(12) United States Patent
Morgan et al.

(10) Patent No.: US 7,202,613 B2
(45) Date of Patent: Apr. 10, 2007

(54) CONTROLLED LIGHTING METHODS AND APPARATUS

(75) Inventors: Frederick M. Morgan, Quincy, MA (US); Kevin J. Dowling, Westford, MA (US); Ihor A. Lys, Milton, MA (US); Brian Roberge, West Roxbury, MA (US); Brian Chemel, Salem, MA (US); Jeff Hyer, Newburyport, MA (US); Michael K. Blackwell, Milton, MA (US); John Warwick, Cambridge, MA (US)

(73) Assignee: Color Kinetics Incorporated, Boston, MA (US)

( * ) Notice: Subject to any disclaimer, the term of this patent is extended or adjusted under 35 U.S.C. 154(b) by 0 days.

(21) Appl. No.: 10/360,594

(22) Filed: Feb. 6, 2003

(65) Prior Publication Data
US 2004/0160199 A1    Aug. 19, 2004

Related U.S. Application Data

(63) Continuation-in-part of application No. 09/870,193, filed on May 30, 2001, now Pat. No. 6,608,453, and a continuation-in-part of application No. 10/325,635, filed on Dec. 19, 2002, and a continuation-in-part of application No. 10/163,164, filed on Jun. 5, 2002, and a continuation-in-part of application No. 10/158,579, filed on May 30, 2002, now Pat. No. 6,777,891, and a continuation-in-part of application No. 10/045,604, filed on Oct. 23, 2001.

(60) Provisional application No. 60/415,897, filed on Oct. 3, 2002, provisional application No. 60/401,964, filed on Aug. 8, 2002, provisional application No. 60/401,965, filed on Aug. 8, 2002, provisional application No. 60/354,692, filed on Feb. 6, 2002.

(51) Int. Cl.
    *H05B 37/00*    (2006.01)
(52) U.S. Cl. .................. 315/312; 315/313; 315/314; 362/363; 362/375
(58) Field of Classification Search ............ 315/185 R, 315/185 S, 186, 312, 313, 314; 362/31, 362/29, 26, 362, 363, 375; 715/771
See application file for complete search history.

(56) References Cited

U.S. PATENT DOCUMENTS 2,135,480 A    11/1938    Birdseye (Continued)

FOREIGN PATENT DOCUMENTS

AU        6 267 9        12/1996

(Continued)

OTHER PUBLICATIONS iLight Technologies, "Explore the iLight Possibilities", http://www.ilight-tech.com, Sep. 7, 2004, 1 page.

(Continued)

*Primary Examiner*—David Vu
(74) *Attorney, Agent, or Firm*—Wolf, Greenfield & Sacks, P.C.

(57) ABSTRACT

Described herein are lighting units of a variety of types and configurations, including linear lighting units suitable for lighting large spaces, such as building exteriors and interiors. Also provided herein are methods and systems for powering lighting units, controlling lighting units, authoring displays for lighting units, and addressing control data for lighting units.

72 Claims, 78 Drawing Sheets

U.S. PATENT DOCUMENTS

| | | |
|---|---|---|
| 2,769,897 A | 11/1956 | Rzeszutko |
| 2,909,097 A | 10/1959 | Alden et al. |
| 3,318,185 A | 5/1967 | Kott |
| 3,561,719 A | 2/1971 | Grindle |
| 3,586,936 A | 6/1971 | McLeroy |
| 3,601,621 A | 8/1971 | Ritchie |
| 3,643,088 A | 2/1972 | Osteen et al. |
| 3,746,918 A | 7/1973 | Drucker et al. |
| 3,818,216 A | 6/1974 | Larraburu |
| 3,832,503 A | 8/1974 | Crane |
| 3,858,086 A | 12/1974 | Anderson et al. |
| 3,909,670 A | 9/1975 | Wakamatsu et al. |
| 3,924,120 A | 12/1975 | Cox, III |
| 3,958,885 A | 5/1976 | Stockinger et al. |
| 3,974,637 A | 8/1976 | Bergey et al. |
| 4,001,571 A | 1/1977 | Martin |
| 4,054,814 A | 10/1977 | Fegley et al. |
| 4,070,568 A | 1/1978 | Gala |
| 4,082,395 A | 4/1978 | Donato et al. |
| 4,096,349 A | 6/1978 | Donato |
| 4,241,295 A | 12/1980 | Williams, Jr. |
| 4,271,408 A | 6/1981 | Teshima et al. |
| 4,272,689 A | 6/1981 | Crosby et al. |
| 4,273,999 A | 6/1981 | Pierpoint |
| 4,298,869 A | 11/1981 | Okuno |
| 4,329,625 A | 5/1982 | Nishizawa et al. |
| 4,339,788 A | 7/1982 | White et al. |
| 4,342,947 A | 8/1982 | Bloyd |
| 4,367,464 A | 1/1983 | Kurahashi et al. |
| 4,388,567 A | 6/1983 | Yamazaki et al. |
| 4,388,589 A | 6/1983 | Molldrem, Jr. |
| 4,392,187 A | 7/1983 | Bornhorst |
| 4,420,711 A | 12/1983 | Takahashi et al. |
| 4,455,562 A | 6/1984 | Dolan et al. |
| 4,470,044 A | 9/1984 | Bell |
| 4,500,796 A | 2/1985 | Quin |
| 4,597,033 A | 6/1986 | Meggs et al. |
| 4,622,881 A | 11/1986 | Rand |
| 4,625,152 A | 11/1986 | Nakai |
| 4,635,052 A | 1/1987 | Aoike et al. |
| 4,647,217 A | 3/1987 | Havel |
| 4,654,629 A | 3/1987 | Bezos et al. |
| 4,656,398 A | 4/1987 | Michael et al. |
| 4,668,895 A | 5/1987 | Schneiter |
| 4,675,575 A | 6/1987 | Smith et al. |
| 4,682,079 A | 7/1987 | Sanders et al. |
| 4,686,425 A | 8/1987 | Havel |
| 4,687,340 A | 8/1987 | Havel |
| 4,688,154 A | 8/1987 | Nilssen |
| 4,688,869 A | 8/1987 | Kelly |
| 4,695,769 A | 9/1987 | Schweickardt |
| 4,701,669 A | 10/1987 | Head et al. |
| 4,705,406 A | 11/1987 | Havel |
| 4,707,141 A | 11/1987 | Havel |
| 4,727,289 A | 2/1988 | Uchida |
| 4,740,882 A | 4/1988 | Miller |
| 4,753,148 A | 6/1988 | Johnson |
| 4,771,274 A | 9/1988 | Havel |
| 4,780,621 A | 10/1988 | Bartleucci et al. |
| 4,794,383 A | 12/1988 | Havel |
| 4,818,072 A | 4/1989 | Mohebban |
| 4,824,269 A | 4/1989 | Havel |
| 4,833,542 A | 5/1989 | Hara et al. |
| 4,837,565 A | 6/1989 | White |
| 4,843,627 A | 6/1989 | Stebbins |
| 4,845,481 A | 7/1989 | Havel |
| 4,845,745 A | 7/1989 | Havel |
| 4,857,801 A | 8/1989 | Farrell |
| 4,858,088 A | 8/1989 | Agabekov |
| 4,863,223 A | 9/1989 | Weissenbach et al. |
| 4,870,325 A | 9/1989 | Kazar |
| 4,874,320 A | 10/1989 | Freed et al. |
| 4,887,074 A | 12/1989 | Simon et al. |
| 4,922,154 A | 5/1990 | Cacoub |
| 4,934,852 A | 6/1990 | Havel |
| 4,962,687 A | 10/1990 | Belliveau et al. |
| 4,965,561 A | 10/1990 | Havel |
| 4,973,835 A | 11/1990 | Kurosu et al. |
| 4,979,081 A | 12/1990 | Leach et al. |
| 4,980,806 A | 12/1990 | Taylor et al. |
| 4,992,704 A | 2/1991 | Stinson |
| 5,003,227 A | 3/1991 | Nilssen |
| 5,008,595 A | 4/1991 | Kazar |
| 5,008,788 A | 4/1991 | Palinkas |
| 5,010,459 A | 4/1991 | Taylor et al. |
| 5,027,262 A | 6/1991 | Freed |
| 5,034,807 A | 7/1991 | Von Kohorn |
| 5,036,248 A | 7/1991 | McEwan et al. |
| 5,038,255 A | 8/1991 | Nishihashi et al. |
| 5,057,981 A | 10/1991 | Bowen et al. |
| 5,072,216 A | 12/1991 | Grange |
| 5,078,039 A | 1/1992 | Tulk et al. |
| 5,083,063 A | 1/1992 | Brooks |
| 5,089,748 A | 2/1992 | Ihms |
| 5,107,408 A | 4/1992 | Vernondier |
| 5,122,733 A | 6/1992 | Havel |
| 5,126,634 A | 6/1992 | Johnson |
| 5,128,595 A | 7/1992 | Hara |
| 5,130,909 A | 7/1992 | Gross |
| 5,134,387 A | 7/1992 | Smith et al. |
| 5,142,199 A | 8/1992 | Elwell |
| 5,154,641 A | 10/1992 | McLaughlin |
| 5,161,879 A | 11/1992 | McDermott |
| 5,164,715 A | 11/1992 | Kashiwabara et al. |
| 5,184,114 A | 2/1993 | Brown |
| 5,194,854 A | 3/1993 | Havel |
| 5,209,560 A | 5/1993 | Taylor et al. |
| 5,225,765 A | 7/1993 | Callahan et al. |
| 5,226,723 A | 7/1993 | Chen |
| 5,254,910 A | 10/1993 | Yang |
| 5,256,948 A | 10/1993 | Boldin et al. |
| 5,268,828 A | 12/1993 | Miura |
| 5,278,542 A | 1/1994 | Smith et al. |
| 5,278,610 A | 1/1994 | Ishiwatari et al. |
| 5,282,121 A | 1/1994 | Bornhorst et al. |
| 5,283,517 A | 2/1994 | Havel |
| 5,287,352 A | 2/1994 | Jackson et al. |
| 5,294,865 A | 3/1994 | Haraden |
| 5,298,871 A | 3/1994 | Shimohara |
| 5,301,090 A | 4/1994 | Hed |
| 5,307,295 A | 4/1994 | Taylor et al. |
| 5,309,541 A | 5/1994 | Flint |
| 5,329,431 A | 7/1994 | Taylor et al. |
| 5,350,977 A | 9/1994 | Hamamoto et al. |
| 5,353,786 A | 10/1994 | Wilk |
| 5,357,170 A | 10/1994 | Luchaco et al. |
| 5,371,618 A | 12/1994 | Tai et al. |
| 5,374,876 A | 12/1994 | Horibata et al. |
| 5,375,043 A | 12/1994 | Tokunaga |
| 5,381,074 A | 1/1995 | Rudzewicz et al. |
| 5,388,357 A | 2/1995 | Malita |
| 5,402,702 A | 4/1995 | Hata |
| 5,404,282 A | 4/1995 | Klinke et al. |
| 5,406,176 A | 4/1995 | Sugden |
| 5,410,328 A | 4/1995 | Yoksza et al. |
| 5,412,284 A | 5/1995 | Moore et al. |
| 5,412,552 A | 5/1995 | Fernandes |
| 5,418,697 A | 5/1995 | Chiou |
| 5,420,482 A | 5/1995 | Phares |
| 5,421,059 A | 6/1995 | Leffers, Jr. |
| 5,432,408 A | 7/1995 | Matsuda et al. |
| 5,436,535 A | 7/1995 | Yang |
| 5,436,853 A | 7/1995 | Shimohara |
| 5,450,301 A | 9/1995 | Waltz et al. |

| | | | | | |
|---|---|---|---|---|---|
| 5,461,188 A | 10/1995 | Drago et al. | 6,025,550 A | 2/2000 | Kato |
| 5,463,280 A | 10/1995 | Johnson | 6,031,343 A | 2/2000 | Recknagel et al. |
| 5,465,144 A | 11/1995 | Parker et al. | 6,056,420 A | 5/2000 | Wilson et al. |
| 5,475,300 A | 12/1995 | Havel | 6,068,383 A | 5/2000 | Robertson et al. |
| 5,489,827 A | 2/1996 | Xia | 6,069,597 A | 5/2000 | Hansen |
| 5,491,402 A | 2/1996 | Small | 6,072,280 A | 6/2000 | Allen |
| 5,493,183 A | 2/1996 | Kimball | 6,074,074 A | 6/2000 | Marcus |
| 5,504,395 A | 4/1996 | Johnson et al. | 6,092,915 A | 7/2000 | Rensch |
| 5,519,496 A | 5/1996 | Borgert et al. | 6,095,661 A | 8/2000 | Lebens et al. |
| 5,545,950 A | 8/1996 | Cho | 6,097,352 A | 8/2000 | Zavracky et al. |
| 5,559,681 A * | 9/1996 | Duarte ................ 362/252 | 6,127,783 A | 10/2000 | Pashley et al. |
| 5,561,346 A | 10/1996 | Byrne | 6,132,072 A | 10/2000 | Turnbull et al. |
| 5,575,459 A | 11/1996 | Anderson | 6,135,604 A | 10/2000 | Lin |
| 5,575,554 A | 11/1996 | Guritz | 6,150,774 A | 11/2000 | Mueller et al. |
| 5,577,832 A | 11/1996 | Lodhie | 6,158,882 A | 12/2000 | Bischoff, Jr. |
| 5,592,051 A | 1/1997 | Korkala | 6,166,496 A | 12/2000 | Lys et al. |
| 5,607,227 A | 3/1997 | Yasumoto et al. | 6,181,126 B1 | 1/2001 | Havel |
| 5,614,788 A | 3/1997 | Mullins et al. | 6,183,086 B1 | 2/2001 | Neubert |
| 5,621,282 A | 4/1997 | Haskell | 6,183,104 B1 | 2/2001 | Ferrara |
| 5,621,603 A | 4/1997 | Adamec et al. | 6,183,108 B1 | 2/2001 | Herold |
| 5,633,629 A | 5/1997 | Hockstein | 6,184,628 B1 | 2/2001 | Ruthenberg |
| 5,634,711 A | 6/1997 | Kennedy et al. | 6,196,471 B1 | 3/2001 | Ruthenberg |
| 5,640,061 A | 6/1997 | Bornhorst et al. | 6,211,626 B1 | 4/2001 | Lys et al. |
| 5,642,129 A | 6/1997 | Zavracky et al. | 6,215,409 B1 | 4/2001 | Blach |
| 5,653,529 A | 8/1997 | Spocharski | 6,237,290 B1 | 5/2001 | Tokomoto et al. |
| 5,655,830 A | 8/1997 | Ruskouski | 6,241,364 B1 * | 6/2001 | Want et al. ................ 362/234 |
| 5,656,935 A | 8/1997 | Havel | 6,250,774 B1 | 6/2001 | Begemann et al. |
| 5,673,059 A | 9/1997 | Zavracky et al. | 6,252,358 B1 | 6/2001 | Xydis et al. |
| 5,682,035 A | 10/1997 | Gallagher et al. | 6,273,338 B1 | 8/2001 | White |
| 5,684,309 A | 11/1997 | McIntosh et al. | 6,283,612 B1 | 9/2001 | Hunter |
| 5,688,042 A | 11/1997 | Madadi et al. | 6,292,901 B1 | 9/2001 | Lys et al. |
| 5,701,058 A | 12/1997 | Roth | 6,310,590 B1 | 10/2001 | Havel |
| 5,712,650 A | 1/1998 | Barlow | 6,323,832 B1 | 11/2001 | Nishizawa et al. |
| 5,721,471 A | 2/1998 | Begemann et al. | 6,329,764 B1 | 12/2001 | van de Ven |
| 5,734,590 A | 3/1998 | Tebbe | 6,330,111 B1 | 12/2001 | Myers |
| 5,751,118 A | 5/1998 | Mortimer | 6,331,915 B1 | 12/2001 | Myers |
| 5,752,766 A | 5/1998 | Bailey et al. | 6,340,868 B1 | 1/2002 | Lys et al. |
| 5,769,527 A | 6/1998 | Taylor et al. | 6,361,186 B1 | 3/2002 | Slayden |
| 5,784,006 A | 7/1998 | Hockstein | 6,369,525 B1 | 4/2002 | Chang et al. |
| 5,786,992 A * | 7/1998 | Vinciarelli et al. ........... 363/89 | 6,371,637 B1 | 4/2002 | Atchinson et al. |
| 5,790,329 A | 8/1998 | Klaus et al. | 6,394,623 B1 | 5/2002 | Tsui |
| 5,803,579 A | 9/1998 | Turnbull et al. | 6,445,139 B1 | 9/2002 | Marshall et al. |
| 5,808,689 A | 9/1998 | Small | 6,448,550 B1 | 9/2002 | Nishimura |
| 5,812,105 A | 9/1998 | Van de Ven | 6,459,919 B1 | 10/2002 | Lys et al. |
| 5,821,695 A | 10/1998 | Vilanilam et al. | 6,466,234 B1 * | 10/2002 | Pyle et al. ................ 715/771 |
| 5,836,676 A | 11/1998 | Ando et al. | 6,495,964 B1 | 12/2002 | Muthu et al. |
| 5,848,837 A | 12/1998 | Gustafson | 6,528,954 B1 | 3/2003 | Mueller et al. |
| 5,850,126 A | 12/1998 | Kanbar | 6,548,967 B1 | 4/2003 | Dowling et al. |
| 5,851,063 A | 12/1998 | Doughty et al. | 6,550,952 B1 | 4/2003 | Hulse et al. |
| 5,852,658 A | 12/1998 | Knight et al. | 6,551,282 B1 | 4/2003 | Exline et al. |
| 5,854,542 A | 12/1998 | Forbes | 6,561,690 B2 | 5/2003 | Balestriero et al. |
| RE36,030 E | 1/1999 | Nadeau | 6,566,824 B2 | 5/2003 | Panagotacos et al. |
| 5,859,508 A | 1/1999 | Ge et al. | 6,577,080 B2 | 6/2003 | Lys et al. |
| 5,887,968 A | 3/1999 | Logan | 6,582,103 B1 | 6/2003 | Popovich et al. |
| 5,896,010 A | 4/1999 | Mikolajczak et al. | 6,592,238 B2 | 7/2003 | Cleaver et al. |
| 5,907,742 A | 5/1999 | Johnson et al. | 6,596,977 B2 | 7/2003 | Muthu et al. |
| 5,912,653 A | 6/1999 | Fitch | 6,608,453 B2 | 8/2003 | Morgan et al. |
| 5,924,784 A | 7/1999 | Chliwnyj et al. | 6,609,813 B1 | 8/2003 | Showers et al. |
| 5,927,845 A | 7/1999 | Gustafson et al. | 6,624,597 B2 | 9/2003 | Dowling et al. |
| 5,946,209 A | 8/1999 | Eckel et al. | 6,636,003 B2 | 10/2003 | Rahm et al. |
| 5,949,581 A | 9/1999 | Kurtenbach et al. | 6,683,423 B2 | 1/2004 | Cunningham |
| 5,952,680 A | 9/1999 | Strite | 6,693,556 B1 * | 2/2004 | Jones et al. ................ 340/907 |
| 5,959,547 A | 9/1999 | Tubel et al. | 6,717,376 B2 | 4/2004 | Lys et al. |
| 5,961,201 A | 10/1999 | Gismondi | 6,720,745 B2 | 4/2004 | Mueller et al. |
| 5,963,185 A | 10/1999 | Havel | 6,726,350 B1 | 4/2004 | Herold |
| 5,974,553 A | 10/1999 | Gandar | 6,749,310 B2 | 6/2004 | Pohlert |
| 5,980,064 A | 11/1999 | Metroyanis | 2001/0033488 A1 | 10/2001 | Chliwnyj et al. |
| 5,982,969 A | 11/1999 | Sugiyama et al. | 2002/0038157 A1 | 3/2002 | Dowling et al. |
| 6,008,783 A | 12/1999 | Kitagawa et al. | 2002/0044066 A1 | 4/2002 | Dowling et al. |
| 6,016,038 A | 1/2000 | Mueller et al. | 2002/0047569 A1 | 4/2002 | Dowling et al. |
| 6,018,237 A | 1/2000 | Havel | 2002/0047624 A1 | 4/2002 | Stam et al. |
| 6,020,825 A | 2/2000 | Chansky et al. | 2002/0048169 A1 | 4/2002 | Dowling et al. |
| 6,023,255 A | 2/2000 | Bell | 2002/0057061 A1 | 5/2002 | Mueller et al. |

| | | | | | | |
|---|---|---|---|---|---|---|
| 2002/0060526 | A1 | 5/2002 | Timmermans et al. | EP | 0734082 A2 | 9/1996 |
| 2002/0070688 | A1 | 6/2002 | Dowling et al. | EP | 0752632 A2 | 1/1997 |
| 2002/0074559 | A1 | 6/2002 | Dowling et al. | EP | 0752632 A3 | 8/1997 |
| 2002/0078221 | A1 | 6/2002 | Blackwell et al. | EP | 0823812 A2 | 2/1998 |
| 2002/0101197 | A1 | 8/2002 | Lys et al. | EP | 0935234 A1 | 8/1999 |
| 2002/0114155 | A1 | 8/2002 | Katogi et al. | EP | 0942631 A2 | 9/1999 |
| 2002/0126064 | A1* | 9/2002 | Yen .............................. 345/5 | EP | 1020352 A2 | 7/2000 |
| 2002/0130627 | A1 | 9/2002 | Morgan et al. | EP | 1113215 A2 | 7/2001 |
| 2002/0145394 | A1 | 10/2002 | Morgan et al. | EP | 1162400 A2 | 12/2001 |
| 2002/0145869 | A1 | 10/2002 | Dowling | FR | 88 17359 | 12/1998 |
| 2002/0152045 | A1 | 10/2002 | Dowling et al. | GB | 2045098 A | 10/1980 |
| 2002/0153851 | A1 | 10/2002 | Morgan et al. | GB | 2131589 A | 11/1982 |
| 2002/0158583 | A1 | 10/2002 | Lys et al. | GB | 2135536 A | 8/1984 |
| 2002/0163316 | A1 | 11/2002 | Dowling et al. | GB | 2176042 A | 12/1986 |
| 2002/0171365 | A1 | 11/2002 | Morgan et al. | GB | 2210720 A | 6/1989 |
| 2002/0171377 | A1 | 11/2002 | Morgan et al. | JP | 2247688 | 10/1990 |
| 2002/0171378 | A1 | 11/2002 | Morgan et al. | JP | 03045166 | 2/1991 |
| 2002/0176259 | A1 | 11/2002 | Ducharme | JP | 06043830 | 2/1994 |
| 2002/0195975 | A1 | 12/2002 | Dowling et al. | JP | 7-39120 | 7/1995 |
| 2003/0011538 | A1 | 1/2003 | Lys et al. | JP | 8-106264 | 4/1996 |
| 2003/0021115 | A1 | 1/2003 | Sloan et al. | JP | 8-007611 | 12/1996 |
| 2003/0028260 | A1 | 2/2003 | Blackwell | JP | 9 320766 | 12/1997 |
| 2003/0038822 | A1* | 2/2003 | Raskar ...................... 345/632 | KR | 1019910009812 | 11/1991 |
| 2003/0048641 | A1 | 3/2003 | Alexanderson et al. | WO | WO 89/05086 | 6/1989 |
| 2003/0057884 | A1 | 3/2003 | Dowling et al. | WO | WO 94/18809 | 8/1994 |
| 2003/0057886 | A1 | 3/2003 | Lys et al. | WO | WO 95/13498 | 5/1995 |
| 2003/0057887 | A1 | 3/2003 | Dowling et al. | WO | WO 96/41098 | 12/1996 |
| 2003/0057890 | A1 | 3/2003 | Lys et al. | WO | WO 99/06759 | 2/1999 |
| 2003/0076281 | A1 | 4/2003 | Morgan et al. | WO | WO 99/30537 A1 | 6/1999 |
| 2003/0100837 | A1 | 5/2003 | Lys et al. | WO | WO 00/14705 | 3/2000 |
| 2003/0107887 | A1 | 6/2003 | Eberl | WO | WO 01/73818 A1 | 10/2001 |
| 2003/0133292 | A1 | 7/2003 | Mueller et al. | WO | WO 02/061328 A1 | 8/2002 |
| 2003/0137258 | A1 | 7/2003 | Piepgras et al. | | | |
| 2003/0189412 | A1 | 10/2003 | Cunningham | | | |
| 2003/0198061 | A1 | 10/2003 | Chambers et al. | | | |
| 2003/0222587 | A1 | 12/2003 | Dowling et al. | | | |
| 2004/0032226 | A1 | 2/2004 | Lys | | | |
| 2004/0036006 | A1 | 2/2004 | Dowling | | | |
| 2004/0052076 | A1 | 3/2004 | Mueller et al. | | | |
| 2004/0066652 | A1 | 4/2004 | Hong | | | |
| 2004/0090787 | A1 | 5/2004 | Dowling et al. | | | |
| 2004/0105261 | A1 | 6/2004 | Ducharme et al. | | | |
| 2004/0130909 | A1 | 7/2004 | Mueller et al. | | | |
| 2005/0122293 | A1 | 6/2005 | Wang | | | |

FOREIGN PATENT DOCUMENTS

| | | |
|---|---|---|
| CA | 2 134 848 | 5/1995 |
| CA | 2 178 432 | 12/1996 |
| DE | 02315709 | 10/1974 |
| DE | 0205307 | 12/1983 |
| DE | 03438154 A1 | 4/1986 |
| DE | 3837313 | 5/1989 |
| DE | 3805998 | 9/1989 |
| DE | 3925767 A1 | 4/1990 |
| DE | 8902905 | 5/1990 |
| DE | 3917101 | 11/1990 |
| DE | 3916875 | 12/1990 |
| DE | 4041338 | 7/1992 |
| DE | 4130576 C1 | 3/1993 |
| DE | 9414688 U1 | 2/1995 |
| DE | 9414689 | 2/1995 |
| DE | 4419006 A1 | 12/1995 |
| DE | 29607270 U1 | 8/1996 |
| DE | 19525897 | 10/1996 |
| DE | 19525987 | 10/1996 |
| DE | 29620583 U1 | 3/1997 |
| DE | 19651140 A1 | 6/1997 |
| DE | 19602891 A1 | 7/1997 |
| EP | 0482680 A1 | 4/1992 |
| EP | 0495305 A2 | 7/1992 |
| EP | 0567280 B1 | 10/1993 |
| EP | 0534710 B1 | 1/1996 |

OTHER PUBLICATIONS iLight Technologies, "Curved or straight in white or color", http://www.ilight-tech.com/products.htm, Sep. 7, 2004, 1 page.

iLight Technologies, "Curved or straight in white or color",/products_white.htm, Sep. 7, 2004, 1 page.

iLight Technologies, "Curved or straight in white or color",/products_color.htm, Sep. 7, 2004, 1 page.

iLight Technologies, "Curved or straight in white or color",/products_signs.htm, Sep. 7, 2004, 1 page.

Co-Pending U.S. Appl. No. 09/333,739, filed Jun. 15, 1999, entitled "Diffuse Illumination Systems and Methods."

Co-Pending U.S. Appl. No. 10/245,786, filed Sep. 17, 2002, Colin Piepgras, et al., entitled "Light Emitting Diode Based Products."

* "LM117/LM317A/LM317 3-Terminal Adjustable Regulator", National Semiconductor Corporation, May 1997, pp. 1-20.

* "DS96177 RS-485 / RS-422 Differential Bus Repeater", National Semiconductor Corporation, Feb. 1996, pp. 1-8.

* "DS2003 / DA9667 / DS2004 High Current / Voltage Darlington Drivers", National Semiconductor Corporation, Dec. 1995, pp. 1-8.

* "LM140A / LM140 / LM340A / LM7800C Series 3—Terminal Positive Regulators", National Semiconductor Corporation, Jan. 1995, pp. 1-14.

* High End Systems, Inc., Trackspot User Manual, Aug. 1997, Excerpts (Cover, Title page, pp. ii through iii and 2-13 through 2-14).

* Artistic License, AL4000 DMX512 Processors, Revision 3.4, Jun. 2000, Excerpts (Cover, pp. 7,92 through 102).

* Artistic License, Miscellaneous Drawings (3 sheets) Jan. 12, 1995.

* Artistic License, Miscellaneous Documents (2 sheets Feb. 1995 and Apr. 1996).

* Newnes's Dictionary of Electronics, Fourth Edition, S.W. Amos, et al., Preface to First Edition, pp. 278-279.

*"http://www.luminus.cx/projects/chaser", (Nov. 13, 2000), pp. 1-16.

* Hewlett Packard Components, "Solid State Display and Optoelectronics Designer's Catalog," pp. 30-43, Jul. 1973.

* INTEC Research, TRACKSPOT, http://www.intec-research.com/trackspot.htm, pp. 1-4, Apr. 24, 2003.

* SHARP, Optoelectronics Data Book, pp. 1096-1097, 1994/1995.

* About DMX-512 Lighting Protocol—Pangolin Laser Systems, pp. 1-4, Apr. 7, 2003.
* Avitec Licht Design '89-90, pp. 1-4.
* Dr. Ing, Ulrich Tietze, Dr. Ing, Christoph Schenk, pp. 566-569.
*Case No. 6:02-cv-270-ORL-19JGG in the United States District Court, Middle District of Florida, Orlando Division, Plaintiff's Amended Verified Complaint.
*Case No. 6:02-cv-270-ORL-19JGG in the United States District Court, Middle District of Florida, Orlando Division, Defendant's Answer and Counterclaims.
*Case No. 6:02-cv-270-ORL-19JGG in the United States District Court, Middle District of Florida, Orlando Division, Plaintiff's Answer to Counterclaims.
*Case No. 6:02-cv-270-ORL-19JGG in the United States District Court, Middle District of Florida, Orlando Division, Plaintiff's Answers to Defendant's First Set of Interrogatories w/Exhibit 1.
*Case No. 02 CV 11137MEL in the United States District Court, District of Massachusetts, Plaintiff's Complaint and Jury Demand.
*Case No. 02 CV 11137MEL in the United States District Court, District of Massachusetts, Defendant's Answer and Affirmative Defenses.
* Furry, Kevin and Somerville, Chuck, Affidavit, LED effects, Feb. 22, 2002, pp. 24-29.
* Putman, Peter H., "The Allure of LED," www.sromagazine.biz, Jun./Jul. 2002, pp. 47-52.
* Bremer, Darlene, "LED Advancements Increase Potential," www.ecmag.com, Apr. 2002, p. 115.
* Longo, Linda, "LEDS Lead the Way," Home Lighting & Accessories, Jun. 2002, pp. 226-234.

* cited by examiner

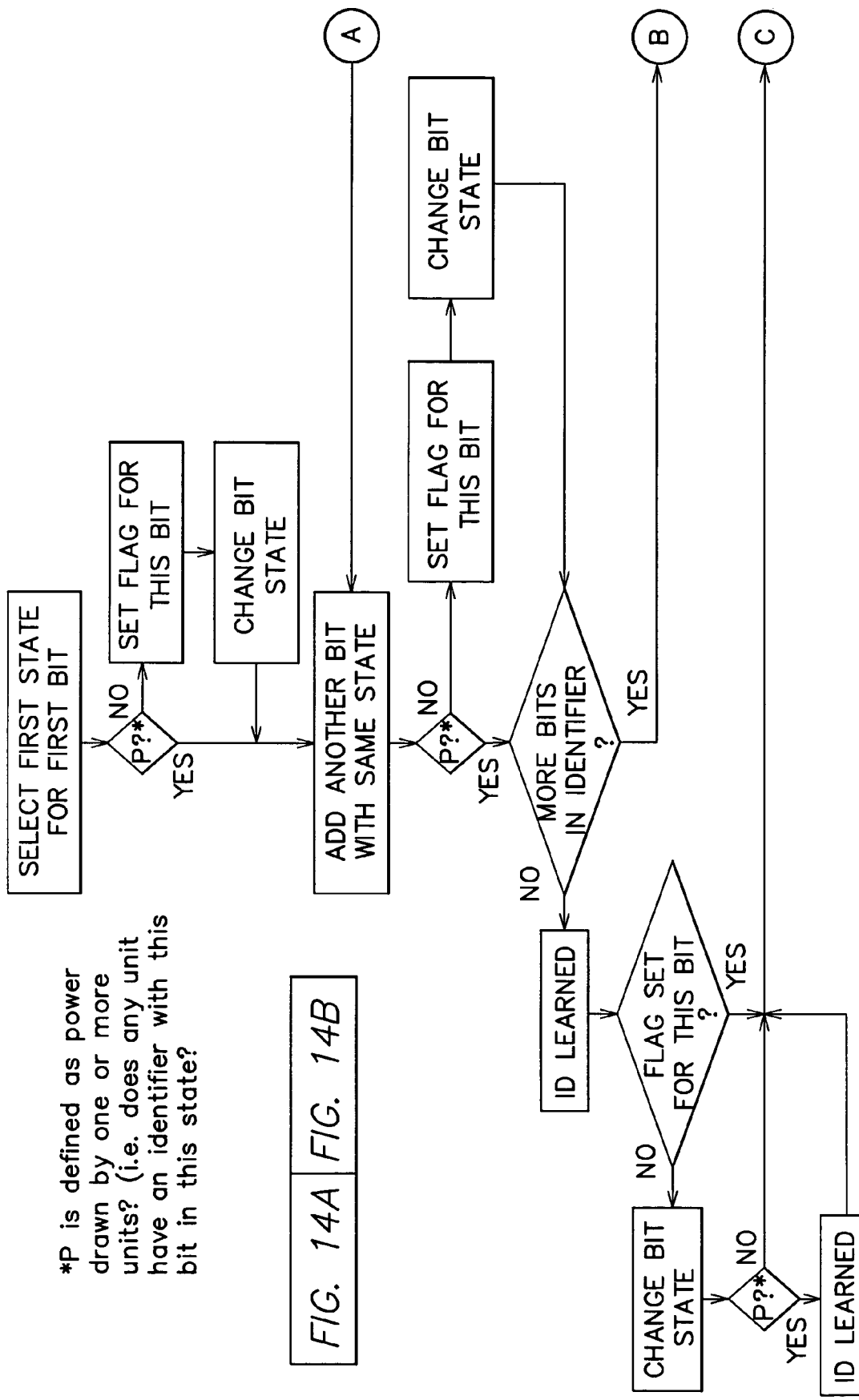

FIG. 26

| LIGHT SYSTEM | TIME | POSITION | LIT POSITION | COLOR RANGE | INTENSITY | OTHER SYS. | POSITION |
|---|---|---|---|---|---|---|---|
| LS001 | T1 | (1, 3, 7) | POLY001 | 0-16000 | 0-100 | | |
| LS001 | T2 | (1, 3, 7) | PLOY001 | 0-16000 | | | |
| LS001 | T3 | (1, 3, 7) | POLY002 | 0-16000 | | | |
| LS002 | T1 | (0, 0, 0) | POLY003 | 0-16000 | | | |
| LS002 | T2 | (0, 0, 0) | POLY004 | 0-16000 | | | |
| LS002 | T3 | (0, 0, 0) | POLY005 | | | | |
| | | | | | | | |
| | | | | | | | |
| | | | | | | | |
| | | | | | | | |
| LS00N | TN | | | | | | |

| LIGHT | DIRECTION | POSITION | ATTRIBUTE | ATTRIBUTE | INTENSITY |
|---|---|---|---|---|---|
| LS001 | D1001 | (1, 3, 7) | POLY001 | 0–16000 | 0–100 |
| LS001 | D1002 | (1, 3, 7) | POLY001 | 0–16000 | |
| LS001 | D2005 | (1, 3, 7) | POLY002 | 0–16000 | |
| LS002 | D1008 | (0, 0, 0) | POLY003 | 0–16000 | |
| LS002 | D1010 | (0, 0, 0) | POLY004 | 0–16000 | |
| LS002 | D1001 | (0, 0, 0) | POLY005 | | |

FIG. 37

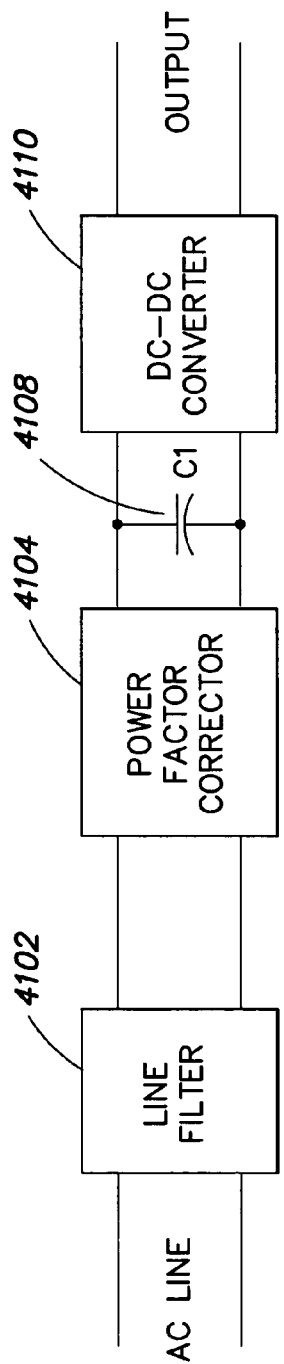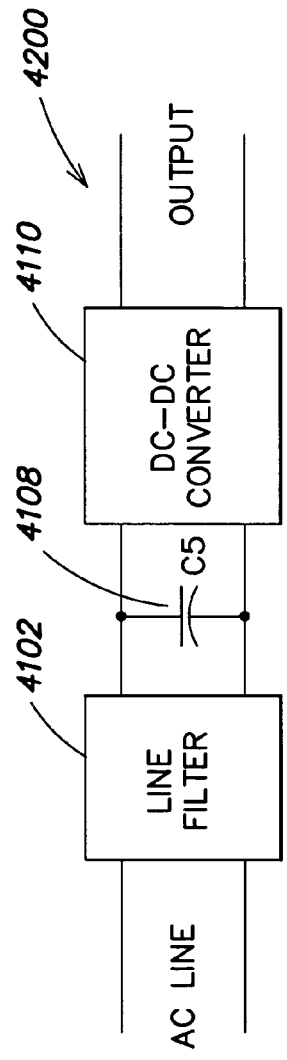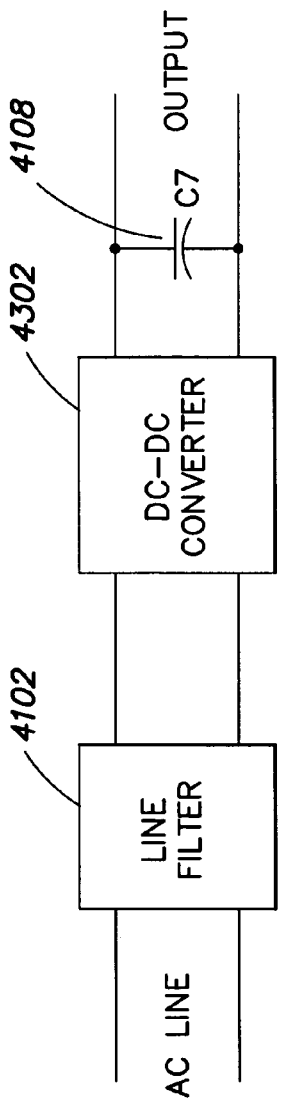

CONTROLLED LIGHTING METHODS AND APPARATUS

CROSS-REFERENCES TO RELATED APPLICATIONS

This patent application claims the benefit under 35 U.S.C. §119(e) of the following U.S. Provisional Applications:

Ser. No. 60/354,692, filed Feb. 6, 2002, entitled "LED Based Lighting Systems";

Ser. No. 60/401,964, filed Aug. 8, 2002, entitled "LED Based Lighting Systems";

Ser. No. 60/401,965, filed Aug. 8, 2002, entitled "Methods and Apparatus for Controlling Addressable Systems;" and Ser. No. 60/415,897, filed Oct. 3, 2002, entitled "Methods and Apparatus for Illuminating Environments".

This application also claims the benefit under 35 U.S.C. §120 as a continuation-in-part (CIP) of the following U.S. Non-provisional applications:

Ser. No. 09/870,193, filed May 30, 2001, entitled "Methods and Apparatus for Controlling Devices in a Networked Lighting System", now U.S. Pat. No. 6,608,453;

Ser. No. 10/045,604, filed Oct. 23, 2001, entitled "Systems and Methods for Digital Entertainment;"

Ser. No. 10/158,579, filed May 30, 2002, entitled "Methods and Apparatus for Controlling Devices in a Networked Lighting System", now U.S. Pat. No. 6,777,891;

Ser. No. 10/163,164, filed Jun. 5, 2002, entitled "Systems and Method of Generating Control Signals;" and Ser. No. 10/325,635, filed Dec. 19, 2002, entitled "Controlled Lighting Methods and Apparatus."

Each of the foregoing applications is hereby incorporated herein by reference.

FIELD OF THE INVENTION

This invention relates to the field of lighting, and more particularly to the field of processor-controlled lighting.

BACKGROUND

With the advent of digital lighting technologies, it is becoming increasingly popular to create lighting networks of light-emitting diode (LED) based lighting devices, as described in U.S. Pat. Nos. 6,016,038, 6,150,774 and 6,166,496, each of which are incorporated herein by reference. Fantastic lighting effects can be created with these systems and the lighting effects can be coordinated through a network to make, for example, a rainbow chase down a hallway or corridor. These lighting systems are generally controlled through a network, although there are many non-networked applications, wherein a data stream containing packets of information is communicated to the lighting devices. Each of the lighting devices may see all of the packets of information but only respond to packets that are addressed to the particular device. Once a properly addressed packet of information arrives, the lighting device may read and execute the commands. This arrangement demands that each of the lighting devices have an address and these addresses need to be unique with respect to the other lighting devices on the network. The addresses are normally set by setting switches on each of the lighting devices during installation. Settings switches tends to be time consuming and error prone.

Lighting systems for theatres, entertainment, retail and architectural venues such as casinos, theme parks, stores, malls, etcetera, require elaborate lighting instruments and, in addition, networks to control the lights. One of the designers' most onerous tasks comes after all the lights are in place: configuration. This involves going to each instrument or light fixture and determining and setting the network address of each unit through the use of switches or dials and then determining the setup and corresponding element on a lighting board or computer. Two people usually accomplish this and, depending on the distance, use walkie-talkies and enter into a lot of back and forth discussion during the process. With sufficient planning and coordination this address selection and setting can be done a priori but still requires substantial time and effort This task can take many hours depending on the locations. For example, a new amusement park ride may use hundreds of lighting fixtures, each of which is controlled over a network and are neither line-of-sight to each other or to any single point. Each one must be identified and a correspondence made between the light and its setting on the lighting control board. Mix-ups and confusion are common during this process.

Currently, networked lighting devices have their addresses set through a series of physical switches such as dials, dipswitches or buttons. These devices have to be individually set to particular addresses and this process can be cumbersome. It would be useful to avoid this process or make the system more user friendly.

There are several other problems associated with these lighting systems. While many such lighting systems are used for indirect lighting, general illumination and the like, some such systems are used for direct view applications. That is, the viewer is directly viewing the light emitted from the lighting system (e.g. accent lighting on a building where the light is intended to outline the perimeter of the building.) Generally, these lighting systems have gaps in light emission towards the ends of the system and alignment of one lighting system next to another produces gaps where there is little or no light produced. There are many installations that require long lines of lighting systems placed in a row or other pattern in an attempt to produce a continuous light line. The gaps in light tend to detract from such applications.

Another problem associated with these systems is that when the LEDs are directly viewed they appear to be discrete light emitters until there is sufficient distance between the light and the viewer. Even when the viewer is relatively far away from the lighting system, the lighting system does not tend to produce very bright or brilliant lighting effects.

Another problem associated with these lighting systems is that the communication and power is fed through the ends of the housing and into junction boxes at the beginning and end of every light. The three lines, power ground, data, are run through each end and then passed through the length of the fixture. Each lighting element in the housing would tap into the three lines for power and data. Mounting of the lights is very expensive because it is done through junction boxes. Every light required two junction boxes to be mounted on the wall or other mounting surface and wires and conduit needs to be run between boxes to allow two lighting units to be connected together.

SUMMARY

One embodiment of the invention is directed to a device that is configured to set the address of an illumination device. For example, many lighting installations have hundreds of LED based lighting devices and these lighting devices may be connected through a network. Lighting control information may be sent over the network and each of the lighting devices may be waiting for addressed instructions. The data may be in the form of a data stream where lighting control information is communicated to all of the lighting devices. The data stream may be broken up into packets where each packet includes an address. Another example of data format is when the position of the data within the data stream indicates its address (e.g. DMX protocol). When a lighting device receives a data packet that is addressed to it the lighting device may read and execute the instructions. This technique is taught in U.S. Pat. No. 6,016,038. Rather than setting dip switches on every lighting device it would be much easier and faster to attach a lighting device to a programming device according to the principles of the invention and load an address into the lighting device. This may take the form of generating an address and then sending the address to the lighting device.

A method of setting the address of a lighting system according to the principles of the invention may include plugging the programming device into the lighting system. The programming device may also power the lighting system. Upon attachment of the programming device the lighting device may power up. A knob on the user interface of the programming device may be rotated to select a program, program parameter, or address mode. After the program has been selected, a parameter may then be selected and set. After the address mode has been selected, an address may be selected and set. The programming device may also automatically increment the address to provide quick setting of many lighting systems in an installation.

The lighting device can also be programmed to log the activities such as address setting, program selection, parameter setting or other settings. This may be useful in retrieving information at a later time. For example, many lighting devices have a unique identifier (e.g. a serial number) and this serial number could be retrieved along with the address settings and changes to the address setting. This information may be retrievable from a central computer operating the lighting network for example. This information could be used to locate the particular lighting device on the network by the serial number. This may be useful in the event the lighting device has to be changed for example. When the lighting device is removed from the network, the central controller, or master controller, may be monitoring the network and realize the lighting device has been removed. When the next lighting device is attached to the system, at a similar location with respect to other lighting devices, the central system or master device may automatically set the address. Other information may also be retrieved from the lighting device such as date of manufacture, calibration information, color settings or other information. The lighting network may also use this information. For example, a network may retrieve information from a lighting device; subsequently the lighting device may malfunction and be replaced. The new lighting device may be of a newer version and as a result it may be much brighter than the original device. The network system could compare the information gathered from the original lighting device and compare it to the information gathered from the replacement device and then adjust the replacement device accordingly.

Another embodiment relates to lighting methods and systems that include providing a substantially linear circuit board, disposing a plurality of light sources along the circuit board, disposing the circuit board and the light sources in a substantially linear housing, providing a light-transmissive cover for the housing and providing a connection facility of the housing that allows a first unit of the lighting system to connect end to end with a second unit of the lighting system without a gap between the housings. In embodiments the light sources are LEDs. In embodiments the processor and the LEDs are on the same circuit board. In embodiments the connection facility is a hole that allows cables to exit the housing at a location other than the end of the housing. In embodiments the processor is an application specific integrated circuit (ASIC). In embodiments the ASIC is configured to receive and transmit a data stream. In embodiments the ASIC responds to data addressed to it, modifies at least one bit of the data stream, and transmits the modified data stream.

The methods and systems disclosed herein may further comprise disposing a plurality of lighting systems in a serial configuration and controlling all of them by a stream of data to respective ASICs of each of them, wherein each lighting system responds to the first unmodified bit of data in the stream, modifies that bit of data, and transmits the stream to the next ASIC.

In embodiments the lighting system may have a housing configured to resemble a fluorescent light. The housing may be linear, curved, bent, branched, or in a "T" or "V" shape, among other shapes.

The methods and systems may further include providing a communication facility of the lighting system, wherein the lighting system responds to data from a source exterior to the lighting system. The data may come from a signal source exterior to the lighting system. The signal source may be a wireless signal source. In embodiments the signal source includes a sensor for sensing an environmental condition, and the control of the lighting system is in response to the environmental condition. In embodiments the signal source generates a signal based on a scripted lighting program for the lighting system.

In embodiments the control of the lighting system is based on assignment of lighting system units as objects in an object-oriented computer program. In embodiments the computer program is an authoring system. In embodiments the authoring system relates attributes in a virtual system to real world attributes of lighting systems. In embodiments the real world attributes include positions of lighting units of the lighting system. In embodiments the computer program is a computer game. In other embodiments the computer program is a music program.

In embodiments of the methods and systems provided herein, the lighting system includes a power supply. In embodiments the power supply is a power-factor-controlled power supply. In embodiments the power supply is a two-stage power supply. In embodiments the power factor correction includes an energy storage capacitor and a DC—DC converter. In embodiments the PFC and energy storage capacitor are separated from the DC—DC converter by a bus.

In embodiments of the methods and systems provided herein, the lighting systems further include disposing at least one such lighting unit on a building. In embodiments the lighting units are disposed in an array on a building. In embodiments the array is configured to facilitate displaying at least one of a number, a word, a letter, a logo, a brand, and a symbol. In embodiments the array is configured to display a light show with time-based effects.

In embodiments of the methods and systems provided herein, the lighting systems can be disposed on a vehicle, an automobile, a boat, a mast, a sail, an airplane, a wing, a fountain, a waterfall or similar item. In other embodiments, lighting units can be disposed on a deck, a stairway, a door, a window, a roofline, a gazebo, a jungle gym, a swing set, a slide, a tree house, a club house, a garage, a shed, a pool, a spa, furniture, an umbrella, a counter, a cabinet, a pond, a walkway, a tree, a fence, a light pole, a statue or other object.

In embodiments the lighting units described herein are configured to be recessed into an alcove or similar facility.

Methods and systems disclosed herein include lighting systems that include a platform, circuit board wherein the circuit board comprises at least one circuit; an illumination source, LED, plurality of LEDs; multi-colored LEDs, wherein the illumination source is associated with the platform, wherein the illumination source is mounted on the circuit board; wherein the illumination source is associated with the at least one circuit, wire, bus, conductor, or plurality of conductors, wherein the foregoing comprises at least one data conductor and at least one power conductor, wherein the wire is electrically associated with the circuit through an insulation displacement system.

Methods and systems disclosed herein include a plurality of lighting systems wherein the plurality of lighting systems are electrically associated; wherein the electrical association comprises at least one conductor wherein the conductor is associated with each of the plurality of lighting systems through an insulation displacement system.

In embodiments the plurality of lighting systems is associated with an optic; wherein the association with the optic comprises an optical association; wherein the association with the optic comprises a mechanical association.

In embodiments the optic comprises an extruded material; wherein the material comprises polycarbonate; wherein the polycarbonate is translucent; wherein the optic further comprises a guide feature and the platform is mechanically associated with the guide feature; wherein the guide feature is on an interior surface of the optic; and wherein the plurality of lighting systems are mechanically associated with the guide feature Methods and systems disclosed herein include a lighting system that includes one or more of various configurations of LEDs, including an LED, an LED color controllable system, two LEDs, two rows of LEDs, two rows of multi-colored LEDs, or LEDs associated with a platform; an addressable controller; an optic, such as an extruded optic, polycarbonate optic, double lobe optic, upper and lower lobe, translucent, transparent, wherein the optic comprises platform guides.

In embodiments the LED illumination system is optically associated with the optic, wherein a plurality of LED illumination systems are associated with the optic, wherein the plurality of LED illumination systems are independently controlled; wherein the plurality of LED illumination systems are multi-colored illumination systems. In embodiments the optical association provides substantially uniform illumination of at least a portion of the optic, wherein the portion is at least a portion of the upper lobe, wherein the at least a portion of the optic is the upper lobe, wherein the LED illumination system projects a substantial portion of light within a beam angle, wherein the beam angle is formed by the light emitted by the two rows of LEDs, wherein the beam angle is aligned to project light onto the interior surface of the optic, wherein the alignment is optimized to generate substantially uniform illumination of the upper lobe of the optic.

Other embodiments include a ridged member, wherein the ridged member comprises metal, plastic, or ceramic. In embodiments the ridged member is mechanically associated with the optic and associated with the lower lobe to provide rigidity to the lighting system. In embodiments the ridged member is adapted to couple to an attachment device wherein the attachment device is adapted to attach the lighting system to another system, wherein the other system comprises a wall, building, exterior of building. In embodiments the methods and systems include at least one end cap, a first end cap associated with a first end of the optic and a second end cap associated with the second end of the optic, wherein the first and second end caps are hermetically sealed to the optic to form a water resistant lighting assembly. In embodiments the end cap comprises platform guides on an interior surface, and the platform is associated with the platform guides, wherein at least one of the first and second end caps comprises a gas exchange port (add a method of exchanging gas from the interior of the lighting system to provide a substantially dry atmosphere in the lighting system). In embodiments at least one of the first and second end caps further comprises an expansion facility, wherein the expansion facility is adapted to capture the ridged member and allow for expansion differences between the ridged member and at least one of the optic and the end cap. In embodiments the end cap comprises a cable sealing portion wherein the cable sealing portion is adapted to pass wires to the interior of the lighting system, wherein the cable sealing portion is hermetically sealed and wherein the cable sealing system further comprises a wire strain relief system. In embodiments the end caps comprise transparent material, translucent material, substantially the same material as the optic, or polycarbonate material, and the lighting system is adapted to provide substantially uniform illumination of the upper lobe and at least an upper portion of the end caps such that a second lighting system can be aligned with the lighting system to form a substantially uniform interconnection of illumination.

Methods and system provided herein also include providing a self-healing lighting system, which may include providing a plurality of lighting units in a system, each having a plurality of light sources; providing at least one processor associated with at least some of the lighting units for controlling the lighting units; providing a network facility for addressing data to each of the lighting units; providing a diagnostic facility for identifying a problem with a lighting unit; and providing a healing facility for modifying the actions of at least one processor to automatically correct the problem identified by the diagnostic facility.

As used herein for purposes of the present disclosure, the term "LED" should be understood to include any light emitting diode or other type of carrier injection/junction-based system that is capable of generating radiation in response to an electric signal. Thus, the term LED includes, but is not limited to, various semiconductor-based structures that emit light in response to current, light emitting polymers, light-emitting strips, electro-luminescent strips, and the like.

In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured to generate radiation having various bandwidths for a given spectrum (e.g., narrow bandwidth, broad bandwidth).

It should be noted that LED(s) in systems according to the present invention might be any color including white, ultraviolet, infrared or other colors within the electromagnetic spectrum. As used herein, the term "LED" should be further understood to include, without limitation, light emitting diodes of all types, light emitting polymers, semiconductor dies that produce light in response to current, organic LEDs, electro-luminescent strips, and other such systems. In an embodiment, an "LED" may refer to a single light emitting diode having multiple semiconductor dies that are individually controlled. It should also be understood that the term "LED" does not restrict the package type of the LED. The term "LED" includes packaged LEDs, non-packaged LEDs, surface mount LEDs, chip on board LEDs and LEDs of all other configurations. The term "LED" also includes LEDs packaged or associated with material (e.g. a phosphor) wherein the material may convert energy from the LED to a different wavelength.

For example, one implementation of an LED configured to generate essentially white light (e.g., a white LED) may include a number of dies which respectively emit different spectrums of luminescence that, in combination, mix to form essentially white light. In another implementation, a white light LED may be associated with a phosphor material that converts luminescence having a first spectrum to a different second spectrum. In one example of this implementation, luminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectrums of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources as defined above, incandescent sources (e.g., filament lamps, halogen lamps), fluorescent sources, phosphorescent sources, high-intensity discharge sources (e.g., sodium vapor, mercury vapor, and metal halide lamps), lasers, other types of luminescent sources, electro-lumiscent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication and/or illumination. An "illumination source" is a light source that is particularly configured to generate radiation having a sufficient intensity to effectively illuminate an interior or exterior space.

An LED system is one type of illumination source. As used herein "illumination source" should be understood to include all illumination sources, including LED systems, as well as incandescent sources, including filament lamps, pyro-luminescent sources, such as flames, candle-luminescent sources, such as gas mantles and carbon arch radiation sources, as well as photo-luminescent sources, including gaseous discharges, fluorescent sources, phosphorescence sources, lasers, electro-luminescent sources, such as electro-luminescent lamps, light emitting diodes, and cathode luminescent sources using electronic satiation, as well as miscellaneous luminescent sources including galvano-luminescent sources, crystallo-luminescent sources, kine-luminescent sources, thermo-luminescent sources, triboluminescent sources, sonoluminescent sources, and radioluminescent sources. Illumination sources may also include luminescent polymers capable of producing primary colors.

The term "illuminate" should be understood to refer to the production of a frequency of radiation by an illumination source. The term "color" should be understood to refer to any frequency of radiation within a spectrum; that is, a "color," as used herein, should be understood to encompass frequencies not only of the visible spectrum, but also frequencies in the infrared and ultraviolet areas of the spectrum, and in other areas of the electromagnetic spectrum.

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (essentially few frequency or wavelength components) or a relatively wide bandwidth (several frequency or wavelength components having various relative strengths). It should also be appreciated that a given spectrum may be the result of a mixing of two or more other spectrums (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to different spectrums having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. The color temperature of white light generally falls within a range of from approximately 700 degrees K (generally considered the first visible to the human eye) to over 10,000 degrees K.

Lower color temperatures generally indicate white light having a more significant red component or a "warmer feel," while higher color temperatures generally indicate white light having a more significant blue component or a "cooler feel." By way of example, a wood burning fire has a color temperature of approximately 1,800 degrees K, a conventional incandescent bulb has a color temperature of approximately 2848 degrees K, early morning daylight has a color temperature of approximately 3,000 degrees K, and overcast midday skies have a color temperature of approximately 10,000 degrees K. A color image viewed under white light having a color temperature of approximately 3,000 degree K has a relatively reddish tone, whereas the same color image viewed under white light having a color temperature of approximately 10,000 degrees K has a relatively bluish tone.

The terms "lighting unit" and "lighting fixture" are used interchangeably herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources.

The terms "processor" or "controller" are used herein interchangeably to describe various apparatus relating to the operation of one or more light sources. A processor or controller can be implemented in numerous ways, such as with dedicated hardware, using one or more microprocessors that are programmed using software (e.g., microcode or firmware) to perform the various functions discussed herein, or as a combination of dedicated hardware to perform some functions and programmed microprocessors and associated circuitry to perform other functions.

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers, including by retrieval of stored sequences of instructions.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present invention, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The lighting systems described herein may also include a user interface used to change and or select the lighting effects displayed by the lighting system. The communication between the user interface and the processor may be accomplished through wired or wireless transmission. The term "user interface" as used herein refers to an interface between a human user or operator and one or more devices that enables communication between the user and the device(s). Examples of user interfaces that may be employed in various implementations of the present invention include, but are not limited to, switches, human-machine interfaces, operator interfaces, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

The following patents and patent applications are hereby incorporated herein by reference:

U.S. Pat. No. 6,016,038, issued Jan. 18, 2000, entitled "Multicolored LED Lighting Method and Apparatus;"

U.S. Pat. No. 6,211,626, issued Apr. 3, 2001 to Lys et al, entitled "Illumination Components;"

U.S. patent application Ser. No. 09/870,193, filed May 30, 2001, entitled "Methods and Apparatus for Controlling Devices in a Networked Lighting System;"

U.S. patent application Ser. No. 09/344,699, filed Jun. 25, 1999, entitled "Method for Software Driven Generation of Multiple Simultaneous High Speed Pulse Width Modulated Signals;"

U.S. patent application Ser. No. 09/805,368, filed Mar. 13, 2001, entitled "Light-Emitting Diode Based Products;"

U.S. patent application Ser. No. 09/663,969, filed Sep. 19, 2000, entitled "Universal Lighting Network Methods and Systems;"

U.S. patent application Ser. No. 09/716,819, filed Nov. 20, 2000, entitled "Systems and Methods for Generating and Modulating Illumination Conditions;"

U.S. patent application Ser. No. 09/675,419, filed Sep. 29, 2000, entitled "Systems and Methods for Calibrating Light Output by Light-Emitting Diodes;"

U.S. patent application Ser. No. 09/870,418, filed May 30, 2001, entitled "A Method and Apparatus for Authoring and Playing Back Lighting Sequences;" and U.S. patent application Ser. No. 10/045,629, filed Oct. 25, 2001, entitled "Methods and Apparatus for Controlling Illumination."

BRIEF DESCRIPTION OF THE DRAWINGS

The foregoing and other objects and advantages of the invention will be appreciated more fully from the following further description thereof, with reference to the accompanying drawings, wherein:

FIG. 14A–14B illustrate a flow chart of an identifier determination/learning algorithm according to one embodiment of the present invention.

FIG. 26 illustrates a configuration file for data relating to light systems in an environment.

FIG. 37 shows a configuration file for attributes of a lighting unit.

FIG. 41 shows a typical low voltage switching power supply.

FIG. 42 shows a block diagram of a typical low voltage power supply with a line filter.

FIG. 43 shows another power supply arrangement with an integrated PFC and DC—DC converter.

DETAILED DESCRIPTION

The description below pertains to several illustrative embodiments of the invention. Although many variations of the invention may be envisioned by one skilled in the art, such variations and improvements are intended to fall within the compass of this disclosure. Thus, the scope of the invention is not to be limited in any way by the disclosure below.

Various embodiments of the present invention are described below, including certain embodiments relating particularly to LED-based light sources. It should be appreciated, however, that the present invention is not limited to any particular manner of implementation, and that the various embodiments discussed explicitly herein are primarily for purposes of illustration. For example, the various concepts discussed herein may be suitably implemented in a variety of environments involving LED-based light sources, other types of light sources not including LEDs, environments that involve both LEDs and other types of light sources in combination, and environments that involve non-lighting-related devices alone or in combination with various types of light sources.

Figure 1:
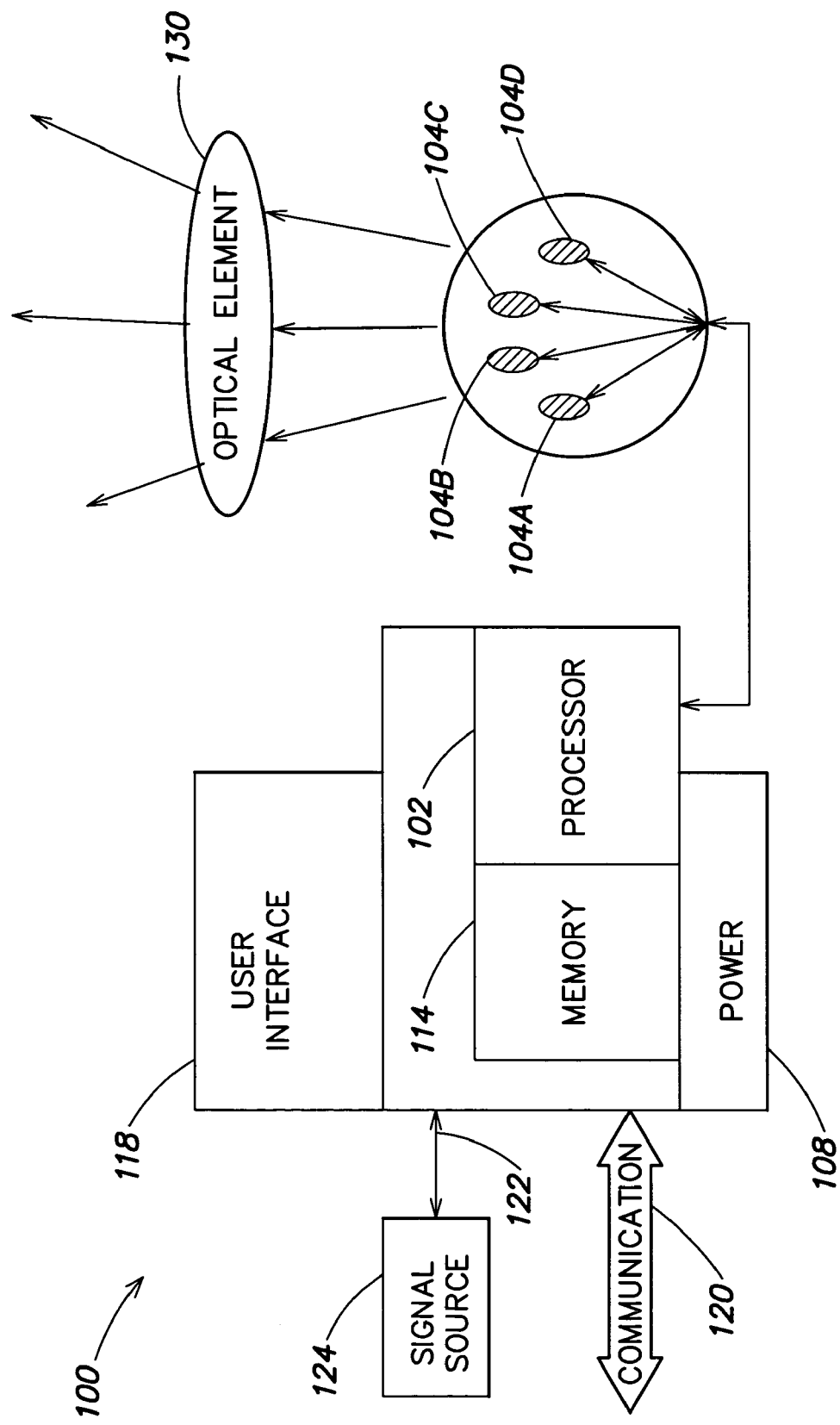
FIG. 1 illustrates one example of a lighting unit that may serve as a device in a lighting environment according to one embodiment of the present invention.

FIG. 1 illustrates one example of a lighting unit 100 that may serve as a device in a lighting environment according to one embodiment of the present invention. Some examples of LED-based lighting units similar to those that are described below in connection with FIG. 1 may be found, for example, in U.S. Pat. No. 6,016,038, issued Jan. 18, 2000 to Mueller et al., entitled "Multicolored LED Lighting Method and Apparatus," and U.S. Pat. No. 6,211,626, issued Apr. 3, 2001 to Lys et al, entitled "Illumination Components," which patents are both hereby incorporated herein by reference.

In various embodiments of the present invention, the lighting unit 100 shown in FIG. 1 may be used alone or together with other similar lighting units in a system of lighting units (e.g., as discussed further below in connection with FIG. 2). Used alone or in combination with other lighting units, the lighting unit 100 may be employed in a variety of applications including, but not limited to, interior or exterior space illumination in general, direct or indirect illumination of objects or spaces, theatrical or other entertainment-based/special effects illumination, decorative illumination, safety-oriented illumination, vehicular illumination, illumination of displays and/or merchandise (e.g. for advertising and/or in retail/consumer environments), combined illumination and communication systems, etc., as well as for various indication and informational purposes.

Additionally, one or more lighting units similar to that described in connection with FIG. 1 may be implemented in a variety of products including, but not limited to, various forms of light modules or bulbs having various shapes and electrical/mechanical coupling arrangements (including replacement or "retrofit" modules or bulbs adapted for use in conventional sockets or fixtures), as well as a variety of consumer and/or household products (e.g., night lights, toys, games or game components, entertainment components or systems, utensils, appliances, kitchen aids, cleaning products, etc.).

In one embodiment, the lighting unit 100 shown in FIG. 1 may include one or more light sources 104A, 104B, 104C, and 104D wherein one or more of the light sources may be an LED-based light source that includes one or more light emitting diodes (LEDs). In one aspect of this embodiment, any two or more of the light sources 104A, 104B, 104C and 104D may be adapted to generate radiation of different colors (e.g. red, green, and blue, respectively). Although FIG. 1 shows four light sources 104A, 104B, 104C, and 104D, it should be appreciated that the lighting unit is not limited in this respect, as different numbers and various types of light sources (all LED-based light sources, LED-based and non-LED-based light sources in combination, etc.) adapted to generate radiation of a variety of different colors, including essentially white light, may be employed in the lighting unit 100, as discussed further below.

As shown in FIG. 1, the lighting unit 100 also may include a processor 102 that is configured to output one or more control signals to drive the light sources 104A, 104B, 104C and 104D so as to generate various intensities of light from the light sources. For example, in one implementation, the processor 102 may be configured to output at least one control signal for each light source so as to independently control the intensity of light generated by each light source. Some examples of control signals that may be generated by the processor to control the light sources include, but are not limited to, pulse modulated signals, pulse width modulated signals (PWM), pulse amplitude modulated signals (PAM), pulse displacement modulated signals, analog control signals (e.g., current control signals, voltage control signals), combinations and/or modulations of the foregoing signals, or other control signals. In one aspect, the processor 102 may control other dedicated circuitry (not shown in FIG. 1), which in turn controls the light sources so as to vary their respective intensities.

Lighting systems in accordance with this specification can operate LEDs in an efficient manner. Typical LED performance characteristics depend on the amount of current drawn by the LED. The optimal efficacy may be obtained at a lower current than the level where maximum brightness occurs. LEDs are typically driven well above their most efficient operating current to increase the brightness delivered by the LED while maintaining a reasonable life expectancy. As a result, increased efficacy can be provided when the maximum current value of the PWM signal may be variable. For example, if the desired light output is less than the maximum required output the current maximum and/or the PWM signal width may be reduced. This may result in pulse amplitude modulation (PAM), for example; however, the width and amplitude of the current used to drive the LED may be varied to optimize the LED performance. In an embodiment, a lighting system may also be adapted to provide only amplitude control of the current through the LED. While many of the embodiments provided herein describe the use of PWM and PAM to drive the LEDs, one skilled in the art would appreciate that there are many techniques to accomplish the LED control described herein and, as such, the scope of the present invention is not limited by any one control technique. In embodiments, it is possible to use other techniques, such as pulse frequency modulation (PFM), or pulse displacement modulation (PDM), such as in combination with either or both of PWM and PAM.

Pulse width modulation (PWM) involves supplying a substantially constant current to the LEDs for particular periods of time. The shorter the time, or pulse-width, the less brightness an observer will observe in the resulting light. The human eye integrates the light it receives over a period of time and, even though the current through the LED may generate the same light level regardless of pulse duration, the eye will perceive short pulses as "dimmer" than longer pulses. The PWM technique is considered on of the preferred techniques for driving LEDs, although the present invention is not limited to such control techniques. When two or more colored LEDs are provided in a lighting system, the colors may be mixed and many variations of colors can be generated by changing the intensity, or perceived intensity, of the LEDs. In an embodiment, three colors of LEDs are presented (e.g., red, green and blue) and each of the colors is driven with PWM to vary its apparent intensity. This system allows for the generation of millions of colors (e.g., 16.7 million colors when 8-bit control is used on each of the PWM channels).

In an embodiment the LEDs are modulated with PWM as well as modulating the amplitude of the current driving the LEDs (Pulse Amplitude Modulation, or PAM). LED efficiency increases to a maximum followed by decreasing efficiency. Typically, LEDs are driven at a current level beyond its maximum efficiency to attain greater brightness while maintaining acceptable life expectancy. The objective is typically to maximize the light output from the LED while maintaining an acceptable lifetime. In an embodiment, the LEDs may be driven with a lower current maximum when lower intensities are desired. PWM may still be used, but the maximum current intensity may also be varied depending on the desired light output. For example, to decrease the intensity of the light output from a maximum operational point, the amplitude of the current may be decreased until the maximum efficiency is achieved. If further reductions in the LED brightness are desired the PWM activation may be reduced to reduce the apparent brightness.

In one embodiment of the lighting unit 100, one or more of the light sources 104A, 104B, 104C and 104D shown in FIG. 1 may include a group of multiple LEDs or other types of light sources (e.g., various parallel and/or serial connections of LEDs or other types of light sources) that are controlled together by the processor 102. Additionally, it should be appreciated that one or more of the light sources 104A, 104B, 104C and 104D may include one or more LEDs that are adapted to generate radiation having any of a variety of spectra (i.e., wavelengths or wavelength bands), including, but not limited to, various visible colors (including essentially white light), various color temperatures of white light, ultraviolet, or infrared.

In another aspect of the lighting unit 100 shown in FIG. 1, the lighting unit 100 may be constructed and arranged to produce a wide range of variable color radiation. For example, the lighting unit 100 may be particularly arranged such that the processor-controlled variable intensity light generated by two or more of the light sources combines to produce a mixed colored light (including essentially white light having a variety of color temperatures). In particular, the color (or color temperature) of the mixed colored light may be varied by varying one or more of the respective intensities of the light sources (e.g., in response to one or more control signals output by the processor 102). Furthermore, the processor 102 may be particularly configured (e.g., programmed) to provide control signals to one or more of the light sources so as to generate a variety of static or time-varying (dynamic) multi-color (or multi-color temperature) lighting effects.

As shown in FIG. 1, the lighting unit 100 also may include a memory 114 to store various information. For example, the memory 114 may be employed to store one or more lighting programs for execution by the processor 102 (e.g., to generate one or more control signals for the light sources), as well as various types of data useful for generating variable color radiation (e.g., calibration information, discussed further below). The memory 114 also may store one or more particular identifiers (e.g., a serial number, an address, etc.) that may be used either locally or on a system level to identify the lighting unit 100. In various embodiments, such identifiers may be pre-programmed by a manufacturer, for example, and may be either alterable or non-alterable thereafter (e.g., via some type of user interface located on the lighting unit, via one or more data or control signals received by the lighting unit, etc.). Alternatively, such identifiers may be determined at the time of initial use of the lighting unit in the field, and again may be alterable or non-alterable thereafter.

One issue that may arise in connection with controlling multiple light sources in the lighting unit 100 of FIG. 1, and controlling multiple lighting unit 100 in a lighting system (e.g., as discussed below in connection with FIG. 2), relates to potentially perceptible differences in light output between substantially similar light sources. For example, given two virtually identical light sources being driven by respective identical control signals, the actual intensity of light output by each light source may be perceptibly different. Such a difference in light output may be attributed to various factors including, for example, slight manufacturing differences between the light sources, normal wear and tear over time of the light sources that may differently alter the respective spectrums of the generated radiation, etc. For purposes of the present discussion, light sources for which a particular relationship between a control signal and resulting intensity are not known are referred to as "uncalibrated" light sources.

The use of one or more uncalibrated light sources in the lighting unit 100 shown in FIG. 1 may result in generation of light having an unpredictable, or "uncalibrated," color or color temperature. For example, consider a first lighting unit including a first uncalibrated red light source and a first uncalibrated blue light source, each controlled by a corresponding control signal having an adjustable parameter in a range of from zero to 255 (0–255). For purposes of this example, if the red control signal is set to zero, blue light is generated, whereas if the blue control signal is set to zero, red light is generated. However, if both control signals are varied from non-zero values, a variety of perceptibly different colors may be produced (e.g., in this example, at very least, many different shades of purple are possible). In particular, perhaps a particular desired color (e.g., lavender) is given by a red control signal having a value of 125 and a blue control signal having a value of 200.

Now consider a second lighting unit including a second uncalibrated red light source substantially similar to the first uncalibrated red light source of the first lighting unit, and a second uncalibrated blue light source substantially similar to the first uncalibrated blue light source of the first lighting unit. As discussed above, even if both of the uncalibrated red light sources are driven by respective identical control signals, the actual intensity of light output by each red light source may be perceptibly different. Similarly, even if both of the uncalibrated blue light sources are driven by respective identical control signals, the actual intensity of light output by each blue light source may be perceptibly different.

With the foregoing in mind, it should be appreciated that if multiple uncalibrated light sources are used in combination in lighting units to produce a mixed colored light as discussed above, the observed color (or color temperature) of light produced by different lighting units under identical control conditions may be perceivably different. Specifically, consider again the "lavender" example above; the "first lavender" produced by the first lighting unit with a red control signal of 125 and a blue control signal of 200 indeed may be perceptibly different than a "second lavender" produced by the second lighting unit with a red control signal of 125 and a blue control signal of 200. More generally, the first and second lighting units generate uncalibrated colors by virtue of their uncalibrated light sources.

In view of the foregoing, in one embodiment of the present invention, the lighting unit 100 includes calibration means to facilitate the generation of light having a calibrated (e.g., predictable, reproducible) color at any given time. In one aspect, the calibration means is configured to adjust the light output of at least some light sources of the lighting unit so as to compensate for perceptible differences between similar light sources used in different lighting units.

For example, in one embodiment, the processor 102 of the lighting unit 100 is configured to control one or more of the light sources 104A, 104B, 104C and 104D so as to output radiation at a calibrated intensity that substantially corresponds in a predetermined manner to a control signal for the light source(s). As a result of mixing radiation having different spectra and respective calibrated intensities, a calibrated color is produced. In one aspect of this embodiment, at least one calibration value for each light source is stored in the memory 114, and the processor is programmed to apply the respective calibration values to the control signals for the corresponding light sources so as to generate the calibrated intensities.

In one aspect of this embodiment, one or more calibration values may be determined once (e.g., during a lighting unit manufacturing/testing phase) and stored in the memory 114 for use by the processor 102. In another aspect, the processor 102 may be configured to derive one or more calibration values dynamically (e.g. from time to time) with the aid of one or more photosensors, for example. In various embodiments, the photosensor(s) may be one or more external components coupled to the lighting unit, or alternatively may be integrated as part of the lighting unit itself. A photosensor is one example of a signal source that may be integrated or otherwise associated with the lighting unit 100, and monitored by the processor 102 in connection with the operation of the lighting unit. Other examples of such signal sources are discussed further below, in connection with the signal source 124 shown in FIG. 1.

One exemplary method that may be implemented by the processor 102 to derive one or more calibration values includes applying a reference control signal to a light source, and measuring (e.g., via one or more photosensors) an intensity of radiation thus generated by the light source. The processor may be programmed to then make a comparison of the measured intensity and at least one reference value (e.g., representing an intensity that nominally would be expected in response to the reference control signal). Based on such a comparison, the processor may determine one or more calibration values for the light source. In particular, the processor may derive a calibration value such that, when applied to the reference control signal, the light source outputs radiation having an intensity that corresponds to the reference value (i.e., the "expected" intensity).

In various aspects, one calibration value may be derived for an entire range of control signal/output intensities for a given light source. Alternatively, multiple calibration values may be derived for a given light source (i.e., a number of calibration value "samples" may be obtained) that are respectively applied over different control signal/output intensity ranges, to approximate a nonlinear calibration function in a piecewise linear manner.

In another aspect, as also shown in FIG. 1, the lighting unit 100 optionally may include one or more user interfaces 118 that are provided to facilitate any of a number of user-selectable settings or functions (e.g., generally controlling the light output of the lighting unit 100, changing and/or selecting various pre-programmed lighting effects to be generated by the lighting unit, changing and/or selecting various parameters of selected lighting effects, setting particular identifiers such as addresses or serial numbers for the lighting unit, etc.). In various embodiments, the communication between the user interface 118 and the lighting unit may be accomplished through wire or cable, or wireless transmission.

In one implementation, the processor 102 of the lighting unit monitors the user interface 118 and controls one or more of the light sources 104A, 104B, 104C and 104D based at least in part on a user's operation of the interface. For example, the processor 102 may be configured to respond to operation of the user interface by originating one or more control signals for controlling one or more of the light sources. Alternatively, the processor 102 may be configured to respond by selecting one or more pre-programmed control signals stored in memory, modifying control signals generated by executing a lighting program, selecting and executing a new lighting program from memory, or otherwise affecting the radiation generated by one or more of the light sources.

In particular, in one implementation, the user interface 118 may constitute one or more switches (e.g., a standard wall switch) that interrupt power to the processor 102. In one aspect of this implementation, the processor 102 is configured to monitor the power as controlled by the user interface, and in turn control one or more of the light sources 104A, 104B, 104C and 104D based at least in part on a duration of a power interruption caused by operation of the user interface. As discussed above, the processor may be particularly configured to respond to a predetermined duration of a power interruption by, for example, selecting one or more pre-programmed control signals stored in memory, modifying control signals generated by executing a lighting program, selecting and executing a new lighting program from memory, or otherwise affecting the radiation generated by one or more of the light sources.

LED based lighting systems may be preprogrammed with several lighting routines for use in a non-networked mode. For example, the switches on the lighting device may be set such that the lighting device produces a solid color, a program that slowly changes the color of the illumination throughout the visible spectrum over a few minutes, or a program designed to change the illumination characteristics quickly or even strobe the light. Generally, the switches used to set the address of the lighting system may also be used to set the system into a preprogrammed non-networked lighting control mode. Each lighting control programs may also have adjustable parameters that are adjusted by switch settings. All of these functions can also be set using a programming device according to the principles of the invention. For example, a user interface may be provided in the programming device to allow the selection of a program in the lighting system, adjust a parameter of a program in the lighting system, set a new program in the lighting system, or make another setting in the lighting system. By communicating to the lighting system through a programming device according to the principles of the invention, a program could be selected and an adjustable parameter could be set. The lighting device can then execute the program without the need of setting switches. Another problem with setting switches for such a program selection is that the switches do not provide an intuitive user interface. The user may have to look to a table in a manual to find the particular switch setting for a particular program, whereas a programming device according to the principles of the invention may contain a user interface screen. The user interface may display information relating to a program, a program parameter or other information relating to the illumination device. The programmer may read information from the illumination apparatus and provide this information of the user interface screen.

FIG. 1 also illustrates that the lighting unit 100 may be configured to receive one or more signals 122 from one or more other signal sources 124. In one implementation, the processor 102 of the lighting unit may use the signal(s) 122, either alone or in combination with other control signals (e.g., signals generated by executing a lighting program, one or more outputs from a user interface, etc.), so as to control one or more of the light sources 104A, 104B, 104C and 104D in a manner similar to that discussed above in connection with the user interface.

By way of example, a lighting unit 100 may also include sensors and or transducers and or other signal generators (collectively referred to hereinafter as sensors) that serve as signal sources 124. The sensors may be associated with the processor 102 through wired or wireless transmission systems. Much like the user interface and network control systems, the sensor(s) may provide signals to the processor and the processor may respond by selecting new LED control signals from memory 114, modifying LED control signals, generating control signals, or otherwise change the output of the LED(s).

Examples of the signal(s) 122 that may be received and processed by the processor 102 include, but are not limited to, one or more audio signals, video signals, power signals, various types of data signals, signals representing information obtained from a network (e.g., the Internet), signals representing some detectable/sensed condition, signals from lighting units, signals consisting of modulated light, etc. In various implementations, the signal source(s) 124 may be located remotely from the lighting unit 100, or included as a component of the lighting unit. For example, in one embodiment, a signal from one lighting unit 100 could be sent over a network to another lighting unit 100.

Some examples of a signal source 124 that may be employed in, or used in connection with, the lighting unit 100 of FIG. 1 include any of a variety of sensors or transducers that generate one or more signals 122 in response to some stimulus. Examples of such sensors include, but are not limited to, various types of environmental condition sensors, such as thermally sensitive (e.g., temperature, infrared) sensors, humidity sensors, motion sensors, photosensors/light sensors (e.g., sensors that are sensitive to one or more particular spectra of electromagnetic radiation), sound or vibration sensors or other pressure/force transducers (e.g., microphones, piezoelectric devices), and the like.

Additional examples of a signal source 124 include various metering/detection devices that monitor electrical signals or characteristics (e.g., voltage, current, power, resistance, capacitance, inductance, etc.) or chemical/biological characteristics (e.g., acidity, a presence of one or more particular chemical or biological agents, bacteria, etc.) and provide one or more signals 122 based on measured values of the signals or characteristics. Yet other examples of a signal source 124 include various types of scanners, image recognition systems, voice or other sound recognition systems, artificial intelligence and robotics systems, and the like. A signal source 124 could also be a lighting unit 100, a processor 102, or any one of many available signal generating devices, such as media players, MP3 players, computers, DVD players, CD players, television signal sources, camera signal sources, microphones, speakers, telephones, cellular phones, instant messenger devices, SMS devices, wireless devices, personal organizer devices, and many others.

In one embodiment, the lighting unit 100 shown in FIG. 1 also may include one or more optical facilities 130 to optically process the radiation generated by the light sources 104A, 104B, 104C and 104D. For example, one or more optical facilities may be configured so as to change one or both of a spatial distribution and a propagation direction of the generated radiation. In particular, one or more optical facilities may be configured to change a diffusion angle of the generated radiation. In one aspect of this embodiment, one or more optical facilities 130 may be particularly configured to variably change one or both of a spatial distribution and a propagation direction of the generated radiation (e.g., in response to some electrical and/or mechanical stimulus). Examples of optical facilities that may be included in the lighting unit 100 include, but are not limited to, reflective materials, refractive materials, translucent materials, filters, lenses, mirrors, and fiber optics. The optical facility 130 also may include a phosphorescent material, luminescent material, or other material capable of responding to or interacting with the generated radiation.

As also shown in Fig; 1, the lighting unit 100 may include one or more communication ports 120 to facilitate coupling of the lighting unit 100 to any of a variety of other devices. For example, one or more communication ports 120 may facilitate coupling multiple lighting units together as a networked lighting system, in which at least some of the lighting units are addressable (e.g., have particular identifiers or addresses) and are responsive to particular data transported across the network. The lighting unit 100 may also include a communication port 120 adapted to communicate with a programming device. The communication port may be adapted to receive data through wired or wireless transmission. In an embodiment of the invention, information received through the communication port 120 may relate to address information and the lighting unit 100 may be adapted to receive and then store the address information in the memory 114. The lighting unit 100 may be adapted to use the stored address as its address for use when receiving data from network data. For example, the lighting unit 100 may be connected to a network where network data is communicated. The lighting unit 100 may monitor the data communicated on the network and respond to data it 'hears' that correspond to the address stored in the lighting systems 100 memory 114. The memory 114 may be any type of memory including, but not limited to, non-volatile memory. A person skilled in the art would appreciate that there are many systems and methods for communicating to addressable lighting fixtures through networks (e.g. U.S. Pat. No. 6,016,038) and the present invention is not limited to a particular system or method.

In an embodiment, the lighting unit 100 may be adapted to select a given lighting program, modify a parameter of a lighting program, or otherwise make a selection or modification or generate certain lighting control signals based on the data received from a programming device.

In particular, in a networked lighting system environment, as discussed in greater detail further below (e.g., in connection with FIG. 2), as data is communicated via the network, the processor 102 of each lighting unit coupled to the network may be configured to be responsive to particular data (e.g., lighting control commands) that pertain to it (e.g., in some cases, as dictated by the respective identifiers of the networked lighting units). Once a given processor identifies particular data intended for it, it may read the data and, for example, change the lighting conditions produced by its light sources according to the received data (e.g., by generating appropriate control signals to the light sources). In one aspect, the memory 114 of each lighting unit coupled to the network may be loaded, for example, with a table of lighting control signals that correspond with data the processor 102 receives. Once the processor 102 receives data from the network, the processor may consult the table to select the control signals that correspond to the received data, and control the light sources of the lighting unit accordingly.

In one aspect of this embodiment, the processor 102 of a given lighting unit, whether or not coupled to a network, may be configured to interpret lighting instructions/data that are received in a DMX protocol (as discussed, for example, in U.S. Pat. Nos. 6,016,038 and 6,211,626), which is a lighting command protocol conventionally employed in the lighting industry for some programmable lighting applications. However, it should be appreciated that lighting units suitable for purposes of the present invention are not limited in this respect, as lighting units according to various embodiments may be configured to be responsive to other types of communication protocols so as to control their respective light sources.

In one embodiment, the lighting unit 100 of FIG. 1 may include and/or be coupled to one or more power sources 108. In various aspects, examples of power source(s) 108 include, but are not limited to, AC power sources, DC power sources, batteries, solar-based power sources, thermoelectric or mechanical-based power sources and the like. Additionally, in one aspect, the power source(s) 108 may include or be associated with one or more power conversion devices that convert power received by an external power source to a form suitable for operation of the lighting unit 100.

While not shown explicitly in FIG. 1, the lighting unit 100 may be implemented in any one of several different structural configurations according to various embodiments of the present invention. For example, a given lighting unit may have any one of a variety of mounting arrangements for the light source(s), enclosure/housing arrangements and shapes to partially or fully enclose the light sources, and/or electrical and mechanical connection configurations. In particular, a lighting unit may be configured as a replacement or "retrofit" to engage electrically and mechanically in a conventional socket or fixture arrangement (e.g., an Edison-type screw socket, a halogen fixture arrangement, a fluorescent fixture arrangement, etc.).

Additionally, one or more optical elements as discussed above may be partially or fully integrated with an enclosure/housing arrangement for the lighting unit. Furthermore, a given lighting unit optionally may be associated with (e.g., include, be coupled to and/or packaged together with) various other components (e.g., control circuitry such as the processor and/or memory, one or more sensors/transducers/ signal sources, user interfaces, displays, power sources, power conversion devices, etc.) relating to the operation of the light source(s).

Figure 2:
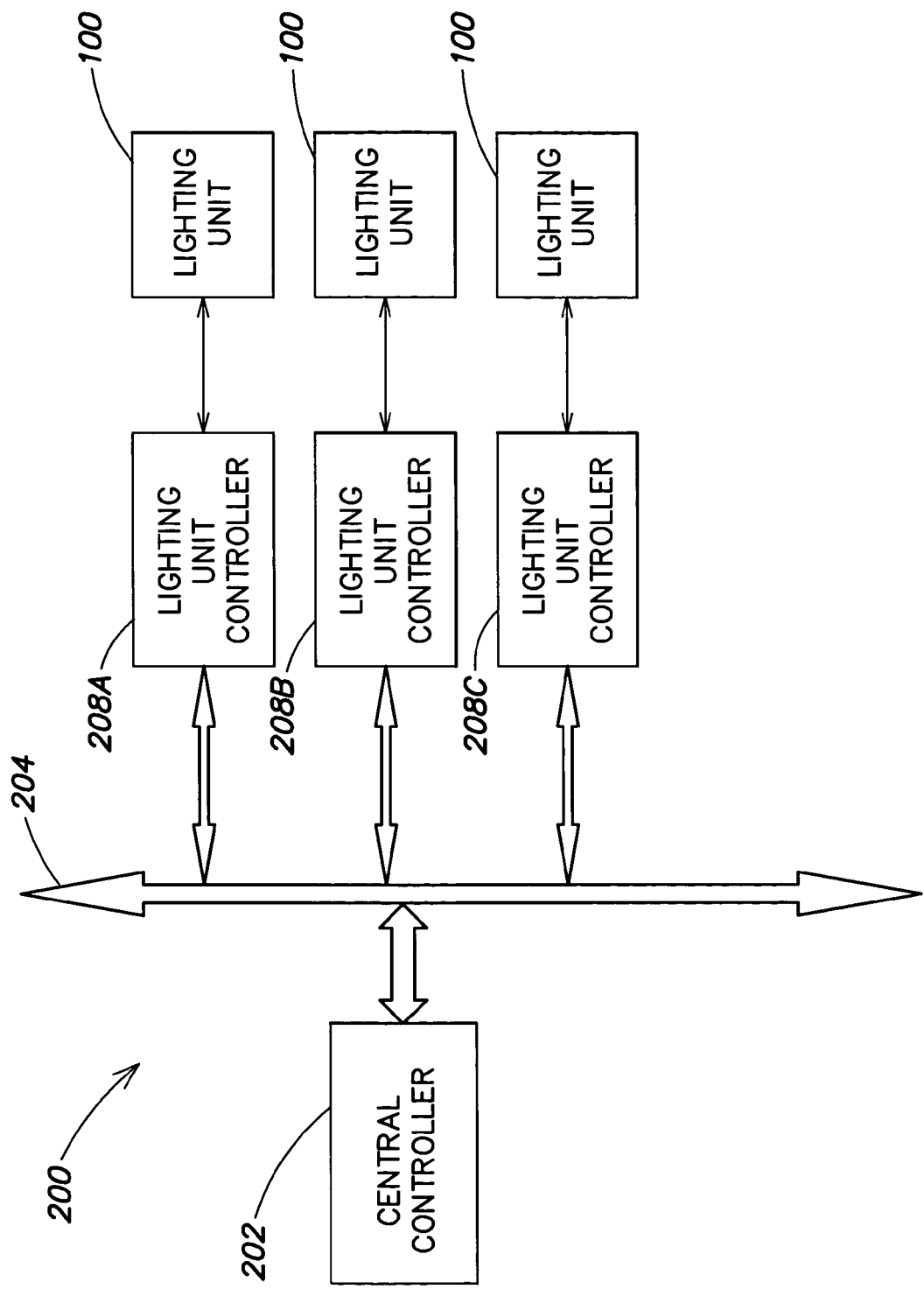
FIG. 2 depicts a lighting system with a plurality of lighting units and a central controller.

FIG. 2 illustrates an example of a networked lighting system 200 according to one embodiment of the present invention. In the embodiment of FIG. 2, a number of lighting units 100, similar to those discussed above in connection with FIG. 1, are coupled together to form the networked lighting system. It should be appreciated, however, that the particular configuration and arrangement of lighting units shown in FIG. 2 is for purposes of illustration only, and that the invention is not limited to the particular system topology shown in FIG. 2.

Thus, lighting units 100 be associated with a network such that the lighting unit 100 responds to network data. For example, the processor 102 may be an addressable processor that is associated with a network. Network data may be communicated through a wired or wireless network and the addressable processor may be 'listening' to the data stream for commands that pertain to it. Once the processor 'hears' data addressed to it, it may read the data and change the lighting conditions according to the received data. For example, the memory 114 in the lighting unit 100 may be loaded with a table of lighting control signals that correspond with data the processor 102 receives. Once the processor 102 receives data from a network, user interface, or other source, the processor may select the control signals that correspond to the data and control the LED(s) accordingly. The received data may also initiate a lighting program to be executed by the processor 102 or modify a lighting program or control data or otherwise control the light output of the lighting unit 100.

Additionally, while not shown explicitly in FIG. 2, it should be appreciated that the networked lighting system 200 may be configured flexibly to include one or more user interfaces, as well as one or more signal sources such as sensors/transducers. For example, one or more user interfaces and/or one or more signal sources such as sensors/transducers (as discussed above in connection with FIG. 1) may be associated with any one or more of the lighting units of the networked lighting system 200. Alternatively (or in addition to the foregoing), one or more user interfaces and/or one or more signal sources may be implemented as "stand alone" components in the networked lighting system 200. Whether stand alone components or particularly associated with one or more lighting unit 100, these devices may be "shared" by the lighting units of the networked lighting system. Stated differently, one or more user interfaces and/or one or more signal sources such as sensors/transducers may constitute "shared resources" in the networked lighting system that may be used in connection with controlling any one or more of the lighting units of the system.

As shown in the embodiment of FIG. 2, the lighting system 200 may include one or more lighting unit controllers (hereinafter "LUCs") 208A, 208B, 208C and 208D, wherein each LUC is responsible for communicating with and generally controlling one or more lighting unit 100 coupled to it. Although FIG. 2 illustrates three lighting unit 100 coupled in a serial fashion to a given LUC, it should be appreciated that the invention is not limited in this respect, as different numbers of lighting unit 100 may be coupled to a given LUC in a variety of different configurations using a variety of different communication media and protocols.

In the system of FIG. 2, each LUC in turn may be coupled to a central controller 202 that is configured to communicate with one or more LUCs. Although FIG. 2 shows three LUCs coupled to the central controller 202 via a switching or coupling device 204, it should be appreciated that according to various embodiments, different numbers of LUCs may be coupled to the central controller 202. Additionally, according to various embodiments of the present invention, the LUCs and the central controller may be coupled together in a variety of configurations using a variety of different communication media and protocols to form the networked lighting system 200. Moreover, it should be appreciated that the interconnection of LUCs and the central controller, and the interconnection of lighting units to respective LUCs, may be accomplished in different manners (e.g., using different configurations, communication media, and protocols).

For example, according to one embodiment of the present invention, the central controller 202 shown in FIG. 2 may by configured to implement Ethernet-based communications with the LUCs, and in turn the LUCs may be configured to implement DMX-based communications with the lighting unit 100. In particular, in one aspect of this embodiment, each LUC may be configured as an addressable Ethernet-based controller and accordingly may be identifiable to the central controller 202 via a particular unique address (or a unique group of addresses) using an Ethernet-based protocol. In this manner, the central controller 202 may be configured to support Ethernet communications throughout the network of coupled LUCs, and each LUC may respond to those communications intended for it. In turn, each LUC may communicate lighting control information to one or more lighting units coupled to it, for example, via a DMX protocol, based on the Ethernet communications with the central controller 202.

More specifically, according to one embodiment, the LUCs 208A, 208B, 208C and 208D shown in FIG. 2 may be configured to be "intelligent" in that the central controller 202 may be configured to communicate higher level commands to the LUCs that need to be interpreted by the LUCs before lighting control information can be forwarded to the lighting unit 100. For example, a lighting system operator may want to generate a color changing effect that varies colors from lighting unit to lighting unit in such a way as to generate the appearance of a propagating rainbow of colors ("rainbow chase"), given a particular placement of lighting units with respect to one another. In this example, the operator may provide a simple instruction to the central controller 202 to accomplish this, and in turn the central controller may communicate to one or more LUCs using an Ethernet-based protocol high-level command to generate a "rainbow chase." The command may contain timing, intensity, hue, saturation or other relevant information, for example. When a given LUC receives such a command, it may then interpret the command so as to generate the appropriate lighting control signals which it then communicates using a DMX protocol via any of a variety of signaling techniques (e.g., PWM) to one or more lighting units that it controls.

It should again be appreciated that the foregoing example of using multiple different communication implementations (e.g., Ethernet/DMX) in a lighting system according to one embodiment of the present invention is for purposes of illustration only, and that the invention is not limited to this particular example.

Figure 3:
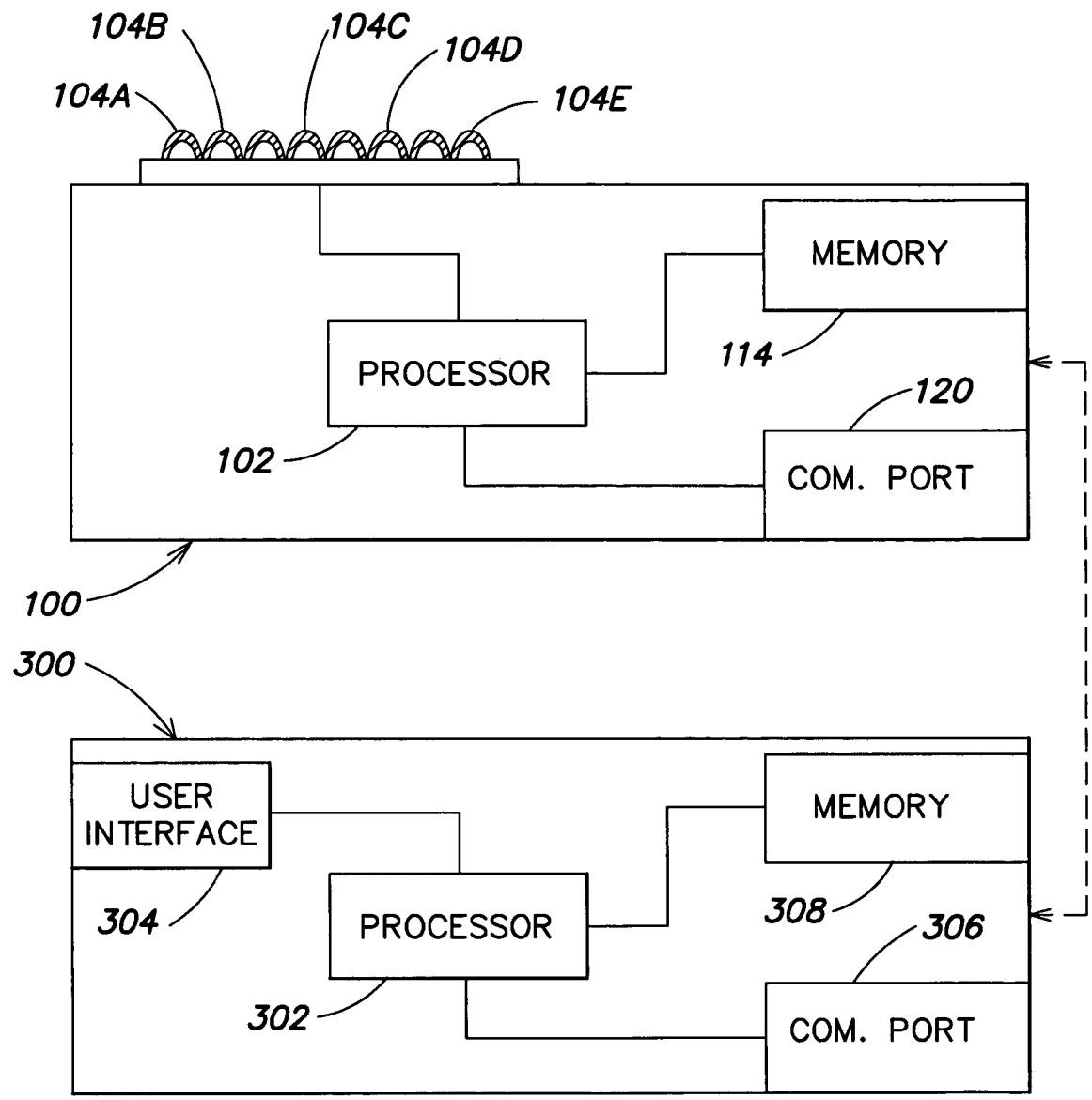
FIG. 3 is a schematic diagram for a programming device for programming a lighting unit in accordance with the principles of the invention.

FIG. 3 illustrates a programming device 300 in communicative association with a lighting unit 100. The programming device 300 may include a processor 302, a user interface 304 associated with the processor 302, a communication port 306 in association with the processor 302, and memory 308 associated with the processor 302. The communication port 306 may be arranged to communicate a data signal to the lighting unit 100 and the lighting unit 100 may be adapted to receive the data signal. For example, the communication port 306 may be arranged to communicate data via wired transmission and the communication port 120 of the lighting unit 100 may be arranged to receive the wired transmission. Likewise, the communication ports may be arranged to communicate through wireless transmission.

The programming device processor 302 may be associated with a user interface 304 such that the user interface 304 can be used to generate an address in the processor 302. The user interface 304 may be used to communicate a signal to the processor and the processor may, in turn, generate an address and or select an address from the memory 308. In an embodiment, the user interface may be used to generate or select a starting address and the programming device may then be arranged to automatically generate the next address. For example, a user may select a new address by making a selection on the user interface and then the address may be communicated to a lighting unit 100. Following the transmission of the address a new address may be selected or generated to be transmitted to the next lighting unit 100. Of course the actual timing of the selection and or generation of the new address is not critical and may actually be generated prior to the transmission of the previous address or at any other appropriate time. This method of generating addresses may be useful in situations where the user wants to address more than one lighting systems 100. For example, the user may have a row of one hundred lighting systems 100 and may desire the first such lighting system include the address number one thousand. The user may select the address one thousand on the programming device and cause the programming device to communicate the address to the lighting system. Then the programming device may automatically generate the next address in the desired progression (e.g. one thousand one). This newly generated address (e.g. one thousand one) may then be communicated to the next lighting system in the row. This eliminates the repeated selection of the new addresses and automates one more step for the user. The addresses may be selected/generated in any desired pattern (e.g. incrementing by two, three, etc.).

The programming device may be arranged to store a selected/generated address in its memory to be recalled later for transmission to a lighting system. For example, a user may have a number of lighting systems to program and he may want to preprogram the memory of the programming device with a set of addresses because he knows in advance the lighting systems he is going to program. He may have a layout planned and it may be desirable to select an address, store it in memory, and then select a new address to be place in memory. This system of selecting and storing addresses could place a long string of addresses in memory. Then he could begin to transmit the address information to the lighting systems in the order in which he loaded the addresses.

The programming device 300 may include a user interface 304 and the user interface may be associated with the processor 302. The user interface 304 may be an interface, button, switch, dial, slider, encoder, analog to digital converter, digital to analog converter, digital signal generator, or other user interface. The user interface 304 may be capable of accepting address information, program information, lighting show information, or other information or signals used to control an illumination device. The device may communicate with a lighting device upon receipt of user interface information. The user interface information may also be stored in memory and be communicated from the memory to an illumination device. The user interface 304 may also contain a screen for the displaying of information. The screen may be a screen, LCD, plasma screen, backlit display, edgelit display, monochrome screen, color screen, is screen, or any other type of display.

Many of the embodiments illustrated herein involve setting an address in a lighting unit 100. However, a method or system according to the principles of the present invention may involve selecting a mode, setting, program or other setting in the lighting unit 100. An embodiment may also involve the modification of a mode, setting, program or other setting in the lighting unit 100. In an embodiment, a programming device may be used to select a preprogrammed mode in the lighting unit 100. For example, a user may select a mode using a programming device and then communicate the selection to the lighting unit 100 wherein the lighting unit 100 would then select the corresponding mode. The programming device 300 may be preset with modes corresponding to the modes in the lighting unit 100. For example, the lighting unit 100 may have four preprogrammed modes: color wash, static red, static green, static blue, and random color generation. The programming device 300 may have the same four mode selections available such that the user can make the selection on the programming device 300 and then communicate the selection to the lighting unit 100. Upon receipt of the selection, the lighting unit 100 may select the corresponding mode from memory for execution by the processor 102. In an embodiment, the programming device may have a mode indicator stored in its memory such that the mode indicator indicates a particular mode or lighting program or the like. For example, the programming device may have a mode indicator stored in memory indicating the selection and communication of such a mode indicator would initiate or set a mode in the lighting system corresponding to the indicator. An embodiment of the present invention may involve using the programming device 300 to read the available selections from the lighting systems memory 114 and then present the available selections to the user. The user can then select the desired mode and communicate the selection back to the lighting unit 100. In an embodiment, the lighting system may receive the selection and initiate execution of the corresponding mode.

In an embodiment, the programming device 300 may be used to download a lighting mode, program, setting or the like to a lighting unit 100. The lighting unit 100 may store the lighting mode in its memory 114. The lighting unit 100 may be arranged to execute the mode upon download and or the mode may be available for selection at a later time. For example, the programming device 300 may have one or more lighting programs stored in its memory 308. A user may select one or more of the lighting programs on the programming device 300 and then cause the programming device 300 to download the selected program(s) to a lighting unit 100. The lighting unit 100 may then store the lighting program(s) in its memory 114. The lighting unit 100 and or downloaded program(s) may be arranged such that the lighting system's processor 102 executes one of the downloaded programs automatically.

As used herein, the terms "wired" transmission and or communication should be understood to encompass wire, cable, optical, or any other type of communication where the devices are physically connected. As used herein, the terms "wireless" transmission and or communication should be understood to encompass acoustical, RF, microwave, IR, and all other communication and or transmission systems were the devices are not physically connected.

Figure 4:
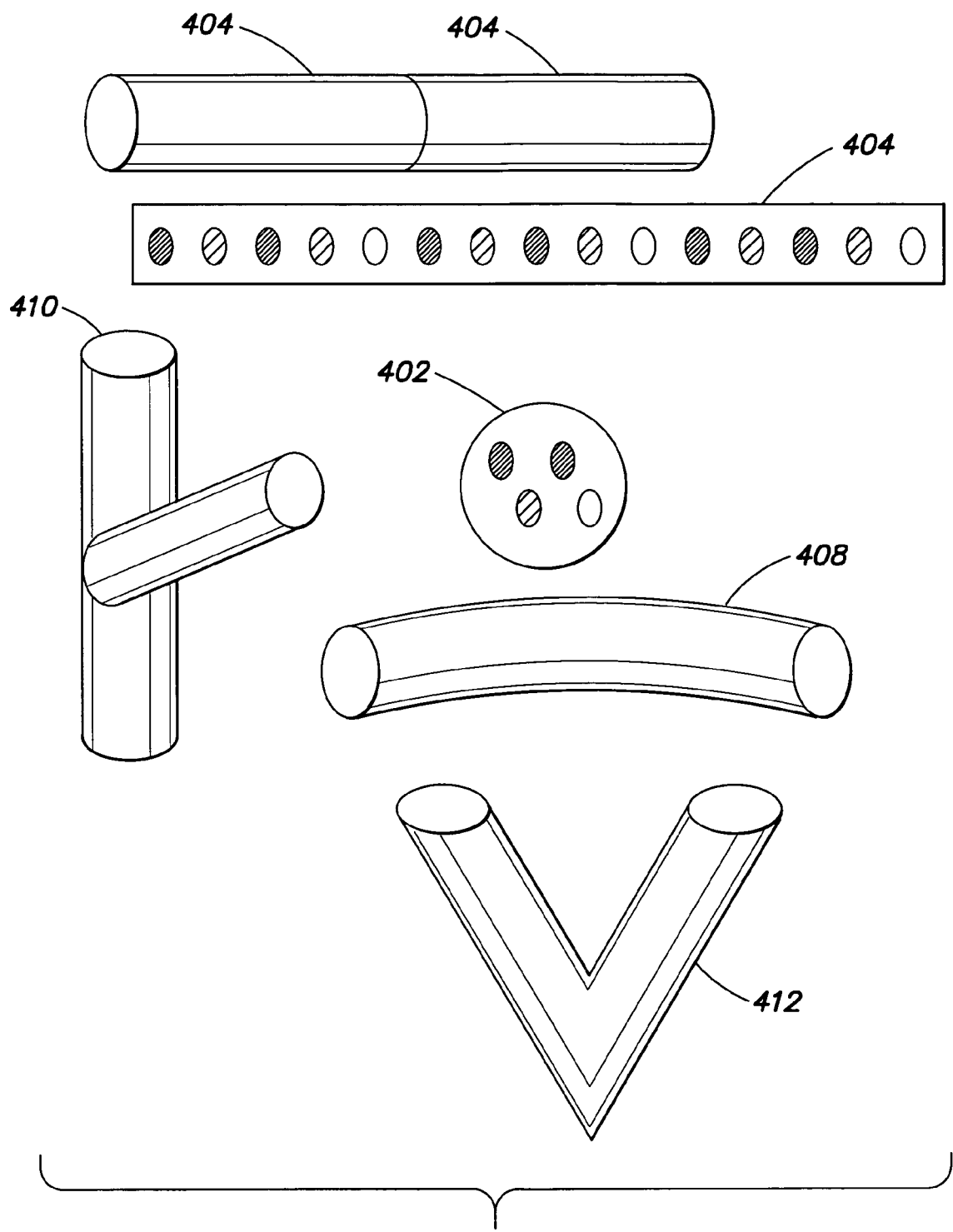
FIG. 4 depicts various configurations of lighting units in accordance with the invention.

Referring to FIG. 4, various configurations can be provided for lighting units 100, in each case with an optional communications facility 120. Configurations include a linear configuration 404 (which may be curvilinear 408 in embodiments), a circular configuration 402, an oval configuration, or a collection of various configurations 402, 404, etc. Lighting unit 100 can also include a wide variety of colors of LED, in various mixtures, including red, green, and blue LEDs to produce a color mix, as well as one or more other LEDs to create varying colors and color temperatures of white light. For example, red, green and blue can be mixed with amber, white, UV, orange, IR or other colors of LED. Amber and white LEDs can be mixed to offer varying colors and color temperatures of white. Any combination of LED colors can produce a gamut of colors, whether the LEDs are red, green, blue, amber, white, orange, UV, or other colors. The various embodiments described throughout this specification encompass all possible combinations of LEDs in lighting unit 100, so that light of varying color, intensity, saturation and color temperature can be produced on demand under control of a processor 102. Combinations of LEDs with other mechanisms, such as phosphors, are also encompassed herein.

Although mixtures of red, green and blue have been proposed for light due to their ability to create a wide gamut of additively mixed colors, the general color quality or color rendering capability of such systems are not ideal for all applications. This is primarily due to the narrow bandwidth of current red, green and blue emitters. However, wider band sources do make possible good color rendering, as measured, for example, by the standard CRI index. In some cases this may require LED spectral outputs that are not currently available. However, it is known that wider-band sources of light will become available, and such wider-band sources are encompassed as sources for lighting unit 100 described herein.

Additionally, the addition of white LEDs (typically produced through a blue or UV LED plus a phosphor mechanism) does give a 'better' white it is still limiting in the color temperature that is controllable or selectable from such sources.

The addition of white to a red, green and blue mixture may not increase the gamut of available colors, but it can add a broader-band source to the mixture. The addition of an amber source to this mixture can improve the color still further by 'filling in' the gamut as well.

This combinations of light sources as lighting unit 100 can help fill in the visible spectrum to faithfully reproduce desirable spectrums of lights. These include broad daylight equivalents or more discrete waveforms corresponding to other light sources or desirable light properties. Desirable properties include the ability to remove pieces of the spectrum for reasons that may include environments where certain wavelengths are absorbed or attenuated. Water, for example tends to absorb and attenuate most non-blue and non-green colors of light, so underwater applications may benefit from lights that combine blue and green sources for lighting unit 100.

Amber and white light sources can offer a color temperature selectable white source, wherein the color temperature of generated light can be selected along the black body curve by a line joining the chromaticity coordinates of the two sources. The color temperature selection is useful for specifying particular color temperature values for the lighting source.

Orange is another color whose spectral properties in combination with a white LED-based light source can be used to provide a controllable color temperature light from a lighting unit 100.

The combination of white light with light of other colors as light sources for lighting unit 100 can offer multi-purpose lights for many commercial and home applications, such as in pools, spas, automobiles, building interiors (commercial and residential), indirect lighting applications, such as alcove lighting, commercial point of purchase lighting, merchandising, toys, beauty, signage, aviation, marine, medical, submarine, space, military, consumer, under cabinet lighting, office furniture, landscape, residential including kitchen, home theater, bathroom, faucets, dining rooms, decks, garage, home office, household products, family rooms, tomb lighting, museums, photography, art applications, and many others.

Referring still to FIG. 4, lighting units 100 can be arranged in many different forms. Thus, one or more light sources 104A–104D can be disposed with a processor 102 in a housing. The housing can take various shapes, such as one that resembles a point source 402, such as a circle or oval. Such a point source 402 can be located in a conventional lighting fixture, such as lamp or a cylindrical fixture. Lighting units 100 can be configured in substantially linear arrangements, either by positioning point sources 402 in a line, or by disposing light sources 104A–104D substantially in a line on a board located in a substantially linear housing, such as a cylindrical housing. A linear lighting unit 404 can be placed end-to-end with other linear elements 404 or elements of other shapes to produce longer linear lighting systems comprised of multiple lighting units 100 in various shapes. A housing can be curved to form a curvilinear lighting unit 408. Similarly, junctions can be created with branches, "Ts," or "Ys" to created a branched lighting unit 410. A bent lighting unit 412 can include one or more "V" elements. Combinations of various configurations of point source 402, linear 404, curvilinear 408, branched 410 and bent 412 lighting units can be used to create any shape of lighting system, such as one shaped to resemble a letter, number, symbol, logo, object, structure, or the like. An embodiment of a lighting unit 100 suitable for being joined to other lighting units 100 in different configurations is disclosed below in connection with FIG. 54 and subsequent figures.

Figure 5:
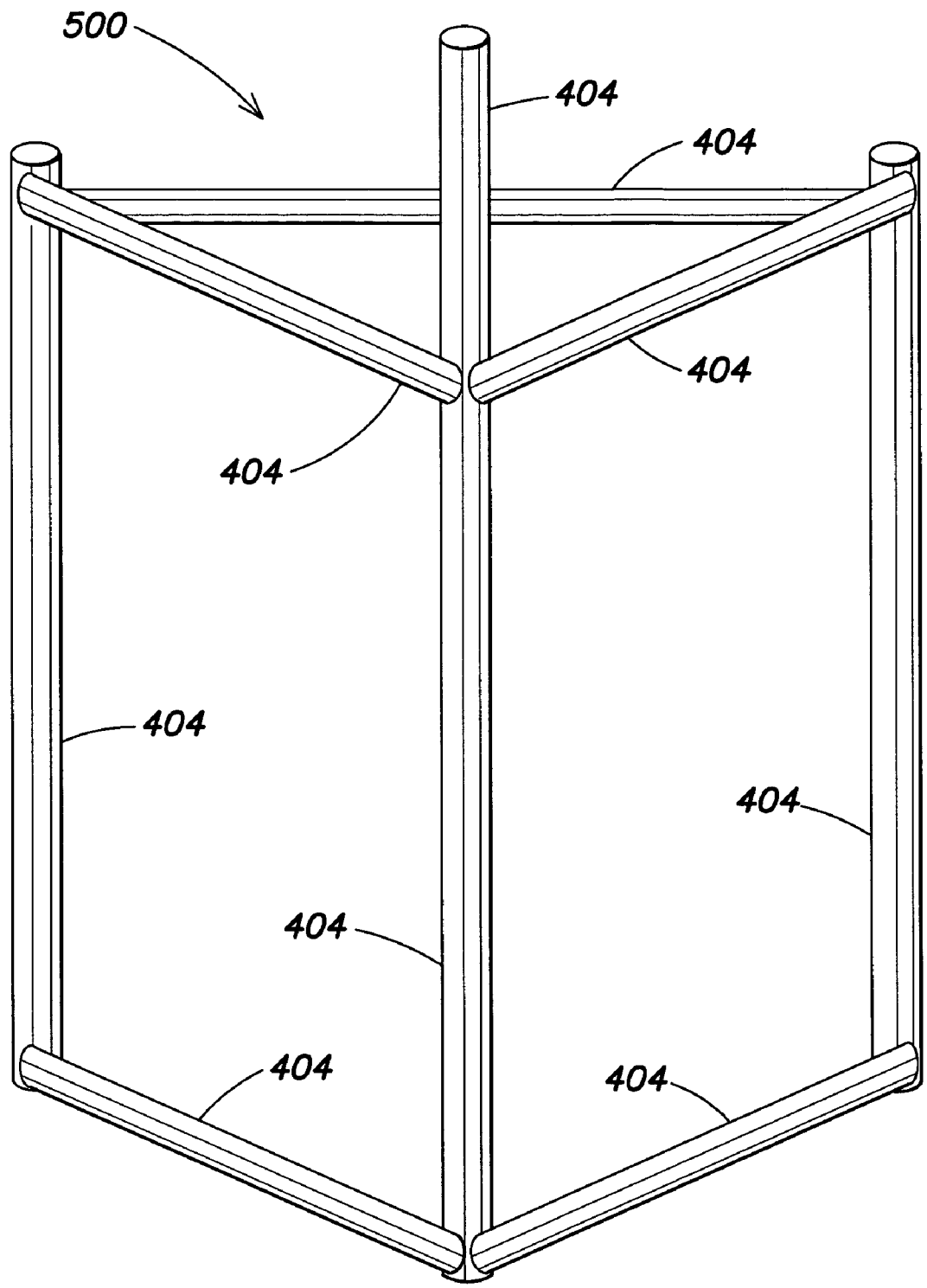
FIG. 5 shows a configuration made of various lighting units.

FIG. 5 shows a simple three-dimensional configuration 500 made from a plurality of linear lighting units 404. Thus, linear lighting units 404 can be used to create three-dimensional structures and objects, or to outline existing structures and objects when disposed along the lines of such structures and objects. Many different displays, objects, structures, and works of art can be created using linear lighting units as a medium.

Figure 6:
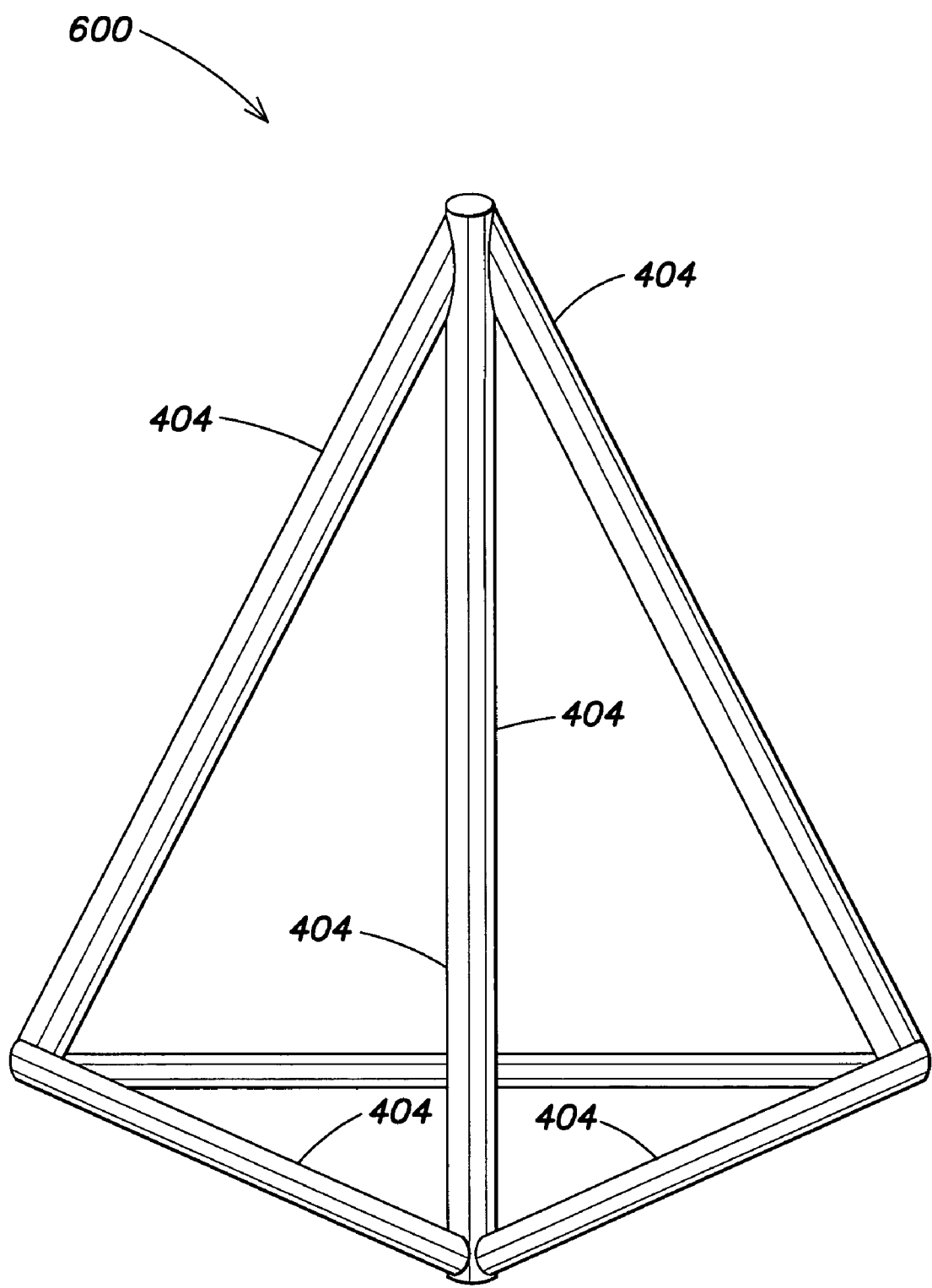
FIG. 6 shows a pyramid configuration consisting of linear lighting units.

FIG. 6 shows a pyramid configuration 600 consisting of linear lighting units 404. The pyramid 600 is one of many different possible configurations.

Figure 7:
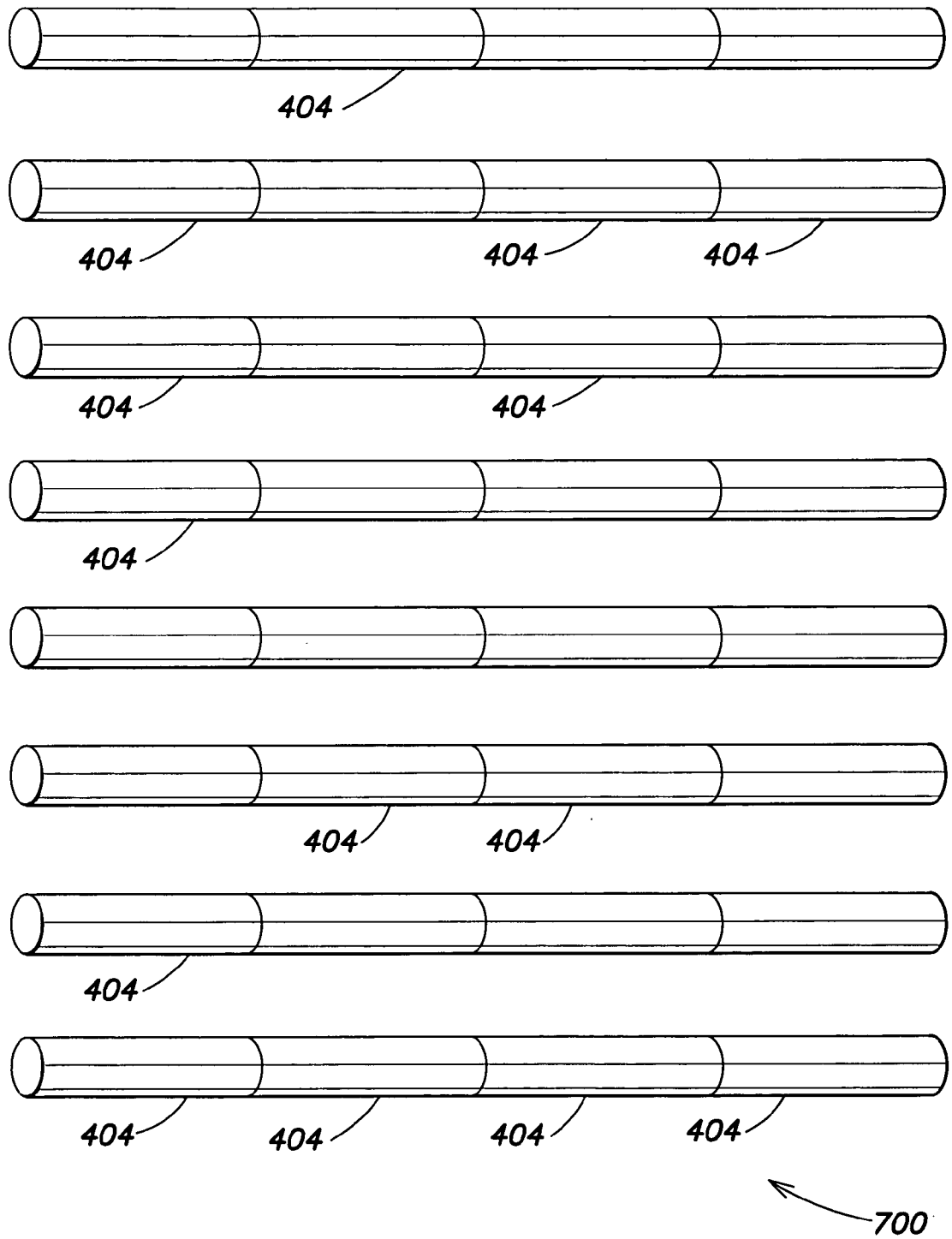
FIG. 7 shows a number of linear lighting units disposed in a two-dimensional array.

FIG. 7 shows a number of linear lighting units 404 disposed in a two-dimensional array 700. Lighting units 404 can thus be placed end-to-end to create an array of arbitrarily large size. Lighting units 404 can be of various sizes, such as one foot and four foot segments, or can be uniform in size. The individual linear lighting units 404 (and the light sources 104A–104D disposed in each of the linear lighting units 404) can be individually controlled to provide color, hue, intensity, saturation, and color temperature changes. Thus, the array 700 can present any combination of colors, based on the on and off state, color and intensity of individual linear lighting units 404.

Figure 8:
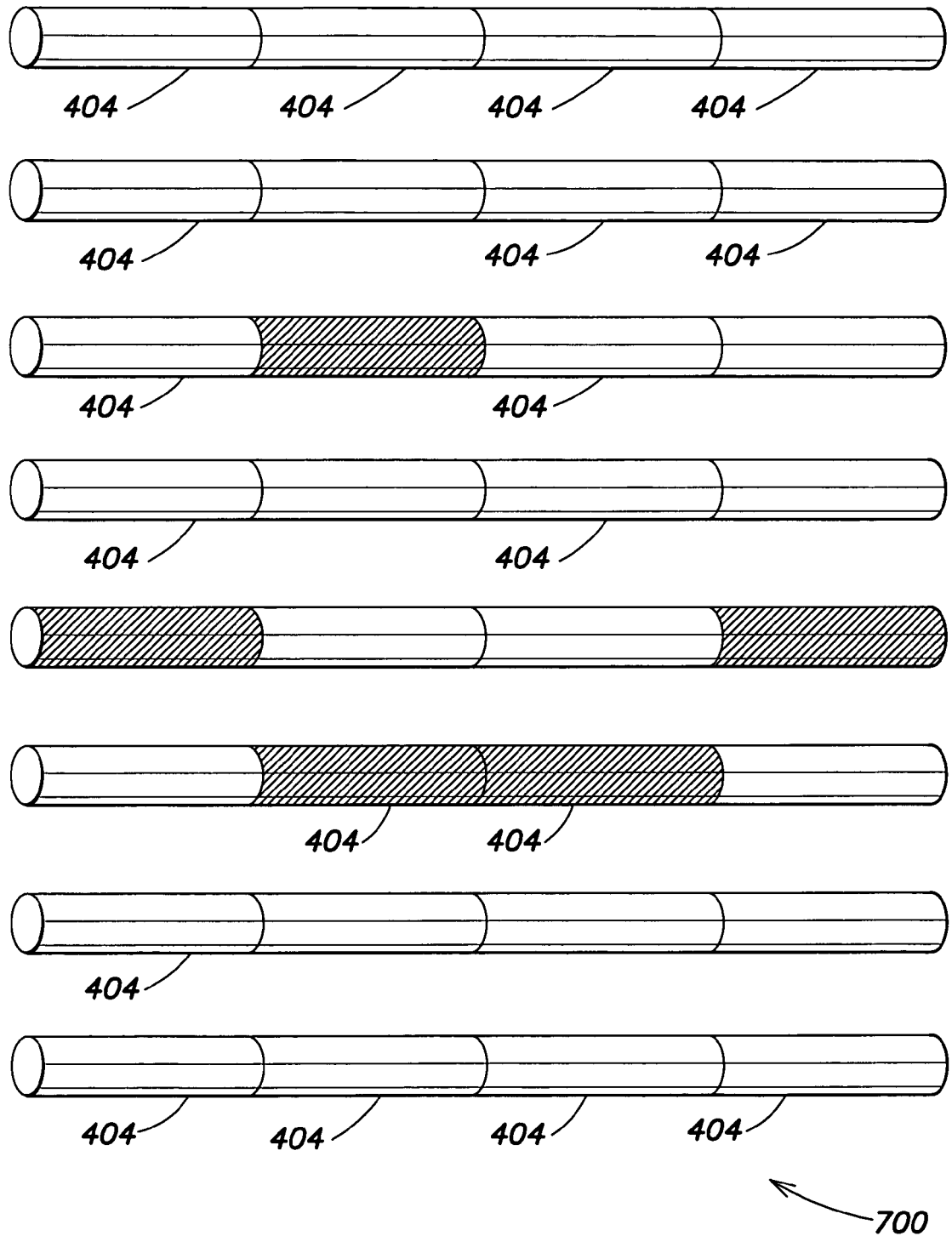
FIG. 8 shows the array of FIG. 7 with certain lighting units in the "on" position and others in an "off" position.

FIG. 8 shows the array 700 of linear lighting units 404, with certain units 404 turned on. The units 404 that are turned on can show the same color, or different colors, under control of the operator based on their individual addresses. As with all lighting units 100 disclosed in this specification, a wide range of controls and addressing techniques can be used to accomplish individual control of the elements of the array 700.

Figure 9:
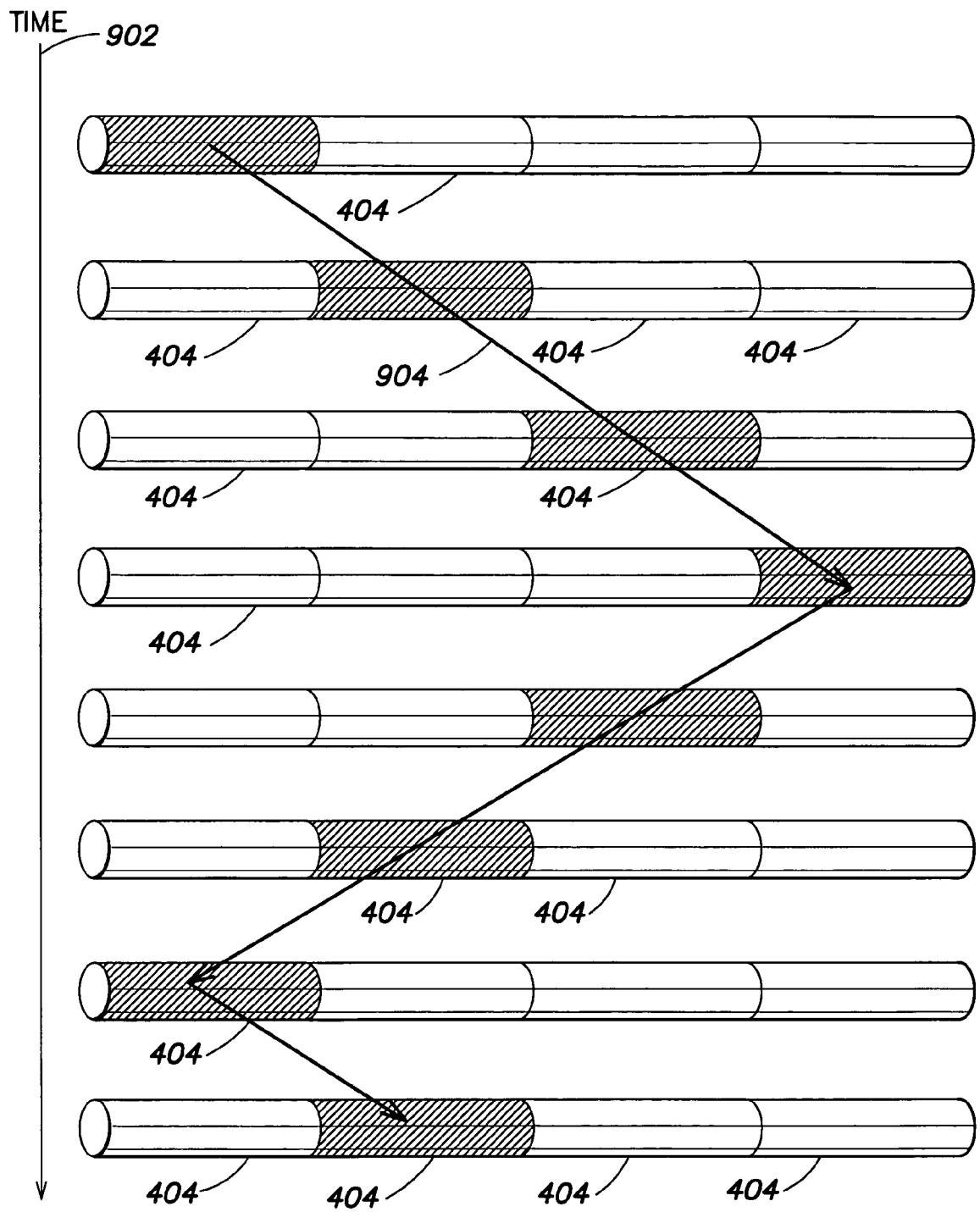
FIG. 9 shows a time-based effect taking place on a lighting configuration.

FIG. 9 shows that an effect can be created by generating different lighting signals over time. The arrow 902 shows that as time passes (moving downward in FIG. 9), different elements 404 are triggered to turn on. FIG. 9 could represent a moving element 404, which travels down and across the array and back., apparently following the path of the arrow 904 in FIG. 9 Alternatively, FIG. 9 can represent a single line of linear lighting units 404 over time. Thus, with the passage of each period of time, the element that is lit travels to the right, then back to the left. As a result, a particular color of light can "bounce" back and forth between the ends of a row of linear lighting elements 404, or it can "bounce" around the "walls" of an array. The lit element can be given attributes, such as simple harmonic motion, a pendulum effect, or the like. With a proper algorithm, the "bounce" can be made to obey rules that appear to give it "friction" or "gravity," (causing the bounce effect to slow down) or "anti-gravity" (causing the bounce effect to accelerate). Elements can also be designed to follow each other, so that a color chases other colors along the line, or through the array, in a "color chasing rainbow" effect. Such effect can be played out with other combinations of elements, such as curvilinear element 408, branched elements 410, or bent elements 412, as well as with point sources 402.

It should be noted that any shape or element may substantially resemble a point source if viewed from a great enough distance. For example, substantially linear elements can appear like "pixels" on the side of a building, if viewed from a great enough distance.

In some cases lighting systems consisting of various configurations of lighting units 100 may be very large in scale. The design and control of large systems of multiple lighting units 100 or other devices generally becomes increasingly complex as the scale of the system (i.e., number of devices coupled to the system) grows. One example of such a system is a lighting system of controllable lighting devices coupled together as a network. Such systems of networked lighting devices can produce coordinated color-changing lighting effects for a variety of applications. As the scale of such systems grow, system design, configuration and control in some cases present appreciable challenges to system designers, installers and operators.

Applicants generally have recognized and appreciated that complex systems of multiple devices, and in particular complex lighting networks of multiple controllable lighting devices, are in some cases challenging to design, install, configure and control. Accordingly, one embodiment of the present invention relates generally to methods and apparatus for improving various features of such systems to facilitate one or more of system design, installation, configuration and control.

The various concepts disclosed herein relating to the present invention may be implemented generally in systems of multiple devices in which any of several different types of devices are employed, including, but not limited to, different types of lighting-related devices as well as other non-lighting-related devices. In various embodiments, such devices may include, for example, one or more LED-based light sources, other types of illumination sources (e.g., conventional incandescent, fluorescent, and halogen light sources, just to name a few), combinations of different types of illumination sources, and combinations of both lighting and non-lighting related devices.

More specifically, one embodiment of the present invention is directed to a system of multiple controllable lighting units coupled together in any of a variety of configurations to form a networked lighting system. In one aspect of this embodiment, each lighting unit has one or more unique identifiers (e.g., a serial number, a network address, etc.) that may be pre-programmed at the time of manufacture and/or installation of the lighting unit, wherein the identifiers facilitate the communication of information between respective lighting units and one or more lighting system controllers. In another aspect of this embodiment, each lighting unit may be flexibly deployed in a variety of physical configurations with respect to other lighting units of the system, depending on the needs of a given installation.

One issue that may arise in such a system of multiple controllable lighting units is that upon deployment of the lighting units for a given installation, it is in some cases challenging to configure one or more system controllers a priori with some type of mapping information that provides a relationship between the identifier for each lighting unit and its physical location relative to other lighting units in the system. In particular, a lighting system designer/installer may desire to purchase a number of individual lighting units each pre-programmed with a unique identifier (e.g., serial number), and then flexibly deploy and interconnect the lighting units in any of a variety of configurations to implement a networked lighting system. At some point before operation, however, the system needs to know the identifiers of the controllable lighting units deployed, and preferably their physical location relative to other units in the system, so that each unit may be appropriately controlled to realize system-wide lighting effects.

One way to accomplish this is to have one or more system operators and/or programmers manually create one or more custom system configuration files containing the individual identifiers for each lighting unit and corresponding mapping information that provides some means of identifying the relative physical locations of lighting units in the system. As the number of lighting units deployed in a given system increases and the physical geometry of the system becomes more complex, however, Applicants have recognized and appreciated that this process quickly can become unwieldy.

In view of the foregoing, one embodiment of the invention is directed to methods and apparatus that facilitate a determination of the respective identifiers of controllable lighting units coupled together to form a networked lighting system. In one aspect of this embodiment, each lighting unit of the system has a pre-programmed multiple-bit binary identifier, and a determination algorithm is implemented to iteratively determine (i.e., "learn") the identifiers of all lighting units that make up the system. In various aspects, such determination/learning algorithms may employ a variety of detection schemes during the identifier determination process, including, but not limited to, monitoring a power drawn by lighting units at particular points of the process, and/or monitoring an illumination state of one or more lighting units at particular points of the determination process.

Once the collection of identifiers for all lighting units of the system is determined (or manually entered), another embodiment of the present invention is directed to facilitating the compilation of mapping information that relates the identified lighting units to their relative physical locations in the installation. In various aspects of this embodiment, the mapping information compilation process may be facilitated by one or more graphics user interfaces that enable a system operator and/or programmer to conveniently configure the system based on either learned and/or manually entered identifiers of the lighting units, as well as one or more graphic representations of the physical layout of the lighting units relative to one another.

Once all lighting unit identifiers are known and mapping information for the system is compiled, yet another embodiment of the invention is directed to the control of such a lighting system using various command hierarchies in conjunction with various system configurations and communication protocols. For example, one embodiment of the invention is directed to methods and apparatus that facilitate the communication of "high level" lighting commands and/or other programming information throughout some portion of the networked lighting system via an Ethernet-based implementation, while the "lower level" actual control of individual lighting units is accomplished using a DMX-based implementation (which is conventionally used in some professional lighting applications). In one aspect of this embodiment, a number of lighting unit controllers are deployed throughout the networked lighting system to communicate with one or more central system controllers via an Ethernet-based protocol. Such lighting unit controllers subsequently process the Ethernet-based information to provide DMX-based control signals to one or more lighting units.

To facilitate the following discussion, a lighting system including multiple LED-based light sources (hereinafter referred to generically as "lighting units") is described as one exemplary system in which various concepts according to the present invention may be implemented. As discussed above, however, it should be appreciated that the invention is not limited to implementation and application with such LED-based light sources, and that other implementations and applications are possible with other types of devices (i.e., both lighting and non-lighting-related devices).

Figure 10:
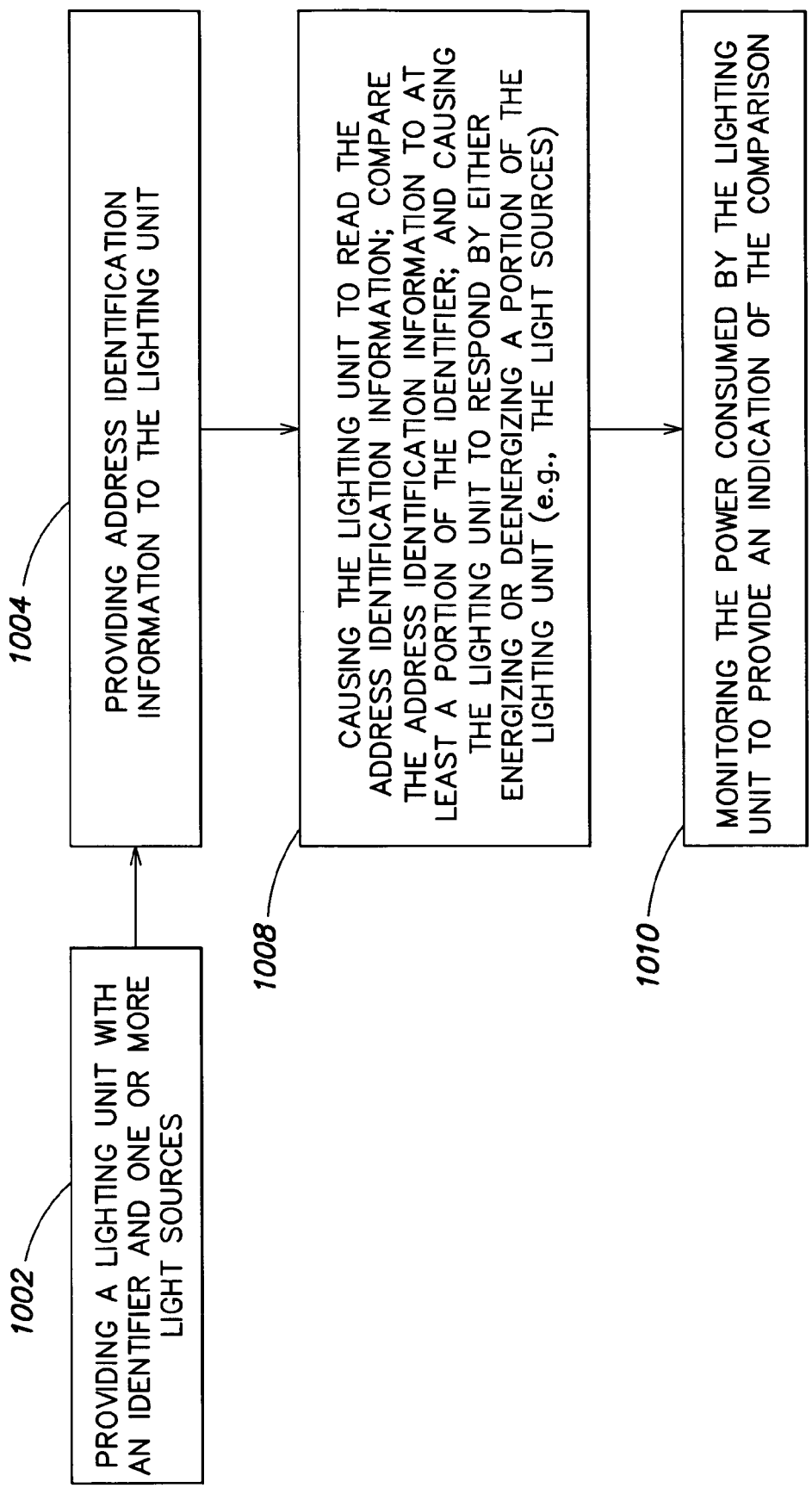
FIG. 10 illustrates an example of a general process flow diagram for determining lighting unit identifiers according to one embodiment of the present invention.

FIG. 10 illustrates an example of a general method for determining lighting unit identifiers according to one embodiment of the present invention. As shown in FIG. 10, the method may include a first step 1002 of providing a lighting unit having an identifier, a second step 1004 of providing address identification information to the lighting unit, a third step 1008 of causing the lighting unit to read the address identification information, compare the address identification information to at least a portion of the identifier, and causing the lighting unit to respond to the address identification information by either energizing or de-energizing one or more light sources of the lighting unit, and a fourth step 1010 of monitoring the power consumed by the lighting unit to provide an indication of the comparison.

According to one aspect of this embodiment, each LUC 208A, 208B, and 208C shown in FIG. 2 includes a power sensing module that provides one or more indications to the LUC when power is being drawn by one or more lighting units coupled to the LUC (i.e., when one or more light sources of one or more of the lighting units is energized).

Figure 11:
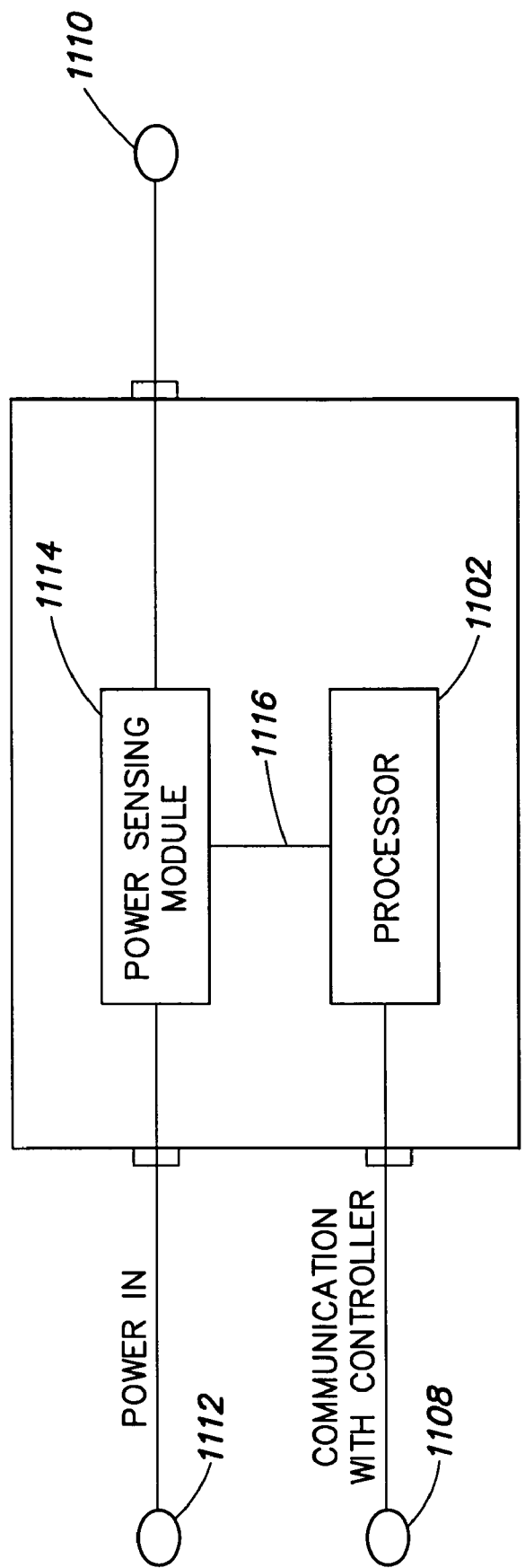
FIG. 11 illustrates a portion of a lighting unit controller including a power-sensing module according to one embodiment of the present invention.

FIG. 11 shows a block diagram of a portion of a generic LUC 208 that includes a LUC processor 1102 and a power sensing module 1114. As indicated in FIG. 11, the power sensing module 1114 may be coupled to a power supply input connection 1112 and may in turn provide power to one or more lighting units coupled to the LUC via a power output connection 1110. The power sensing module 1114 also may provide one or more output signals 1116 to the processor 1102, and the processor in turn may communicate to the central controller 202 information relating to power sensing, via the connection 1108.

In one aspect of the LUC shown in FIG. 11, the power sensing module 1114, together with the processor 1102, may be adapted to determine merely when any power is being consumed by any of the lighting units coupled to the LUC, without necessarily determining the actual power being drawn or the actual number of units drawing power. As discussed further below in connection with FIG. 13, such a "binary" determination of power either being consumed or not consumed by the collection of lighting units coupled to the LUC facilitates an identifier determination/learning algorithm (e.g., that may be performed by the LUC processor 1102 or the central controller 202) according to one embodiment of the invention. In other aspects, the power sensing module 1114 and the processor 1102 may be adapted to determine, at least approximately, and actual power drawn by the lighting units at any given time. If the average power consumed by a single lighting unit is known a priori, the number of units consuming power at any given time can then be derived from such an actual power measurement. Such a determination is useful in other embodiments of the invention, as discussed further below.

Figure 12:
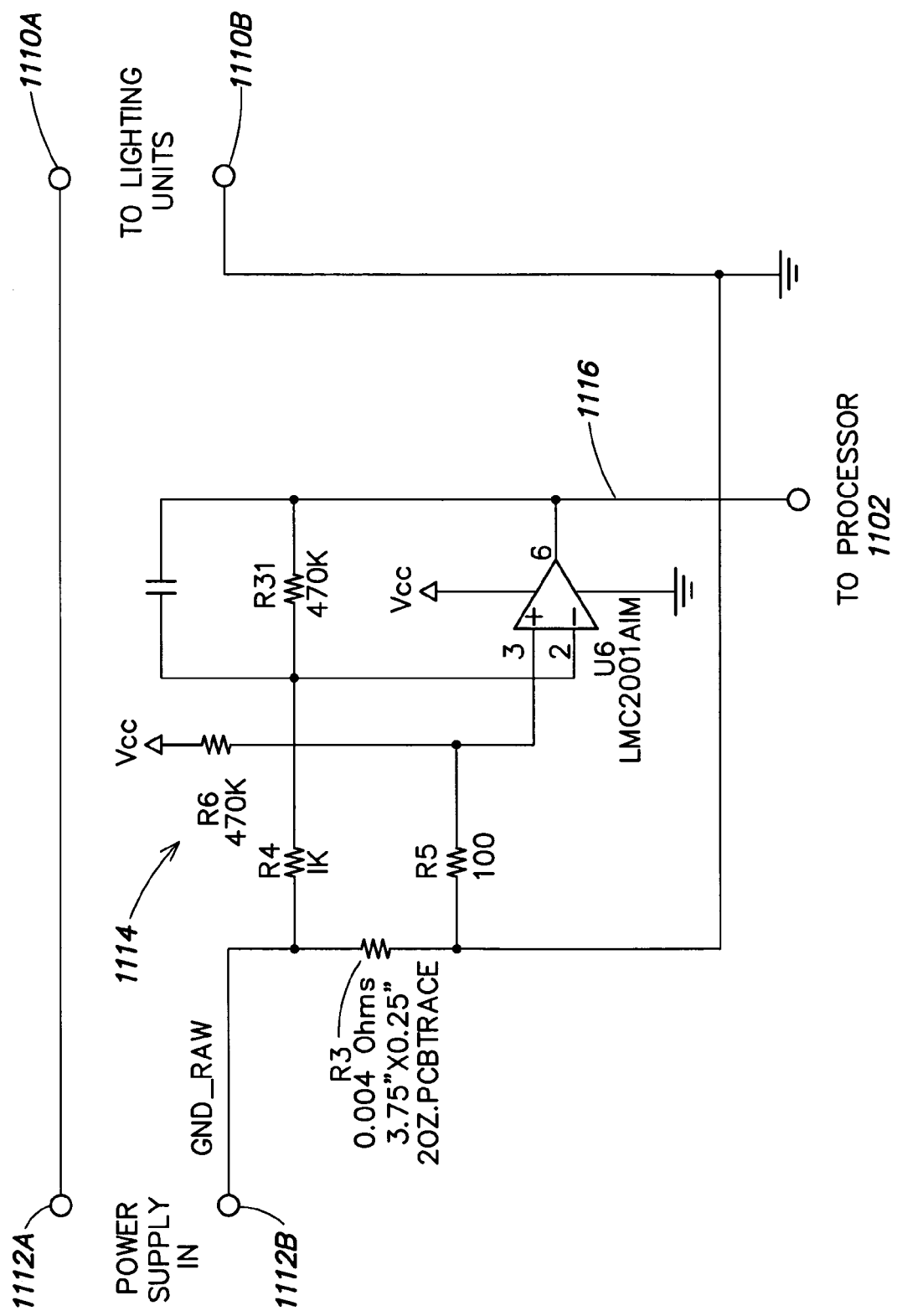
FIG. 12 shows an example of a circuit implementation of a lighting unit controller including a power-sensing module according to one embodiment of the invention.

FIG. 12 shows an example of a portion of a circuit implementation of a LUC including a power sensing module 1114 according to one embodiment of the invention. In FIG. 12, the power supply input connection is shown as a positive terminal 1112A and a ground terminal 1112B. Similarly, the power output connection to the lighting units is shown as a positive terminal 1110A and a ground terminal 1110B. In FIG. 12, the power sensing module 1114 is implemented essentially as a current sensor interposed between the ground terminal 1112B of the power supply input connection and the ground terminal 1110B of the power output connection. The current sensor includes a sampling resistor R3 to develop a sampled voltage based on power drawn from the power output connection. The sampled voltage is then amplified by operational amplifier U6 to provide an output signal 1116 to the processor 1102 indicating that power is being drawn.

In one aspect of the embodiment shown in FIG. 12, the power input supply connection 1112A and 1112B may provide a supply voltage of approximately 20 volts, and the power sensing module 1114 may be designed to generate an output signal 1116 of approximately 2 volts per amp of load current (i.e., a gain of 2 V/A) drawn by the group of lighting units coupled to the LUC. In other aspects, the processor 1102 may include an A/D converter having a detection resolution on the order of approximately 0.02 volts, and the lighting units may be designed such that each lighting unit may draw approximately 0.1 amps of current when energized, resulting in a minimum of approximately a 0.2 volt output signal 1116 (based on the 2 V/A gain discussed above) when any unit of the group is energized (i.e., easily resolved by the processor's A/D converter). In another aspect, the minimum quiescent current (off-state current, no light sources energized) drawn by the group of lighting units may be measured from time to time, and an appropriate threshold may be set for the power sensing module 1114, so that the output signal 1116 accurately reflects when power is being drawn by the group of lighting units due to actually energizing one or more light sources.

As discussed above, according to one embodiment of the invention, the LUC processor 1102 may monitor the output signal 1116 from the power sensing module 1114 to determine if any power is being drawn by the group of lighting units, and use this indication in an identifier determination/learning algorithm to determine the collection of identifiers of the group of lighting units coupled to the LUC. For purposes of illustrating the various concepts related to such an algorithm, the following discussion assumes an example of a unique four bit binary identifier for each of the lighting units coupled to a given LUC. It should be appreciated, however, that lighting unit identifiers according to the present invention are not limited to four bits, and that the following example is provided primarily for purposes of illustration.

Figure 13:
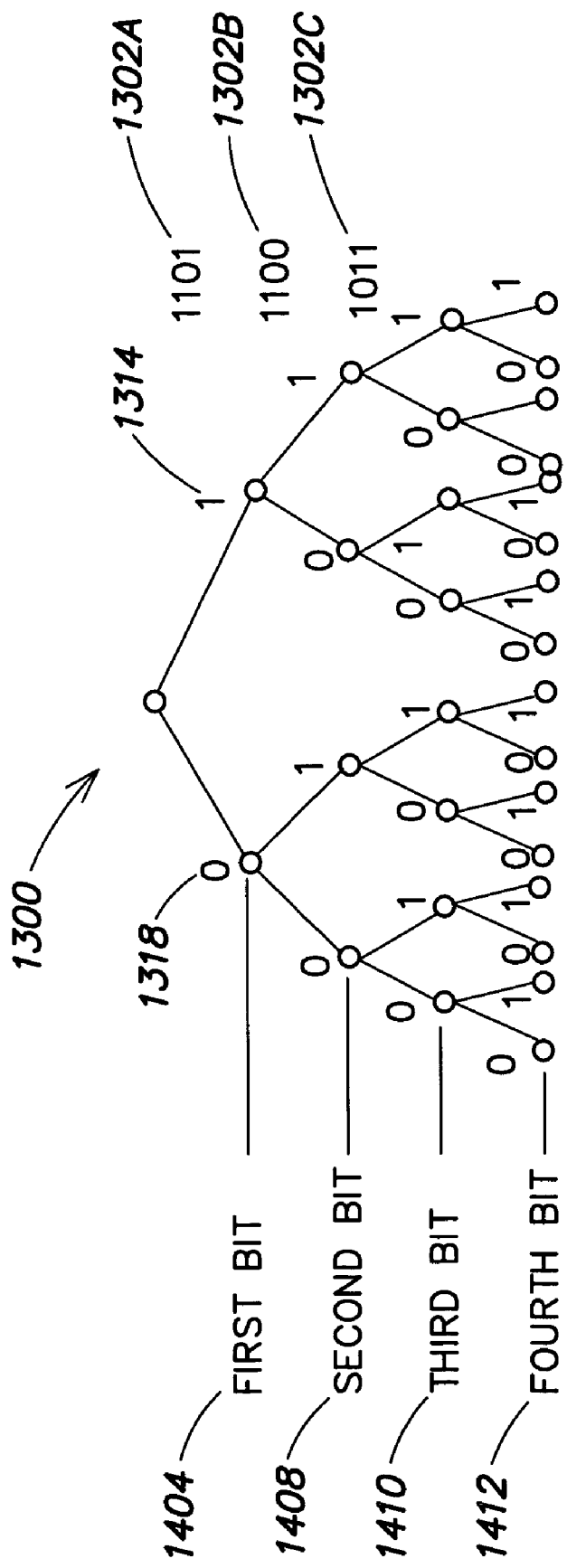
FIG. 13 illustrates a binary tree structure representing possible identifiers for multiple lighting units of the system of FIG. 2, according to one embodiment of the present invention.

FIG. 13 illustrates a binary search tree 1300 based on four bit identifiers for lighting units, according to one embodiment of the invention. In FIG. 13, it is assumed that three lighting unit 100 are coupled to a generic LUC 208, and that the first lighting unit has a first binary identifier 1302A of one, one, zero, one (1101), the second lighting unit has a second binary identifier 1302B of one, one, zero, zero (1100), and the third lighting unit has a third binary identifier 1302C of one, zero, one, one (1011). These exemplary identifiers are used below to illustrate an example of an identifier determination/learning algorithm.

Figure 14B:
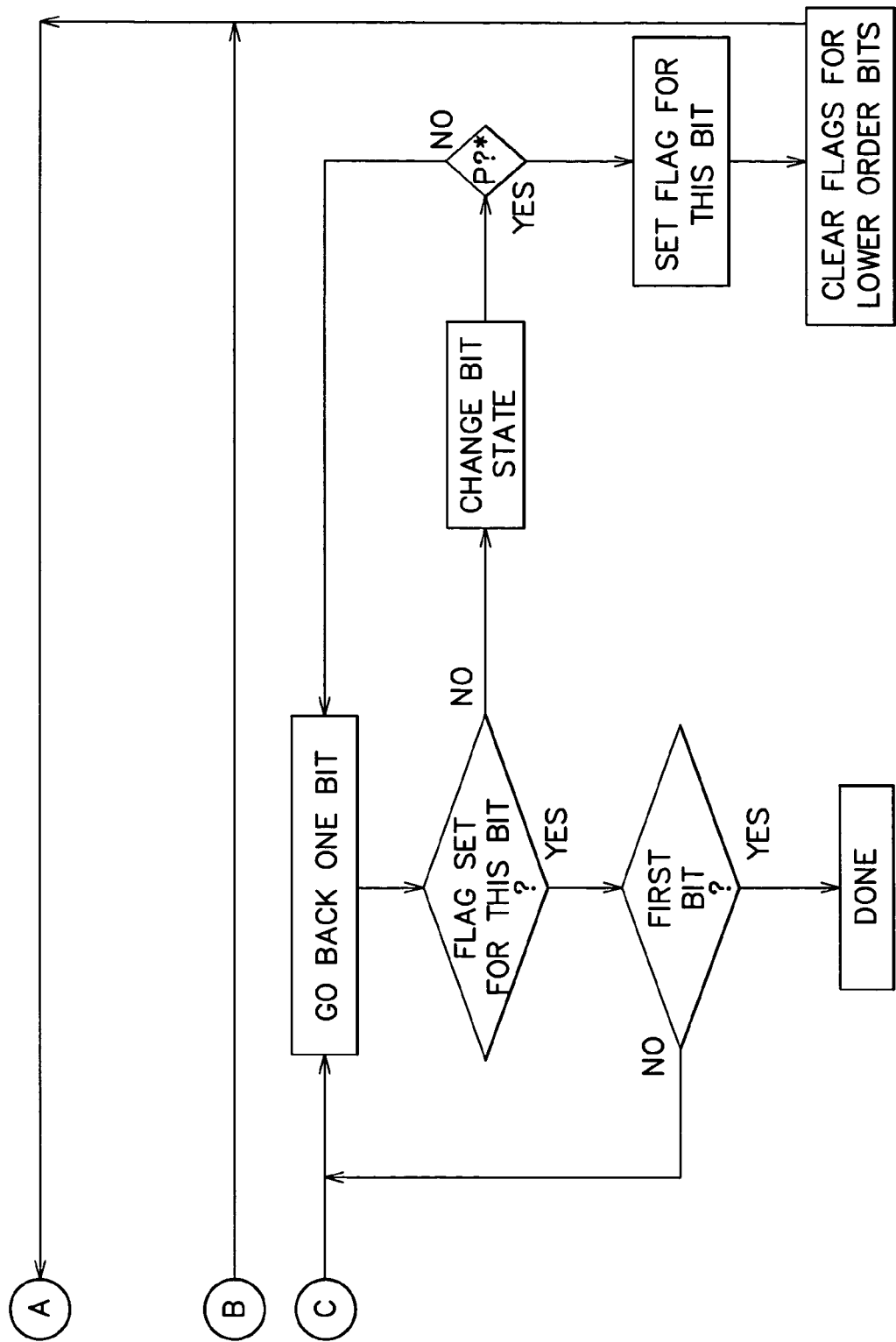

FIG. 14 illustrates a more detailed flow diagram of an identifier determination/learning algorithm according to one embodiment of the present invention, based on monitoring the power drawn by of one or more lighting units coupled to the LUC. In the algorithm of FIG. 14, the number of lighting units coupled to the LUC and the collection of identifiers corresponding to the respective units are determined. However, it should be appreciated that no particular determination is made of which lighting unit has which identifier; stated differently, the algorithm of FIG. 14 does not determine a one-to-one correspondence between identifiers and lighting units, but rather merely determines the collection of identifiers of all of the lighting units coupled to the LUC. According to one embodiment of the invention, such a determination is sufficient for purposes of subsequently compiling mapping information regarding the physical locations of the lighting units relative to one another.

In the algorithm of FIG. 14, it should also be appreciated that one or both of a given LUC processor 1102 or the central controller 202 shown in FIG. 2 may be configured to execute the algorithm, and that either the processor or the central controller may include memory to store a flag for each bit of the identifier, which flag may be set and reset at various points during the execution of the algorithm, as discussed further below. Furthermore, for purposes of explaining the algorithm, it is to be understood that the "first bit" of an identifier refers to the highest order binary bit of the identifier. In particular, with reference to the example of FIG. 13, the four identifier bits are consecutively indicated as a first bit 1404, a second bit 1408, a third bit 1410, and a fourth bit 1412.

Referring again to the exemplary identifiers and binary tree illustrated in FIG. 13, the algorithm of FIG. 14 essentially implements a complete search of the binary tree to determine the identifiers of all lighting units coupled to a given LUC. As indicated in FIG. 14, the algorithm begins by selecting a first state (either a 1 or a 0) for the highest order bit 1404 of the identifier, and then sends a global command to all of the lighting units coupled to the LUC to energize one or more of their light sources if their respective identifiers have a highest order bit corresponding to the selected state. Again for purposes of illustration, it is assumed here that the algorithm initially selects the state "1" (indicated with the reference character 1314 in FIG. 13). In response to this command, all of the lighting units energize their light sources and, hence, power is drawn from the LUC. It should be appreciated, however, that the algorithm may initially select the state "0" (indicated with the reference character 1318 in FIG. 13); in the present case, since no lighting unit has an identifier with a "0" in the highest order bit 1404, no power would be drawn from the LUC and the algorithm would respond by setting a flag for this bit, changing the state of this bit, and by default assume that all of the lighting units coupled to the LUC necessarily have a "1" in the highest order bit (as is indeed the case for this example).

As a result of a "1" in the highest order bit having been identified, with reference to FIG. 14, the algorithm adds another bit 1408 with the same state (i.e., "1"), and then sends a global command to all of the lighting units to energize their light sources if their respective identifiers begin with "11" (i.e., 11XX). As a result of this query, based on the example of FIG. 13, the first and second lighting units energize their light sources and draw power, but the third lighting unit does not energize. In any event, some power is drawn, so the algorithm of FIG. 14 then queries if there are any more bits in the identifier. In the present example there are more bits, so the algorithm returns to adding another bit 1410 with the same state as the previous bit and then sends a global command to all lighting units to energize their light sources if their respective identifiers begin with "111" (i.e., 111X).

At this point in the example, no identifiers correspond to this query, and hence no power is drawn from the LUC. Accordingly, the algorithm sets a flag for this third bit 1410, changes the state of the bit (now to a "0"), and again queries if there are any more bits in the identifier. In the present example there are more bits, so the algorithm returns to adding another bit 1412 with the same state as the previous bit (i.e., another "0") and then sends a global command to all lighting units to energize their light sources if they have the identifier "1100."

In response to this query, the second lighting unit energizes its light sources and hence power is drawn from the LUC. Since there are no more bits in the identifiers, the algorithm has thus learned a first of the three identifiers, namely, the second identifier 1402B of "1100." At this point, the algorithm checks to see if a flag for the fourth bit 1412 has been set. Since no flag yet has been set for this bit, the algorithm changes the bit state (now to a "1"), and sends a global command to all lighting units to energize their light sources if they have the identifier "1101." In the present example, the first lighting unit energizes its light sources and draws power, indicating that yet another identifier has been learned by the algorithm, namely, the first identifier 1402A of "1101."

At this point, the algorithm goes back one bit in the identifier (in the present example, this is the third bit 1410) and checks to see if a flag was set for this bit. As pointed out above, indeed the flag for the third bit was set (i.e., no identifiers corresponded to "111X"). The algorithm then checks to see if it has arrived back at the first (highest order) bit 1404 again, and if not, goes back yet another bit (to the second bit 1408). Since no flag has yet been set for this bit (it is currently a "1"), the algorithm changes the state of the second bit (i.e., to a "0" in the present example), and sends a global command to all lighting units to energize their light sources if their respective identifiers begin with "10" (i.e., 10XX). In the current example, the third lighting unit energizes its light sources, and hence power is drawn. Accordingly, the algorithm then sets the flag for this second bit, clears any lower order flags that may have been previously set (e.g., for the third or fourth bits 1410 and 1412), and returns to adding another bit 1410 with the same state as the previous bit. From this point, the algorithm executes as described above until ultimately it learns the identifier 1402C of the third lighting unit (i.e., 1011), and determines that no other lighting units are coupled to the LUC.

Again, it should be appreciated that although an example of four bit identifiers was used for purposes of illustration, the algorithm of FIG. 14 may be applied similarly to determine identifiers having an arbitrary number of bits. Furthermore, it should be appreciated that FIG. 14 provides merely one example of an identifier determination/learning algorithm, and that other methods for determining/learning identifiers may be implemented according to other embodiments of the invention.

In another embodiment, the lighting unit controller may not include a power monitoring system but the methodology of identifying lighting unit addresses according to the principles of the present invention may still be achieved. For example, rather than monitoring the power consumed by one or more lighting units, a visible interpretation of the individual lighting units may be recorded, either by human intervention or another image capture system such as a camera or video recorder. In this case, the images of the light emitted by the individual lighting units may be recorded for each bit identification and it may not be necessary to go up and down the binary task tree as identified above.

Figure 15:
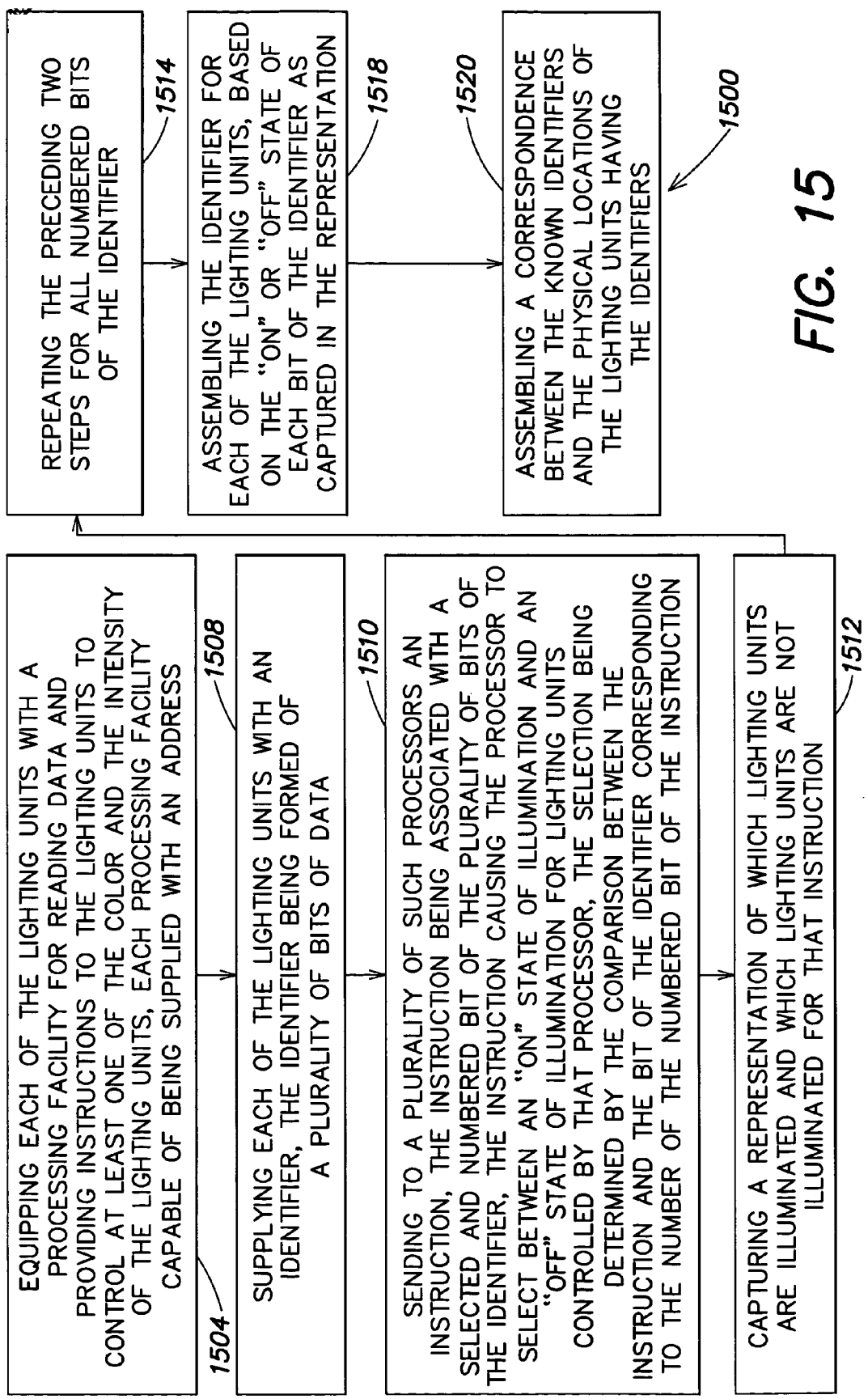
FIG. 15 illustrates a process flow diagram according to one embodiment of the present invention for determining lighting unit identifiers by observing an illumination state of the lighting units.

FIG. 15 illustrates a process flow diagram according to the principles of the present invention for determining lighting unit identifiers based on observing illumination states of the lighting units. The method may involve the controlling of light from a plurality of lighting units that are capable of being supplied with addresses (identifiers) 1500. The method may comprise the steps of equipping each of the lighting units with a processing facility for reading data and providing instructions to the lighting units to control at least one of the color and the intensity of the lighting units, each processing facility capable of being supplied with an address 1504. For example, the lighting units may include a lighting unit 100 where the processor 102 is capable of receiving network data. The processor may receive network data and operate the LED(s) 104 in a manner consistent with the received data. The processor may read data that is explicitly or implicitly addressed to it or it may respond to all of the data supplied to it. The network commands may be specifically targeting a particular lighting unit with an address or group of lighting units with similar addresses or the network data may be communicated to all network devices. A communication to all network devices may not be addressed but may be a universe or world style command.

The method may further comprise the step of supplying each processor with an identifier, the identifier being formed of a plurality of bits of data 1508. For example, each lighting unit 100 may be associated with memory 114 (e.g. EPROM) and the memory 114 may contain a serial number that is unique to the light or processor. Of course, the setting of the serial number or other identifier may be set through mechanical switches or other devices and the present invention is not limited by a particular method of setting the identifier. The serial number may be a 32-bit number in EPROM for example.

The method may also comprise sending to a plurality of such processors an instruction, the instruction being associated with a selected and numbered bit of the plurality of bits of the identifier, the instruction causing the processor to select between an "on" state of illumination and an "off" state of illumination for light sources controlled by that processor, the selection being determined by the comparison between the instruction and the bit of the identifier corresponding to the number of the numbered bit of the instruction 1510. For example, a network command may be sent to one or more lighting units in the network of lighting units. The command may be a global command such that all lighting units that receive the command respond. The network command may instruct the processors 102 to read the first bit of data associated with its serial number. The processor may then compare the first bit to the instructions in the network instruction or assess if the bit is a one or a zero. If the bit is a one, the processor may turn the lighting unit on or to a particular color or intensity. This provides a visual representation of the first bit of the serial number. A person or apparatus viewing the light would understand that the first bit in the serial number is either a one (e.g. light is on) or a zero (e.g. light is off). The next instruction sent to the light may be to read and indicate the setting of the second bit of the address. This process can be followed for each bit of the address allowing a person or apparatus to decipher the address by watching the light sources of the lighting unit turn on and/or off following each command.

The method may further comprise capturing a representation of which lighting units are illuminated and which lighting units are not illuminated for that instruction 1512. For example, a camera, video or other image capture system may be used to capture the image of the lighting unit(s) following each such network command. Repeating the preceding two steps, 1510 and 1512, for all numbered bits of the identifier 1514 allows for the reconstruction of the serial number of each lighting unit in the network.

The method may further comprise assembling the identifier for each of the lighting units, based on the "on" or "off" state of each bit of the identifier as captured in the representation 1518. For example, a person could view the lighting unit's states and record them to decipher the lighting unit's serial number or software can be written to allow the automatic reading of the images and the reassembly of the serial numbers from the images. The software may be used to compare the state of the lighting unit with the instruction to calculate the bit state of the address and then proceed to the next image to calculate the next bit state. The software may be adapted to calculate a plurality or all of the bit states of the associated lighting units in the image and then proceed to the next image to calculate the next bit state. This process could be used to calculate all of the serial numbers of the lighting units in the image.

The method may also comprise assembling a correspondence between the known identifiers (e.g. serial numbers) and the physical locations of the lighting units having the identifiers 1520. For example, the captured image not only contains lighting unit state information but it also contains lighting unit position information. The positioning may be relative or absolute. For example, the lighting units may be mounted on the outside of a building and the image may show a particular lighting unit is below the third window from the right on the seventy second floor. This lighting unit's position may also be referenced to other lighting unit positions such that a map can be constructed which identifies all of the identifiers (e.g. serial numbers) with a lighting unit and its position. Once these positions and/or lighting units are identified, network commands can be directed to the particular lighting units by addressing the commands with the identifier and having the lighting unit respond to data that is addressed to its identifier. The method may further comprise controlling the illumination from the lighting units by sending instructions to the desired lighting units at desired physical locations. Another embodiment may involve sending the now identified lighting units address information such that the lighting units store the address information as its address and will respond to data sent to the address. This method may be useful when it is desired to address the lighting units in some sequential scheme in relation to the physical layout of the lighting units. For example, the user may want to have the addresses sequentially increase as the lighting fixtures go from left to right across the face of a building. This may make authoring of lighting sequences easier because the addresses are associated with position or progression.

Another aspect of the present invention relates to communicating with lighting units and altering their address information. In an embodiment, a lighting unit controller LUC may be associated with several lighting units and the controller may know the address information/identifiers for the lighting units associated with the controller. A user may want to know the relative position of one lighting unit as compared to another and may communicate with the controller to energize a lighting unit such that the user can identify its position within an installation. For example, the user may use a computer with a display to show representations of the controller and the lighting units associated with the controller. The user may select the controller, using the representation on the display, and cause all of the associated lighting units to energize allowing the user to identify their relative or absolute positions. A user may also elect to select a lighting unit address or representation associated with the controller to identify its particular position with the array of other lighting units. The user may repeat this process for all the associated lighting unit addresses to find their relative positions. Then, the user may rearrange the lighting unit representations on the display in an order that is more convenient (e.g. in order of the lighting units actual relative positions such as left to right). Information relating to the rearrangement may then be used to facilitate future communications with the lighting units. For example, the information may be communicated to the controller and the lighting units to generate new 'working' addresses for the lighting units that correspond with the re-arrangement. In another embodiment, the information may be stored in a configuration file to facilitate the proper communication to the lighting units.

Figure 16:
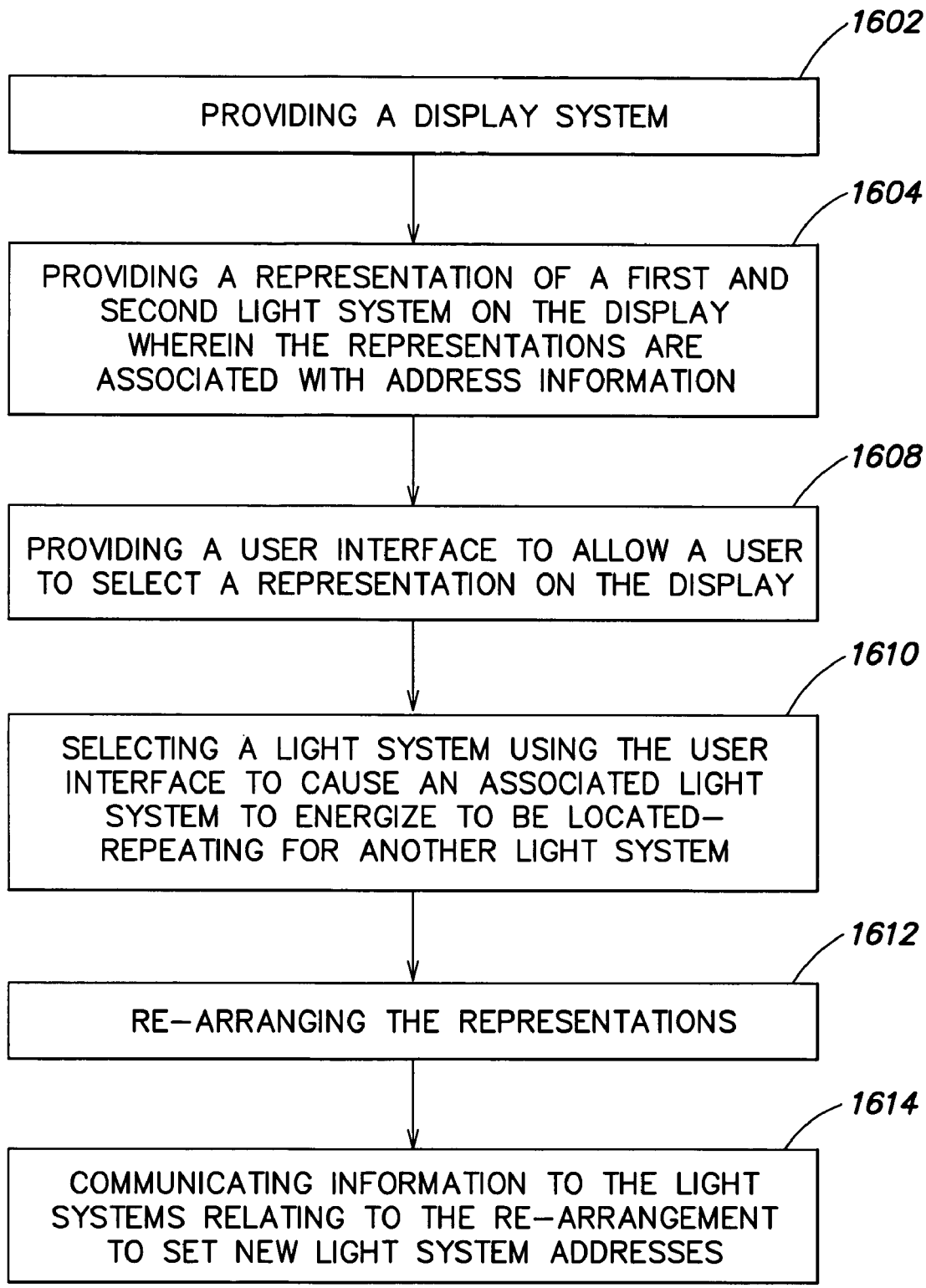
FIG. 16 illustrates a process flow diagram for determining/compiling mapping information based on physical locations of lighting units according to one embodiment of the present invention.

FIG. 16 illustrates a flow diagram of a method of determining/compiling mapping information relating to the physical locations of lighting units and thereafter communicating to the lighting units, according to one embodiment of the invention. The method includes the steps of providing a display system 1602; providing a representation of a first and second lighting unit wherein the representations are associated with a first address 1604; providing a user interface wherein a user can select a lighting unit and cause the selected lighting units to energize 1608; selecting a lighting unit to identify its position and repeating this step for the other lighting unit 1610; re-arranging the representations of the first lighting unit and the second lighting unit on the display using a user interface 1612; and communicating information to the lighting units relating to the rearrangement to set new system addresses 1614. The method may include other steps such as storing information relating to the re-arrangement of the representations on a storage medium. The storage medium may be any electronic storage medium such as a hard drive; CD; DVD; portable memory system or other memory device. The method may also include the step of storing the address information in a lighting unit as the lighting unit working address.

Figure 17:
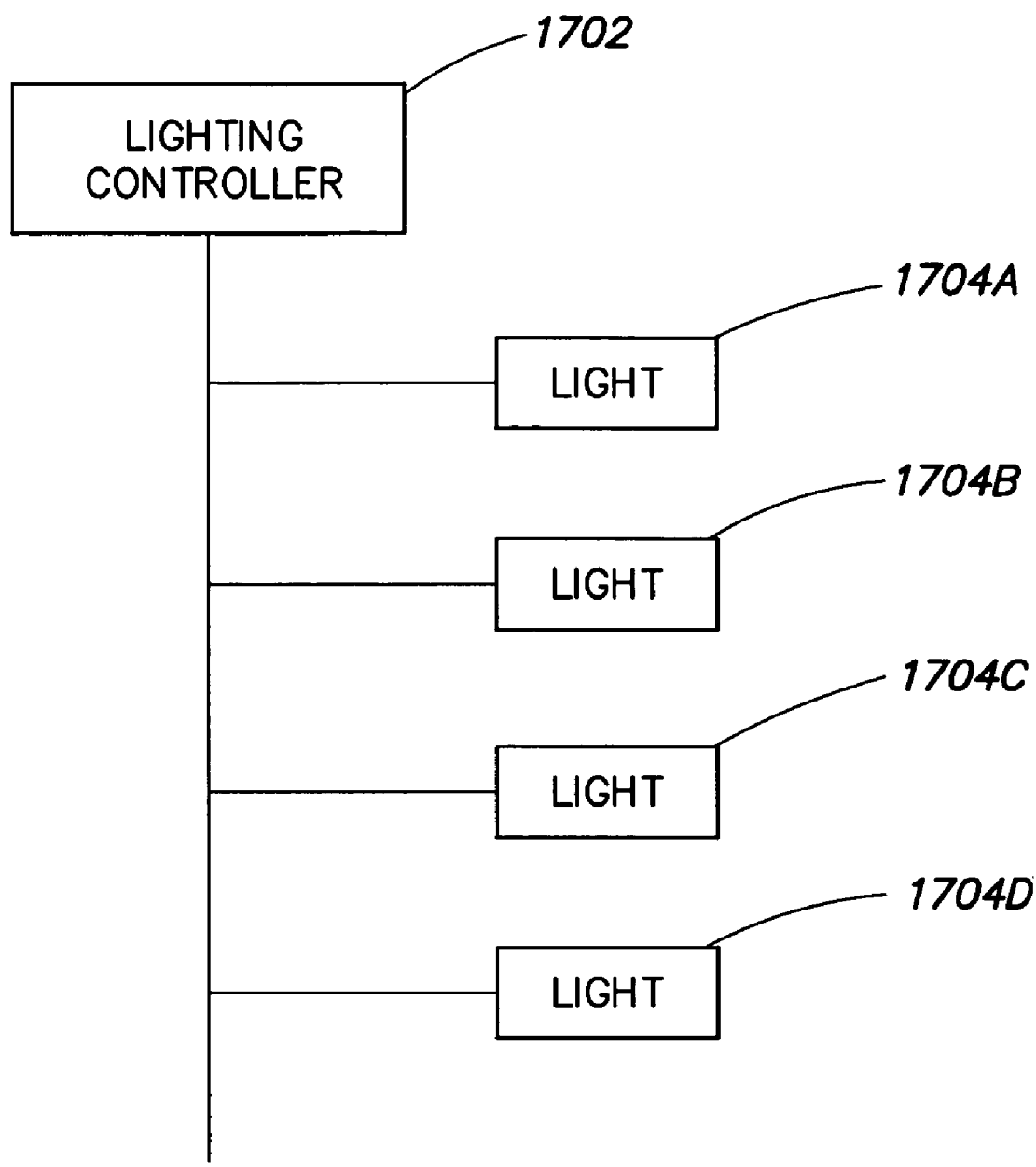
FIG. 17 illustrates an exemplary graphics user interface to facilitate system configuration according to one embodiment of the present invention.

In an embodiment, once the lighting units have been identified, the lighting unit controller 208 may transmit the address information to a computer system. The computer system may include a display (e.g., a graphics user interface) where a representation of the lighting unit controller 208 is displayed as indicated in FIG. 17 as object 1702. The display may also provide representations of the lighting unit 100 associated with the light controller 208 as indicated in FIG. 17 as object 1704. In an embodiment, the computer, possibly through a user interface, may be used to re-arrange the order of the lighting unit representations. For example, a user may click on the lighting unit representation 1702 and all of the lighting units associated with the lighting unit controller may energize to provide the user with a physical interpretation of the placement of the lighting unit (e.g. they are located on above the window on the $72^{nd}$ floor of the building). Then, the user may click on individual lighting unit representations (e.g. 1704A) to identify the physical location of the lighting unit within the array of lighting units. As the user identifies the lighting unit locations, the user may rearrange the lighting unit representations on the computer screen such that they represent the ordering in the physical layout. In an embodiment, this information may be stored to a storage medium. The information may also be used in a configuration file such that future communications with the lighting units are directed per the configuration file. In an embodiment, information relating to the rearrangement may be transmitted to the lighting unit controller and new 'working' addresses may be assigned to the individual lighting units. This may be useful in providing a known configuration of lighting unit addresses to make the authoring of lighting shows and effects easier.

Another aspect of the present invention relates to systems and methods of communicating to large-scale networks of lighting units. In an embodiment, the communication to the lighting units originates from a central controller where information is communicated in high level commands to lighting unit controllers. The high level commands are then interpreted by the lighting unit controllers, and the lighting unit controllers generate lighting unit commands. In an embodiment, the lighting unit controller may include its own address such that commands can be directed to the associated lighting units through controller-addressed information. For example, the central controller may communicate light controller addressed information that contains instructions for a particular lighting effect. The lighting unit controller may monitor a network for its own address and once heard, read the associated information. The information may direct the lighting unit controller to generate a dynamic lighting effect (e.g. a moving rainbow of colors) and then communicate control signals to its associated lighting units to effectuate the lighting effect. In an embodiment, the lighting unit controller may also include group address information. For example, it may include a universe address that associates the controller with other controllers or systems to create a universe of controllers that can be addressed as a group; or it may include a broadcast address such that broadcast commands can be sent to all controllers on the network.

Figure 18:
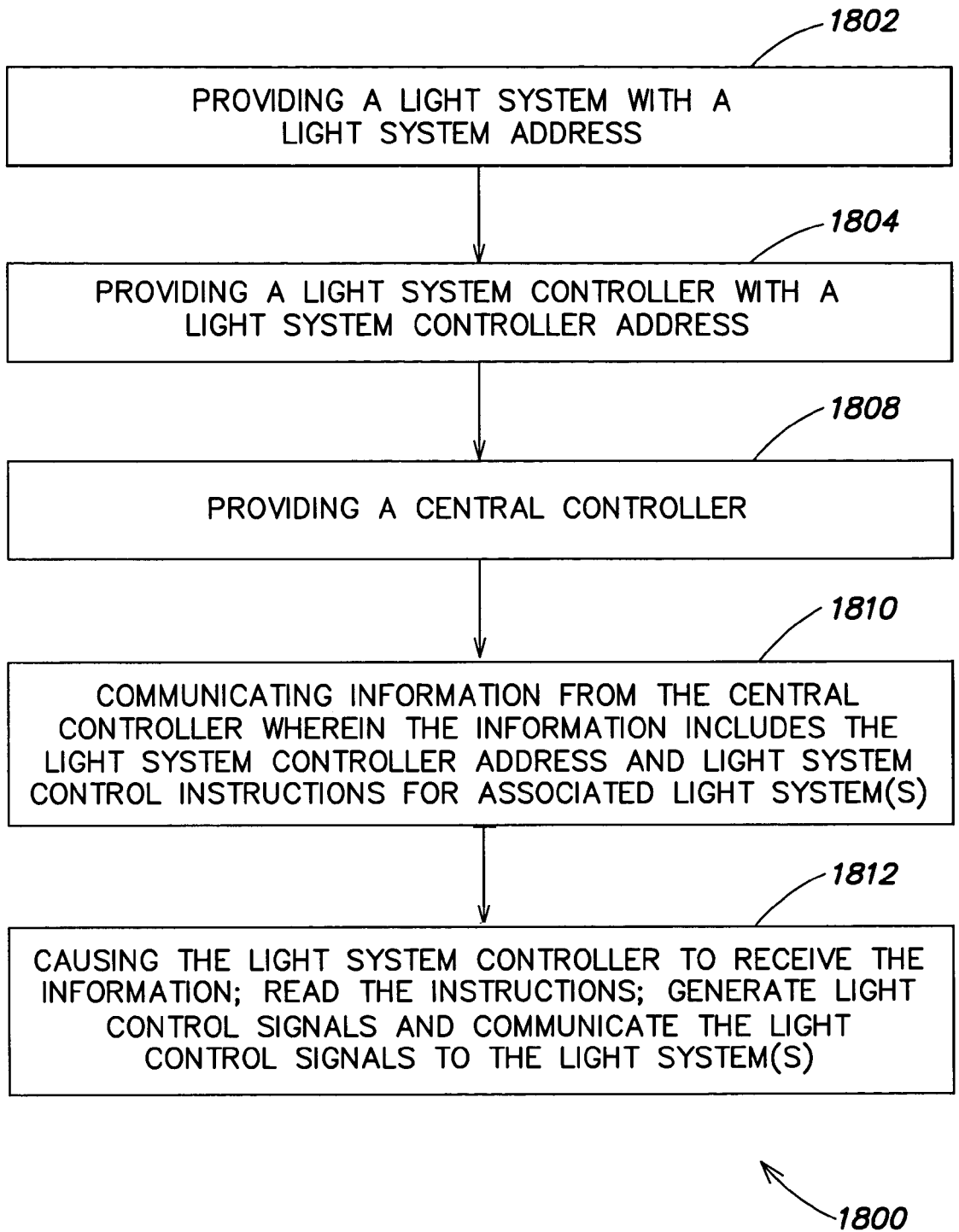
FIG. 18 illustrates a process flow diagram for communicating with a lighting system according to one embodiment of the present invention.

FIG. 18 illustrates a flow diagram of a method of communicating to addressed systems (e.g. lighting units). The method may include the steps of providing a lighting unit wherein the lighting unit includes a lighting unit address 1802; providing a lighting unit controller wherein the lighting unit controller comprises a lighting unit controller address 1804; providing a central network controller 1808; communicating configured information from the central controller wherein the configured information comprises the lighting unit controller address 1810; and causing the lighting unit controller to monitor central controller communications, receive the configured information, interpret the configured information and communicate light information to the lighting unit 1812.

A lighting unit controller 208 according to the present invention may include a unique address such that the LUC 208 can be identified and communicated with. The LUC 208 may also include a universe address such that the lighting unit controller 208 can be grouped with other controllers or systems and addressed information can be communicated to the group of systems. The lighting unit controller 208 may also have broadcast address, or otherwise listen to general commands provided to many or all associated systems.

Another aspect of the present invention relates to maintaining a system of addressable systems. In an embodiment, a lighting unit controller 208 may include a power monitoring system, as indicated above, and this system may be used to monitor the performance of associated systems (e.g. lighting unit 100) and feedback information relating to the same. For example, a lighting unit 100 may control an illumination source and the illumination source may include three colors of LEDs (e.g. red, green and blue). A central controller 202 may communicate a status command that directs each of the addressable lighting unit 100 to turn on a specific color and the power monitoring system may monitor the power drawn by the lighting unit to indicate the condition of the illumination source. For example, the command may instruct a lighting unit to energize its red LEDs and following the energization, the lighting unit controller may monitor the power draw. If some of the red LEDs are not functioning or not functioning properly the power draw would be less then an expected value and a fault condition may be noted. A testing sequence could be generated and communicated by the central controller such that all of the lighting units are inspected using such a system. Following this routine, a system report may be generated indicating lighting units that may not be functioning properly. The report may indicate the lighting unit, associated lighting unit controller, position and any other relevant information. In embodiments, the system report may be delivered to a processor for identifying changes to the lighting configuration, such as changes to the addresses or data streams, or the handling of them, in lighting units 100. Thus, a "self-healing" lighting configuration can be created, that corrects defects that arise as a result of failure of one or more lighting units 100 or components thereof within the configuration.

Applicant has appreciated that by combining conventional light sources (e.g., fluorescent and incandescent light sources) with LED-based (e.g., variable color) light sources, a variety of enhanced lighting effects may be realized for a number of space-illumination applications (e.g., residential, office/workplace, retail, commercial, industrial, and outdoor environments). Applicant also has recognized that various light sources and other devices may be integrated together in a microprocessor-based networked lighting system to provide a variety of computer controlled programmable lighting effects.

Accordingly, one embodiment of the present invention is directed generally to networked lighting systems, and to various methods and apparatus for computer-based control of various light sources and other devices that may be coupled together to form a networked lighting system. In one aspect of the invention, conventional light sources are employed in combination with LED-based (e.g., variable color) light sources to realize enhanced lighting effects. For example, in one embodiment, one or more computer-controllable (e.g., microprocessor-based) light sources conventionally used in various space-illumination applications and LED-based light sources are combined in a single fixture (hereinafter, a "combined" fixture), wherein the conventional light sources and the LED-based sources may be controlled independently. In another embodiment, dedicated computer-controllable light fixtures including conventional space-illumination light sources and LED-based light fixtures, as well as combined fixtures, may be distributed throughout a space and coupled together as a network to facilitate computer control of the fixtures.

In one embodiment of the invention, controllers (which may, for example, be microprocessor-based) are associated with both LED-based light sources and conventional light sources (e.g., fluorescent light sources) such that the light sources are independently controllable. More specifically, according to one embodiment, individual light sources or groups of light sources are coupled to independently controllable output ports of one or more controllers, and a number of such controllers may in turn be coupled together in various configurations to form a networked lighting system. According to one aspect of this embodiment, each controller coupled to form the networked lighting system is "independently addressable," in that it may receive data for multiple controllers coupled to the network, but selectively responds to data intended for one or more light sources coupled to it. By virtue of the independently addressable controllers, individual light sources or groups of light sources coupled to the same controller or to different controllers may be controlled independently of one another based on various control information (e.g., data) transported throughout the network. In one aspect of this embodiment, one or more other controllable devices (e.g., various actuators, such as relays, switches, motors, etc.) also may be coupled to output ports of one or more controllers and independently controlled.

According to one embodiment, a networked lighting system may be an essentially one-way system, in that data is transmitted to one or more independently addressable controllers to control various light sources and/or other devices via one or more output ports of the controllers. In another embodiment, controllers also may have one or more independently identifiable input ports to receive information (e.g., from an output of a sensor) that may be accessed via the network and used for various control purposes. In this aspect, the networked lighting system may be considered as a two-way system, in that data is both transmitted to and received from one or more independently addressable controllers. It should be appreciated, however, that depending on a given network topology (i.e., interconnection of multiple controllers) as discussed further below, according to one embodiment, a controller may both transmit and receive data on the network regardless of the particular configuration of its ports.

In sum, a lighting system controller according to one embodiment of the invention may include one or more independently controllable output ports to provide control signals to light sources or other devices, based on data received by the controller. The controller output ports are independently controllable in that each controller receiving data on a network selectively responds to and appropriately routes particular portions of the data intended for that controller's output ports. In one aspect of this embodiment, a lighting system controller also may include one or more independently identifiable input ports to receive output signals from various sensors (e.g., light sensors, sound or pressure sensors, heat sensors, motion sensors); the input ports are independently identifiable in that the information obtained from these ports may be encoded by the controller as particularly identifiable data on the network. In yet another aspect, the controller is "independently addressable," in that the controller may receive data intended for multiple controllers coupled to the network, but selectively exchanges data with (i.e., receives data from and/or transmits data to) the network based on the one or more input and/or output ports it supports.

According to one embodiment of the invention in which one or more sensors are employed, a networked lighting system may be implemented to facilitate automated computer-controlled operation of multiple light sources and devices in response to various feedback stimuli, for a variety of space-illumination applications. For example, automated lighting applications for home, office, retail environments and the like may be implemented based on a variety of feedback stimuli (e.g., changes in temperature or natural ambient lighting, sound or music, human movement or other motion, etc.). According to various embodiments, multiple controllers may be coupled together in a number of different configurations (i.e., topologies) to form a networked lighting system. For example, according to one embodiment, data including control information for multiple light sources (and optionally other devices), as well as data corresponding to information received from one or more sensors, may be transported throughout the network between one or more central or "hub" processors, and multiple controllers each coupled to one or more light sources, other controllable devices, and/or sensors. In another embodiment, a network of multiple controllers may not include a central hub processor exchanging information with the controllers; rather, the controllers may be coupled together to exchange information with each other in a de-centralized manner. More generally, in various embodiments, a number of different network topologies, data protocols, and addressing schemes may be employed in networked lighting systems according to the present invention. For example, according to one embodiment, one or more particular controller addresses may be manually pre-assigned to each controller on the network (e.g., stored in nonvolatile memory of the controller). Alternatively, the system may be "self-learning" in that one or more central processors (e.g., servers) may query (i.e., "ping") for the existence of controllers (e.g., clients) coupled to the network, and assign one or more addresses to controllers once their existence is verified. The lighting system may also be "self-healing", allowing it to reconfigure in the case of failure of a component or unit. In these embodiments, a variety of addressing schemes and data protocols may be employed, including conventional Internet addressing schemes and data protocols.

In yet other embodiments, a particular network topology may dictate an addressing scheme and/or data protocol for the networked lighting system. For example, in one embodiment, addresses may be assigned to respective controllers on the network based on a given network topology and a particular position in the network topology of respective controllers. Similarly, in another embodiment, data may be arranged in a particular manner (e.g., a particular sequence) for transmission throughout the network based on a particular position in the network topology of respective controllers. In one aspect of this embodiment, the network may be considered "self-configuring" in that it does not require the specific assignment of addresses to controllers, as the position of controllers relative to one another in the network topology dictates the data each controller exchanges with the network.

In particular, according to one embodiment, data ports of multiple controllers are coupled to form a series connection (e.g., a daisy-chain or ring topology for the network), and data transmitted to the controllers is arranged sequentially based on a relative position in the series connection of each controller. In one aspect of this embodiment, as each controller in the series connection receives data, it "strips off" one or more initial portions of the data sequence intended for it and transmits the remainder of the data sequence to the next controller in the series connection. Each controller on the network in turn repeats this procedure, namely, stripping off one or more initial portions of a received data sequence and transmitting the remainder of the sequence. Such a network topology obviates the need for assigning one or more specific addresses to each controller; as a result, each controller may be configured similarly, and controllers may be flexibly interchanged on the network or added to the network without requiring a system operator or network administrator to reassign addresses.

Having identified a variety of geometric configurations for lighting unit 100, it can be recognized that providing illumination control signals to the configurations requires the operators to be able to relate the appropriate control signal to the appropriate lighting unit 100. A configuration of networked lighting unit 100 might be arranged arbitrarily, requiring the operator to develop a table or similar facility that relates a particular light to a particular geometric location in an environment. For large installations requiring many lighting unit 100, the requirement of identifying and keeping track of the relationship between a lights physical location and its network address can be quite challenging, particularly given that the lighting installer may not be the same operator who will use and maintain the lighting system over time. Accordingly, in some situations it may be advantageous to provide addressing schemes that enable easier relation between the physical location of a lighting unit 100 and its virtual location for purposes of providing it a control signal. Thus, one embodiment of the invention is directed to a method of providing address information to a lighting unit 100. The method includes acts of A) transmitting data to an independently addressable controller coupled to at least one LED lighting unit 100 and at least one other controllable device, the data including at least one of first control information for a first control signal output by the controller to the at least one LED light source and second control information for a second control signal output by the controller to the at least one other controllable device, and B) controlling at least one of the at least one LED light source and the at least one other controllable device based on the data.

Another embodiment of the invention is directed to a method, comprising acts of: A) receiving data for a plurality of independently addressable controllers, at least one independently addressable controller of the plurality of independently addressable controllers coupled to at least one LED light source and at least one other controllable device, B) selecting at least a portion of the data corresponding to at least one of first control information for a first control signal output by the at least one independently addressable controller to the at least one LED light source and second control information for a second control signal output by the at least one independently addressable controller to the at least one other controllable device, and C) controlling at least one of the at least one LED light source and the at least one other controllable device based on the selected portion of the data.

Another embodiment of the invention is directed to a lighting system, comprising a plurality of independently addressable controllers coupled together to form a network, at least one independently addressable controller of the plurality of independently addressable controllers coupled to at least one LED light source and at least one other controllable device, and at least one processor coupled to the network and programmed to transmit data to the plurality of independently addressable controllers, the data corresponding to at least one of first control information for a first control signal output by the at least one independently addressable controller to the at least one LED light source and second control information for a second control signal output by the at least one independently addressable controller to the at least one other controllable device. Another embodiment of the invention is directed to an apparatus for use in a lighting system including a plurality of independently addressable controllers coupled together to form a network, at least one independently addressable controller of the plurality of independently addressable controllers coupled to at least one LED light source and at least one other controllable device. The apparatus comprises at least one processor having an output to couple the at least one processor to the network, the at least one processor programmed to transmit data to the plurality of independently addressable controllers, the data corresponding to at least one of first control information for a first control signal output by the at least one independently addressable controller to the at least one LED light source and second control information for a second control signal output by the at least one independently addressable controller to the at least one other controllable device.

Another embodiment of the invention is directed to an apparatus for use in a lighting system including at least one LED light source and at least one other controllable device. The apparatus comprises at least one controller having at least first and second output ports to couple the at least one controller to at least the at least one LED light source and the at least one other controllable device, respectively, the at least one controller also having at least one data port to receive data including at least one of first control information for a first control signal output by the first output port to the at least one LED light source and second control information for a second control signal output by the second output port to the at least one other controllable device, the at least one controller constructed to control at least one of the at least one LED light source and the at least one other controllable device based on the data.

Another embodiment of the invention is directed to a method in a lighting system including at least first and second independently addressable devices coupled to form a series connection, at least one device of the independently addressable devices including at least one light source. The method comprises an act of: A) transmitting data to at least the first and second independently addressable devices, the data including control information for at least one of the first and second independently addressable devices, the data being arranged based on a relative position in the series connection of at least the first and second independently addressable devices.

Another embodiment of the invention is directed to a method in a lighting system including at least first and second independently addressable devices, at least one device of the independently addressable devices including at least one light source. The method comprises acts of: A) receiving at the first independently addressable device first data for at least the first and second independently addressable devices, B) removing at least a first data portion from the first data to form second data, the first data portion corresponding to first control information for the first independently addressable device, and C) transmitting from the first independently addressable device the second data.

Another embodiment of the invention is directed to a lighting system, comprising at least first and second independently addressable devices coupled to form a series connection, at least one device of the independently addressable devices including at least one light source, and at least one processor coupled to the first and second independently addressable devices, the at least one processor programmed to transmit data to at least the first and second independently addressable devices, the data including control information for at least one of the first and second independently addressable devices, the data arranged based on a relative position in the series connection of at least the first and second independently addressable devices.

Another embodiment of the invention is directed to an apparatus for use in a lighting system including at least first and second independently addressable devices coupled to form a series connection, at least one device of the independently addressable devices including at least one light source. The apparatus comprises at least one processor having an output to couple the at least one processor to the first and second independently addressable devices, the at least one processor programmed to transmit data to at least the first and second independently addressable devices, the data including control information for at least one of the first and second independently addressable devices, the data arranged based on a relative position in the series connection of at least the first and second independently addressable devices.

Another embodiment of the invention is directed to an apparatus for use in a lighting system including at least first and second independently controllable devices, at least one device of the independently controllable devices including at least one light source. The apparatus comprises at least one controller having at least one output port to couple the at least one controller to at least the first independently controllable device and at least one data port to receive first data for at least the first and second independently controllable devices, the at least one controller constructed to remove at least a first data portion from the first data to form second data and to transmit the second data via the at least one data port, the first data portion corresponding to first control information for at least the first independently controllable device.

Another embodiment of the present invention is directed to lighting system. The lighting system comprises an LED lighting system adapted to receive a data stream through a first data port, generate an illumination condition based on a first portion of the data stream and communicate at least a second portion of the data stream through a second data port; a housing wherein the housing is adapted to retain the LED lighting system and adapted to electrically associate the first and second data ports with a data connection; wherein the data connection comprises an electrical conductor with at least one discontinuous section; wherein the first data port is associated with the data connection on a first side of the discontinuous section and the second data port is associated with a second side of the discontinuous section wherein the first and second sides are electrically isolated.

Another embodiment of the present invention is directed at an integrated circuit. The integrated circuit comprises a data recognition circuit wherein the data recognition circuit is adapted to read at least a first portion of a data stream received through a first data port; an illumination control circuit adapted to generate at least one illumination control signal in response to the first portion of data; and an output circuit adapted to transmit at least a second portion of the data stream through a second data port.

Another embodiment of the present invention is directed at a method for controlling lighting systems. The method comprises the steps of providing a plurality of lighting systems; communicating a data stream to a first lighting system of the plurality of lighting systems; causing the first lighting system to receive the data stream and to read a first portion of the data stream; causing the first lighting system to generate a lighting effect in response to the first portion of the data stream; and causing the first lighting system to communicate at least a second portion of the data stream to second lighting system of the plurality of lighting systems.

Figure 19:
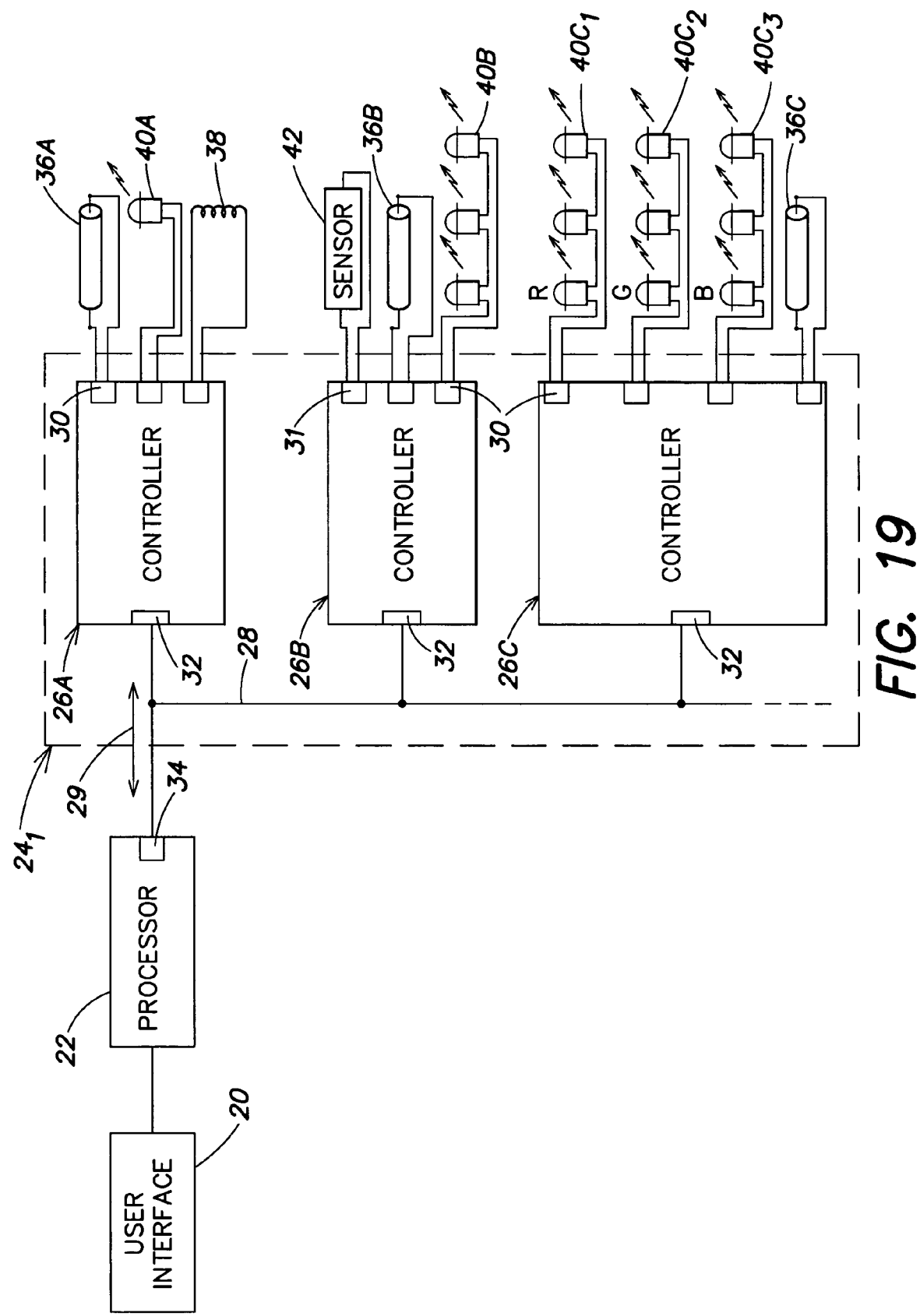
FIG. 19 is a diagram showing a networked lighting system according to one embodiment of the invention.

FIG. 19 is a diagram illustrating a networked lighting system according to one embodiment of the invention. In the system of FIG. 19, three controllers 26A, 26B and 26C are coupled together to form a network $24_1$. In particular, each of the controllers 26A, 26B and 26C has a data port 32 through which data 29 is exchanged between the controller and at least one other device coupled to the network. While FIG. 19 shows a network including three controllers, it should be appreciated that the invention is not limited in this respect, as any number of controllers may be coupled together to form the network $24_1$.

FIG. 19 also shows a processor 22 coupled to the network $24_1$ via an output port 34 of the processor. In one aspect of the embodiment shown in FIG. 19, the processor 22 also may be coupled to a user interface 20 to allow system operators or network administrators to access the network (e.g., transmit information to and/or receive information from one or more of the controllers 26A, 26B, and 26C, program the processor 22, etc.).

The networked lighting system shown in FIG. 19 is configured essentially using a bus topology; namely, each of the controllers is coupled to a common bus 28. However, it should be appreciated that the invention is not limited in this respect, as other types of network topologies (e.g., tree, star, daisy-chain or ring topologies) may be implemented according to other embodiments of the invention. In particular, an example of a daisy-chain or ring topology for a networked lighting system according to one embodiment of the invention is discussed further below in connection with FIG. 21. Also, it should be appreciated that the network lighting system illustrated in FIG. 19 may employ any of a variety of different addressing schemes and data protocols to transfer data 29 between the processor 22 and one or more controllers 26A, 26B, and 26C, or amongst the controllers. Some examples of addressing schemes and data protocols suitable for purposes of the present invention are discussed in greater detail below.

As also illustrated in the embodiment of FIG. 19, each controller 26A, 26B, and 26C of the networked lighting system is coupled to one or more of a variety of devices, including, but not limited to, conventional light sources (e.g., fluorescent or incandescent lights), LED-based light sources, controllable actuators (e.g., switches, relays, motors, etc.), and various sensors (e.g., light, heat, sound/pressure, motion sensors). For example, FIG. 19 shows that the controller 26A is coupled to a fluorescent light 36A, an LED 40A, and a controllable relay 38; similarly, the controller 26B is coupled to a sensor 42, a fluorescent light source 36B, and a group 40B of three LEDs, and the controller 26C is coupled to three groups $40C_1$, $40C_2$, and $40C_3$ of LEDs, as well as a fluorescent light source 36C.

The fluorescent light sources illustrated in FIG. 19 (and in other figures) are shown schematically as simple tubes; however, it should be appreciated that this depiction is for purposes of illustration only. In particular, the gas discharge tube of a fluorescent light source typically is controlled by a ballast (not shown in the figures) which receives a control signal (e.g., a current or voltage) to operate the light source. For purposes of this disclosure, fluorescent light sources generally are understood to comprise a glass tube filled with a vapor, wherein the glass tube has an inner wall that is coated with a fluorescent material. Fluorescent light sources emit light by controlling a ballast electrically coupled to the glass tube to pass an electrical current through the vapor in the tube. The current passing through the vapor causes the vapor to discharge electrons, which in turn impinge upon the fluorescent material on the wall of the tube and cause it to glow (i.e., emit light). One example of a conventional fluorescent light ballast may be controlled by applying an AC voltage (e.g., 120 Volts AC) to the ballast to cause the glass tube to emit light. In another example of a conventional fluorescent light ballast, a DC voltage between 0 and 10 Volts DC may be applied to the ballast to incrementally control the amount of light (e.g., intensity) radiated by the glass tube. In the embodiment of FIG. 19, it should be appreciated generally that the particular types and configuration of various devices coupled to the controllers 26A, 26B, and 26C is for purposes of illustration only, and that the invention is not limited to the particular configuration shown in FIG. 19. For example, according to other embodiments, a given controller may be associated with only one device, another controller may be associated with only output devices (e.g., one or more light sources or actuators), another controller may be associated with only input devices (e.g., one or more sensors), and another controller may be associated with any number of either input or output devices, or combinations of input and output devices. Additionally, different implementations of a networked lighting system according to the invention may include only light sources, light sources and other output devices, light sources and sensors, or any combination of light sources, other output devices, and sensors.

As shown in FIG. 19, according to one embodiment, the various devices are coupled to the controllers 26A, 26B, and 26C via a number of ports. More specifically, in addition to at least one data port 32, each controller may include one or more independently controllable output ports 30 as well as one or more independently identifiable input ports 31. According to one aspect of this embodiment, each output port 30 provides a control signal to one or more devices coupled to the output port 30, based on particular data received by the controller via the data port 32. Similarly, each input port 31 receives a signal from one or more sensors, for example, which the controller then encodes as data which may be transmitted via the data port 32 throughout the network and identified as corresponding to a signal received at a particular input port of the network.

In particular, according to one aspect of this embodiment, particular identifiers may be assigned to each output port and input port of a given controller. This may be accomplished, for example, via software or firmware at the controller (e.g., stored in the memory 48), a particular hardware configuration of the various input and/or output ports, instructions received via the network (i.e., the data port 32) from the processor 22 or one or more other controllers, or any combination of the foregoing. In another aspect of this embodiment, the controller is independently addressable in that the controller may receive data intended for multiple devices coupled to output ports of other controllers on the network, but has the capability of selecting and responding to (i.e., selectively routing) particular data to one or more of its output ports, based on the relative configuration of the ports (e.g., assignment of identifiers to ports and/or physical arrangement of ports) in the controller. Furthermore, the controller is capable of transmitting data to the network that is identifiable as corresponding to a particular input signal received at one or more of its input ports 31.

For example, in one embodiment of the invention based on the networked lighting system shown in FIG. 19, a sensor 42 responsive to some input stimulus (e.g., light, sound/pressure, temperature, motion, etc.) provides a signal to an input port 31 of the controller 26B, which may be particularly accessed (i.e., independently addressed) over the network $24_1$ (e.g., by the processor 22) via the data port 32 of the controller 26B. In response to signals output by the sensor 42, the processor 22 may transmit various data throughout the network, including control information to control one or more particular light sources and/or other devices coupled to any one of the controllers 26A, 26B, and 26C; the controllers in turn each receive the data, and selectively route portions of the data to appropriate output ports to effect the desired control of particular light sources and/or other devices. In another embodiment of the invention not employing the processor 22, but instead comprising a de-centralized network of multiple controllers coupled together, any one of the controllers may function similarly to the processor 22, as discussed above, to first access input data from one or more sensors and then implement various control functions based on the input data.

From the foregoing, it should be appreciated that a networked lighting system according to one embodiment of the invention may be implemented to facilitate automated computer-controlled operation of multiple light sources and devices in response to various feedback stimuli (e.g., from one or more sensors coupled to one or more controllers of the network), for a variety of space-illumination applications. For example, automated networked lighting applications according to the invention for home, office, retail, commercial environments and the like may be implemented based on a variety of feedback stimuli (e.g., changes in temperature or natural ambient lighting, sound or music, human movement or other motion, etc.) for energy management and conservation, safety, marketing and advertisement, entertainment and environment enhancement, and a variety of other purposes.

In different embodiments based on the system of FIG. 19, various data protocols and addressing schemes may be employed in networked lighting systems according to the invention. For example, according to one embodiment, particular controller and/or controller output and input port addresses may be manually pre-assigned to each controller on the network $24_1$ (e.g., stored in nonvolatile memory of the controller). Alternatively, the system may be "self-configuring" in that the processor 22 may query (i.e., "ping") for the existence of controllers coupled to the network $24_1$, and assign addresses to controllers once their existence is verified. In these embodiments, a variety of addressing schemes and data protocols may be employed, including conventional Internet addressing schemes and data protocols. The foregoing concepts also may be applied to the embodiment of a networked lighting system shown in FIG. 21, discussed in greater detail below.

According to one embodiment of the invention, differently colored LEDs may be combined along with one or more conventional non-LED light sources, such as one or more fluorescent light sources, in a computer-controllable lighting fixture (e.g., a microprocessor-based lighting fixture). In one aspect of this embodiment, the different types of light sources in such a fixture may be controlled independently, either in response to some input stimulus or as a result of particularly programmed instructions, to provide a variety of enhanced lighting effects for various applications. The use of differently colored LEDs (e.g., red, green, and blue) in microprocessor-controlled LED-based light sources is discussed, for example, in U.S. Pat. No. 6,016,038, hereby incorporated herein by reference. In these LED-based light sources, generally an intensity of each LED color is independently controlled by programmable instructions so as to provide a variety of colored lighting effects. According to one embodiment of the present invention, these concepts are further extended to implement microprocessor-based control of a lighting fixture including both conventional non-LED light sources and novel LED-based light sources.

For example, as shown in FIG. 19, according to one embodiment of the invention, the controller 26C is coupled to a first group $40C_1$ of red LEDs, a second group $40C_2$ of green LEDs, and a third group $40C_3$ of blue LEDs. Each of the first, second, and third groups of LEDs is coupled to a respective independently controllable output port 30 of the controller 26C, and accordingly may be independently controlled. Although three LEDs connected in series are shown in each illustrated group of LEDs in FIG. 19, it should be appreciated that the invention is not limited in this respect; namely, any number of light sources or LEDs may be coupled together in a series or parallel configuration and controlled by a given output port 30 of a controller, according to various embodiments.

While embodiments herein may indicate the controller 26 is directly controlling the output of an illumination source or other device, it should be understood that the controller may be controlling other components to indirectly control the illumination source or other device. For example, the controller 26 may control a string of LEDs. The controller 26C shown in FIG. 19 also is coupled to a fluorescent light source 36C via another independently controllable output port 30. According to one embodiment, data received and selectively routed by the controller 26C to its respective output ports includes control information corresponding to desired parameters (e.g., intensity) for each of the red LEDs $40C_1$, the green LEDs $40C_2$, the blue LEDs $40C_3$, and the fluorescent light source 36C. In this manner, the intensity of the fluorescent light source 36C may be independently controlled by particular control information (e.g., microprocessor-based instructions), and the relative intensities of the red, green, and blue LEDs also may be independently controlled by respective particular control information (e.g., microprocessor-based instructions), to realize a variety of color enhancement effects for the fluorescent light source 36C.

Figure 20:
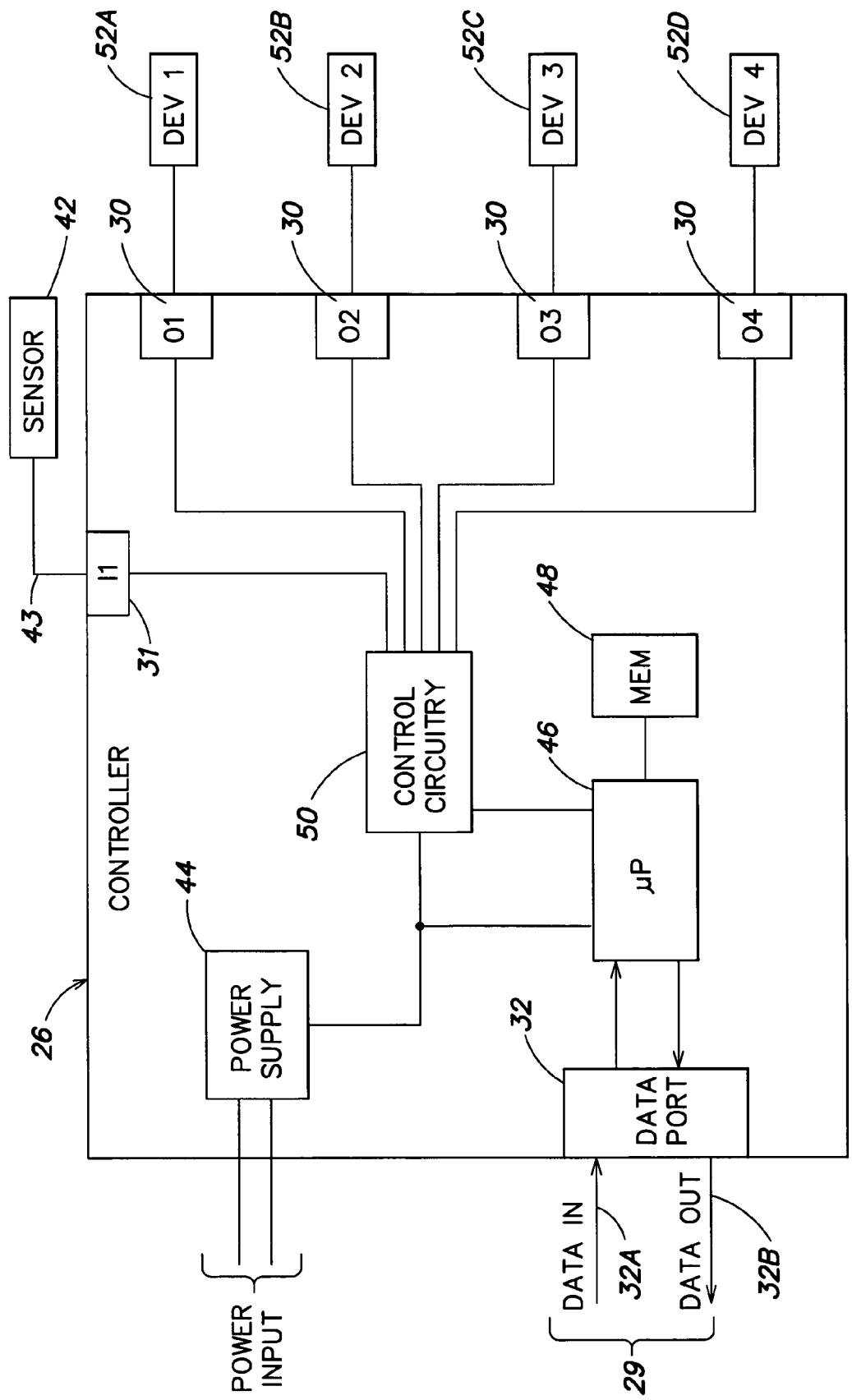
FIG. 20 is a diagram showing an example of a controller in the lighting sytem of FIG. 19, according to one embodiment of the invention.

FIG. 20 is a diagram illustrating an example of a controller 26, according to one embodiment of the invention, that may be employed as any one of the controllers 26A, 26B, and 26C in the networked lighting of FIG. 19. As shown in FIG. 20, the controller 26 includes a data port 32 having an input terminal 32A and an output terminal 32B, through which data 29 is transported to and from the controller 26. The controller 26 of FIG. 20 also includes a microprocessor 46 (μP) to process the data 29, and may also include a memory 48 (e.g., volatile and/or non-volatile memory).

The controller 26 of FIG. 20 also includes control circuitry 50, coupled to a power supply 44 and the microprocessor 46. The control circuitry 50 and the microprocessor 46 operate so as to appropriately transmit various control signals from one or more independently controllable output ports 30 (indicated as O1, O2, O3, and O4 in FIG. 20), based on data received by the microprocessor 46. While FIG. 20 illustrates four output ports 30, it should be appreciated that the invention is not limited in this respect, as the controller 26 may be designed to have any number of output ports. The power supply 44 provides power to the microprocessor 46 and the control circuitry 50, and ultimately may be employed to drive the control signals output by the output ports, as discussed further below.

According to one embodiment of the invention, the microprocessor 46 shown in FIG. 20 is programmed to decode or extract particular portions of the data it receives via the data port 32 that correspond to desired parameters for one or more devices 52A–52D (indicated as DEV1, DEV2, DEV3, and DEV4 in FIG. 20) coupled to one or more output ports 30 of the controller 26. As discussed above in connection with FIG. 19, the devices 52A–52D may be individual light sources, groups of lights sources, or one or more other controllable devices (e.g., various actuators). In one aspect of this embodiment, once the microprocessor 46 decodes or extracts particular portions of the received data intended for one or more output ports of the controller 26, the decoded or extracted data portions are transmitted to the control circuitry 50, which converts the data portions to control signals output by the one or more output ports.

In one embodiment, the control circuitry 50 of the controller 26 shown in FIG. 20 may include one or more digital-to-analog converters (not shown in the figure) to convert data portions received from the microprocessor 46 to analog voltage or current output signals provided by the output ports. In one aspect of this embodiment, each output port may be associated with a respective digital-to-analog converter of the control circuitry, and the control circuitry 50 may route respective data portions received from the microprocessor 46 to the appropriate digital-to-analog converters. As discussed above, the power supply 44 may provide power to the digital-to-analog converters so as to drive the analog output signals. In one aspect of this embodiment, each output port 30 may be controlled to provide a variable analog voltage control signal in a range of from 0 to 10 Volts DC. It should be appreciated, however, that the invention is not limited in this respect; namely, other types of control signals may be provided by one or more output ports of a controller, or different output ports of a controller may be configured to provide different types of control signals, according to other embodiments.

For example, according to one embodiment, the control circuitry 50 of the controller 26 shown in FIG. 20 may provide pulse width modulated signals as control signals at one or more of the output ports 30. In this embodiment, it should be appreciated that, according to various possible implementations, digital-to-analog converters as discussed above may not necessarily be employed in the control circuitry 50. The use of pulse width modulated signals to drive respective groups of differently colored LEDs in LED-based light sources is discussed for example, in U.S. Pat. No. 6,016,038, referenced above. According to one embodiment of the present invention, this concept may be extended to control other types of light sources and/or other controllable devices of a networked lighting system.

As shown in FIG. 20, the controller 26 also may include one or more independently identifiable input ports 31 coupled to the control circuitry 50 to receive a signal 43 provided by one or more sensors 42. Although the controller 26 shown in FIG. 20 includes one input port 31, it should be appreciated that the invention is not limited in this respect, as controllers according to other embodiments of the invention may be designed to have any number of individually identifiable input ports. Additionally, it should be appreciated that the signal 43 may be digital or analog in nature, as the invention is not limited in this respect. In one embodiment, the control circuitry 50 may include one or more analog-to-digital converters (not shown) to convert an analog signal received at one or more input ports 31 to a corresponding digital signal. One or more such digital signals subsequently may be processed by the microprocessor 46 and encoded as data (according to any of a variety of protocols) that may be transmitted throughout the network, wherein the encoded data is identifiable as corresponding to input signals received at one or more particular input ports 31 of the controller 26.

While the controller 26 shown in FIG. 20 includes a two-way data port 32 (i.e., having an input terminal 32A to receive data and an output terminal 32B to transmit data), as well as output ports 30 and an input port 31, it should be appreciated that the invention is not limited to the particular implementation of a controller shown in FIG. 20. For example, according to other embodiments, a controller may include a one-way data port (i.e., having only one of the input terminal 32A and the output terminal 32B and capable of either receiving or transmitting data, respectively), and/or may include only one or more output ports or only one or more input ports.

Figure 21:
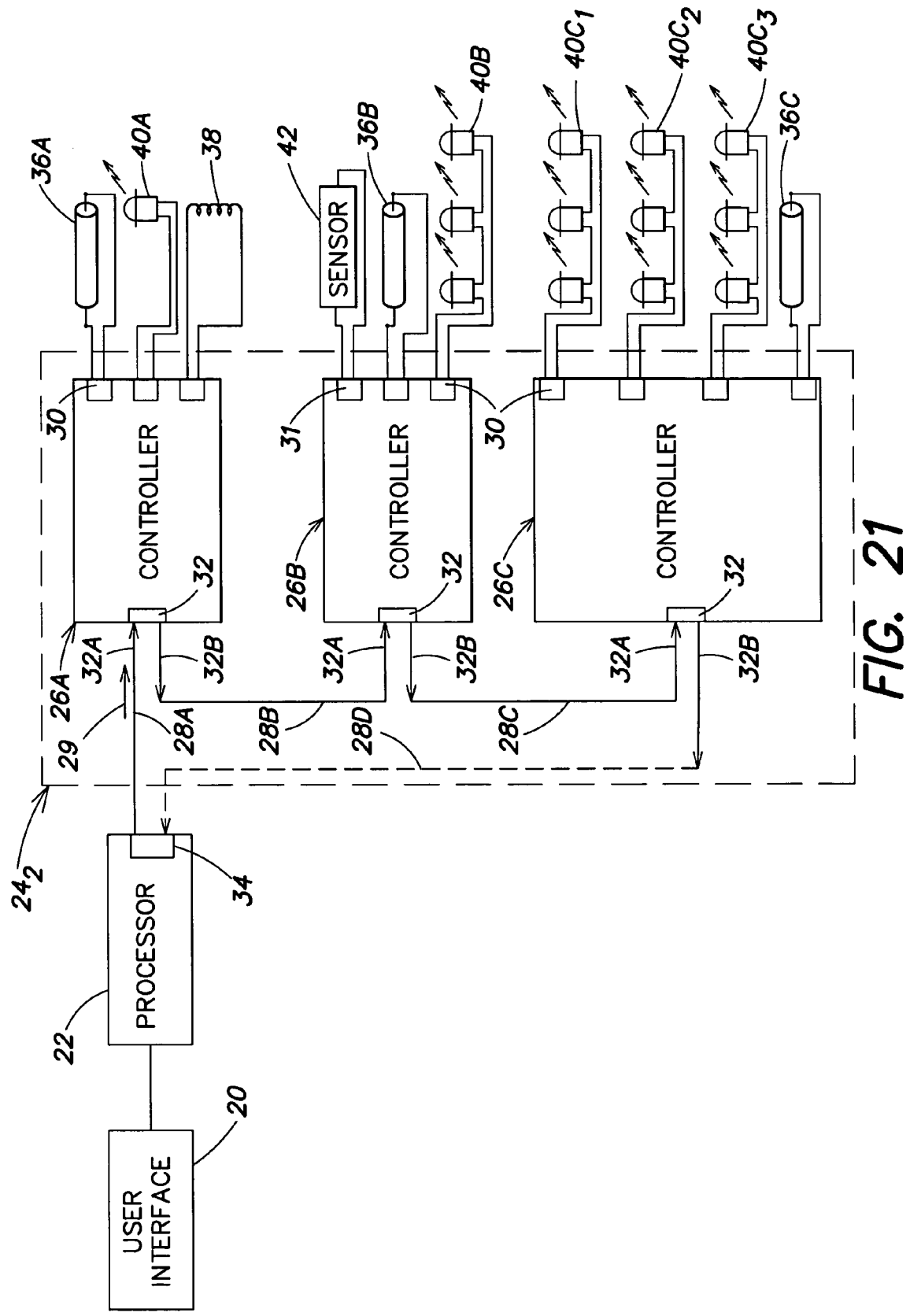
FIG. 21 is a diagram showing a networked lighting system according to another embodiment of the invention.

FIG. 21 is a diagram showing a networked lighting system according to another embodiment of the invention. In the lighting system of FIG. 21, the controllers 26A, 26B, and 26C are series-connected to form a network $24_2$ having a daisy-chain or ring topology. Although three controllers are illustrated in FIG. 21, it should be appreciated that the invention according to this embodiment is not limited in this respect, as any number of controllers may be series-connected to form the network $24_2$. Additionally, as discussed above in connection with FIG. 19, networked lighting systems according to various embodiments of the invention may employ any of a number of different addressing schemes and data protocols to transport data. With respect to the networked lighting system shown in FIG. 21, in one aspect, the topology of the network $24_2$ particularly lends itself to data transport techniques based on token ring protocols. However, it should be appreciated that the lighting system of FIG. 21 is not limited in this respect, as other data transport protocols may be employed in this embodiment, as discussed further below.

In the lighting system of FIG. 21, data is transported through the network $24_2$ via a number of data links, indicated as 28A, 28B, 28C, and 28D. For example, according to one embodiment, the controller 26A receives data from the processor 22 on the link 28A and subsequently transmits data to the controller 26B on the link 28B. In turn, the controller 26B transmits data to the controller 26C on the link 28C. As shown in FIG. 21, the controller 26C may in turn optionally transmit data to the processor 22 on the link 28D, thereby forming a ring topology for the network $24_2$. However, according to another embodiment, the network topology of the system shown in FIG. 21 need not form a closed ring (as indicated by the dashed line for the data link 28D), but instead may form an open daisy-chain. For example, in an alternate embodiment based on FIG. 21, data may be transmitted to the network 24$_2$ from the processor 22 (e.g., via the data link 28A), but the processor 22 need not necessarily receive any data from the network 24$_2$ (e.g., there need not be any physical connection to support the data link 28D).

According to various embodiments based on the system shown in FIG. 21, the data transported on each of the data links 28A–28D may or may not be identical; i.e., stated differently, according to various embodiments, the controllers 26A, 26B, and 26C may or may not receive the same data. Additionally, as discussed above in connection with the system illustrated in FIG. 19, it should be appreciated generally that the particular types and configuration of various devices coupled to the controllers 26A, 26B, and 26C shown in FIG. 21 is for purposes of illustration only. For example, according to other embodiments, a given controller may be associated with only one device, another controller may be associated with only output devices (e.g., one or more light sources or actuators), another controller may be associated with only input devices (e.g., one or more sensors), and another controller may be associated with any number of either input or output devices, or combinations of input and output devices. Additionally, different implementations of a networked lighting system based on the topology shown in FIG. 21 may include only light sources, light sources and other output devices, light sources and sensors, or any combination of light sources, other output devices, and sensors.

Figure 22:
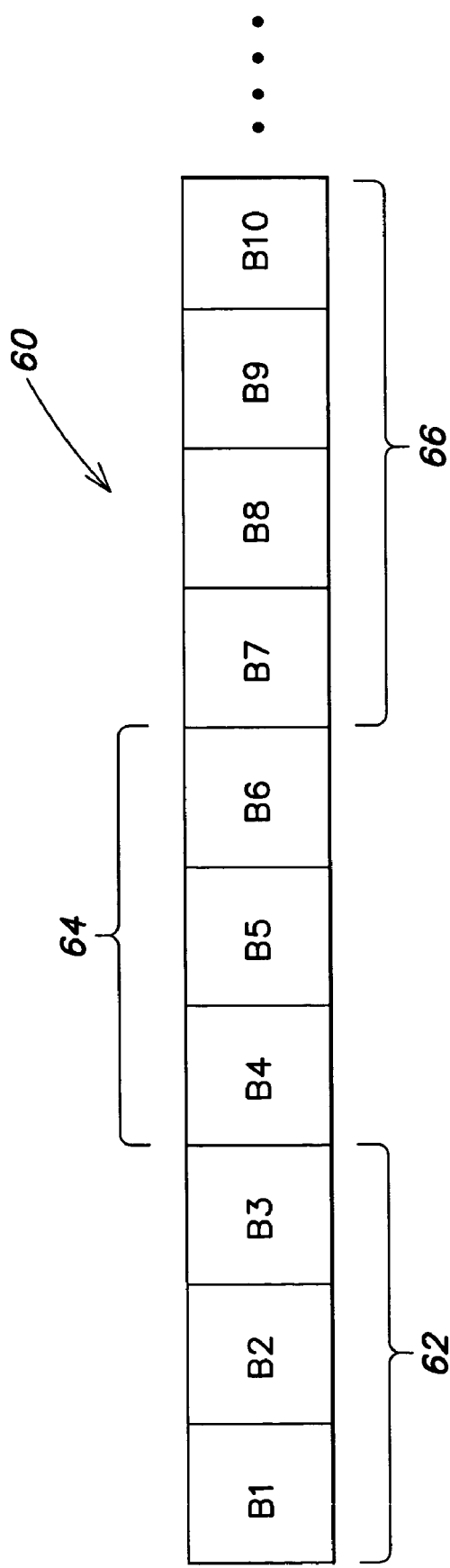
FIG. 22 is a diagram illustrating one example of a data protocol that may be used in the networked lighting system of FIG. 21, according to one embodiment of the invention.

According to one embodiment of the invention based on the network topology illustrated in FIG. 21, data transmitted from the processor 22 to the network 24$_2$ (and optionally received by the processor from the network) may be particularly arranged based on the relative position of the controllers in the series connection forming the network 24$_2$. For example, FIG. 22 is a diagram illustrating a data protocol based on a particular arrangement of data that may be used in the networked lighting system of FIG. 21, according to one embodiment of the invention. In FIG. 22, a sequence 60 of data bytes B1–B10 is illustrated, wherein the bytes B1–B3 constitute a first portion 62 of the sequence 60, the bytes B4–B6 constitute a second portion 64 of the sequence 60, and the bytes B7–B10 constitute a third portion 66 of the sequence 60. While FIG. 22 shows a sequence of ten data bytes arranged in three portions, it should be appreciated that the invention is not limited in this respect, and that the particular arrangement and number of data bytes shown in FIG. 22 is for purposes of illustration only.

According to one embodiment, the exemplary protocol shown in FIG. 22 may be used in the network lighting system of FIG. 21 to control various output devices (e.g., a number of light sources and/or actuators) coupled to one or more of the controllers 26A, 26B, 26C. For purposes of explaining this embodiment, the sensor 42 coupled to an input port 31 of the controller 26B shown in FIG. 21 is replaced by a light source coupled to an output port 30; namely, the controller 26B is deemed to have three independently controllable output ports 30 respectively coupled to three light sources, rather than two output ports 30 and one input port 31. In this embodiment, each of the data bytes B1–B10 shown in FIG. 22 corresponds to a digital value representing a corresponding desired parameter for a control signal provided by a particular output port of one of the controllers 26A, 26B, and 26C.

In particular, according to one embodiment of the invention employing the network topology of FIG. 21 and the data protocol shown in FIG. 22, the data sequence 60 initially is transmitted from the processor 22 to the controller 26A via the data link 28A, and the data bytes B1–B10 are particularly arranged in the sequence based on the relative position of the controllers in the series connection forming the network 24$_2$. For example, the data bytes B1–B3 of the first portion 62 of the data sequence 60 respectively correspond to data intended for the three output ports 30 of the controller 26A. Similarly, the data bytes B4–B6 of the second portion 64 of the sequence respectively correspond to data intended for the three output ports 30 of the controller 26B. Likewise, the data bytes B7–B10 of the third portion 66 of the sequence respectively correspond to data intended for the four output ports 30 of the controller 26C.

In this embodiment, each controller 26A, 26B, and 26C is programmed to receive data via the input terminal 32A of the data port 32, "strip off" an initial portion of the received data based on the number of output ports supported by the controller, and then transmit the remainder of the received data, if any, via the output terminal 32B of the data port 32. Accordingly, in this embodiment, the controller 26A receives the data sequence 60 from the processor 22 via the data link 28A, strips off the first portion 62 of the three bytes B1–B3 from the sequence 60, and uses this portion of the data to control its three output ports. The controller 26A then transmits the remainder of the data sequence, including the second and third portions 64 and 66, respectively, to the controller 26B via the data link 28B. Subsequently, the controller 26B strips off the second portion 62 of the three bytes B4–B6 from the sequence (because these now constitute the initial portion of the data sequence received by the controller 26B), and uses this portion of the data to control its three output ports. The controller 26B then transmits the remainder of the data sequence (now including only the third portion 66) to the controller 26C via the data link 28C. Finally, the controller 26C strips off the third portion 66 (because this portion now constitutes the initial and only portion of the data sequence received by the controller 26C), and uses this portion of the data to control its four output ports.

While the particular configuration of the networked lighting system illustrated in FIG. 21 includes a total of ten output ports (three output ports for each of the controllers 26A and 26B, and four output ports for the controller 26C), and the data sequence 60 shown in FIG. 22 includes at least ten corresponding data bytes B1–B10, it should be appreciated that the invention is not limited in this respect; namely, as discussed above in connection with FIG. 20, a given controller may be designed to support any number of output ports. Accordingly, in one aspect of this embodiment, it should be appreciated that the number of output ports supported by each controller and the total number of controllers coupled to form the network 24$_2$ dictates the sequential arrangement, grouping, and total number of data bytes of the data sequence 60 shown in FIG. 22

For example, in one embodiment, each controller is designed identically to support four output ports; accordingly, in this embodiment, a data sequence similar to that shown in FIG. 22 is partitioned into respective portions of at least four bytes each, wherein consecutive four byte portions of the data sequence are designated for consecutive controllers in the series connection. In one aspect of this embodiment, the network may be considered "self-configuring" in that it does not require the specific assignment of addresses to controllers, as the position of controllers relative to one another in the series connection dictates the data each controller responds to from the network. As a result, each controller may be configured similarly (e.g., programmed to strip off an initial four byte portion of a received data sequence), and controllers may be flexibly interchanged on the network or added to the network without requiring a system operator or network administrator to reassign addresses. In particular, a system operator or programmer need only know the relative position of a given controller in the series connection to provide appropriate data to the controller.

While embodiments herein discuss the data stream 60, of FIG. 22, as containing data segments B1, B2, etc. wherein each data segment is transmitted to an illumination system to control a particular output of a controller 26, it should be understood that the individual data segments may be read by a controller 26 and may be used to control more than one output. For example, the controller 26 may be associated with memory wherein control data is stored. Upon receipt of a data segment B1, for example, the controller may look-up and use control data from its memory that corresponds with the data segment B1 to control one or more outputs (e.g. illumination sources). For example, when a controller 26 controls two or more different colored LEDs, a received data packet B1 may be used to set the relative intensities of the different colors.

According to another embodiment of the invention based on the network topology illustrated in FIG. 21 and the data protocol shown in FIG. 22, one or more of the data bytes of the sequence 60 may correspond to digital values representing corresponding input signals received at particular input ports of one or more controllers. In one aspect of this embodiment, the data sequence 60 may be arranged to include at least one byte for each input port and output port of the controllers coupled together to form the network 24₂, wherein a particular position of one or more bytes in the sequence 60 corresponds to a particular input or output port. For example, according to one embodiment of the invention in which the sensor 42 is coupled to an input port 31 of the controller 26B as shown in FIG. 21, the byte B4 of the data sequence 60 may correspond to a digital value representing an input signal received at the input port 31 of the controller 26B.

In one aspect of this embodiment, rather than stripping off initial portions of received data as described above in the foregoing embodiment, each controller instead may be programmed to receive and transmit the entire data sequence 60. Upon receiving the entire data sequence 60, each controller also may be programmed to appropriately index into the sequence to extract the data intended for its output ports, or place data into the sequence from its input ports. In this embodiment, so as to transmit data corresponding to one or more input ports to the processor 22 for subsequent processing, the data link 28D is employed to form a closed ring topology for the network 24₂.

In one aspect of this embodiment employing a closed ring topology, the processor 22 may be programmed to initially transmit a data sequence 60 to the controller 26A having "blank" bytes (e.g., null data) in positions corresponding to one or more input ports of one or more controllers of the network 24₂. As the data sequence 60 travels through the network, each controller may place data corresponding to its input ports, if any, appropriately in the sequence. Upon receiving the data sequence via the data link 28D, the processor 22 may be programmed to extract any data corresponding to input ports by similarly indexing appropriately into the sequence.

According to one embodiment of the invention, the data protocol shown in FIG. 22 may be based at least in part on the DMX data protocol. The DMX data protocol is discussed, for example, in U.S. Pat. No. 6,016,038, referenced above. Essentially, in the DMX protocol, each byte B1–B10 of the data sequence 60 shown in FIG. 22 corresponds to a digital value in a range of 0–255. As discussed above, this digital value may represent a desired output value for a control signal provided by a particular output port of a controller; for example, the digital value may represent an analog voltage level provided by an output port, or a pulse-width of a pulse width modulated signal provided by an output port. Similarly, this digital value may represent some parameter (e.g., a voltage or current value, or a pulse-width) of a signal received at a particular input port of a controller.

According to yet another embodiment of the invention based on the network topology illustrated in FIG. 21 and the data protocol shown in FIG. 22, one or more of the data bytes of the sequence 60 may correspond to an assigned address (or group of addresses) for one or more of the controllers 26A, 26B, and 26C. For example, the byte B1 may correspond to an address (or starting address of a range of addresses) for the controller 26A, the byte B2 may correspond to an address (or starting address of a range of addresses) for the controller 26B, and the byte B3 may correspond to an address (or starting address of a range of addresses) for the controller 26C. The other bytes of the data sequence 60 shown in FIG. 22 respectively may correspond to addresses for other controllers, or may be unused bytes.

In one aspect of this embodiment, the processor 22 transmits at least the bytes B1–B3 to the controller 26A. The controller 26A stores the first byte B1 (e.g., in its memory 48, as shown in FIG. 20) as an address, removes B1 from the data sequence, and transmits the remaining bytes to the controller 26B. In a similar manner, the controller 26B receives the remaining bytes B2 and B3, stores the first received byte (i.e., B2) as an address, and transmits the remaining byte B3 to the controller 26C, which in turn stores the byte B3 (the first received byte) as an address. Hence, in this embodiment, the relative position of each controller in the series connection forming the network 24₂ dictates the address (or starting address of a range of addresses) assigned to the controller initially by the processor, rather than the data itself to be processed by the controller. In this embodiment, as in one aspect of the system of FIG. 19 discussed above, once each controller is assigned a particular address or range of addresses, each controller may be programmed to receive and re-transmit all of the data initially transmitted by the processor 22 on the data link 28A; stated differently, in one aspect of this embodiment, once each controller is assigned an address, the sequence of data transmitted by the processor 22 is not constrained by the particular topology (i.e., position in the series connection) of the controllers that form the network 24₂. Additionally, each controller does not need to be programmed to appropriately index into a data sequence to extract data from, or place data into, the sequence. Rather, data corresponding to particular input and output ports of one or more controllers may be formatted with an "address header" that specifies a particular controller, and a particular input or output port of the controller.

According to another aspect of this embodiment, during the assignment of addresses to controllers, the processor 22 may transmit a data sequence having an arbitrary predetermined number of data bytes corresponding to controller addresses to be assigned. As discussed above, each controller in the series connection in turn extracts an address from the sequence and passes on the remainder of the sequence. Once the last controller in the series connection extracts an address, any remaining addresses in the sequence may be returned to the processor 22 via the data link 28D. In this manner, based on the number of bytes in the sequence originally transmitted by the processor 22 and the number of bytes in the sequence ultimately received back by the processor, the processor may determine the number of controllers that are physically coupled together to form the network 24₂.

According to yet another aspect of this embodiment, during the assignment of addresses to controllers, the processor 22 shown in FIG. 21 may transmit an initial controller address to the controller 26A, using one or more bytes of the data sequence 60 shown in FIG. 22. Upon receiving this initial controller address, the controller 26A may store this address (e.g., in nonvolatile memory), increment the address, and transmit the incremented address to the controller 26B. The controller 26B in turn repeats this procedure; namely, storing the received address, incrementing the received address, and transmitting the incremented address to the next controller in the series connection (i.e., the controller 26C). According to one embodiment, the last controller in the series connection (e.g., the controller 26C in the example shown in FIG. 21) transmits either the address it stored or an address that is incremented from the one it stored to the processor 22 (e.g., via the data link 28D in FIG. 21). In this manner, the processor 22 need only transmit to the network an initial controller address, and based on the address it receives back from the network, the processor may determine the number of controllers that are physically coupled together to form the network 24₂.

In the various embodiments of the invention discussed above, the processor 22 and the controllers (e.g., 26, 26A, 26B, etc.) can be implemented in numerous ways, such as with dedicated hardware, or using one or more microprocessors that are programmed using software (e.g., microcode) to perform the various functions discussed above. In this respect, it should be appreciated that one implementation of the present invention comprises one or more computer readable media (e.g., volatile and non-volatile computer memory such as PROMs, EPROMs, and EEPROMs, floppy disks, compact disks, optical disks, magnetic tape, etc.) encoded with one or more computer programs that, when executed on one or more processors and/or controllers, perform at least some of the above-discussed functions of the present invention. The one or more computer readable media may be fixed within a processor or controller or may be transportable, such that the one or more programs stored thereon can be loaded into a processor or controller so as to implement various aspects of the present invention discussed above. The term "computer program" is used herein in a generic sense to refer to any type of computer code (e.g., software or microcode) that can be employed to program one or more microprocessors so as to implement the above-discussed aspects of the present invention.

An embodiment of the present invention may be a lighting network wherein the lighting network includes a plurality of lighting fixtures. The lighting fixtures may be associated with a processor and the processor may communicate a lighting control data stream to the plurality of lighting systems wherein the lighting systems are arranged in a serial fashion. Each of the plurality of lighting systems may in turn strip, or otherwise modify, the control data stream for its use and then communicate the remainder of the data stream to the remaining lighting systems in the serial connection. In an embodiment, the stripping or modification occurs when a lighting fixture receives a control data stream. In an embodiment, the lighting fixture may strip off, or modify, the first section of the control data stream such that the lighting fixture can change the lighting conditions to correspond to the data. The lighting fixture may then take the remaining data stream and communicate it to the next lighting fixture in the serial line. In turn, this next lighting system completes similar stripping/modification, executing and re-transmitting. In an embodiment, the processor may receive higher level lighting commands and the processor may generate and communicate lighting control signals based on the higher level commands. A system according to the present invention may comprise many lighting systems wherein coordinated lighting effects are generated such as, on a Ferris Wheel, amusement park ride, boardwalk, building, corridor, or any other area where many lighting fixtures are desired.

In some cases one or more processors, lighting units, or other components in a series may fail. Methods and system provided herein also include providing a self-healing lighting system, which may include providing a plurality of lighting units in a system, each having a plurality of light sources; providing at least one processor associated with at least some of the lighting units for controlling the lighting units; providing a network facility for addressing data to each of the lighting units; providing a diagnostic facility for identifying a problem with a lighting unit; and providing a healing facility for modifying the actions of at least one processor to automatically correct the problem identified by the diagnostic facility.

Figure 22A:
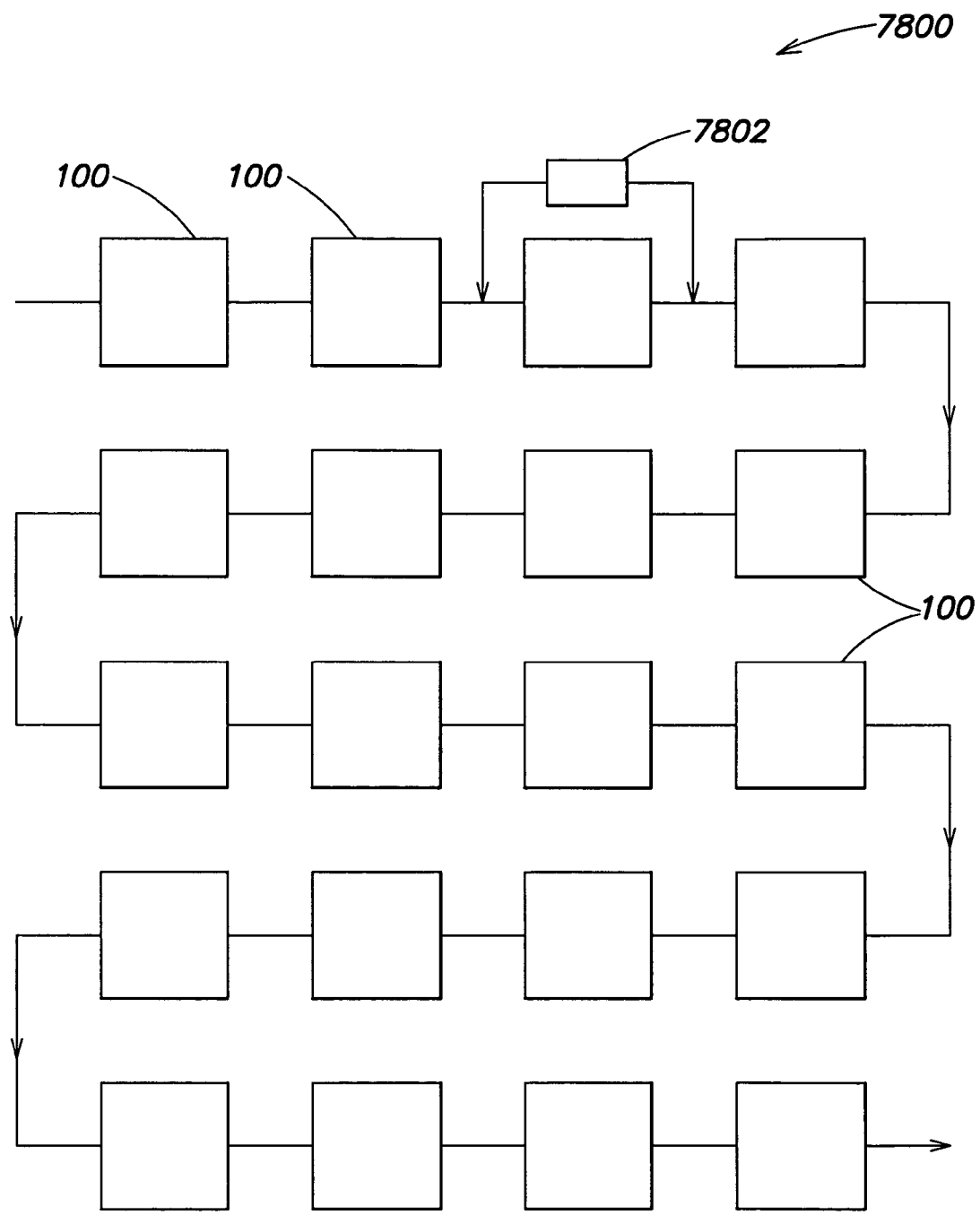
FIG. 22A is a diagram illustrating a one-dimensional array of lighting units to demonstrate a "self-healing" concept.
Figure 22B:
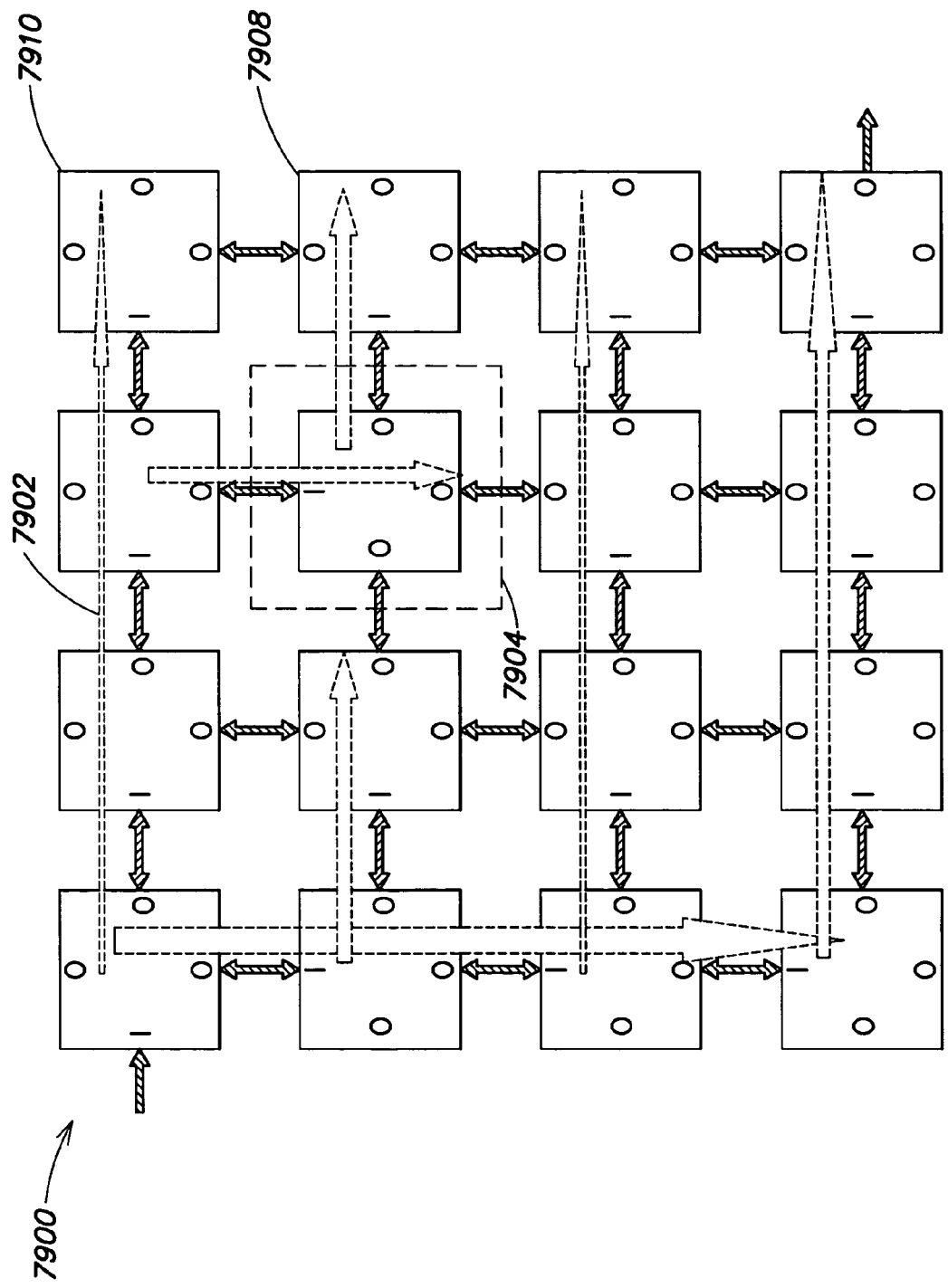
FIG. 22B is a diagram illustrating a two-dimensional array of lighting units to demonstrate a "self-healing" concept.

FIGS. 22A and 22B demonstrate the "self-healing" concept according to one embodiment of the invention. Referring to FIG. 22A, a plurality of lighting units 100 are disposed in an array 7800. The array of FIG. 22A is a one-dimensional array; that is, the lighting units 100 are strung serially along a single path of wiring. This configuration can be referred to as a "string light" configuration. In such a configuration, it is possible to address data so the processor 102 of the first lighting unit 100 reads an incoming data stream, takes the first byte of data from the data stream, either modifies (such as by placing a "1" in the first bit of the first byte) or strips off the first byte altogether, and passes the data stream on to the next lighting unit 100. A subsequent lighting unit 100 then reads the modified data stream from the first light and, depending on whether the first light modifies the first byte or strips off the first byte, either reads the first byte (previously the second byte) or reads the first unmodified byte (e.g., the first byte that does not have a "1" in the first location). The subsequent lighting unit 100 then passes on the modified data stream, and so on throughout the line of lighting units 100. The lighting units 100 can thus be positioned in an array 7800, with the wiring and data delivered in a substantially one-dimensional, or linear arrangement.

One challenge with a serial configuration such as that of FIG. 22A is that if a given lighting unit 100 fails, then all subsequent units can be affected. For example, if a show is authored geometrically as described above, but a lighting unit 100 fails to strip off data, then the entire array may be improperly scripted, because the authored effects are shifted within the array 7800. Thus, a need exists for ways to heal the lighting network when it fails. One technique for healing a lighting network of lighting units 100 is to provide a diagnostic processor 7802. The diagnostic processor 7802 can measure the input and output to a particular lighting unit 100 (such as a linear lighting unit, a tile, or the like). If the output does not change despite changes to the input, the diagnostic processor 7802 can recognize a failure in the lighting unit 100. By analyzing the input and output streams (such as measuring power or current changes in the manner described in connection with FIGS. 13 and 14 above) a processor 7802 can determine not only failure, but the number of light sources 104A–104D located in the lighting unit 100, so that the processor 7802 knows how many bytes of data the failed lighting unit 100 should have taken. The processor 7802 can then modify the output data stream to correct for the defect, such as by setting the first bit of an appropriate number of bytes that would have been used by the failed lighting unit 100 to "1" or by stripping off that number of bytes from the data stream, depending on which technique is used for modifying the data stream between lighting units 100 in the string.

A diagnostic processor 7802 can measure inputs and outputs from each of the lighting units 100 in the array 7800, so that all of the string is monitored. In embodiments the diagnostic processor(s) 7802 can be in communication with a control processor 102, so that the input data stream is modified to account for the failure of a lighting unit 100. For example, an authored show could be altered to maintain geometric mapping, without requiring the diagnostic processor 7802 to alter the data stream coming out of a failed lighting unit 100.

Referring to FIG. 22B, an array 7900 includes a plurality of lighting units 100, each of which is equipped with input and output ports. For example, a given unit could have one input port and three output ports. By contrast to the one-dimensional array 7800 of FIG. 22A, the array 7900 is a two-dimensional array 7900. In embodiments, a given lighting unit 100 may be adapted to allow it to change the function of its ports. For example, which port is the input port and which are the output ports can be varied by a processor 102 of the lighting unit 100. In a properly functioning system, data enters the input port of one lighting unit 100, exits the output port, and feeds the input port of one or more neighboring lighting units 100. The dotted arrows 7902 show a path of data through the two-dimensional mesh of the array 7900. This is one path of many available paths. However, it can be appreciated that if a lighting unit 100 fails, then other lighting units 100 whose input ports are configured to receive data from that lighting unit 100 will not receive the data that is intended for them. In that case it is desirable to re-route data so that it reaches the units that are "downstream" from the failed lighting unit 100. For example, if the unit 7904 fails, then in the routing shown in FIG. 22B the unit 7908 would also fail, because its input port is directed to the output of the unit 7904. However, switching the input port of the unit 7908 to the position proximal to the unit 7910 would allow the unit 7908 to receive data from that unit instead, keeping the scope of the failure to a single unit, rather than having it propagate to other unit. In embodiments, such a mesh or array 7900 could be "self-healing," in that it could include a master routing table and a diagnostic processor, so that if the diagnostic processor (similar to that described in connection with FIG. 22A) finds a failure of a particular lighting unit 100, then it can notify a control system to use a master routing table to reroute the data through the mesh, such as by changing the location of input ports of units 100 that were dependent on the incoming data. The mesh 7900 may be able to heal itself without a master routing unit; that is, units 100 can be configured to monitor whether or not they are receiving data (such as whenever they are powered on). If a unit 100 is not receiving data, then it can shift its input port to a different port of the lighting unit 100 and check again to determine whether it is receiving data. For example, the unit 7908 would "heal" a failure of the unit 7904 by changing its input port to the position facing the unit 7910, without the need for a master routing table. In other cases, if the array 7900 is unable to "heal" by just having individual lighting units 100 shift to new input ports when not receiving data, it may be necessary for lighting units 100 to signal their status to neighboring units, which would shift their own input ports until a viable routing is established throughout the array 7900. Once a routing is determined, it may be desirable to monitor the routing, such as with a diagnostic processor, to allow for any changes that may be needed in the incoming data stream to account, for example, for geometric effects that change with different routing of the data.

Other embodiments of self-healing networks are known, such as self-healing information networks, and the principles of those networks may be applied to lighting devices in lighting networks in accordance with the principles of this invention.

Figure 23:
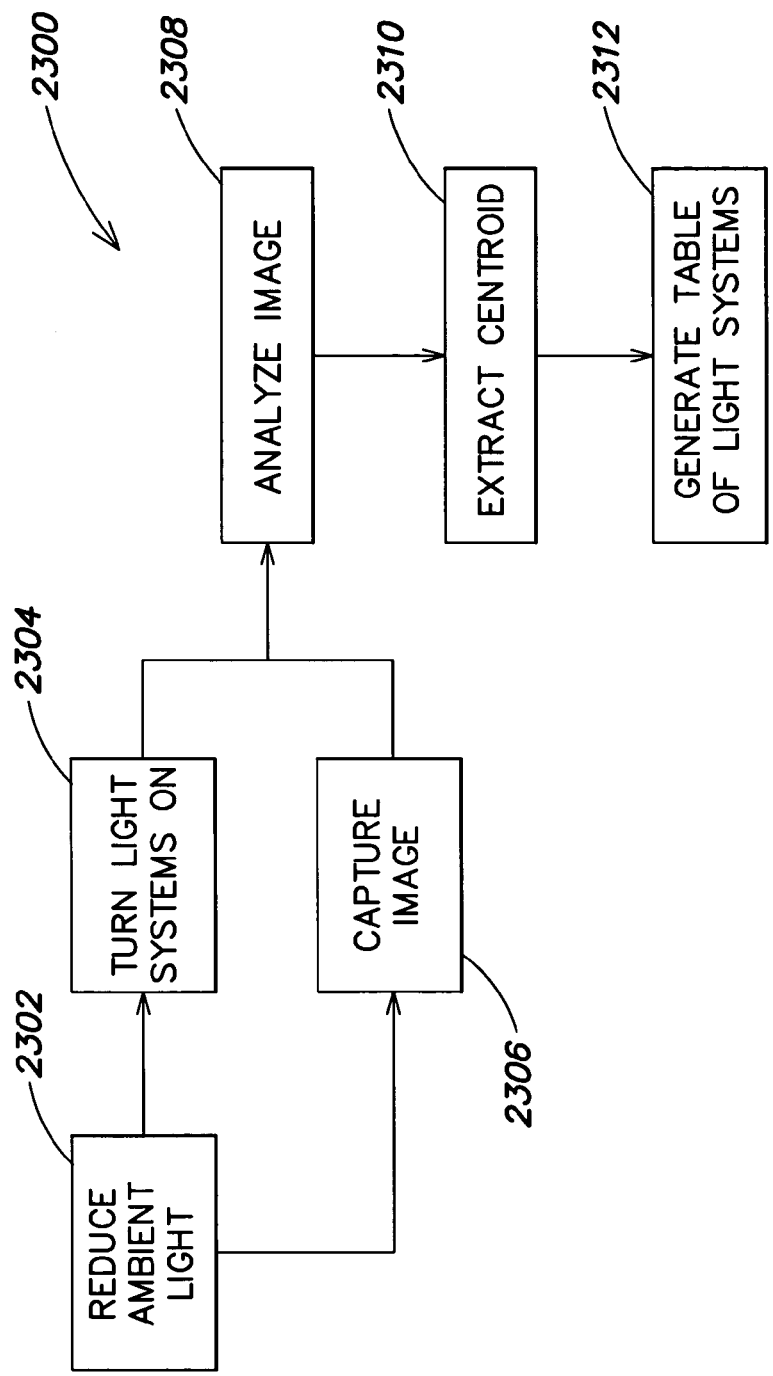
FIG. 23 is a flow diagram that depicts a series of steps that can be used to locate positions of lights using a video camera.

Another issue in large configurations of lighting units 100 is capturing the addresses of the lighting units 100. An embodiment of the present invention is a method of automatically capturing the position of the lighting units 100 within an environment. An imaging device may be used as a means of capturing the position of the light. A camera, connected to a computing device, can capture the image for analysis can calculation of the position of the light. FIG. 23 depicts a flow diagram 2300 that depicts a series of steps that may be used to accomplish this method. First, at a step 2302, the environment to be mapped may be darkened by reducing ambient light. Next, at a step 2304, control signals can be sent to each lighting unit 100, commanding the lighting unit 100 to turn on and off in turn. Simultaneously, the camera can capture an image during each "on" time at a step 2306. Next, at a step 2308, the image is analyzed to locate the position of the "on" lighting unit 100. At a step 2310 a centroid can be extracted. Because no other light is present when the particular lighting unit 100 is on, there is little issue with other artifacts to filter and remove from the image. Next, at a step 2312, the centroid position of the lighting unit 100 is stored and the system generates a table of lighting units 100 and centroid positions. This data can be used to populate a configuration file, such as that depicted in connection with FIG. 26 below. In sum, each lighting unit 100, in turn, is activated, and the centroid measurement determined. This is done for all of the lighting units 100. An image thus gives a position of the light system in a plane, such as with (x,y) coordinates.

Where a 3D position is desired a second image may be captured to triangulate the position of the light in another coordinate dimension. This is the stereo problem. In the same way human eyes determine depth through the correspondence and disparity between the images provided by each eye, a second set of images may be taken to provide the correspondence. The camera is either duplicated at a known position relative to the first camera or the first camera is moved a fixed distance and direction. This movement or difference in position establishes the baseline for the two images and allows derivation of a third coordinate (e.g., (x,y,z)) for the lighting unit 100.

Having developed a variety of embodiments for relating a lighting unit 100 that has a physical location to an address for the lighting unit 100, whether it be a network address, a unique identifier, or a position within a series or string of lighting unit 100 that pass control signals along to each other, it is further desirable to have facilities for authoring control signals for the lighting units. An example of such an authoring system is a software-based authoring system, such as COLORPLAY™ offered by Color Kinetics Incorporated of Boston, Mass.

An embodiment of this invention relates to systems and methods for generating control signals. While the control signals are disclosed herein in connection with authoring lighting shows and displays for lighting unit 100 in various configurations, it should be understood that the control signals may be used to control any system that is capable of responding to a control signal, whether it be a lighting system, lighting network, light, LED, LED lighting system, audio system, surround sound system, fog machine, rain machine, electromechanical system or other systems. Lighting systems like those described in U.S. Pat. Nos. 6,016,038, 6,150,774, and 6,166,496 illustrate some different types of lighting systems where control signals may be used.

In certain computer applications, there is typically a display screen (which could be a personal computer screen, television screen, laptop screen, handheld, gameboy screen, computer monitor, flat screen display, LCD display, PDA screen, or other display) that represents a virtual environment of some type. There is also typically a user in a real world environment that surrounds the display screen. The present invention relates, among other things, to using a computer application in a virtual environment to generate control signals for systems, such as lighting systems, that are located in real world environments, such as lighting unit 100 positioned in various configurations described above, including linear configurations, arrays, curvilinear configurations, 3D configurations, and other configurations.

Figure 24:
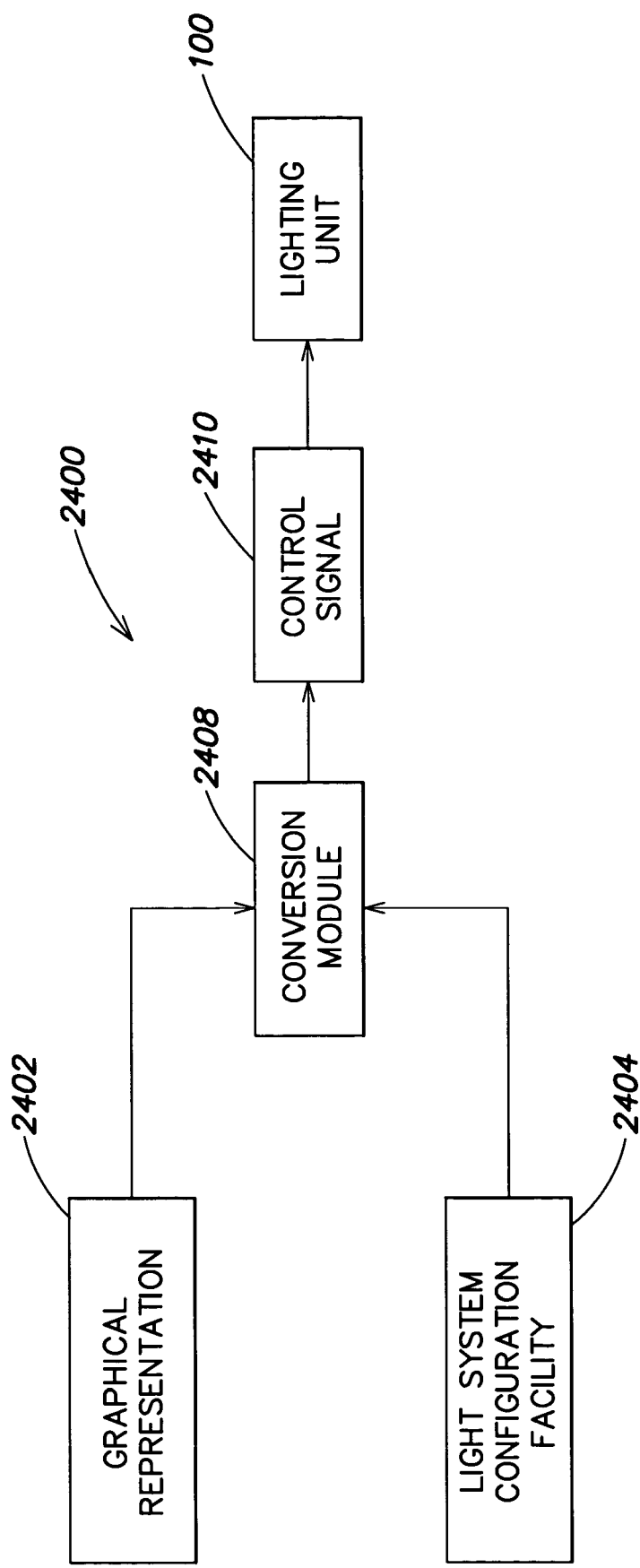
FIG. 24 is a schematic diagram showing elements for generating a lighting control signal using a configuration facility and a graphical representation facility.

An embodiment of the present invention describes a method 2400 for generating control signals as illustrated in the block diagram in FIG. 24. The method may involve providing or generating an image or representation of an image, i.e., a graphical representation 2402. The graphical representation may be a static image such as a drawing, photograph, generated image, or image that is or appears to be static. The static image may include images displayed on a computer screen or other screen even though the image is continually being refreshed on the screen. The static image may also be a hard copy of an image.

Providing a graphical representation 2402 may also involve generating an image or representation of an image. For example, a processor may be used to execute software to generate the graphical representation 2402. Again, the image that is generated may be or appear to be static or the image may be dynamic. An example of software used to generate a dynamic image is Flash 5 computer software offered by Macromedia, Incorporated. Flash 5 is a widely used computer program to generate graphics, images and animations. Other useful products used to generate images include, for example, Adobe Illustrator, Adobe Photoshop, and Adobe LiveMotion. There are many other programs that can be used to generate both static and dynamic images. For example, Microsoft Corporation makes a computer program Paint. This software is used to generate images on a screen in a bit map format. Other software programs may be used to generate images in bitmaps, vector coordinates, or other techniques. There are also many programs that render graphics in three dimensions or more. Direct X libraries, from Microsoft Corporation, for example generate images in three-dimensional space. The output of any of the foregoing software programs or similar programs can serve as the graphical representation 2402.

In embodiments the graphical representation 2402 may be generated using software executed on a processor, but the graphical representation 2402 may never be displayed on a screen. In an embodiment, an algorithm may generate an image or representation thereof, such as an explosion in a room for example. The explosion function may generate an image and this image may be used to generate control signals as described herein with or without actually displaying the image on a screen. The image may be displayed through a lighting network for example without ever being displayed on a screen.

In an embodiment, generating or representing an image may be accomplished through a program that is executed on a processor. In an embodiment, the purpose of generating the image or representation of the image may be to provide information defined in a space. For example, the generation of an image may define how a lighting effect travels through a room. The lighting effect may represent an explosion, for example. The representation may initiate bright white light in the corner of a room and the light may travel away from this corner of the room at a velocity (with speed and direction) and the color of the light may change as the propagation of the effect continues. In an embodiment, an image generator may generate a function or algorithm. The function or algorithm may represent an event such as an explosion, lighting strike, headlights, train passing through a room, bullet shot through a room, light moving through a room, sunrise across a room, or other event. The function or algorithm may represent an image such as lights swirling in a room, balls of light bouncing in a room, sounds bouncing in a room, or other images. The function or algorithm may also represent randomly generated effects or other effects.

Referring again to FIG. 24, a light system configuration facility 2404 may accomplish further steps for the methods and systems described herein. The light system configuration facility may generate a system configuration file, configuration data or other configuration information for a lighting system, such as the one depicted in connection with FIG. 1.

The light system configuration facility can represent or correlate a system, such as a lighting unit 100, sound system or other system as described herein with a position or positions in an environment. For example, an LED lighting unit 100 may be correlated with a position within a room. In an embodiment, the location of a lighted surface may also be determined for inclusion into the configuration file. The position of the lighted surface may also be associated with a lighting unit. In embodiments, the lighted surface 107 (e.g., as discussed further below in connection with FIG. 27) may be the desired parameter while the lighting unit 100 that generates the light to illuminate the surface is also important. Lighting control signals may be communicated to a lighting unit 100 when a surface is scheduled to be lit by the lighting unit 100. For example, control signals may be communicated to a lighting system when a generated image calls for a particular section of a room to change in hue, saturation or brightness. In this situation, the control signals may be used to control the lighting system such that the lighted surface 107 is illuminated at the proper time. The lighted surface 107 may be located on a wall but the lighting unit 100 designed to project light onto the surface 107 may be located on the ceiling. The configuration information could be arranged to initiate the lighting unit 100 to activate or change when the surface 107 is to be lit.

Referring still to FIG. 24, the graphical representation 2402 and the configuration information from the light system configuration facility 2404 can be delivered to a conversion module 2408, which associates position information from the configuration facility with information from the graphical representation and converts the information into a control signal, such as a control signal for a lighting unit 100. Then the conversion module can communicate the control signal 2410, such as to the lighting unit 100. In embodiments the conversion module maps positions in the graphical representation to positions of lighting units 100 in the environment, as stored in a configuration file for the environment (as described below). The mapping might be a one-to-one mapping of pixels or groups of pixels in the graphical representation to lighting units 100 or groups of lighting units 100 in the environment 100. It could be a mapping of pixels in the graphical representation to surfaces 107, polygons, or objects in the environment that are lit by lighting units 100. A mapping relation could also map vector coordinate information, a wave function, or an algorithm to positions of lighting units 100. Many different mapping relations can be envisioned and are encompassed herein.

Figure 25:
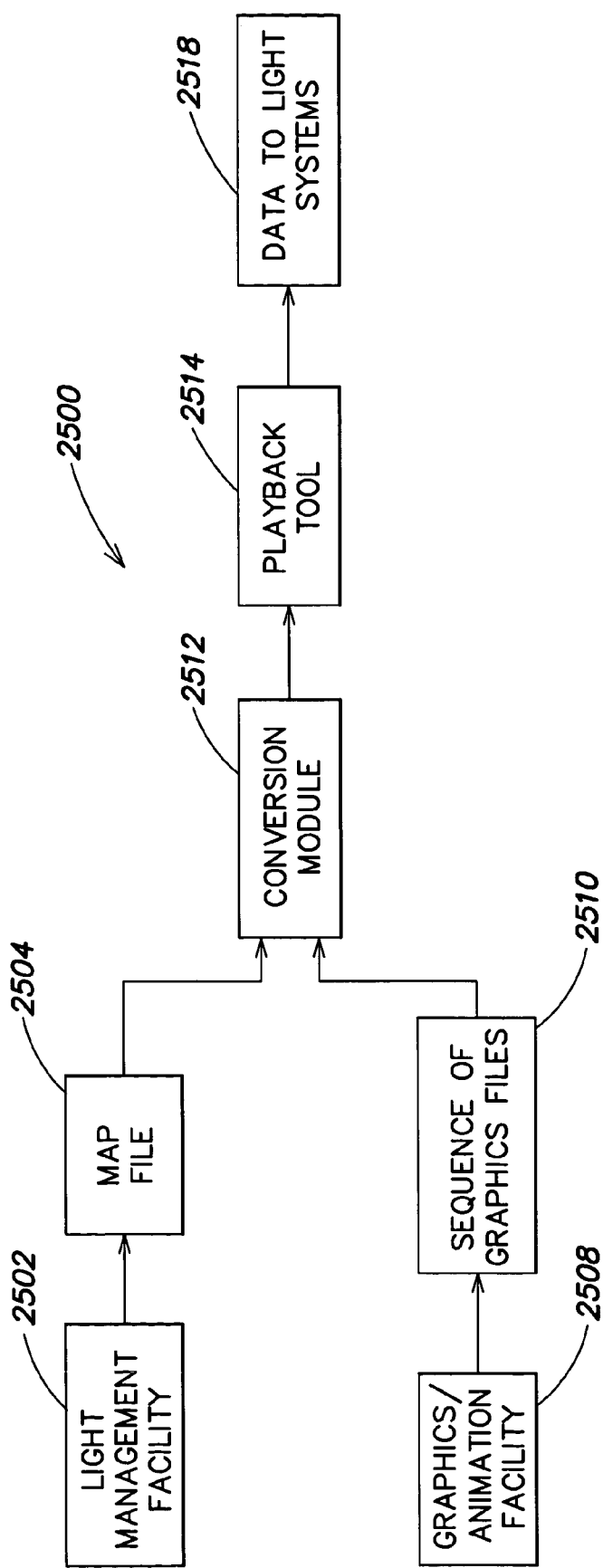
FIG. 25 is a schematic diagram showing elements for generating a lighting control signal from an animation facility and light management facility.

Referring to FIG. 25, another embodiment of a block diagram for a method 2500 and system for generating a control signal is depicted. A light management facility 2502 is used to generate a map file 2504 that maps lighting units 100 to positions in an environment, to surfaces that are lit by the light systems, and the like. An animation facility 2508 generates a sequence of graphics files 2510 for an animation effect. A conversion module 2512 relates the information in the map file 2504 for the lighting units 100 to the graphical information in the graphics files. For example, color information in the graphics file may be used to convert to a color control signal for a lighting unit 100 to generate a similar color. Pixel information for the graphics file may be converted to address information for lighting units 100, which will correspond to the pixels in question. In embodiments, the conversion module 2512 includes a lookup table for converting particular graphics file information into particular lighting control signals, based on the content of a configuration file for the lighting system and conversion algorithms appropriate for the animation facility in question. The converted information can be sent to a playback tool 2514, which may in turn play the animation and deliver control signals 2518 to lighting units 100 in an environment.

Referring to FIG. 26, an embodiment of a configuration file 2600 is depicted, showing certain elements of configuration information that can be stored for a lighting unit 100 or other system. Thus, the configuration file 2600 can store an identifier 2602 for each lighting unit 100, as well as the position 2608 of that light system in a desired coordinate or mapping-system for the environment (which may be (x,y,z) coordinates, polar coordinates, (x,y) coordinates, or the like). The position 2608 and other information may be time-dependent, so the configuration file 2600 can include an element of time 2604. The configuration file 2600 can also store information about the position 2610 that is lit by the lighting unit 100. That information can consist of a set of coordinates, or it may be an identified surface, polygon, object, or other item in the environment. The configuration file 2600 can also store information about the available degrees of freedom for use of the lighting unit 100, such as available colors in a color range 2612, available intensities in an intensity range 2614, or the like. The configuration file 2600 can also include information about other systems in the environment that are controlled by the control systems disclosed herein, information about the characteristics of surfaces 107 in the environment, and the like. Thus, the configuration file 2600 can map a set of lighting units 100 to the conditions that they are capable of generating in an environment.

Figure 27:
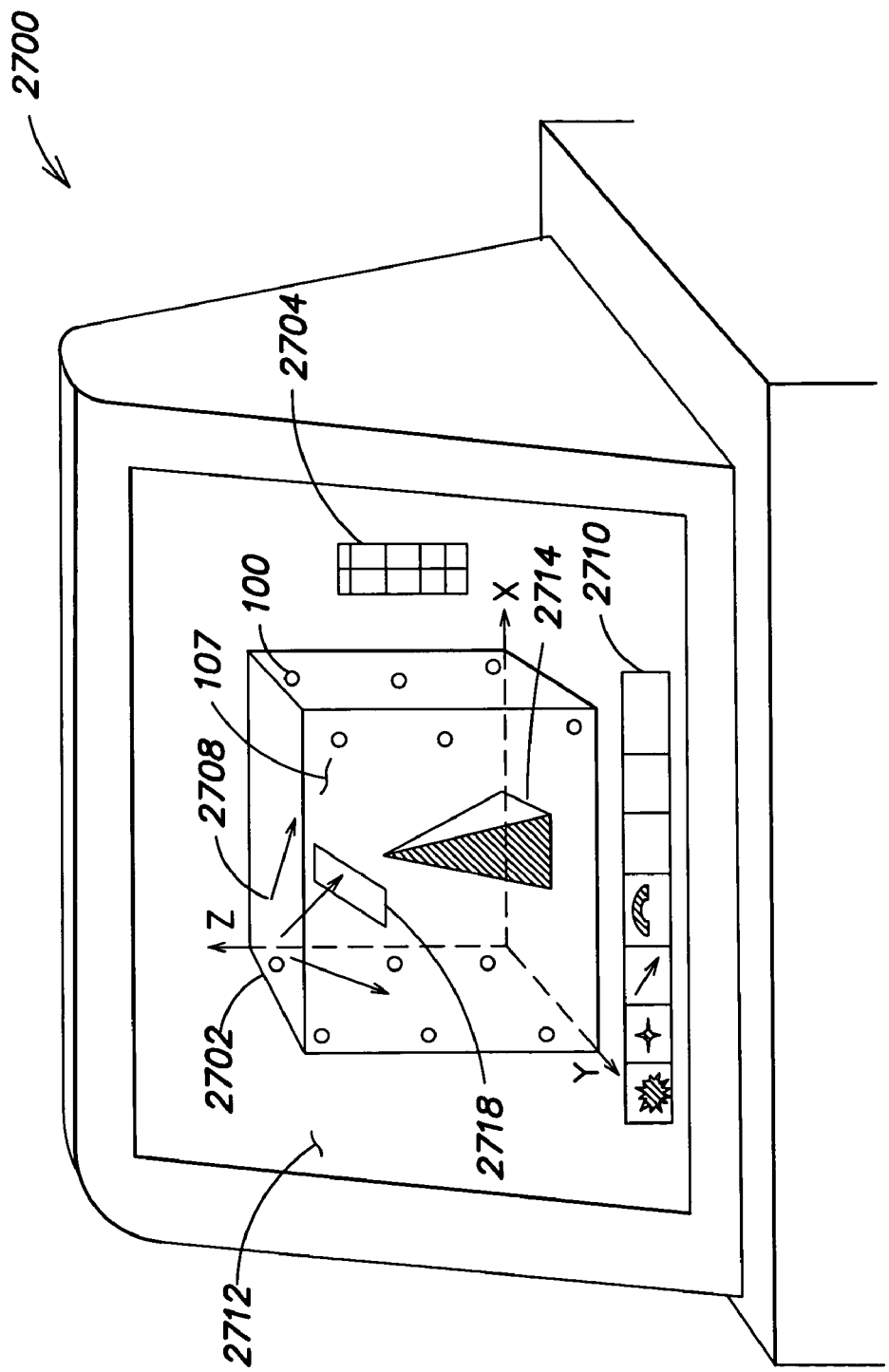
FIG. 27 illustrates a virtual representation of an environment using a computer screen.

In an embodiment, configuration information such as the configuration file 2600 may be generated using a program executed on a processor. Referring to FIG. 27, the program may run on a computer 2700 with a graphical user interface 2712 where a representation 2702 of an environment can be displayed, showing lighting units 100, lit surfaces 107 or other elements in a graphical format. The interface may include a representation 2702 of a room for example. Representations of lights, lighted surfaces or other systems may then be presented in the interface 2712 and locations can be assigned to the system. In an embodiment, position coordinates or a position map may represent a system, such as a light system. A position map may also be generated for the representation of a lighted surface for example. FIG. 27 illustrates a room with lighting units 100. In other embodiments, the lighting units 100 could be positioned on the exterior of a building, in windows of a building, or the like.

The representation 2702 can also be used to simplify generation of effects. For example, a set of stored effects can be represented by icons 2710 on the screen 2712. An explosion icon can be selected with a cursor or mouse, which may prompt the user to click on a starting and ending point for the explosion in the coordinate system. By locating a vector in the representation, the user can cause an explosion to be initiated in the upper corner of the room 2702 and a wave of light and or sound may propagate through the environment. With all of the lighting units 100 in predetermined positions, as identified in the configuration file 2600, the representation of the explosion can be played in the room by the light system and or another system such as a sound system.

In use, a control system such as used herein can be used to provide information to a user or programmer from the lighting units 100 in response to or in coordination with the information being provided to the user of the computer 2700. One example of how this can be provided is in conjunction with the user generating a computer animation on the computer 2700. The lighting unit 100 may be used to create one or more light effects in response to displays 2712 on the computer 2700. The lighting effects, or illumination effects, can produce a vast variety of effects including color-changing effects; stroboscopic effects; flashing effects; coordinated lighting effects; lighting effects coordinated with other media such as video or audio; color wash where the color changes in hue, saturation or intensity over a period of time; creating an ambient color; color fading; effects that simulate movement such as a color chasing rainbow, a flare streaking across a room, a sun rising, a plume from an explosion, other moving effects; and many other effects. The effects that can be generated are nearly limitless. Light and color continually surround the user, and controlling or changing the illumination or color in a space can change emotions, create atmosphere, provide enhancement of a material or object, or create other pleasing and or useful effects. The user of the computer 2700 can observe the effects while modifying them on the display 2712, thus enabling a feedback loop that allows the user to conveniently modify effects.

Figure 28:
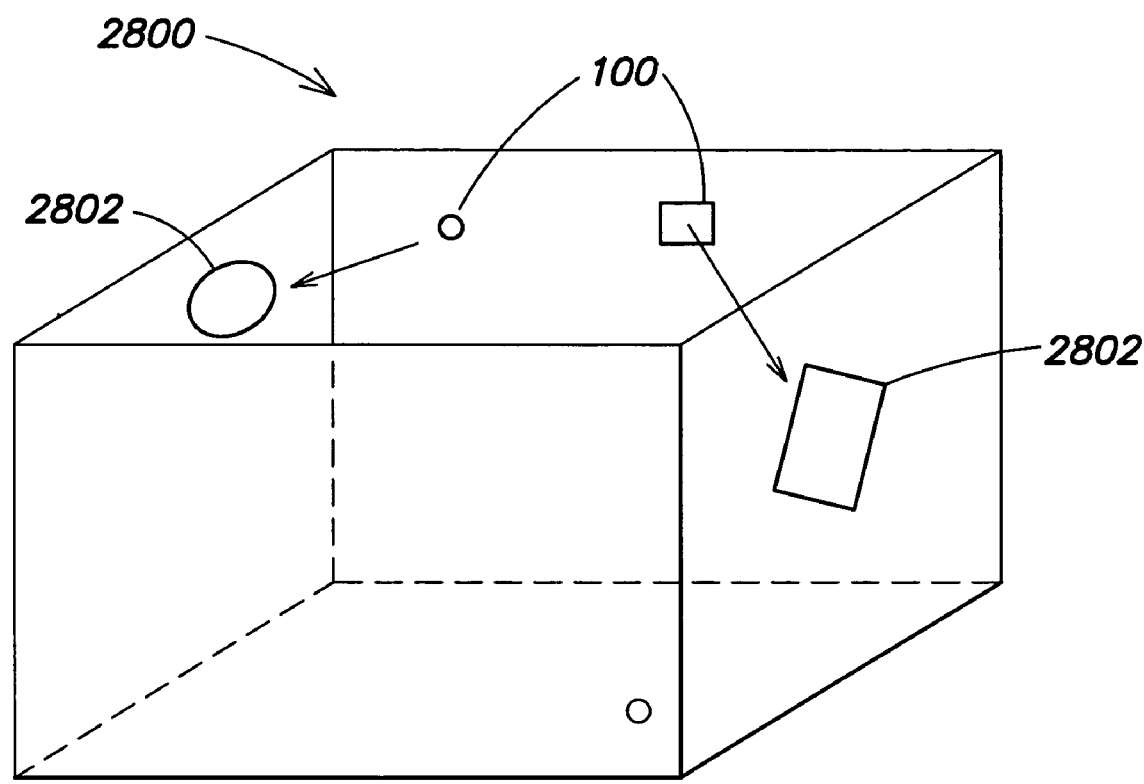
FIG. 28 is a representation of an environment with light systems that project light onto portions of the environment.

FIG. 28 illustrates how the light from a given lighting unit 100 may be displayed on a surface. A lighting unit 100, sound system, or other system may project onto a surface. In the case of a lighting unit 100, this may be an area 2802 that is illuminated by the lighting unit 100. The lighting unit 100, or other system, may also move, so the area 2802 may move as well. In the case of a sound system, this may be the area where the user desires the sound to emanate from.

In an embodiment, the information generated to form the image or representation may be communicated to a lighting unit 100 or plurality of lighting units 100. The information may be sent to lighting systems as generated in a configuration file. For example, the image may represent an explosion that begins in the upper right hand corner of a room and the explosion may propagate through the room. As the image propagates through its calculated space, control signals can be communicated to lighting systems in the corresponding space. The communication signal may cause the lighting system to generate light of a given hue, saturation and intensity when the image is passing through the lighted space the lighting systems projects onto. An embodiment of the invention projects the image through a lighting system. The image may also be projected through a computer screen or other screen or projection device. In an embodiment, a screen may be used to visualize the image prior or during the playback of the image on a lighting system. In an embodiment, sound or other effects may be correlated with the lighting effects. For example, the peak intensity of a light wave propagating through a space may be just ahead of a sound wave. As a result, the light wave may pass through a room followed by a sound wave. The light wave may be played back on a lighting system and the sound wave may be played back on a sound system. This coordination can create effects that appear to be passing through a room or they can create various other effects.

Referring to FIG. 27, an effect can propagate through a virtual environment that is represented in 3D on the display screen 2712 of the computer 2700. In embodiments, the effect can be modeled as a vector or plane moving through space over time. Thus, all lighting units 100 that are located on the plane of the effect in the real world environment can be controlled to generate a certain type of illumination when the effect plane propagates through the light system plane. This can be modeled in the virtual environment of the display screen, so that a developer can drag a plane through a series of positions that vary over time. For example, an effect plane 2718 can move with the vector 2708 through the virtual environment. When the effect plan 2718 reaches a polygon 2714, the polygon can be highlighted in a color selected from the color palette 2704. A lighting unit 100 positioned on a real world object that corresponds to the polygon can then illuminate in the same color in the real world environment. Of course, the polygon could be any configuration of light systems on any object, plane, surface, wall, or the like, so the range of 3D effects that can be created is unlimited.

In an embodiment, the image information may be communicated from a central controller. The information may be altered before a lighting system responds to the information. For example, the image information may be directed to a position within a position map. All of the information directed at a position map may be collected prior to sending the information to a lighting system. This may be accomplished every time the image is refreshed or every time this section of the image is refreshed or at other times. In an embodiment, an algorithm may be performed on information that is collected. The algorithm may average the information, calculate and select the maximum information, calculate and select the minimum information, calculate and select the first quartile of the information, calculate and select the third quartile of the information, calculate and select the most used information calculate and select the integral of the information or perform another calculation on the information. This step may be completed to level the effect of the lighting system in response to information received. For example, the information in one refresh cycle may change the information in the map several times and the effect may be viewed best when the projected light takes on one value in a given refresh cycle.

In an embodiment, the information communicated to a lighting system may be altered before a lighting system responds to the information. The information format may change prior to the communication for example. The information may be communicated from a computer through a USB port or other communication port and the format of the information may be changed to a lighting protocol such as DMX when the information is communicated to the lighting system. In an embodiment, the information or control signals may be communicated to a lighting system or other system through a communications port of a computer, portable computer, notebook computer, personal digital assistant or other system. The information or control signals may also be stored in memory, electronic or otherwise, to be retrieved at a later time. Systems such the iPlayer and SmartJack systems manufactured and sold by Color Kinetics Incorporated can be used to communicate and or store lighting control signals.

In an embodiment, several systems may be associated with position maps and the several systems may a share position map or the systems may reside in independent position areas. For example, the position of a lighted surface from a first lighting system may intersect with a lighted surface from a second lighting system. The two systems may still respond to information communicated to the either of the lighting systems. In an embodiment, the interaction of two lighting systems may also be controlled. An algorithm, function or other technique may be used to change the lighting effects of one or more of the lighting systems in a interactive space. For example, if the interactive space is greater than half of the non-interactive space from a lighting system, the lighting system's hue, saturation or brightness may be modified to compensate the interactive area. This may be used to adjust the overall appearance of the interactive area or an adjacent area for example.

Control signals generated using methods and or systems according to the principles of the present invention can be used to produce a vast variety of effects. Imagine a fire or explosion effect that one wishes to have move across a wall or room. It starts at one end of the room as a white flash that quickly moves out followed by a high-brightness yellow wave whose intensity varies as it moves through the room. When generating a control signal according to the principles of the present invention, a lighting designer does not have to be concerned with the lights in the room and the timing and generation of each light system's lighting effects. Rather the designer only needs to be concerned with the relative position or actual position of those lights in the room. The designer can lay out the lighting in a room and then associate the lights in the room with graphical information, such as pixel information, as described above. The designer can program the fire or explosion effect on a computer, using Flash 5 for example, and the information can be communicated to the lighting units 100 in an environment. The position of the lights in the environment may be considered as well as the surfaces 107 or areas 2802 that are going to be lit.

In an embodiment, the lighting effects could also be coupled to sound that will add to and reinforce the lighting effects. An example is a 'red alert' sequence where a 'whoop whoop' siren-like effect is coupled with the entire room pulsing red in concert with the sound. One stimulus reinforces the other. Sounds and movement of an earthquake using low frequency sound and flickering lights is another example of coordinating these effects. Movement of light and sound can be used to indicate direction.

In an embodiment the lights are represented in a two-dimensional or plan view. This allows representation of the lights in a plane where the lights can be associated with various pixels. Standard computer graphics techniques can then be used for effects. Animation tweening and even standard tools may be used to create lighting effects. Macromedia Flash works with relatively low-resolution graphics for creating animations on the web. Flash uses simple vector graphics to easily create animations. The vector representation is efficient for streaming applications such as on the World Wide Web for sending animations over the net. The same technology can be used to create animations that can be used to derive lighting commands by mapping the pixel information or vector information to vectors or pixels that correspond to positions of lighting units 100 within a coordinate system for an environment.

For example, an animation window of a computer 2700 can represent a room or other environment of the lights. Pixels in that window can correspond to lights within the room or a low-resolution averaged image can be created from the higher resolution image. In this way lights in the room can be activated when a corresponding pixel or neighborhood of pixels turn on. Because LED-based lighting technology can create any color on demand using digital control information, see U.S. Pat. Nos. 6,016,038, 6,150,774, and 6,166,496, the lights can faithfully recreate the colors in the original image.

Some examples of effects that could be generated using systems and methods according to the principles of the invention include, but are not limited to, explosions, colors, underwater effects, turbulence, color variation, fire, missiles, chases, rotation of a room, shape motion, Tinkerbell-like shapes, lights moving in a room, and many others. Any of the effects can be specified with parameters, such as frequencies, wavelengths, wave widths, peak-to-peak measurements, velocities, inertia, friction, speed, width, spin, vectors, and the like. Any of these can be coupled with other effects, such as sound.

In computer graphics, anti-aliasing is a technique for removing staircase effects in imagery where edges are drawn and resolution is limited. This effect can be seen on television when a narrow striped pattern is shown. The edges appear to crawl like ants as the lines approach the horizontal. In a similar fashion, the lighting can be controlled in such a way as to provide a smoother transition during effect motion. The effect parameters such as wave width, amplitude, phase or frequency can be modified to provide better effects.

Figure 29:
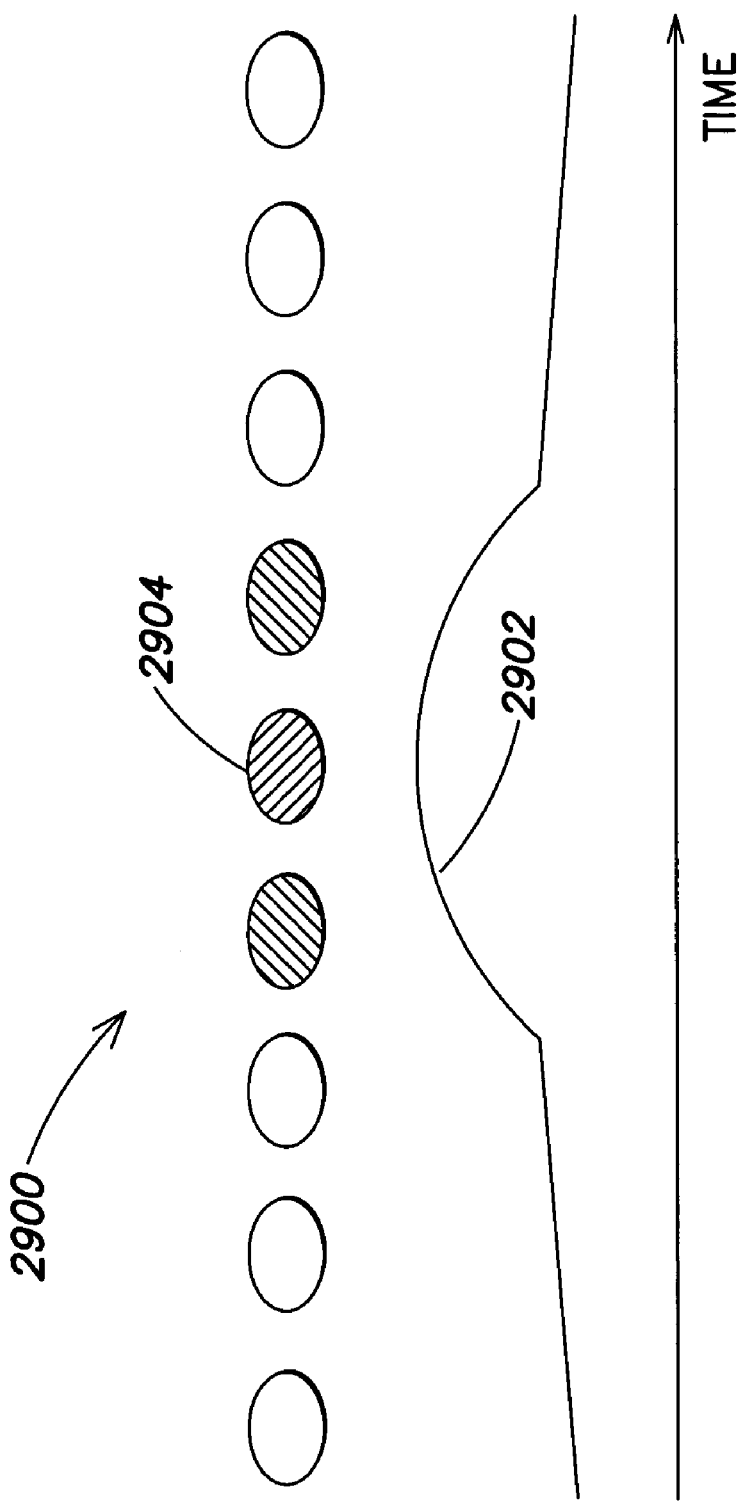
FIG. 29 is a schematic diagram showing the propagation of an effect through a light system.

For example, referring to FIG. 29, a schematic diagram 2900 has circles that represent a single light 2904 over time. For an effect to 'traverse' this light, it might simply have a step function that causes the light to pulse as the wave passes through the light. However, without the notion of width, the effect might be indiscernible. The effect preferably has width. If however, the effect on the light was simply a step function that turned on for a period of time, then might appear to be a harsh transition, which may be desirable in some cases but for effects that move over time (i.e. have some velocity associated with them) then this would not normally be the case.

The wave 2902 shown in FIG. 29 has a shape that corresponds to the change. In essence it is a visual convolution of the wave 2902 as it propagates through a space. So as a wave, such as from an explosion, moves past points in space, those points rise in intensity from zero, and can even have associated changes in hue or saturation, which gives a much more realistic effect of the motion of the effect. At some point, as the number and density of lights increases, the room then becomes an extension of the screen and provides large sparse pixels. Even with a relatively small number of lighting units 100 the effect eventually can serve as a display similar to a large screen display.

Effects can have associated motion and direction, i.e. a velocity. Even other physical parameters can be described to give physical parameters such as friction, inertia, and momentum. Even more than that, the effect can have a specific trajectory. In an embodiment, each light may have a representation that gives attributes of the light. This can take the form of 2D position, for example. A lighting unit 100 can have all various degrees of freedom assigned (e.g., xyz-rpy), or any combination.

The techniques listed here are not limited to lighting. Control signals can be propogated through other devices based on their positions, such as special effects devices such as pyrotechnics, smell-generating devices, fog machines, bubble machines, moving mechanisms, acoustic devices, acoustic effects that move in space, or other systems.

Figure 30:
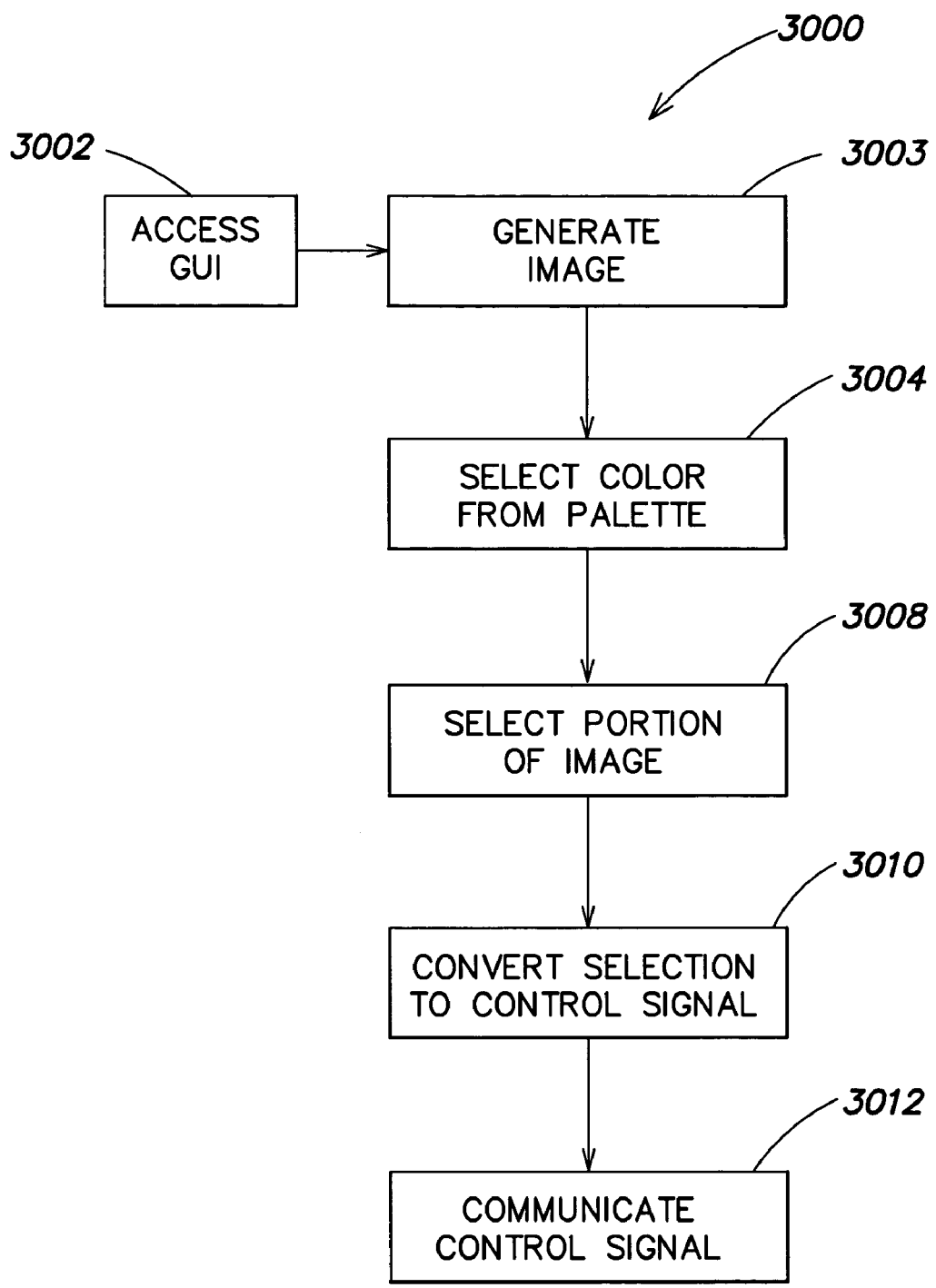
FIG. 30 is a flow diagram showing steps for using an image capture device to determine the positions of a plurality of light systems in an environment.

Another embodiment of the invention is depicted in FIG. 30, which contains a flow diagram 3000 with steps for generating a control signal. First, at a step 3002 a user can access a graphical user interface, such as the display 2712 depicted in FIG. 27. Next, at a step 3003, the user can generate an image on the display, such as using a graphics program or similar facility. The image can be a representation of an environment, such as a room, wall, building, surface, object, or the like, in which lighting units 100 are disposed. It is assumed in connection with FIG. 30 that the configuration of the lighting units 100 in the environment is known and stored, such as in a table or configuration file 2600. Next, at a step 3004, a user can select an effect, such as from a menu of effects. In an embodiment, the effect may be a color selected from a color palette. The color might be a color temperature of white. The effect might be another effect, such as described herein. In an embodiment, generating the image 3003 may be accomplished through a program executed on a processor. The image may then be displayed on a computer screen. Once a color is selected from the palette at the step 3004, a user may select a portion of the image at a step 3008. This may be accomplished by using a cursor on the screen in a graphical user interface where the cursor is positioned over the desired portion of the image and then the portion is selected with a mouse. Following the selection of a portion of the image, the information from that portion can be converted to lighting control signals at a step 3010. This may involve changing the format of the bit stream or converting the information into other information. The information that made the image may be segmented into several colors such as red, green, and blue. The information may also be communicated to a lighting system in, for example, segmented red, green, and blue signals. The signal may also be communicated to the lighting system as a composite signal at a step 3012. This technique can be useful for changing the color of a lighting system. For example, a color palette may be presented in a graphical user interface and the-palette may represent millions of different colors. A user may want to change the lighting in a room or other area to a deep blue. To accomplish her task, the user can select the color from the screen using a mouse and the lighting in the room changes to match the color of the portion of the screen she selected. Generally, the information on a computer screen is presented in small pixels of red, green and blue. LED systems, such as those found in U.S. Pat. Nos. 6,016,038, 6,150,774 and 6,166,496, may include red, green and blue lighting elements as well. The conversion process from the information on the screen to control signals may be a format change such that the lighting system understands the commands. However, in an embodiment, the information or the level of the separate lighting elements may be the same as the information used to generate the pixel information. This provides for an accurate duplication of the pixel information in the lighting system.

Using the techniques described herein, including techniques for determining positions of light systems in environments, techniques for modeling effects in environments (including time- and geometry-based effects), and techniques for mapping light system environments to virtual environments, it is possible to model an unlimited range of effects in an unlimited range of environments. Effects need not be limited to those that can be created on a square or rectangular display. Instead, light systems can be disposed in a wide range of lines, strings, curves, polygons, cones, cylinders, cubes, spheres, hemispheres, non-linear configurations, clouds, and arbitrary shapes and configurations, then modeled in a virtual environment that captures their positions in selected coordinate dimensions. Thus, light systems can be disposed in or on the interior or exterior of any environment, such as a room, building, home, wall, object, product, retail store, vehicle, ship, airplane, pool, spa, hospital, operating room, or other location.

In embodiments, the light system may be associated with code for the computer application, so that the computer application code is modified or created to control the light system. For example, object-oriented programming techniques can be used to attach attributes to objects in the computer code, and the attributes can be used to govern behavior of the light system. Object oriented techniques are known in the field, and can be found in texts such as "Introduction to Object-Oriented Programming" by Timothy Budd, the entire disclosure of which is herein incorporated by reference. It should be understood that other programming techniques may also be used to direct lighting systems to illuminate in coordination with computer applications, object oriented programming being one of a variety of programming techniques that would be understood by one of ordinary skill in the art to facilitate the methods and systems described herein.

In an embodiment, a developer can attach the light system inputs to objects in the computer application. For example, the developer may have an abstraction of a lighting unit 100 that is added to the code construction, or object, of an application object. An object may consist of various attributes, such as position, velocity, color, intensity, or other values. A developer can add light as an instance in the object in the code of a computer application. For example, the object could be vector in an object-oriented computer animation program or solid modeling program, with attributes, such as direction and velocity. A lighting unit 100 can be added as an instance of the object of the computer application, and the light system can have attributes, such as intensity, color, and various effects. Thus, when events occur in the computer application that call on the object of the vector, a thread running through the program can draw code to serve as an input to the processor of the light system. The light can accurately represent geometry, placement, spatial location, represent a value of the attribute or trait, or provide indication of other elements or objects.

Figure 31:
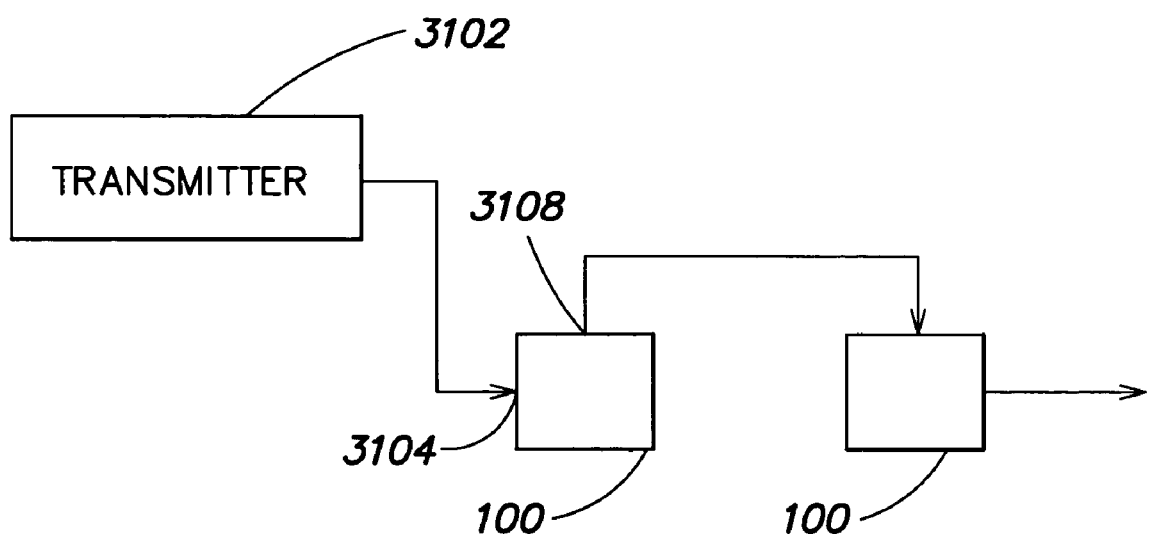
FIG. 31 is a flow diagram showing steps for interacting with a graphical user interface to generate a lighting effect in an environment.

Referring to FIG. 31, in one embodiment of a networked lighting system according to the principles of the invention, a network transmitter 3102 communicates network information to the lighting units 100. In such an embodiment, the lighting units 100 can include an input port 3104 and an export port 3108. The network information may be communicated to the first lighting unit 100 and the first lighting unit 100 may read the information that is addressed to it and pass the remaining portion of the information on to the next lighting unit 100. A person with ordinary skill in the art would appreciate that there are other network topologies that are encompassed by a system according to the principles of the present invention.

Figure 32:
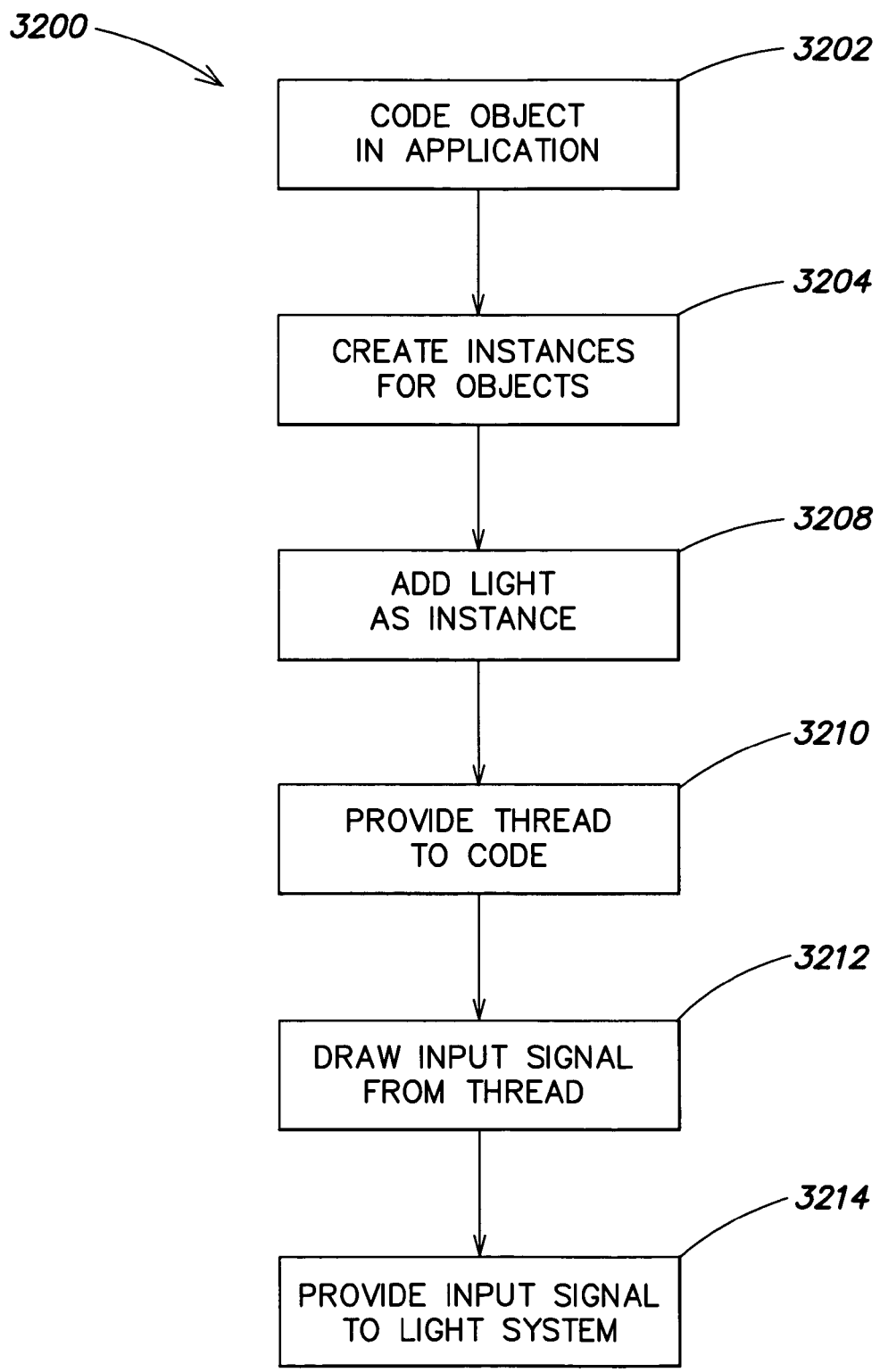
FIG. 32 is a schematic diagram depicting light systems that transmit data that is generated by a network transmitter.

Referring to FIG. 32, a flow chart 3200 provides steps for a method of providing for coordinated illumination. At the step 3202, the programmer codes an object for a computer application, using, for example, object-oriented programming techniques. At a step 3204, the programming creates instances for each of the objects in the application. At a step 3208, the programmer adds light as an instance to one or more objects of the application. At a step 3210, the programmer provides for a thread, running through the application code. At a step 3212, the programmer provides for the thread to draw lighting system input code from the objects that have light as an instance. At a step 3214, the input signal drawn from the thread at the step 3212 is provided to the light system, so that the lighting system responds to code drawn from the computer application.

Using such object-oriented light input to the lighting unit 100 from code for a computer application, various lighting effects can be associated in the real world environment with the virtual world objects of a computer application. For example, in animation of an effect such as explosion of a polygon, a light effect can be attached with the explosion of the polygon, such as sound, flashing, motion, vibration and other temporal effects. Further, the lighting unit 100 could include other effects devices including sound producing devices, motion producing devices, fog machines, rain machines or other devices which could also produce indications related to that object.

Figure 33:
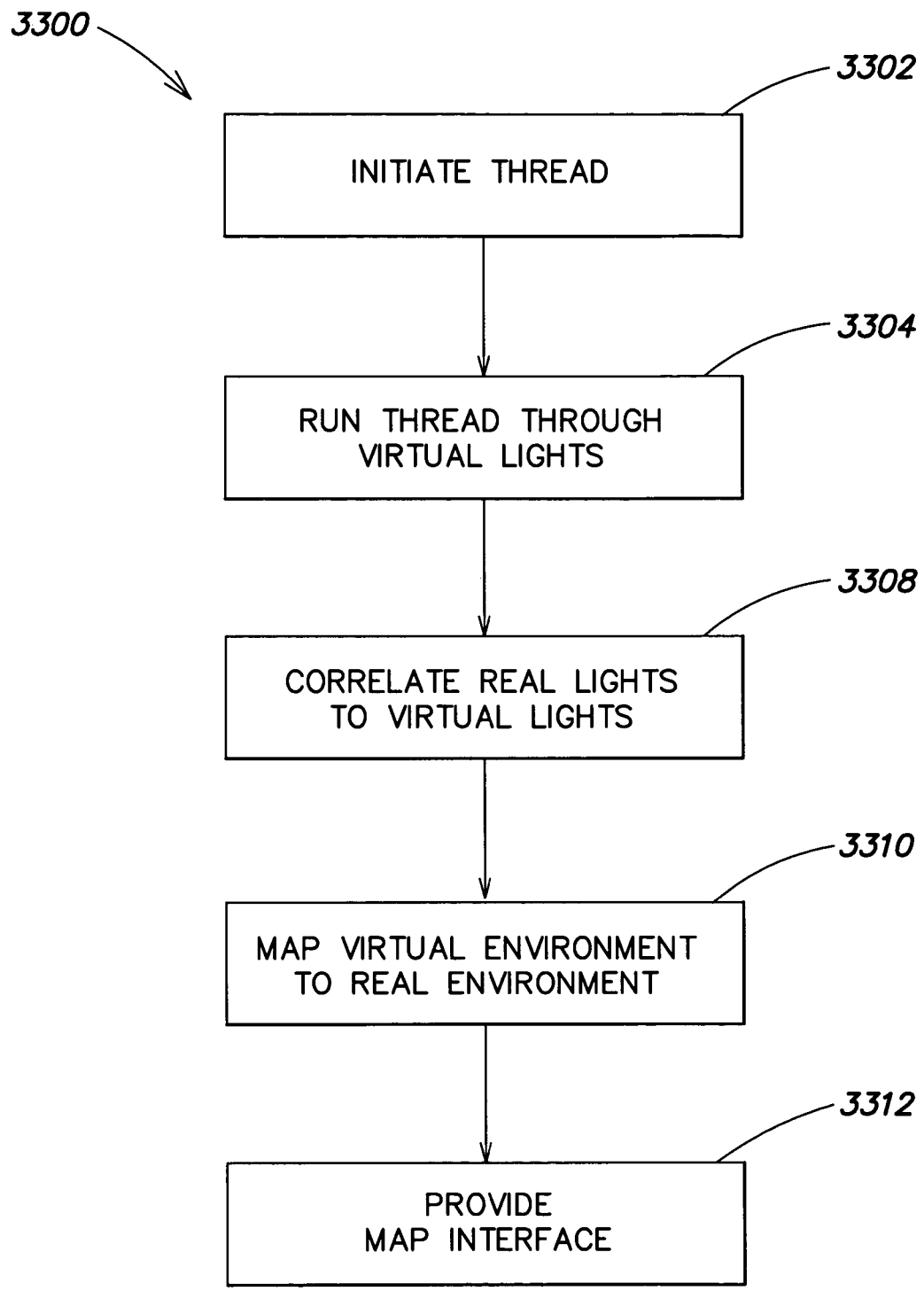
FIG. 33 is a flow diagram showing steps for generating a control signal for a light system using an object-oriented programming technique.

Referring to FIG. 33, a flow diagram 3300 depicts steps for coordinated illumination between a representation on virtual environment of a computer screen and a lighting unit 100 or set of lighting units 100 in a real environment. In embodiments, program code for control of the lighting unit 100 has a separate thread running on the machine that provides its control signals. At a step 3302 the program initiates the thread. At a step 3304 the thread as often as possible runs through a list of virtual lights, namely, objects in the program code that represent lights in the virtual environment. At a step 3308 the thread does three-dimensional math to determine which real-world lighting units 100 in the environment are in proximity to a reference point in the real world (e.g., a selected surface 107) that is projected as the reference point of the coordinate system of objects in the virtual environment of the computer representation. Thus, the (0,0,0) position can be a location in a real environment and a point on the screen in the display of the computer application (for instance the center of the display. At a step 3310, the code maps the virtual environment to the real world environment, including the lighting units 100, so that events happening outside the computer screen are similar in relation to the reference point as are virtual objects and events to a reference point on the computer screen.

At a step 3312, the host of the method may provide an interface for mapping. The mapping function may be done with a function, e.g., "project-all-lights," as described in Directlight API described below and in Appendix A, that maps real world lights using a simple user interface, such as drag and drop interface. The placement of the lights may not be as important as the surface the lights are directed towards. It may be this surface that reflects the illumination or lights back to the environment and as a result it may be this surface that is the most important for the mapping program. The mapping program may map these surfaces rather than the light system locations or it may also map both the locations of the lighting units 100 and the light on the surface 107.

A system for providing the code for coordinated illumination may be any suitable computer capable of allowing programming, including a processor, an operating system, and memory, such as a database, for storing files for execution.

Each lighting unit 100 may have attributes that are stored in a configuration file. An example of a structure for a configuration file is depicted in FIG. 26. In embodiments, the configuration file may include various data, such as a light number, a position of each light, the position or direction of light output, the gamma (brightness) of the light, an indicator number for one or more attributes, and various other attributes. By changing the coordinates in the configuration file, the real world lights can be mapped to the virtual world represented on the screen in a way that allows them to reflect what is happening in the virtual environment. The developer can thus create time-based effects, such as an explosion. There can then be a library of effects in the code that can be attached to various application attributes. Examples include explosions, rainbows, color chases, fades in and out, etc. The developer attaches the effects to virtual objects in the application. For example, when an explosion is done, the light goes off in the display, reflecting the destruction of the object that is associated with the light in the configuration file.

To simplify the configuration file, various techniques can be used. In embodiments, hemispherical cameras, sequenced in turn, can be used as a baseline with scaling factors to triangulate the lights and automatically generate a configuration file without ever having to measure where the lights are. In embodiments, the configuration file can be typed in, or can be put into a graphical user interface that can be used to drag and drop light sources onto a representation of an environment. The developer can create a configuration file that matches the fixtures with true placement in a real environment. For example, once the lighting elements are dragged and dropped in the environment, the program can associate the virtual lights in the program with the real lights in the environment. An example of a light authoring program to aid in the configuration of lighting is included in U.S. patent application Ser. No. 09/616,214 "Systems and Methods for Authoring Lighting Sequences." Color Kinetics Inc. also offers a suitable authoring and configuration program called "ColorPlay."

Further details as to the implementation of the code can be found in the Directlight API document attached hereto as Appendix A. Directlight API is a programmer's interface that allows a programmer to incorporate lighting effects into a program. Directlight API is attached in Appendix A and the disclosure incorporated by reference herein. Object oriented programming is just one example of a programming technique used to incorporate lighting effects. Lighting effects could be incorporated into any programming language or method of programming. In object oriented programming, the programmer is often simulating a 3D space.

In the above examples, lights were used to indicate the position of objects which produce the expected light or have light attached to them. There are many other ways in which light can be used. The lights in the light system can be used for a variety of purposes, such as to indicate events in a computer application (such as a game), or to indicate levels or attributes of objects.

Simulation types of computer applications are often 3D rendered and have objects with attributes as well as events. A programmer can code events into the application for a simulation, such as a simulation of a real world environment. A programmer can also code attributes or objects in the simulation. Thus, a program can track events and attributes, such as explosions, bullets, prices, product features, health, other people, patterns of light, and the like. The code can then map from the virtual world to the real world. In embodiments, at an optional step, the system can add to the virtual world with real world data, such as from sensors or input devices. Then the system can control real and virtual world objects in coordination with each other. Also, by using the light system as an indicator, it is possible to give information through the light system that aids a person in the real world environment.

Having appreciated that a computer screen or similar facility can be used to represent a configuration of lighting units 100 in an environment, and having appreciated that the representation of the lighting units 100 can be linked to objects in an objected-oriented program that generates control signals for the lighting units 100 that correspond to events and attributes of the representation in the virtual world, one can understand that the control signals for lighting units 100 can be linked not only to a graphical representation for purposes of authoring lighting shows, but to graphical representations that are created for other purposes, such as entertainment purposes, as well as to other signals and data sources that can be represented graphically, and thus in turn represented by lighting units 100 in an environment. For example, music can be represented graphically, such as by a graphic equalizer that appears on a display, such as a consumer electronics display or a computer display screen. The graphical representation of the music can in turn be converted into an authoring signal for lighting units 100, in the same way that a scripted show can be authored in a software authoring tool. Thus, any kind of signal or information that can be presented graphically can be translated into a representation on a lighting unit 100, using signal generating facilities similar to those described above, coupled with addressing and configuration facilities described above that translate real world locations of lighting units 100 into coordinates in a virtual environment.

One example of a representation that can be translated to a control signal for a lighting unit 100 is a computer game representation. In computer games, there is typically a display screen (which could be a personal computer screen, television screen, laptop screen, handheld, gameboy screen, computer monitor, flat screen display, LCD display, PDA screen, or other display) that represents a virtual world of some type. The display screen may contain a graphical representation, which typically embodies objects, events and attributes coded into the program code for the game. The code for the game can attach a lighting control signal for a lighting unit 100, so that events in the game are represented graphically on the screen, and in turn the graphics on the screen are translated into corresponding lighting control signals, such as signals that represent events or attributes of the game in the real world, such as flashing lights for an explosion. In some games the objects in the game can be represented directly on an array of lights; for example, the game "pong" could be played on the side of the building, with linear elements of lights representing game elements, such as paddles and the "ball."

Figure 34:
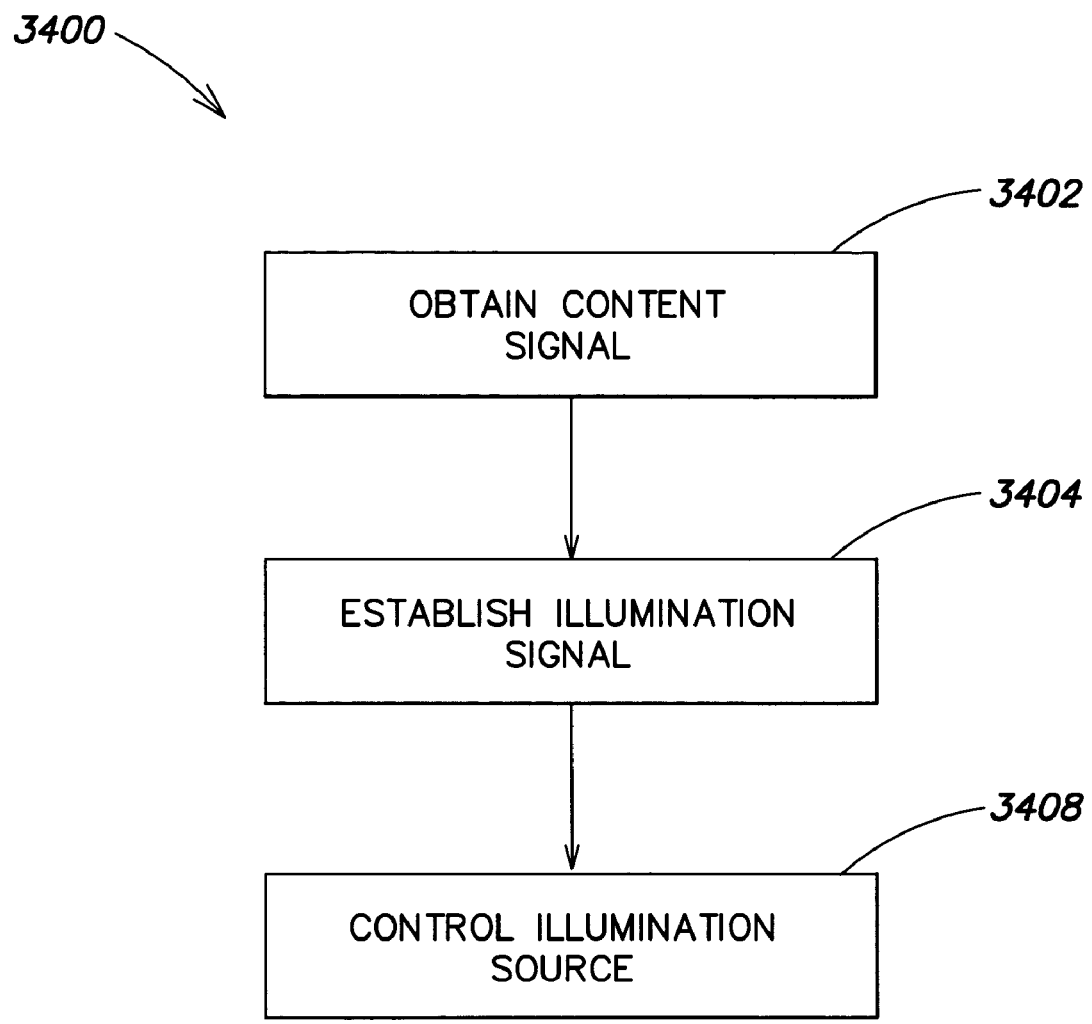
FIG. 34 is a flow diagram for executing a thread to generate a lighting signal for a real world light system based on data from a computer application.

Referring to FIG. 34, a flow diagram 3400 depicts basic steps for providing for coordinated illumination of a lighting unit 100 in conjunction with execution of a computer application such as a game. At a step 3402, the provider of the system provides for obtaining a content signal 3402 that relates to content from the computer game. For example, the content signal may be computer code for execution of the computer game, or a video or other signal that comes from the computer game system for display on a television or a monitor. At a step 3404 the host establishes a system for controlling illumination of a real world environment, such as installing lights in a desired configuration. The system further includes a processor 102 for allowing the host to change illumination. Next, at a step 3408, the user coordinates the illumination control with the nature of the content signal obtained at the step 3402. For example, upon receiving certain code or a certain signal from the computer game system, the illumination system may be controlled to change the illumination in the environment. Further detail will be provided in connection with the embodiments described below.

In embodiments, the light system may be associated with code for the computer game, so that the computer game code is modified or created to control the light system. For example, object-oriented programming techniques can be used to attach attributes to objects in the computer game, and the attributes can be used to govern behavior of the real world light system. Object oriented techniques are known in the field, and can be found in texts such as "Introduction to Object-Oriented Programming" by Timothy Budd, the entire disclosure of which is herein incorporated by reference. It should be understood that other programming techniques may also be used to direct lighting systems to illuminate in coordination with games, object oriented programming being one of a variety of programming techniques that would be understood by one of ordinary skill in the art to facilitate the methods and systems described herein.

In an embodiment, a developer can attach the light system inputs to objects in the game. For example, the developer may have an abstraction of a light that is added to the code construction, or object, of a game object. An object may consist of various attributes, such as position, velocity, color, intensity, or other values. A developer can add light as an instance in the object in the code of a game. For example, the game object could be a ship, with attributes, such as position, size, velocity, etc. A light source can be added as an instance of the object of the game, and the light source can have attributes, such as intensity, color, and various effects. Thus, when events occur in the game that call on the object of the ship, a thread running through the program can draw code to serve as an input to the processor of the light system. The light can accurately represent geometry, placement, spatial location, represent a value of the attribute or trait, or provide indication of other elements or objects.

Figure 35:
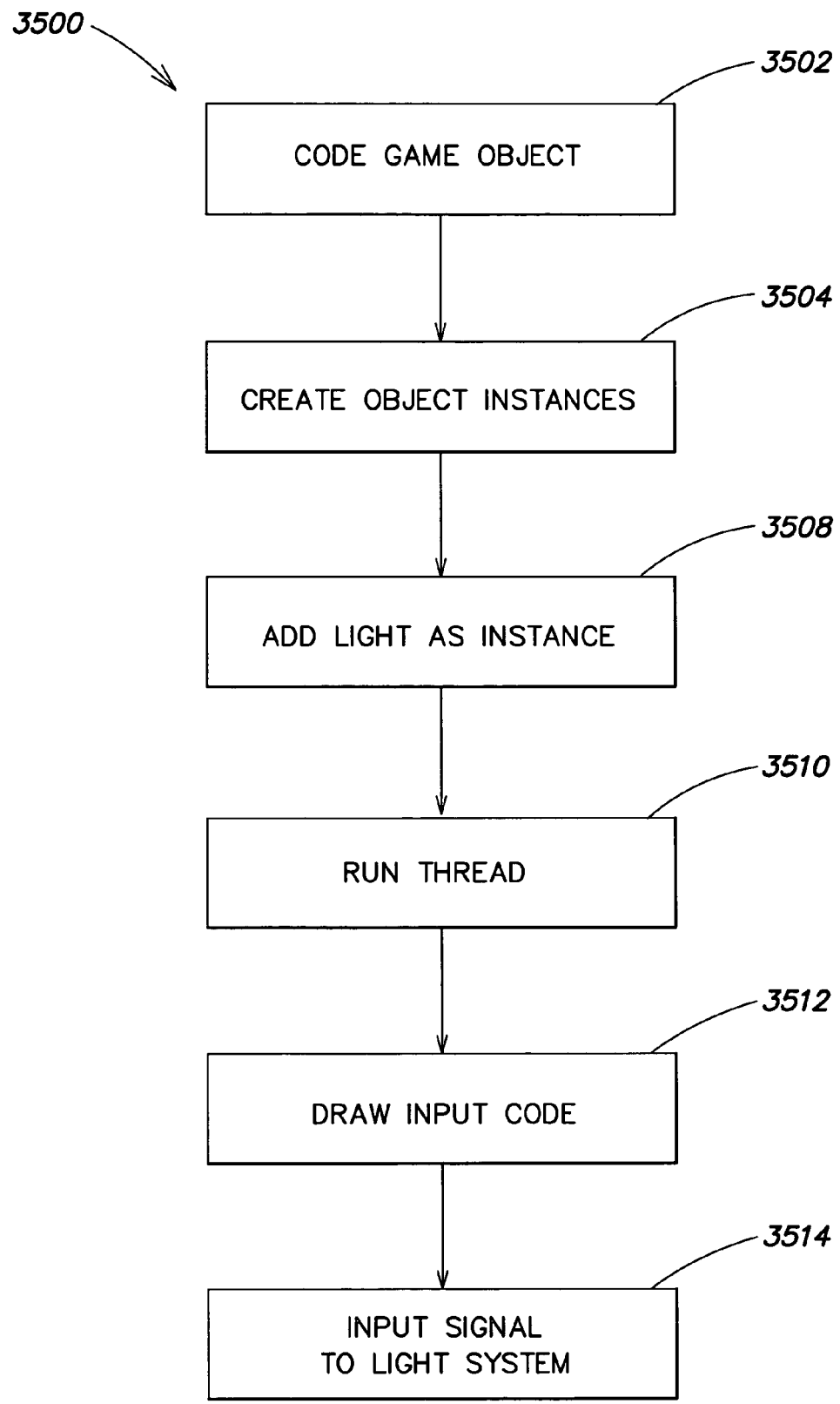
FIG. 35 is a flow chart that provides steps for a method of providing for coordinated illumination.

Referring to FIG. 35, a flow chart 3500 provides steps for a method of providing for coordinated illumination. At the step 3502, the programmer codes a game object for a computer game, using, for example, object-oriented programming techniques. At a step 3504, the programming creates instances for each of the objects in the game. At a step 3508, the programmer adds light as an instance to one or more objects of the game. At a step 3510, the programmer provides for a thread, running through the game code. At a step 3512, the programmer provides for the thread to draw lighting system input code from the objects that have light as an instance. At a step 3514, the input signal drawn from the thread at the step 3512 is provided to the lighting control system, so that the lighting system responds to code drawn from the computer game.

Using such object-oriented light input to the light system from code for a computer game, various lighting effects can be associated in the real world with the virtual world objects of a computer game. For example, in a space battle game, a ship's light source can be attached with an effect, such as sound, flashing, motion, vibration and other temporal effects. Further, the light system could include other effects devices including sound producing devices, motion producing devices, fog machines, rain machines or other devices which could also produce indications related to that object.

Figure 36:
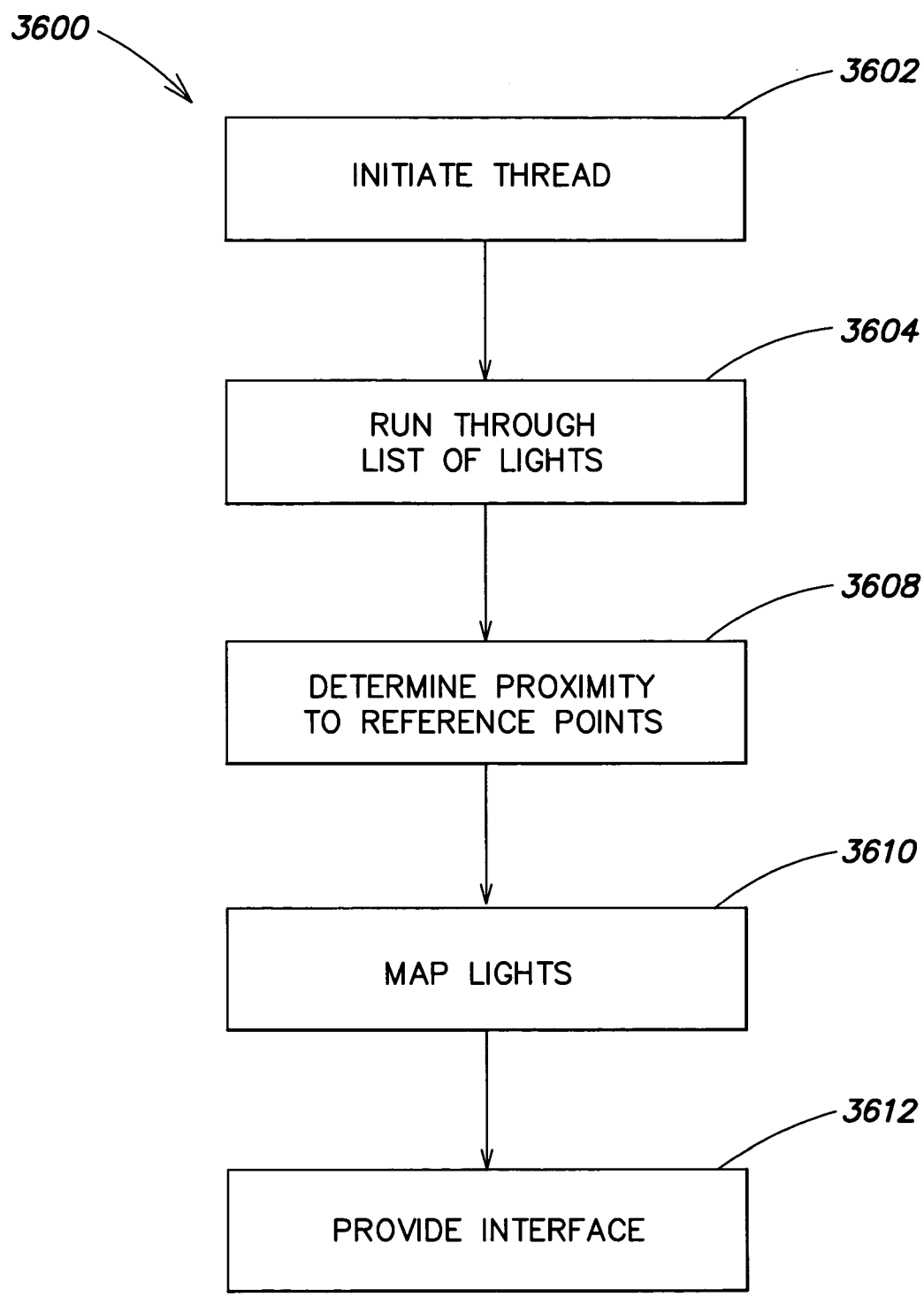
FIG. 36 is another flow chart with steps for providing coordinated illumination.

Referring to FIG. 36, a flow diagram 3600 depicts steps for coordinated illumination. In embodiments, the program code for the light has a separate thread running on the machine. At a step 3602 the program initiates the thread. At a step 3604 the thread as often as possible runs through the list of virtual lights. At a step 3608 the thread does three-dimensional math to determine which real-world lights are in proximity to reference point in the real world (e.g., the head of the user, the side of a building, etc.) that is projected as the reference point of the coordinate system of objects in the game. Thus, the (0,0,0) position could be the user's head in the real world and a point on the screen in the game (for instance the center of the video display and therefore the user's view into the virtual environment), or it could be a reference point, such as a location in an outdoor environment that has a view of a side of a building, for example. At a step 3610, the code maps the virtual environment and object in it to the real world environment, including the light system, so that events happening outside the computer screen are similar in relation to the reference point as are virtual objects to a reference point on the screen. At a step 3612, the host may provide an interface for mapping. The mapping function may be done with a function, e.g., "project-all-lights," as described in Directlight API described below and in Appendix A, that maps real world lights using a simple user interface, such as drag and drop interface. The placement of the lights may not be as important as the surface the lights are directed towards. It may be this surface that reflects the illumination or lights back to the user and as a result it may be this surface that is the most important for the mapping program. The mapping program may map these surfaces rather than the light fixture locations or it may also map both the locations of the fixtures and the light on the surface. In one embodiment a screen, such as the cabana discussed above, can further simplify this mapping by providing a set and unchanging lighting system and screen that will have identical properties no matter the real world environment in which the system is located.

Referring to FIG. 37, each real light may have attributes that are stored in a configuration file. An example of a structure for a configuration file 3700 is depicted in FIG. 37. The configuration file may include various data, such as a light number 3702, a position of each light 3708, the position or direction of light output 3704, the gamma (brightness) of the light 3710, an indicator number for one or more attributes 3712–3714, and various other attributes. By changing the coordinates in the configuration file, the real world lights can be mapped to the virtual world in a way that allows them to reflect what is happening in the virtual environment. The developer can thus create time-based effects, such as an explosion. There can then be a library of effects in the code that can be attached to various game attributes. Examples include explosions, fades in and out, etc. The developer attaches the effects to virtual lights in the game. For example, when an explosion is done, the light goes off in the game, reflecting the destruction of the object that is associated with the light in the configuration file.

Figure 38:
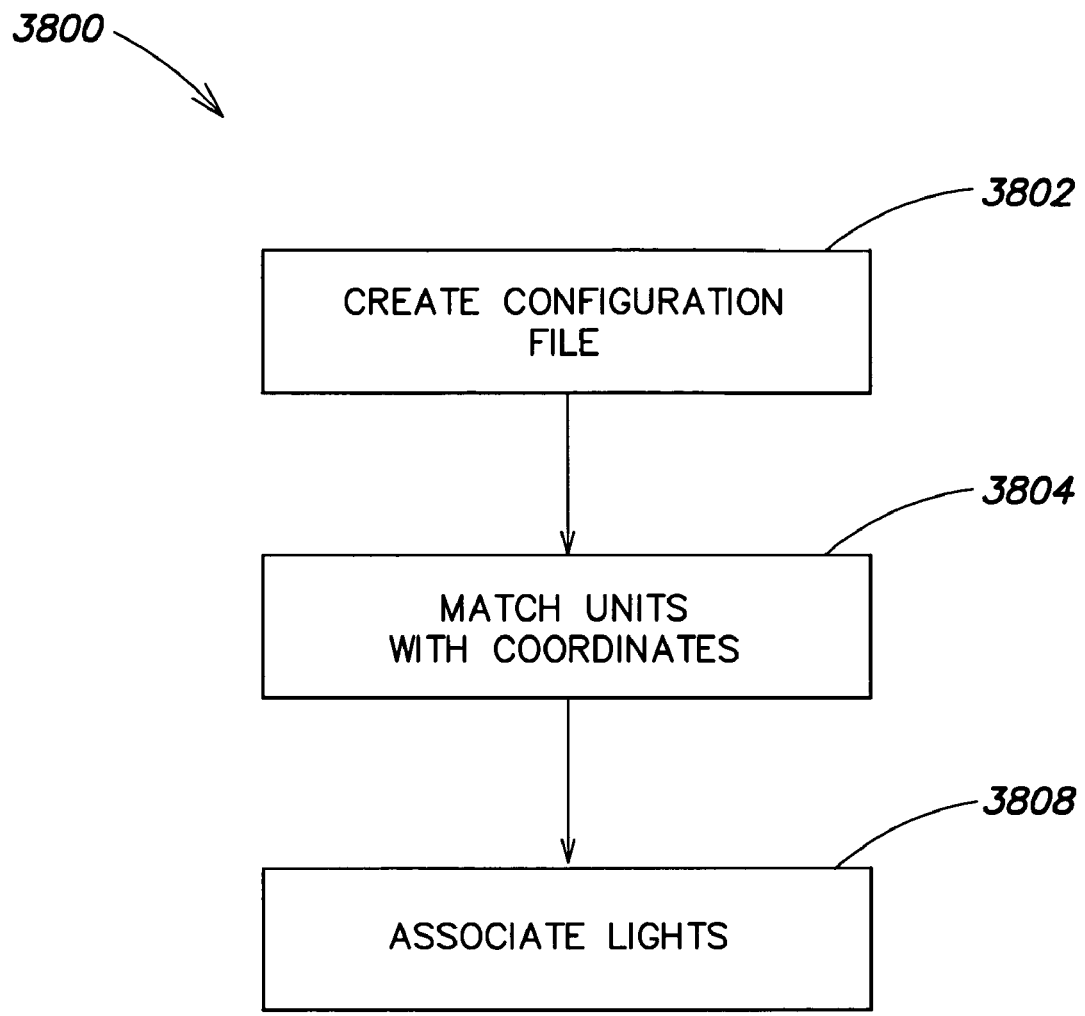
FIG. 38 shows steps for creating a configuration file for lighting units.

To simplify the configuration file, various techniques can be used. In embodiments, hemispherical cameras, sequenced in turn, can be used as a baseline with scaling factors to triangulate the lights and automatically generate a configuration file without ever having to measure where the lights are. Referring to the flow diagram 3800 of FIG. 38, in embodiments, the configuration file is created at a step 3802. The configuration file can be typed in, or can be put into a graphical user interface that can be used to drag and drop light sources onto a representation of a room. At a step 3804, the developer can create a configuration file that matches the fixtures with true placement relative to a user's coordinate in the real room. For example, once the lighting elements are dragged and dropped in the environment, at a step 3808 the program can associate the virtual lights in the program with the real lights in the environment. An example of a light authoring program to aid in the configuration of lighting is included in U.S. patent application Ser. No. 09/616,214 "Systems and Methods for Authoring Lighting Sequences." Color Kinetics Inc. also offers a suitable authoring and configuration program called "ColorPlay."

It is also possible to have lighting units 100 that are attached to data or signals that are not objects in a computer game, such as to indicate another environmental condition, such as the end of the work day, sunset, sunrise, or some other indicator that is useful to a player immersed in the game. The lighting units 100 may also provide mood or aesthetics such as projecting the presence of a person, creature object, or other thing such as by an aura or their traits of good and evil. These traits could be associated with colors and intensities. Approaching a dangerous object could also have the lights switch to a warning mode (such as flashing red) to warn the user of the danger.

In one embodiment of the invention, the lighting system can be replaced or augmented by lighting units 100 already present in the real world environment. For instance, one can create a game that involves the use of the lights in the house. One can use the game itself as a user interface for the lights in the house. A good example might be a horror game where when the lights go out in the game environment, they also go out in the real world room. Such an environment could be highly engaging to a user who is placed even more within the virtual world in which they are playing by having that world truly interact with the real world where they are.

Figure 39:
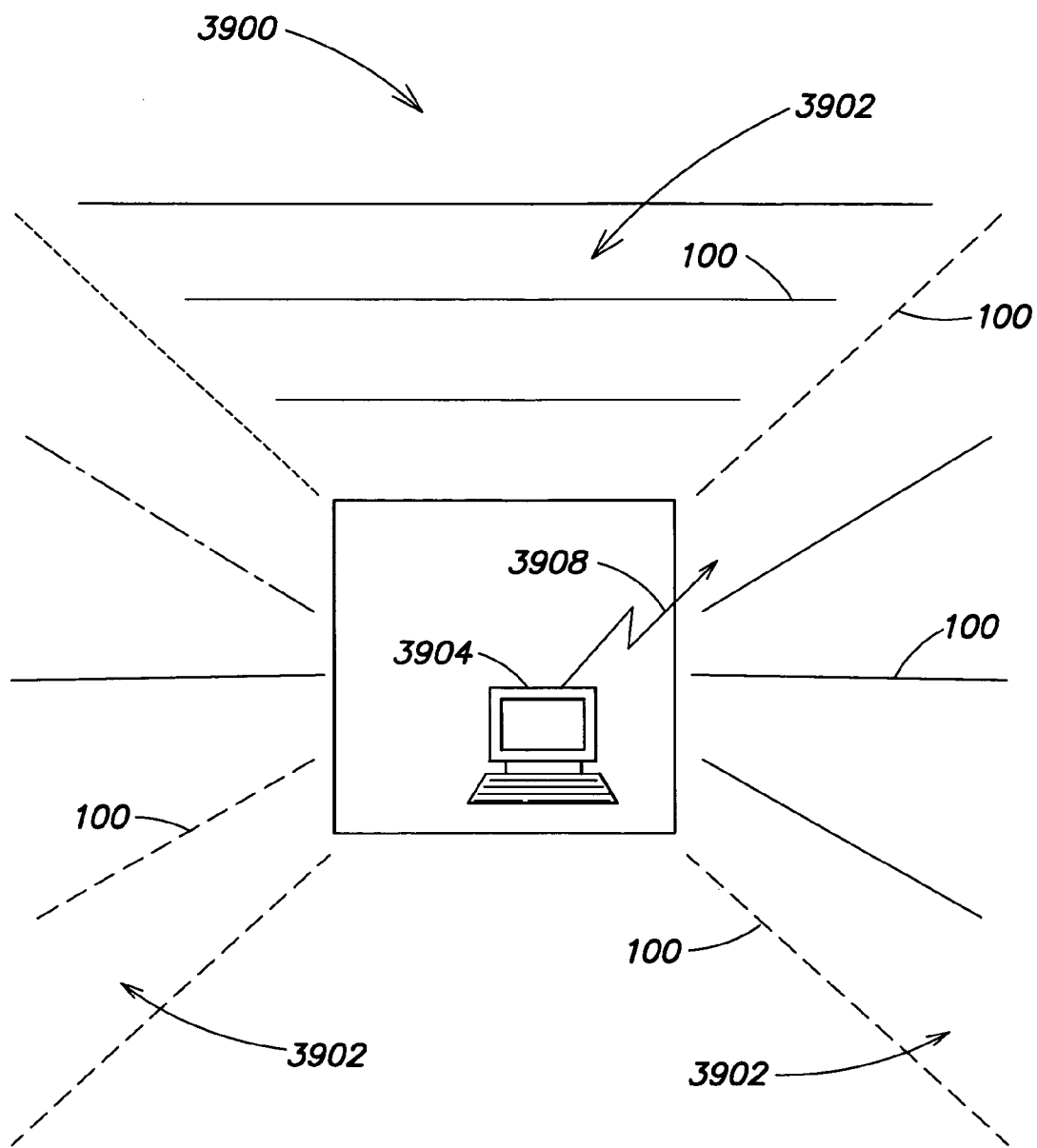
FIG. 39 shows a system for using an array of lights in conjunction with a configuration file.

The real lights in an environment, such as house lights or lighting units 100 on the outside of a building could be made game objects for the game itself, or particular light arrangements could be created for the purposes of playing particular games. Referring to FIG. 39, a system 3900 for using an array of lights 3902 in conjunction with a computer system 3904 (which can be any conventional computer system that provides a connection 3908 to the lights 3902. The array 3902 can be disposed on a wall or the ceiling, as depicted in FIG. 39. The individual lighting units 100, or lights 104A, 104B, 104C, 104D can be provided with changes in on-off status, color, and intensity, serving in effect like pixels on display. Thus, a version of a game such as "pong" or other simple game can be played with an array of lights in the light system, with the lights in the array serving as "pixels" analogous to the virtual environment on the screen. In such embodiments it may be unnecessary to use the screen of the computer system 3904 to play the computer game. Alternatively, one player could use the screen to control the game being played, while other players are totally immersed in a gaming environment. As discussed above, a player could be playing a horror game while the players in the next room or another environment are experiencing the light sensations from his play without control over the game environment. Essentially they can experience the game play as a third party along for the ride in the game. Further the layout of lights in a house could denote the parameters for a particular game. For instance, a game could be created where the user is fighting off evil monsters in their own home and the lighting in their home is acting in the same manner as the lighting in the game. Such a game environment could be creating by receiving information about the location of lights in a house, and generating the game world to conform to that lighting.

Figure 40:
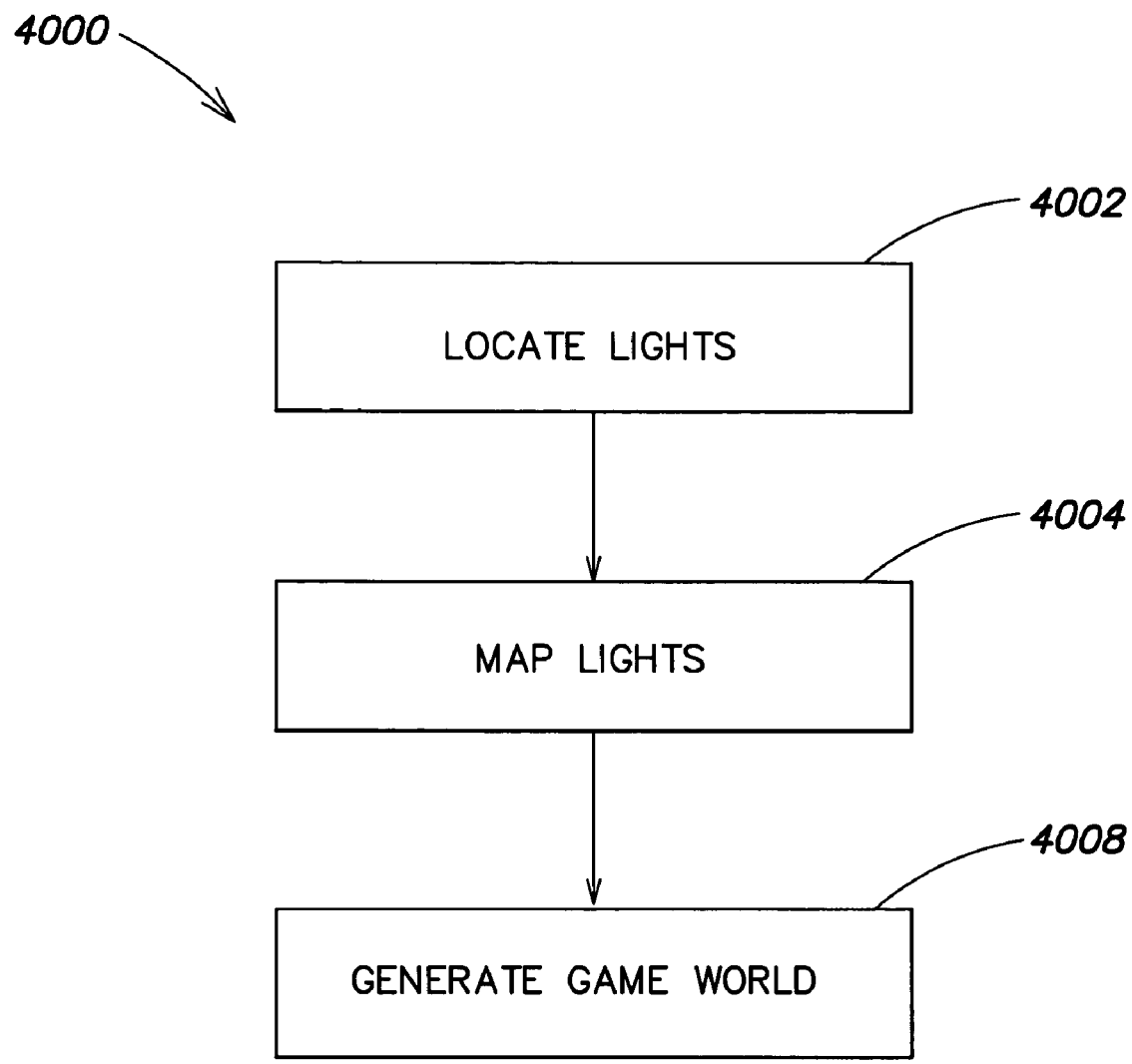
FIG. 40 shows a flow chart with steps for programming a system to coordinate lights with a game.

FIG. 40 depicts a flow chart 4000 with steps for programming a system to coordinate house lights with a game. At a step 4002 the programmer locates the real-world location of each of the house lights. At a step 4004 the programmer maps the lights, such as by dragging and dropping representations of the locations of the lights onto a virtual representation of the house on the display screen of the computer. At a step 4008 the program generates a game world that contains virtual lights that match the lights of the real world. Then, changes in the game lights can change the room lights, such as in hue or intensity.

It would be easily understood by one of skill in the art that this multi-party experience could be extended to multi-party competitive games such as those commonly played across networks. It could be the case where a user is actually trying to affect the real world environment in which another user is playing. For instance, in the game a first user could be trying to disable an opponent's ship by knocking out its ability to perceive the world around it. For instance it could knock out the ship's forward or rear views. In the real world a second player could actually have various views knocked out (lights being disabled) as the first player accomplishes his goal. In an even more realistic example, the first user could be trying to turn the lights out on the second user. The first person may also directly affect the other person's room lights by, for example, turning Is the lights off or changing their color, or the first person may indirectly change the lighting conditions in the other persons room by, for example, getting close to the other persons virtual room and tripping a sensor. The first person may also be carrying an object that generates light or reflects light. This object may trigger the lighting in the other person's room to indicate or warn the other person of the first persons presence.

Although the figures and description above show primarily computer games, it would be clear to one of skill in the art to carry the system into other types of computing devices and environments. A computing device can include, but is not limited to, any type of computer, a console game system (such as the Playstation series manufactured by Sony), a Personal Digital Assistant (PDA), a telephone, a WebTV or similar system, a thin client, or any other type of system on which a user is able to carry out applications where a lighting system could enhance the display provided to the user. There can be systems where the lighting system provides the only source of visual information to the user.

For console game systems, one of skill in the art would understand that libraries customized onto the proprietary chipsets for console games that drive light system output, similar to the Directlight programmer's interface, could be created without undue experimentation. Console games generally have proprietary chipsets so it may be necessary to generate custom libraries for these systems. The systems and libraries for the consoles could function in much the same way as a PC-based game. The console may include a USB, serial, parallel, firewire, optical, modem or other communications port to communicate with the lighting system. The lighting information could also be sent through a controller port. A controller port may be used for a controller communication as well as lighting control information. Separate controller ports could also be used. For example, a first controller port may be used to communicate with a controller and another controller port may be used to communicate with the lighting system.

Many games and computer systems include input devices such as a joystick, mouse, keyboards, gloves, tactile mouse, dance pads, exercise equipment, or other input devices. These devices are generally used by a user to control aspects of a game or other parameter of a computer program. Each of these input devices could also be configured to affect control signals for lighting units 100. For example, a mouse could be used to control the lights in a room or on the outside of a building. As the mouse is moved the lighting units 100 could respond, or as the user dances on a dance pad the lights could generate a color representation of their dance. For instance, their impact force with the pad could translate to an intensity measurement, while their position translated to a color. The input device may also direct sound simultaneously or in conjunction with the light.

In an embodiment of the invention the lighting system could also be associated with sensor or data inputs that could be associated with the virtual environment such as a microphone, camera, heat, cooling or other inputs. For example, a user could control a game object by providing voice instructions through the microphone, which could be synthesized into commands for an application, and in turn used to control the illumination of the environment through a lighting system.

The embodiments discussed above relate primarily to games involving real-time simulation and for such types of games there are numerous applications for lighting systems. For instance: flight games could use indicators for controls or important statistics like fuel level; racing games could have motion or indicate third party activities like the approach of police vehicles: skateboarding, snowboarding, or other performance sport simulators can have indicators of movement, indicators of third party actions, or rewards such as flashbulbs for particularly fine performances. Other types of simulators can use lighting systems including, but not limited to, roller-coaster simulations, closed booth arcade simulators, or location-based entertainment games (large games inside a booth with multiple players). Further, it would be understood by one of skill in the art that the above are merely a limited overview of possibilities and there are many more applications that could be performed without undue experimentation.

In other embodiments, a musical application could also be used, allowing for the choreographing of music to light, or the generation of light as a portion of the generation of music. Alternatively light could be used to help a user learn to play music. For instance light could be projected that indicates a particular key a user should press on a keyboard. In time, a user unable to read music could teach themselves to play instruments and music for the user's performance could be provided as light signals.

An embodiment of the present invention could be a puzzle that consists of getting lighting units 100 into a particular lighting configuration. A player could, for example, "solve" a real-world Rubik's cube representation consisting of lighting units 100. An embodiment of the invention may be used in flight simulators to change the ambient lighting conditions from day to night, or changing the lighting conditions as the horizon changes or associated with other aspects of the simulator.

Many configurations of lighting units 100 require large numbers of lighting units 100, in some cases distributed over great distances, such as in outdoor lighting applications like lighting buildings. The installation of a large number of lighting units 100 in an installation can be very complex and can introduce wiring issues, the use of power converters or power supplies and, in the case of intelligent fixtures, the use of cabling to send data to and from the fixtures for control purposes. In addition to difficulties in addressing and configuring control signals for such configurations of lighting units 100, methods and systems for which are disclosed above, it is also important to provide power sources 108 that are suitable for lighting units 100 that are disposed in such large configurations. Thus, methods and systems are provided herein for offering improved power sources 108 for lighting units 100.

Lighting systems of various types present different issues when tapping into power networks. For example, incandescent lighting sources are typically powered by a simple resistive load to the power network. Over the years, the increased acceptance and use of fluorescent and HID lamps has increased the use of electronics to drive loads, and these devices, along with computers and appliances, have introduced some side effects in power networks due to the ballasts and power supplies they incorporate. The electrical current that these newer systems draw is very different from resistive loads of conventional light sources, which introduces issues for electricity consumers and providers.

In the past, power issues arose from linear power supplies, which drew current in a sinusoidal fashion. As an alternative, switching power supplies are small and efficient compared to the linear supplies used in the past. However, switching supplies introduce distortions of the input current. Switching supplies draw current in pulses and not in a smooth sinusoidal fashion. Thus the alternating voltage (typically a 50 or 60 Hz sine wave in most power distribution systems) and current are often out of phase. As a result, voltage peaks and lows do not correspond with current peaks and lows. This distortion causes problems with power distribution with the local grid and can introduce capacity issues in power distribution and local circuits.

In an ideal situation, both the input current and voltage would be in phase and sinusoidal. For a given situation, power factor can be defined as the real power (Watts) divided by the apparent power (Current×Voltage). While it may appear that power is simply defined as the product of voltage and current, if voltage and current are out of phase, then the product can be very different from the real power used by a device. For a simple resistive load the power factor is unity, or 1.0. For switching supplies, however, the power factor can be much lower, e.g., 0.6. Fixing low power factor can be accomplished through the use of power factor correction (PFC). Good quality PFC can bring the ratio of real power to apparent power in a switching power supply to 0.99, thus mitigating the problems associated with poor power factor.

Since LED-based lighting units 100 and most electronics are low voltage systems, the use of power conversion is quite common. In many cases, there is an off-board power supply that is a transformer or equivalent that is directly plugged into the lo wall and provides lower voltage AC or, more typically, DC power. Thus, high voltage and low voltage systems are often separate. In most consumer electronics these power supply systems are integral to the device; that is, they plug directly into the wall and any necessary power conversion is carried out internal to the device. This is most practical for most electronics and eliminates the need for separate boxes for power supplies and electronics.

However, in most current LED-based lighting systems, an off-board power supply is used, because a single power supply can often supply energy to a multitude of lighting units 100, keeping the overall cost of the system lower than if each lighting unit 100 had a power supply on board. The integration of such power supplies into fixtures would have been prohibitive both in cost and physical space required. In addition, onboard power supplies create thermal issues. Heat is damaging to many electronics components. However, in installations where lighting units 100 are located apart, the additional costs of cabling in addition to maintenance issues can outweigh the initial benefits of a distributed power system.

In general the impedance of the power grid tends to be low, so that delivery of power is efficient. The impedance of a power supply, or any device that uses power, should not be non-linear; otherwise, the device can generate harmonics on the power line that are wasteful and undesirable. Among other things, non-linear impedance reduces power factor.

For certain lighting units 100, it is preferable to integrate a power supply system directly into a lighting unit 100, in order to provide clean, regulated and power-factor-corrected energy and power. In such situations, it is also preferable to eliminate unnecessary components and parts.

Disclosed herein are several embodiments of circuits for single-stage and two-stage power-factor-corrected power supplies for lighting units 100 or other devices that benefit from power factor correction. A key feature of each design is a feedback facility for adjustment of the output power. A key challenge is the elimination of large capacitors. One preferred embodiment uses a fly-back converter in a power supply with a current source.

Design of power supplies requires development of effective facilities to store and release energy to provide clean power with little ripple and good power factor. The challenge is to provide good, efficient, low cost, PFC power. As with most design challenges, tradeoffs are necessary.

One design choice in designing a PFC power supply is the choice of single-stage versus two-stage design. A single stage design appears to have some advantages over a two-stage design, such as requiring fewer components and thus having a lower manufacturing cost; however, these advantages have a trade-off in performance. To increase the performance by decreasing the ripple, a system needs more energy storage to be shifted to the output of the circuit.

FIG. 41 shows a typical low voltage switching power supply that incorporates a line filter 4102, power factor correction (PFC) facility 4104, a capacitor 4108 and a DC—DC converter 4110. The line filter provides general rectification and filtering of the high voltage AC input. The PFC facility 4104 insures that the voltage and current are in phase. The output capacitor 4108 provides a level of energy storage in the event of lapsed input power. This capacitor value is usually sized to permit a missing cycle of input waveform without affecting the output. Finally the DC output voltage is converted to a desired DC level such as 24VDC. In general, switching power supplies, such as this one.

FIG. 42 shows a block diagram 4200 of a typical low voltage power supply with a line filter 4102. Note the absence of any power factor correction facility. The energy storage capacitor 4108 is shown between the line filter 4102 and the DC—DC converter 4110. This power supply can provide equivalent outputs but cannot provide power-factor-corrected outputs. Thus, it can present a problem with local power distribution.

FIG. 43 shows another power supply arrangement with an integrated PFC and DC—DC converter 4302. This is termed a single-stage PFC low voltage power supply. The benefits of a single stage include lower costs and smaller size. Note that the energy storage capacitor 4108 is now at the output end to maintain output under cycle loss. Without this, the output is adversely affected by power lapse and holds up the ability to maintain voltage level.

Figure 44:
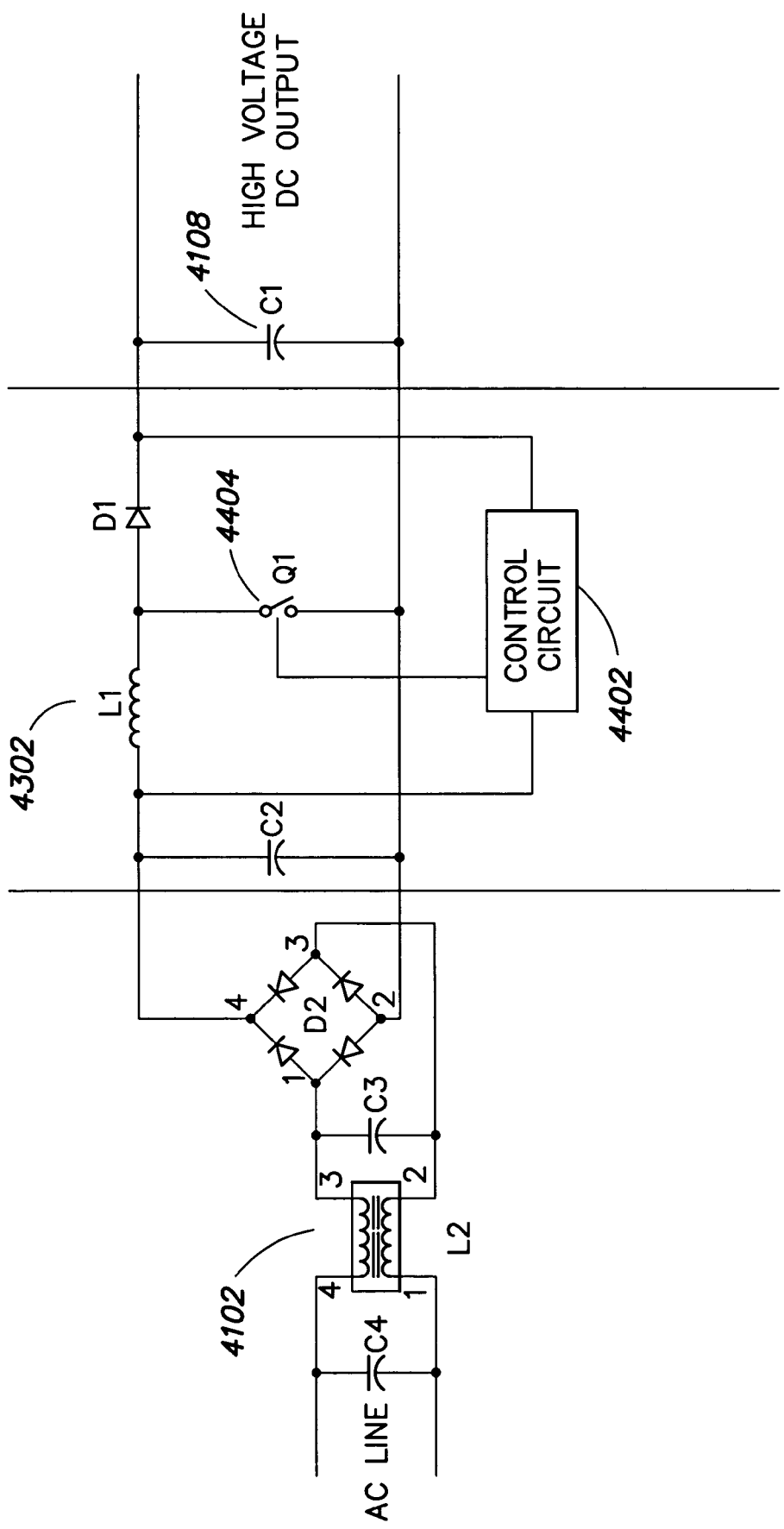
FIG. 44 is a more detailed breakdown of the power supply of FIG. 43 with the line filter.

FIG. 44 is a more detailed breakdown of FIG. 43 with the line filter 4102. The circuit diagrams presented herein are presented in general functional form; many variations with similar functional blocks and similar overall functionality are possible and are intended to be encompassed herein. The control circuit 4402 provides rapid switching of switch 4404 for the purposes of providing a regulated output. This is a standard element in switching power supplies.

Figure 45:
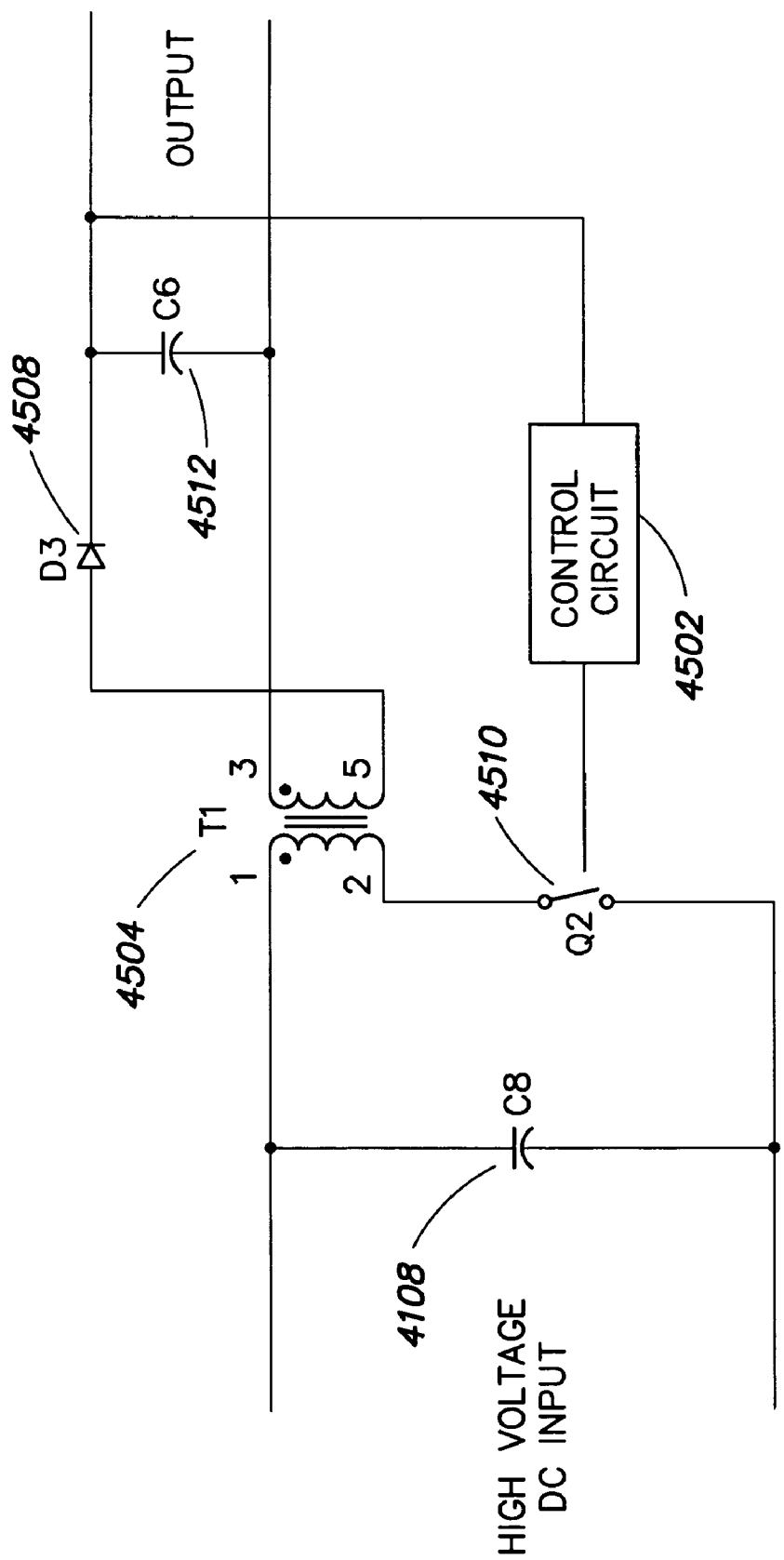
FIG. 45 continues FIG. 44 to the output stage of the power supply.

FIG. 45 continues FIG. 44 to the output stage. Element 4108 is duplicated to show the overlap. The output of the high voltage DC output is then fed into the DC—DC converter as shown by a representative circuit diagram. Again, a control circuit 4502 is shown that measures and responds to the output to provide a feedback system to adjust and regulate the output in real-time to maintain voltage levels. The current in the inductor 4504 is rapidly charged and then discharged through diode D3 4508 through control of switch Q2 4510 is typical of such circuits. A small output capacitor 4512 is appended to the output to provide additional energy storage and minimize output ripple.

Figure 46:
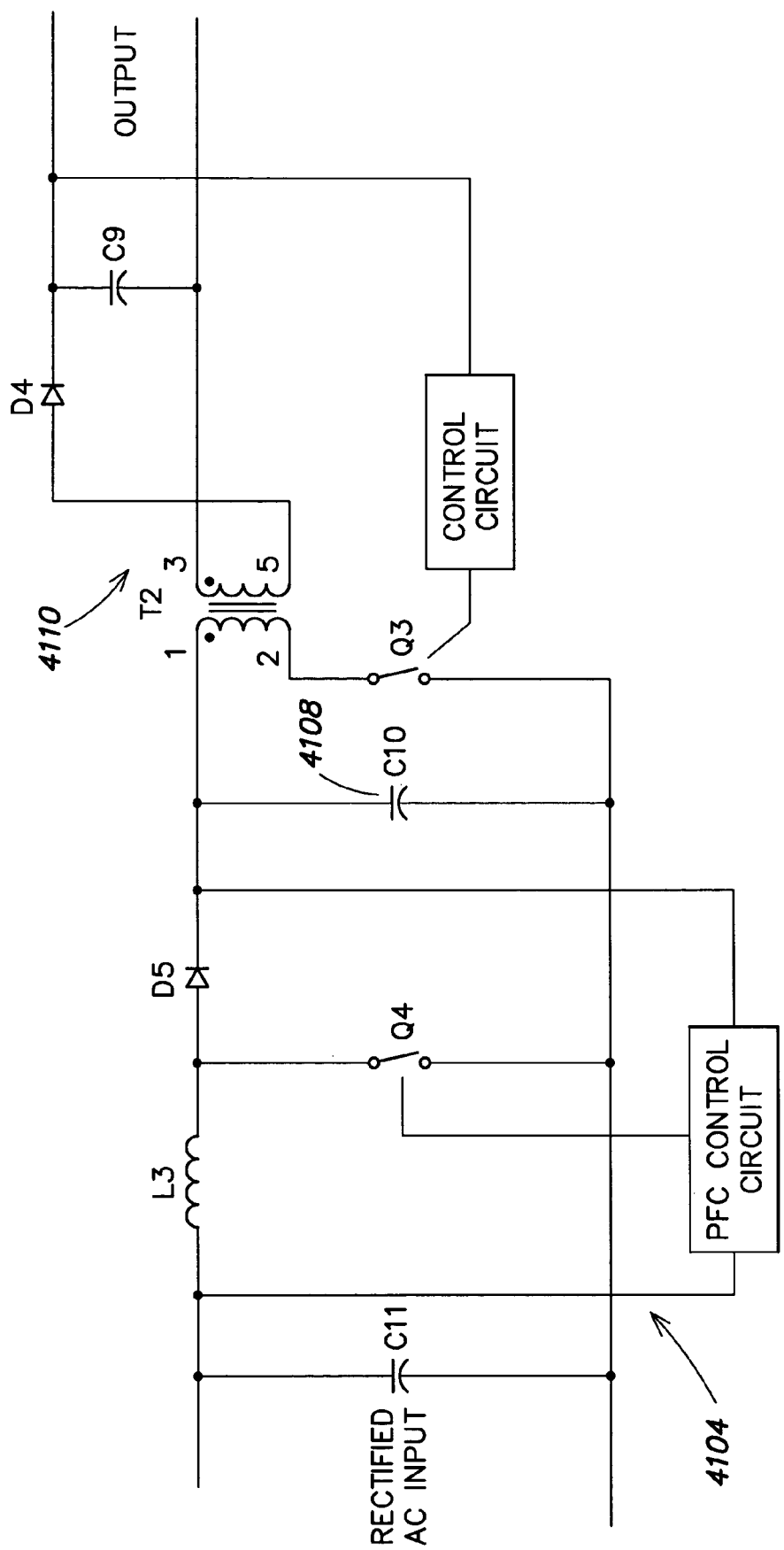
FIG. 46 is an alternative embodiment of a power supply.

FIG. 46 is an alternative embodiment with a combination of a power factor correction facility 4104, energy storage capacitor 4108 and DC—DC Converter 4110.

Figure 47:
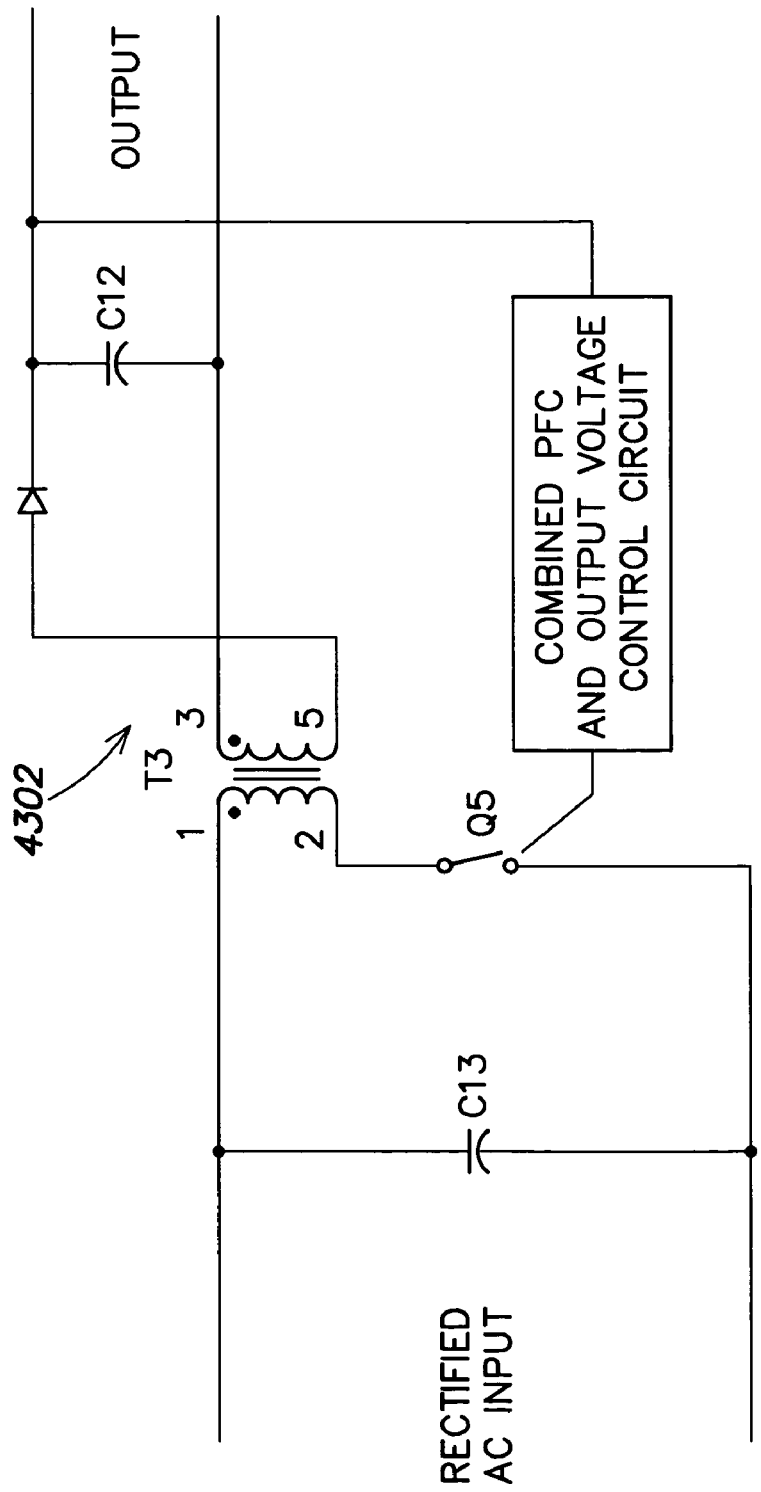
FIG. 47 is an alternative embodiment to the block diagram of the single-stage element of FIG. 43.

FIG. 47 is an alternative embodiment to the block diagram of the single-stage element of 4302 in FIG. 43. This combination provides a smaller and lower cost alternative to the two-stage system of FIG. 46.

Figure 48:
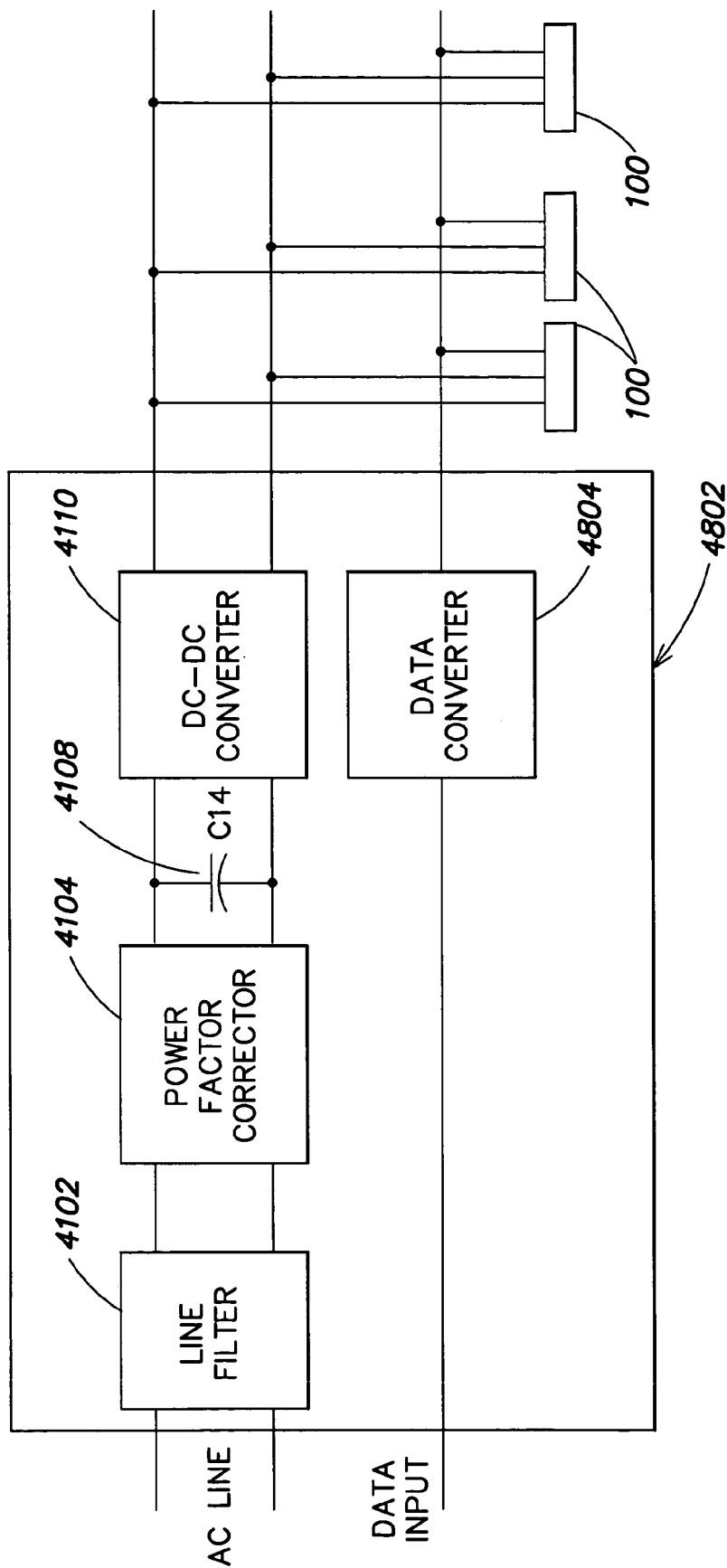
FIG. 48 is a block diagram of a typical LED Illumination power and data supply system for a lighting unit.

FIG. 48 is a block diagram of a typical LED Illumination power and data supply system for a lighting unit 100. As shown in block 4802, the power supply section is equivalent to FIG. 41 and provides a low-voltage bus to directly drive LED-based lighting units 100. This is equivalent to several commercial low voltage systems including the iColor Accent lighting product from Color Kinetics Incorporated of Boston, Mass. The data converter 4804 provides information to the lighting units 100 to communicate lighting levels, colors, effects, and other information in a data stream. The communication and power may be provided over a unified power and data cable or over traces on a circuit board or one of many ways to provide data or power to electronics devices including wireless communication systems.

The lighting units 100 are the recipient of the power and the data and, in this instantiation, are fed low voltage power to control and drive LED light sources 104. With low voltages, a voltage drop down the length of a cable is a given, and this limits the feasible length of the configuration of lighting units 100 in a lighting system. The resistance of a wire, while small, is significant and must be taken into account in the system design. Typical lengths for such low voltage systems may be a few ten of meters of cable length. Voltage drop that exceeds a certain amount means that the voltage will decrease to an unusable level at some distance, so that the electronics within the lighting units 100 cannot operate. The voltage drop effect can be mitigated through larger gauge of wire, which has a lower electrical resistance. However, such wire becomes quite heavy and expensive, and there are practical issues of installation and cost that make a higher-gauge wire approach less than optimal.

Figure 49:
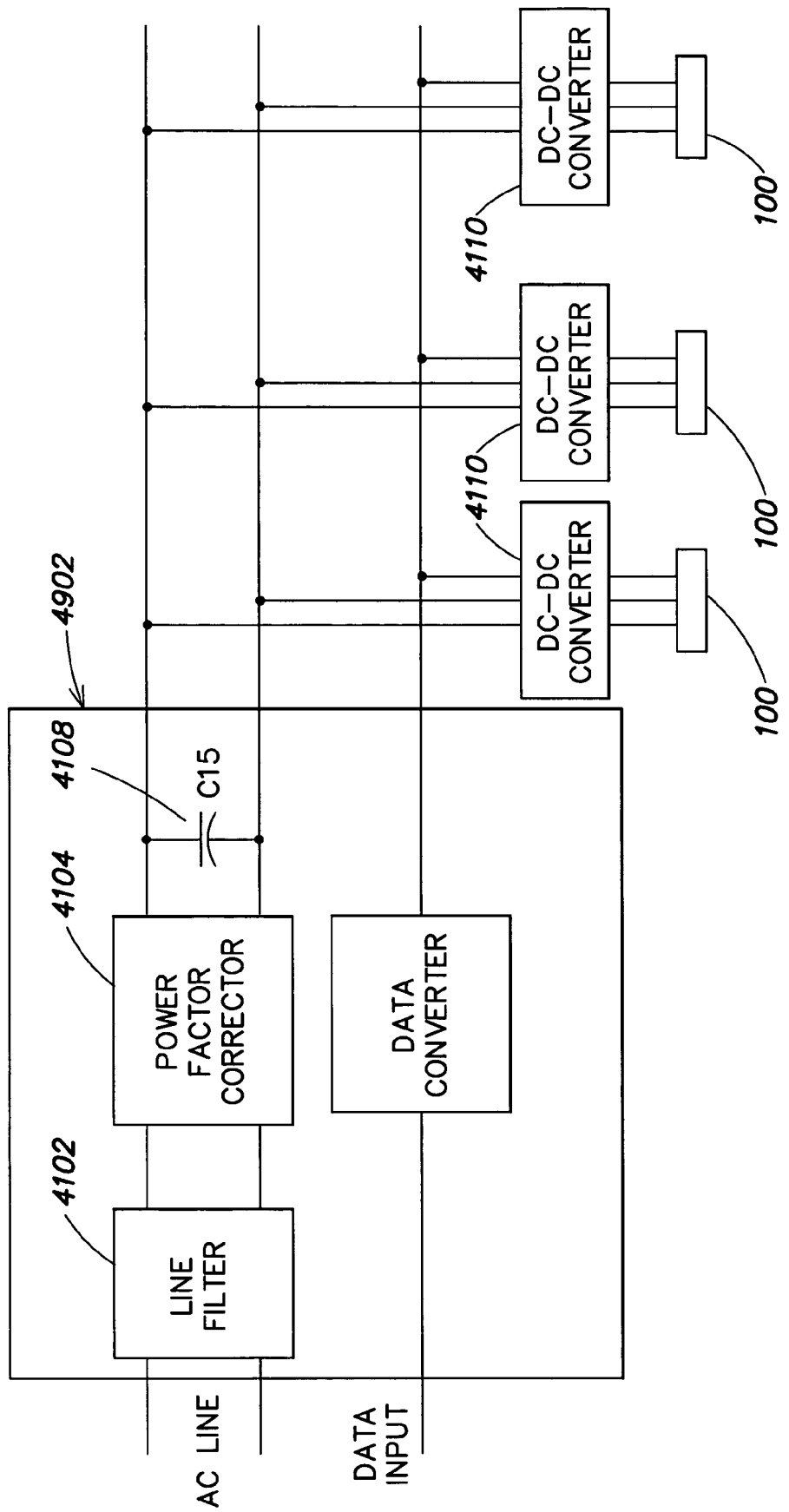
FIG. 49 is an embodiment of a power-factor-corrected power supply.

FIG. 49 is an embodiment of a power-factor-corrected power supply that solves many of the problems of conventional power supplies for lighting units 100. In FIG. 49, the power factor correction facility 4104 and the energy storage capacitor 4108 are separated from the DC—DC converter 4110 by providing a high voltage power bus. Power is the product of voltage and current. In Ohm's Law the relationship of voltage and current is in the form V=IR. Thus power also equals $I^2R$; that is, power is proportional to the square of the current. If the voltage is increased, then the current can be decreased, and the effect of wire resistance and resultant power loss is diminished. FIG. 49 shows an embodiment of a high voltage bus that allows very long lengths of wire and still allow lighting units 100 to be powered and controlled. The element labeled 4902 includes the Line Filter 4102, PFC facility 4104 and storage capacitor 4108, but now power is routed through a long cable for a particular project or installation to the lighting units 100, using the high voltage bus. A DC—DC converter 4110 is co-located at the lighting unit 100, which provides power to the lighting unit 100 or other device. The is high voltage input provides minimal cost per lighting unit 100, and it allows very long lines, thus minimizing system cost and installation cost in configurations where lighting units 100 are spread over large distances, such as on building exteriors. By comparison to lighting units 100 powered by conventional power supplies, line lengths can grow dramatically, for example by a factor of ten or more. Also, the wire gauge can be much smaller than in the low voltage, high current system shown in FIG. 48. The particular advantage of this separate-stage system is that the separation of the two stages facilitates large installations through the use of a low-loss high voltage bus. This two stage design is not necessarily incorporated into a single housing, although it is possible for it to be so.

Figure 50:
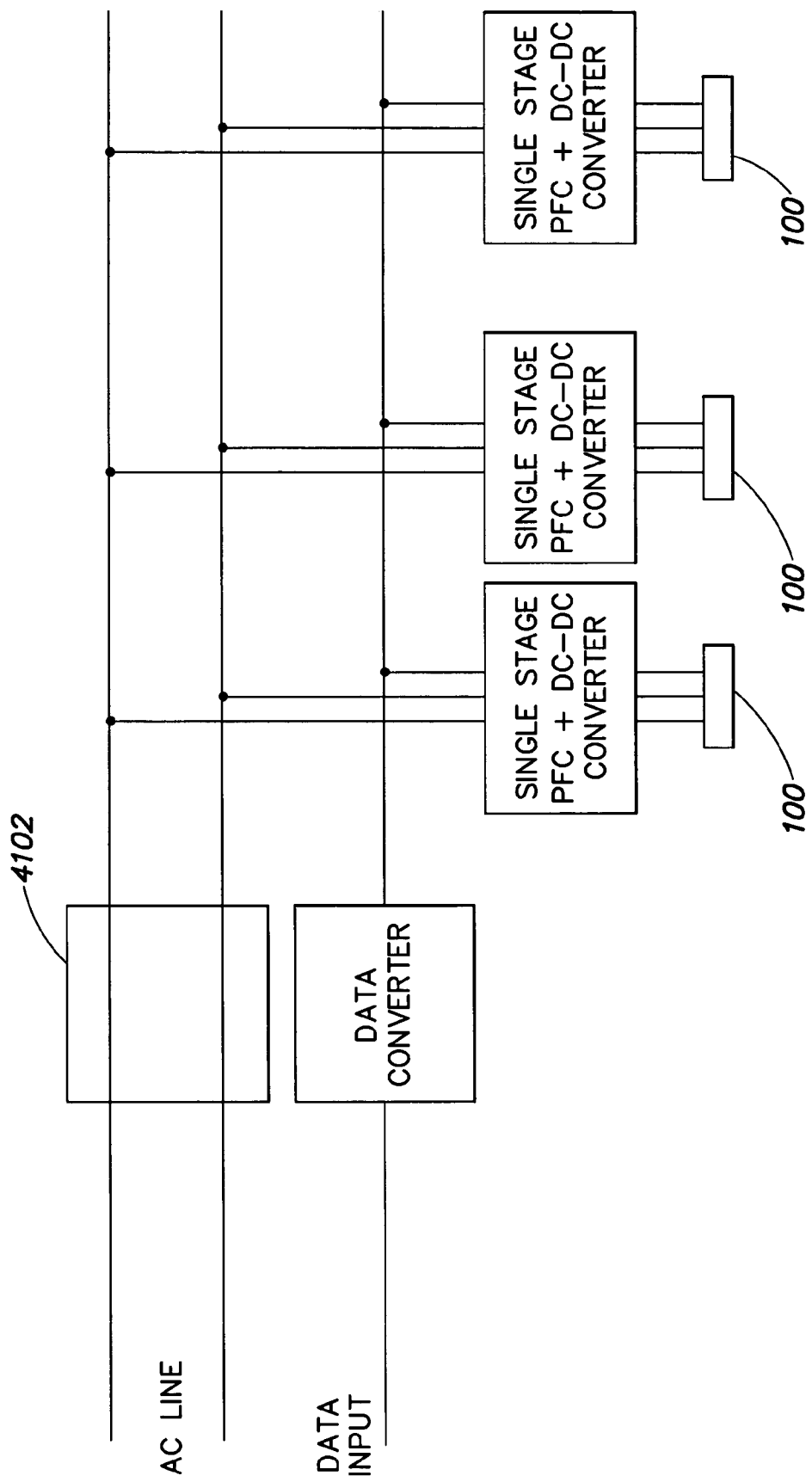
FIG. 50 shows another embodiment of a two-stage design of a power supply.

FIG. 50 shows another embodiment of a two-stage design, in this case with a direct connection of a high voltage bus to line power (e.g. 120 or 240 VAC) through an optional line filter 4102. This implementation still has all power and data originating from a specific source, perhaps a single enclosure, to provide power and data to a number of fixtures. The lower part of FIG. 50 shows another embodiment of a power-factor-correct power supply. This embodiment takes a further step of allowing each of the fixtures to directly connect to line power through a wall plug or direct connection to power locally. This obviates the need to run additional and specific wires for that particular installation and allows the use of standard electrical contractors to install the wiring for powering this system. The data converter can, as shown earlier, be provided by a separate data bus, which can be wired, through the power line or another wireless system. This solution gives the greatest flexibility in location and installation.

Various embodiments of power-factor-correction are intended to be encompassed herein. Further information can be found in Horowitz and Hill, The Art of Electronics, 2ed. Cambridge University Press, 1991. Section 6.19, Switching Regulators and DC—DC Converters, which is incorporated by reference herein.

Figure 51:
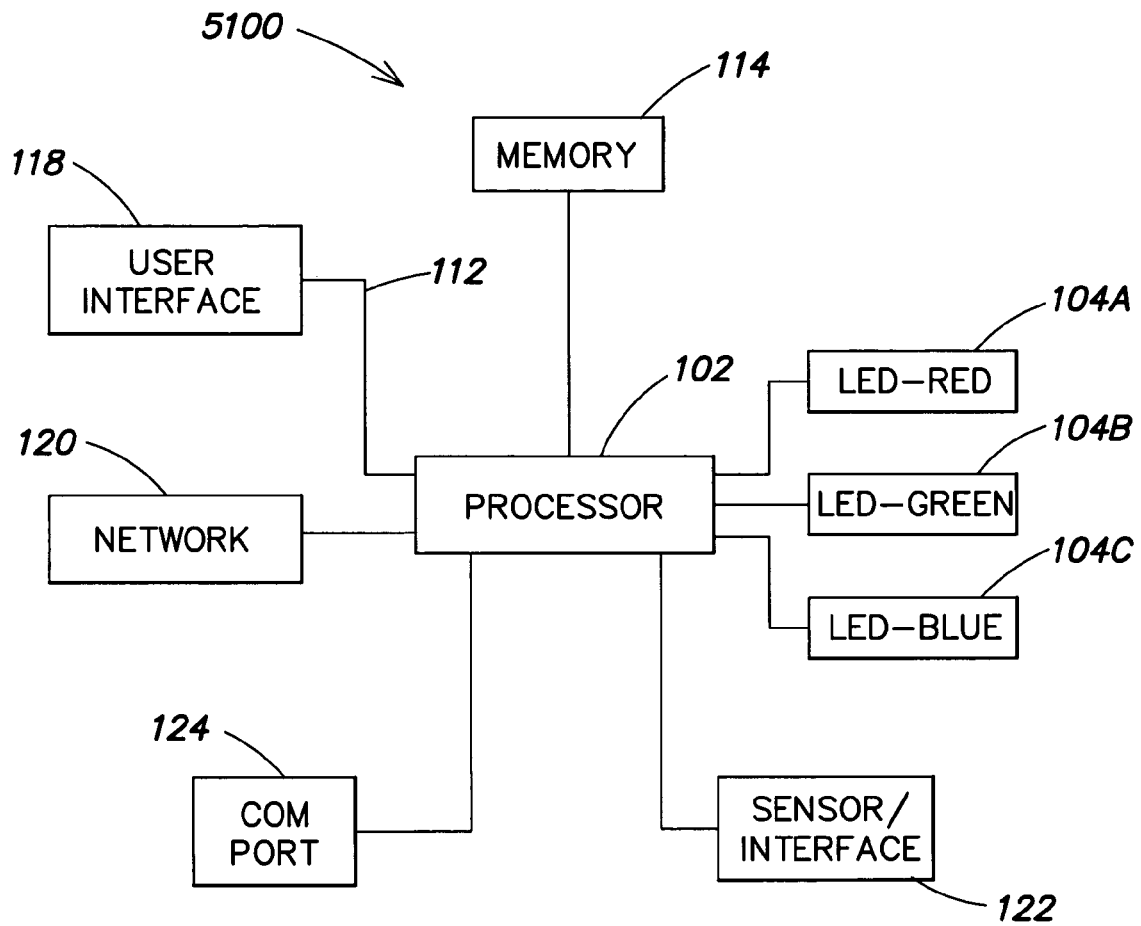
FIG. 51 shows another embodiment of a power-factor-correct power supply.

FIG. 51 illustrates a lighting system 5100 according to the principles of the present invention, similar to the lighting system described in connection with FIG. 1. Lighting system 5100 may include one or more LEDs. In an embodiment, the LEDs 104A, 104B, and 104C may produce different colors (e.g. 104A red, 104B green, and 104C blue). The lighting system 5100 may also include a processor 102 wherein the processor 102 may independently control the output of the LEDs 104A, 104B, and 104C. The processor may generate control signals to run the LEDs such as pulse modulated signals, pulse width modulated signals (PWM), pulse amplitude modulated signals, analog control signals or other control signals to vary the output of the LEDs. In an embodiment, the processor may control other circuitry to control the output of the LEDs. The LEDs may be provided in strings of more than one LED that are controlled as a group and the processor 102 may control more than one string of LEDs. A person with ordinary skill in the art would appreciate that there are many systems and methods that could be used to operate the LED(s) and or LED string(s) and the present invention encompasses such systems and methods.

A lighting system 5100 may be a lighting unit 100 according to the principles the present invention, and either may generate a range of colors within a color spectrum. For example, the lighting unit 100 may be provided with a plurality of LEDs (e.g. 104A-D) and the processor 102 may control the output of the LEDs such that the light from two or more of the LEDs combine to produce a mixed colored light. Such a lighting system may be used in a variety of applications including displays, room illumination, decorative illumination, special effects illumination, direct illumination, indirect illumination or any other application where it would be desirable. Many such lighting systems may be networked together to form large networked lighting applications.

In an embodiment the LEDs 104 and or other components comprising a lighting unit 100 may be arranged in a housing (not shown in FIG. 51). The housing may be adapted to provide illumination to an area and may be arranged to provide linear lighting patterns, circular lighting patterns, rectangular, square or other lighting patterns within a space or environment. For example, a linear arrangement may be provided at the upper edge of a wall along the wall-ceiling interface and the light may be projected down the wall or along the ceiling to generate certain lighting effects. In an embodiment, the intensity of the generated light may be sufficient to provide a surface (e.g. a wall) with enough light that the lighting effects can be seen in general ambient lighting conditions. In an embodiment, such a housed lighting system may be used as a direct view lighting system. For example, such a housed lighting system may be mounted on the exterior of a building where an observer may view the lighted section of the lighting system directly. The housing may include diffusing, or other, optics such that the light from the LED(s) 104 is projected through the optics. This may aid in the mixing, redirecting or otherwise changing the light patters generated by the LEDs. The LED(s) 104 may be arranged within the housing 5212, on the housing 5212 or otherwise mounted as desired in the particular application.

Figure 52:
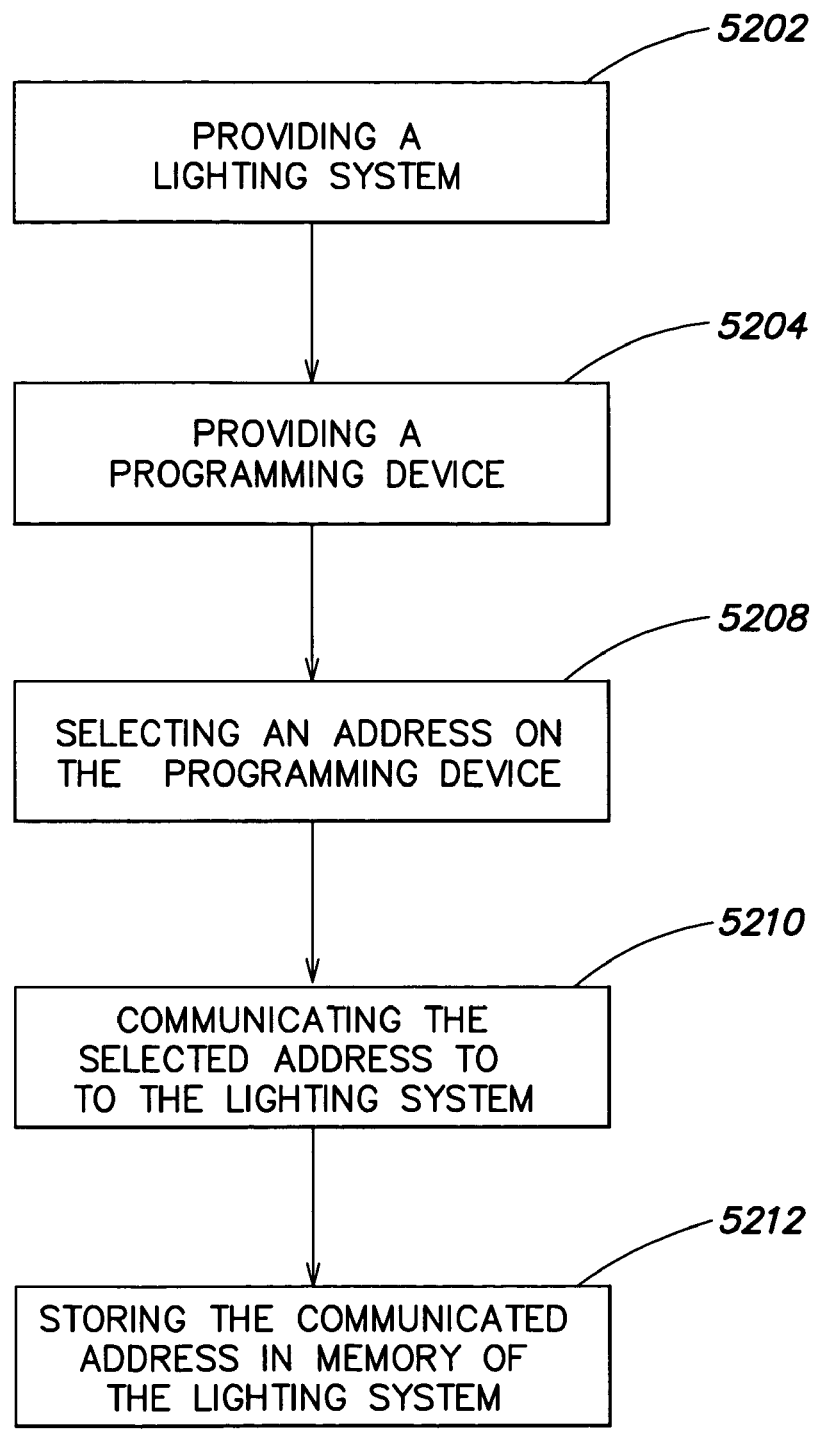
FIG. 52 illustrates a configuration of a lighting unit according to the present invention.

FIG. 52 illustrates a method for programming a lighting unit 100 according to the principles of the present invention. The method may involve providing a lighting system 5202, providing a programming device 5204, selecting and or generating an address or other information on the programming device 5208, communicating the selected and or generated address the lighting system 5210, and storing the communicated address in the memory of the lighting system 5212.

Although many of the examples contained herein use LED based lighting devices as the lighting system, other illumination sources may be incorporated into the lighting system. These illumination sources may be associated with addressable controllers that require setting when incorporated as a part of the network or have preprogrammed lighting control programs to be selected, modified or generated. A programming device according to the principles of the present invention may be used to program the address, or perform other functions as described herein, in these illumination sources as well.

Figure 53:
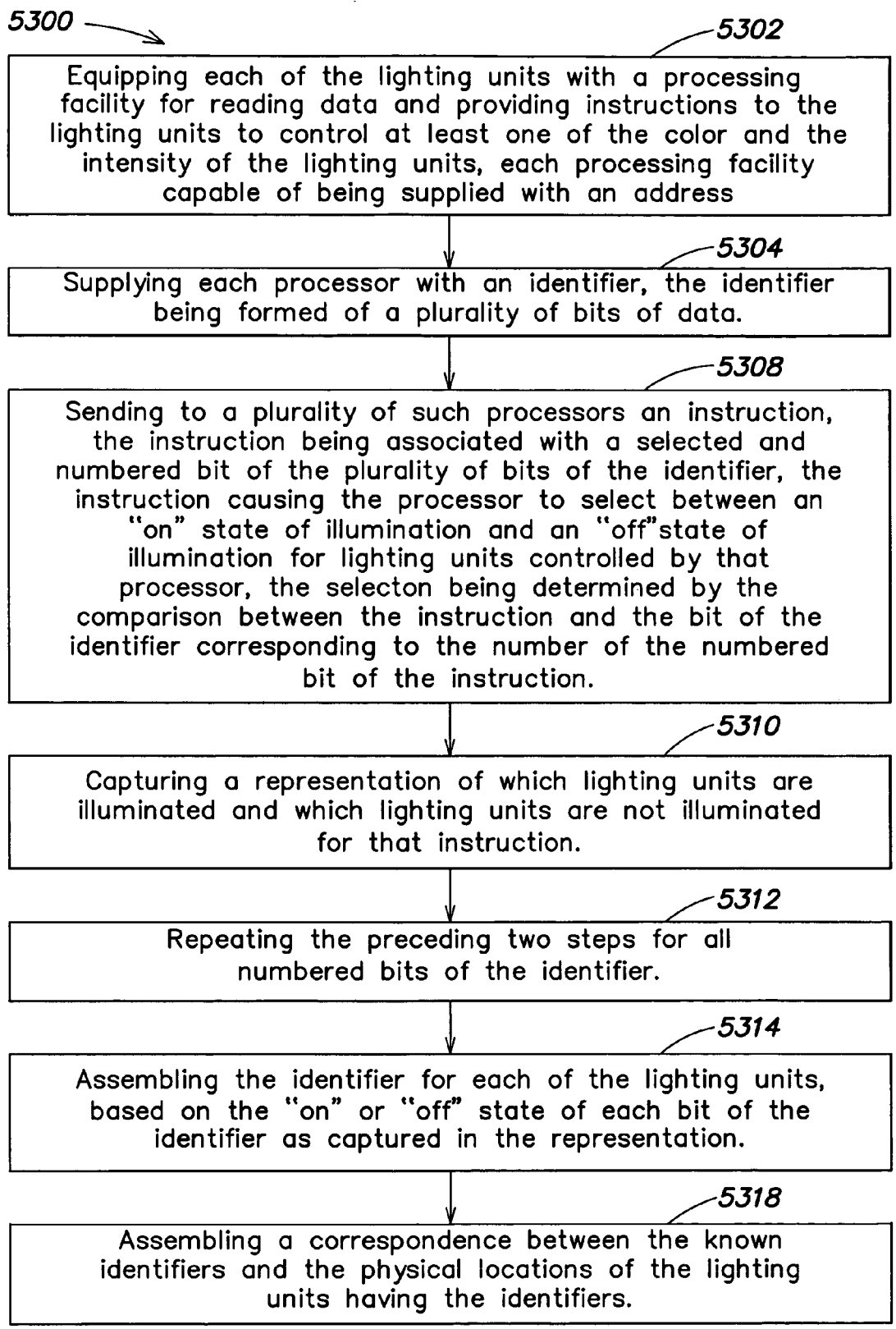
FIG. 53 illustrates a process flow diagram according to the present invention.

FIG. 53 illustrates a process flow diagram according to the principles of the present invention. The present invention is a method 5300 of controlling light from a plurality of lighting units that are capable of being supplied with addresses. The method may comprise the steps of equipping each of the lighting units 100 with a processing facility for reading data and providing instructions to the lighting units to control at least one of the color and the intensity of the lighting units, each processing facility capable of being supplied with an address 5302. For example, the lighting units may include a lighting unit 100 where the processor 102 is capable of receiving network data. The processor may receive network data and operate the light sources 104 in a manner consistent with the received data. The processor 102 may read data that is explicitly or implicitly addressed to it or it may respond to all of the data supplied to it. The network commands may be specifically targeting a particular lighting system with an address or group of lighting systems with similar addresses or the network data may be communicated to all network devices. A communication to all network devices may not be addressed but may be a universe or world style command.

The method may further comprise the steps of supplying each processor with an identifier, the identifier being formed of a plurality of bits of data 5304. For example, each lighting unit 100 may include memory 114 (e.g. EPROM), and the memory 114 may contain a serial number that is unique to the light or processor. Of course, the setting of the serial number or other identifier may be set through mechanical switches or other devices and the present invention is not limited by a particular method of setting the identifier. The serial number may be a 32-bit number in EPROM for example. Various addressing and configuration schemes described above can be used.

In one embodiment, the method may also comprise sending to a plurality of such processors an instruction, the instruction being associated with a selected and numbered bit of the plurality of bits of the identifier, the instruction causing the processor to select between an "on" state of illumination and an "off" state of illumination for lighting units controlled by that processor, the selection being determined by the comparison between the instruction and the bit of the identifier corresponding to the number of the numbered bit of the instruction 5308. For example, a network command may be sent to one or more lighting units in the network of lighting units. The command may be a global command such that all lighting units that receive the command respond. The network command may instruct the processors 102 to read the first bit of data associated with its serial number. The processor may then compare the first bit to the instructions in the network instruction or assess if the bit is a one or a zero. If the bit is a one, the processor may turn the lighting unit on or to a particular color or intensity. This provides a visual representation of the first bit of the serial number. A person or apparatus viewing the light would understand that the first bit in the serial number is either a one (e.g. light is on) or a zero (e.g. light is off). The next instruction sent to the light may be to read and indicate the setting of the second bit of the address. This process can be followed for each bit of the address allowing a person or apparatus to decipher the address by watching the light turn on and or off following each command.

The method may further comprise capturing a representation of which lighting units are illuminated and which lighting units are not illuminated for that instruction 5310. For example, a camera, video or other image capture system may be used to capture the image of the light(s) following each such network command. Repeating the preceding two steps, 5308 and 5310, for all numbered bits of the identifier 5312 allows for the reconstruction of the serial number of each light in the network.

The method may further comprise assembling the identifier for each of the lighting units, based on the "on" or "off" state of each bit of the identifier as captured in the representation 5314. For example, a person could view the light's states and record them to decipher the lights serial number or software can be written to allow the automatic reading of the images and the reassembly of the serial numbers from the images. The software may be used to compare the state of the light with the instruction to calculate the bit state of the address and then proceed to the next image to calculate the next bit state. The software may be adapted to calculate a plurality or all of the bit states of the associated lighting units in the image and then proceed to the next image to calculate the next bit state. This process could be used to calculate all of the serial numbers of the lighting units in the image.

The method may also comprise assembling a correspondence between the known identifiers (e.g. serial numbers) and the physical locations of the lighting units having the identifiers 5318. For example, the captured image not only contains lighting unit state information but it also contains lighting unit position information. The positioning may be relative or absolute. For example, the lights may be mounted on the outside of a building and the image may show a particular light is below the third window from the right on the seventy second floor. This lighting units position may also be referenced to other lighting unit positions such that a map can be constructed which identifies all of the identifiers (e.g. serial numbers) with a light with a position. Once these positions and or lighting units are identified, network commands can be directed to the particular lighting units by addressing the commands with the identified and having the lighting unit respond to data that is addressed to its identifier. The method may further comprise controlling the illumination from the lighting units by sending instructions to the desired lighting units at desired physical locations. Another embodiment may involve sending the now identified lighting units address information such that the lighting units store the address information as its address and will respond to data sent to the address. This method may be useful when it is desired to address the lighting units in some sequential scheme in relation to the physical layout of the lighting units. For example, the user may want to have the addresses sequentially increase as the lighting fixtures go from left to right across the face of a building. This may make authoring of lighting sequences easier because the addresses are associated with position or progression.

Figure 54:
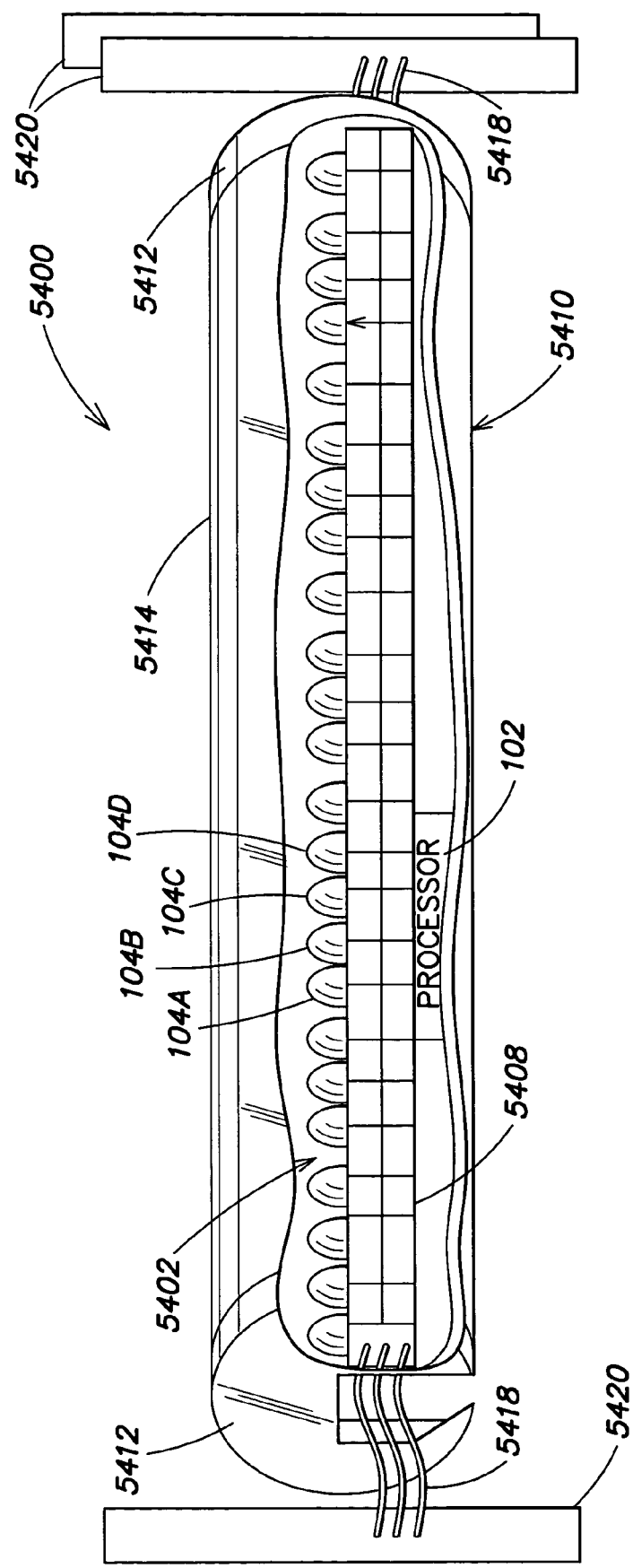
FIG. 54 illustrates a lighting system according to the principles of the present invention.

Referring to FIG. 54, a lighting system 5400 is provided, comprised of a several elements. The lighting system 5400 includes a plurality of linearly disposed light sources 104A–104D, which in an embodiment are LEDs of a variety of colors, such as red, green, amber, white and blue. The lighting units 5402 are disposed in combination with a processor 102 on a board 5408. The board 5408 is located in a housing 5410, which has two end portions 5412. The housing may be adapted for outdoor use, sealed to prevent encroachment from moisture. There is also a cover 5414 that is substantially transparent, allowing transmission of light from the light sources 104A–104D to a viewer of the lighting system 5400. The cover may be watertight or water resistant. Through the end portions 5412 are disposed a plurality of wires 5418, which connect to a junction box 5420. The lighting system 5400 can also be connected to similar such systems by wiring through additional junction boxes 5420. The transparent cover 5414 allows the light from the lighting system 5400 to transmit through at a substantially unchanged beam angle to the viewer. The lighting systems 5400 can be disposed by connecting them to a surface, such as an interior or exterior wall of a building. The lighting systems 5400 can be configured in rows, or in other forms to provide signage, displays, or illumination effects through instructions relayed through the wires 5418 to the processor 102. A wide variety of effects can be created.

Figure 55:
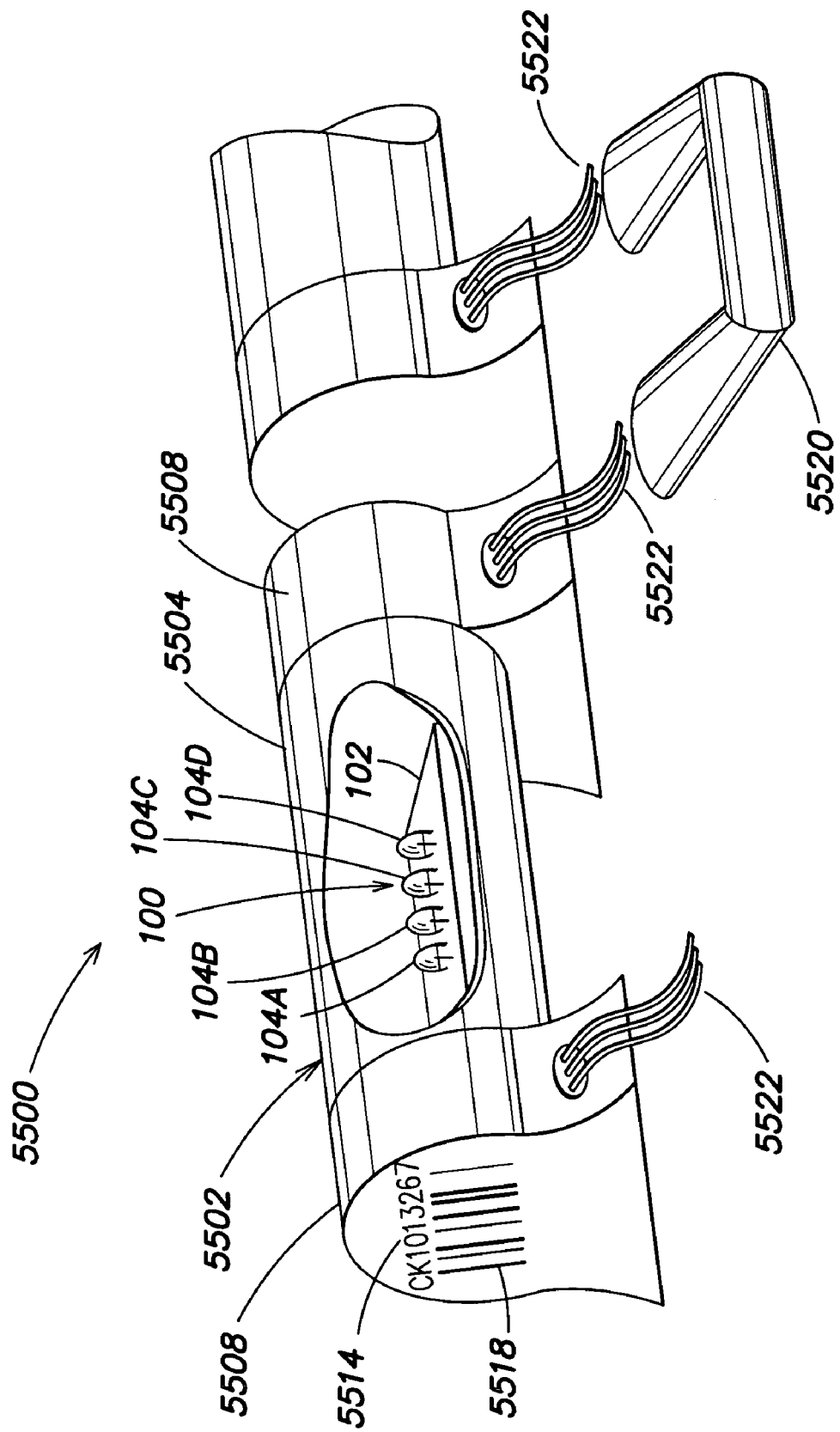
FIG. 55 illustrates a lighting system according to the principles of the present invention.

Referring to FIG. 55, another embodiment of a lighting system 5500 is provided, comprised of several different elements. The lighting system 5500 includes a housing 5502, which includes a cover 5504 and end portions 5508. The housing may be watertight or water resistant, so that it is suitable for outdoor applications. Inside the cover 5504 are disposed a plurality of lighting units 100 that are disposed in a desired configuration, such as a linear configuration indicated in FIG. 55. In other embodiments, the lighting units 100 may be disposed in rows, in triads, in curves, or in a matrix. Similarly, the housing 5502, while substantially straight and cylindrical in FIG. 55, may in other embodiments be curved, disposed in rows, or in other configurations, such as geometric shapes, letters, numbers, or other configurations, similar to the wide range of configurations possible with neon signs. The lighting units 100 may be provided in combination with a processing facility or processor 102 for handling data and providing instructions to the lighting units 5510, the processing facility 102 capable of being supplied with an address for addressing data to control at least one of the color and intensity of light produced by the lighting units. The processing facility 102 may also be capable of being supplied with at least one of an identifier, such as a serial number or DMX address 5514 and a bar code 5518 capable of being uniquely associated with the lighting unit 5510. The processor 102 can respond to external signals that provide illumination instructions according to the address of the processor, allowing illumination to be specified for the specific physical location of the lighting system 5500.

The cover 5504 may be a substantially light-transmissive, optically operative cover, wherein light from the plurality of light sources 104A–104D is mixed to a degree greater than for a transparent cover, such as the one disclosed in connection with FIG. 54. In systems that have transparent coverings, the user views the light sources 104A–104D directly. In such embodiments, that may lead to undesirable color mixing, making it difficult to see certain effects. Also direct view embodiments are limited by the inherent beam angle of the lighting units, e.g. LEDs, so that a viewer from outside that angle does not see color at all. For example, if it is desired to illuminate outward away from a wall, it may also be desirable to illuminate the wall, but a system with a single line of LEDs disposed outward does not illuminate in both directions at the same time. The optically operative cover 5504 diffuses the light from the light sources 104A–104D, so that it travels in directions both inside and outside the beam angle of the line of light sources 104A–104D. Thus, the cover diffuses light and causes a smooth color mixing, including allowing effects that are muddled in direct view applications. Also, the cover 5504 diffuses light backward, allowing illumination of the surface on which the lighting system 5500 is mounted, as well as outward in the direction of the viewer. Thus, the optically operative cover offers substantial advantages for certain applications. A variety of semi-opaque or semi-transmissive materials may used for the cover 5504, such as plastic, crystal, various polymers, or the like. Materials that diffuse, diffract, reflect, refract, or otherwise redirect light may serve the purpose of having an optic that increases the beam angle of the light emitted from the lighting units to produce a substantially uniform light intensity over an angle greater than the beam angle of the light sources 104A–104D themselves.

In an embodiment, the optically operative cover 5504 has end portions 5508. The ends 5508 are themselves substantially light-transmissive, so that the ends 5508 can also mix the light from the light sources 104A–104D, similar to the cover 5504. The ends 5508 may be adapted to permit the lighting system 5500 to be positioned in direct contact with another similar lighting system 5500. A connector 5520 may be supplied as well, capable of putting the lighting system 5500 in at least one of electrical and data communication with another lighting system 5500. The connector 5520 may be disposed in a configuration capable of supplying a direct data and electrical connection to a second similar lighting system 5500 without requiring a separate junction device, such as the junction box 5420 of FIG. 54. An advantage to the direct connector 5520 (without a junction box) in combination with the optically transmissive end portions 5508, is that the lighting systems 5500 can be placed end-to-end with other lighting systems 5500, without leaving any gaps, such as those that can appear where there are non-transmissive portions of housing, or where there needs to be room for a junction box. Gaps can produce undesirable optical properties, such as missing portions in a letter, number, or other image to be created by the lighting systems 5500. Eliminating the junction boxes also avoids very time-consuming installation problems, such as the need to put a separate box in the wall at each terminal between lighting system portions. The junction boxes also can force a gap between ends, interrupting the area of illumination in an undesirable way.

The connector 5520 may include a plurality of wires 5522. The wires 5522 may include, for example, wires for data, power and ground, which may be tapped in parallel fashion by each of the lighting systems 5500. In a given section of a lighting system 5500, there may be multiple addressable processors 102 and multiple addressable light sources 104A–104D. The wires 5522 may loop (inside the connector 5520) from lighting system 5500 to lighting system 5500, in a daisy-chain configuration, allowing a single central controller to control, via the data wire, a large number of lighting systems 5500, delivering each processor 102 instructions that are specified for its particular address (which is associated with the physical or geometric location of that processor 102 by one of various methods disclosed above). In an embodiment, the connector cable 5520 may be, for example, an Essex Royal 12/3 Type SJOOW (−40C) 300V cable.

Figure 56:
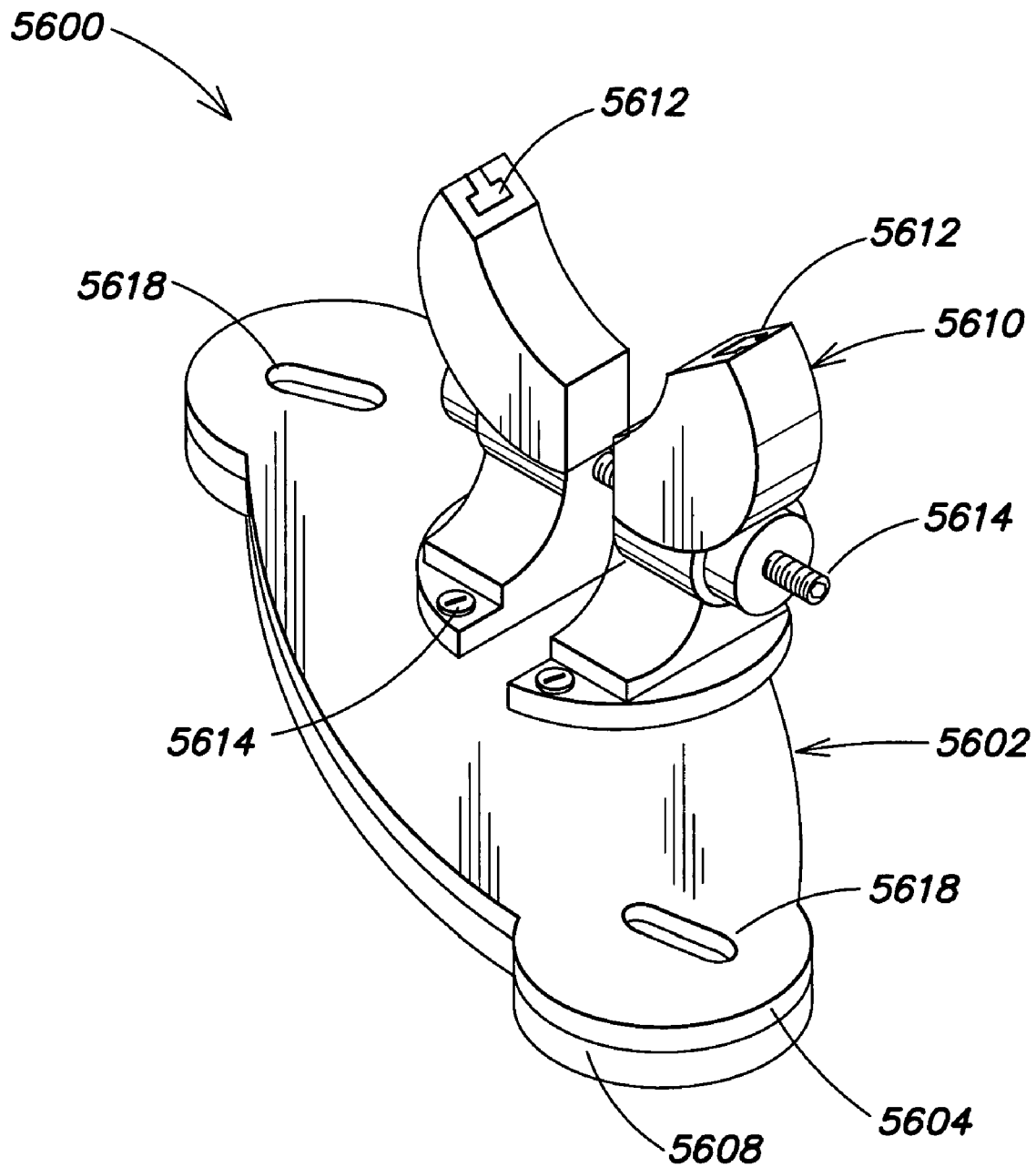
FIG. 56 illustrates a lighting system according to the principles of the present invention.

Referring to FIG. 56, the elimination of a need for a junction box by the provision of a connector 5520 means that rather than connecting each lighting system 5500 to a junction box in a wall, the lighting system 5500 can be disposed on a wall or other surface via a mounting system 5600. The mounting system 5600 may include a bracket 5602. The bracket 5602 may have a plurality of holes therethrough for mounting the mounting system 5600 on a substantially planar surface, such as with screws, toggle bolts, or similar fasteners. The bracket 5602, in an embodiment, may include a metal portion 5604 made of a metal such as aluminum and a non-metal portion made, for example, of rubber 5608. The rubber 5608 prevents the metal portion from contacting a metal wall or other surface, thereby avoiding electrical connection between the metal portions, which can promote oxidation.

The mounting system 5600 may also included a fastener 5610, such as a clamp. The clamp may have two jaws, or claws 5612, which in embodiments may be provided with rubber or other non-metal material, as well as metal portions, with the non-metal portions preventing oxidation when the claws 5612 come in contact with each other. The jaws 5612 may open and receive the lighting system 5500, allowing the user to conveniently snap in the lighting system 5500, then tighten the screw 5614 for permanent installation. The non-metal portions may also cushion the clamp for holding a lighting system 5500. The fastener 5610 may also include a screw 5614 for tightening the fastener 5600. In embodiments, the fastener 5610 may be movably, such as rotatably, disposed on the mounting system 5600, so that the bracket 5602 may be disposed at any angle relative to the fastener 5610, thus allowing the installer to angle a lighting system 5500 that is disposed on the mounting system 5600 at any desired angle, such as an angle that exposes holes 5618 for convenient attachment of the mounting system 5600 to a surface, or at an angle that hides the bracket 5604 from the viewer, by locating it behind the lighting system 5500.

Figure 57:
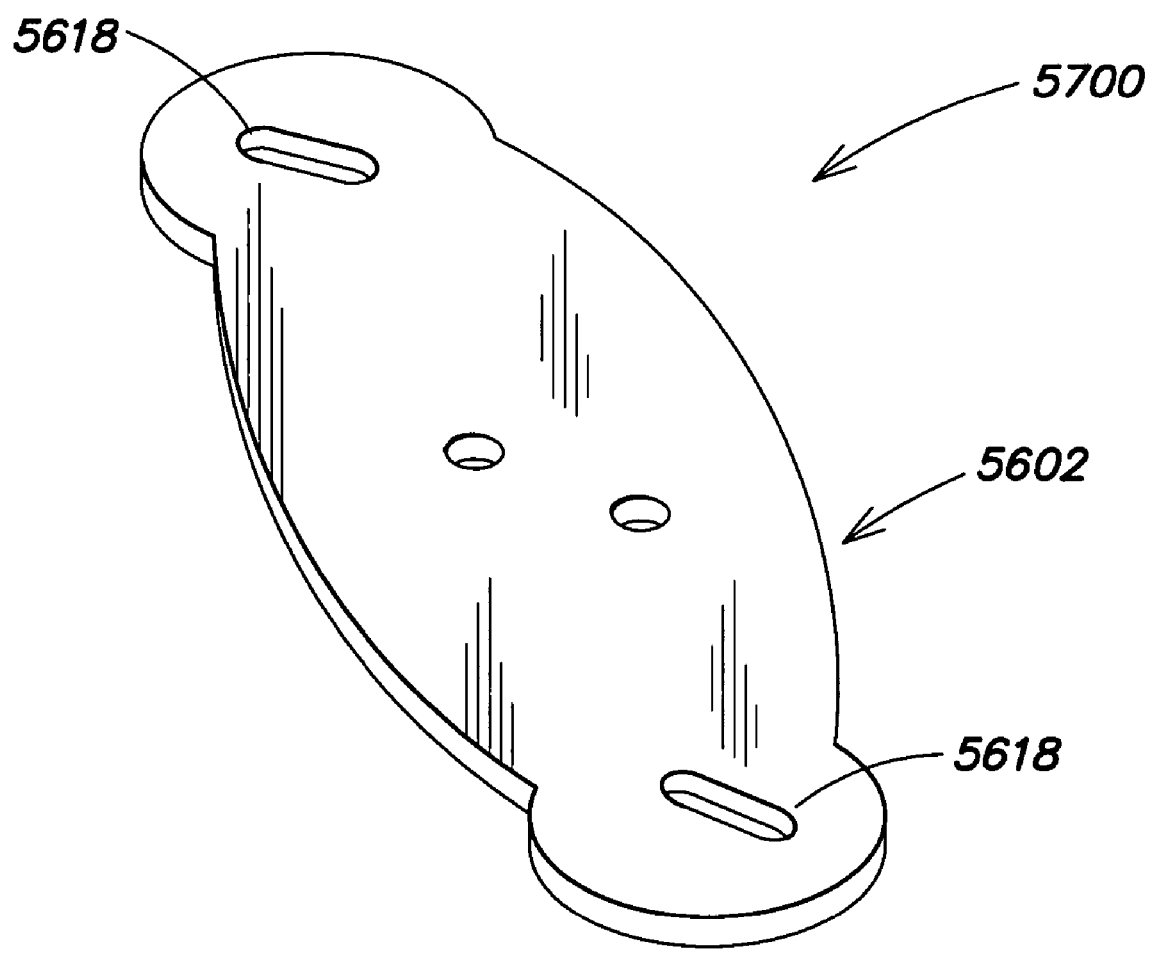
FIG. 57 illustrates a bracket according to the principles of the present invention.

FIG. 57 provides a top view 5700 of a bracket 5602 with holes 5618.

Figure 58:
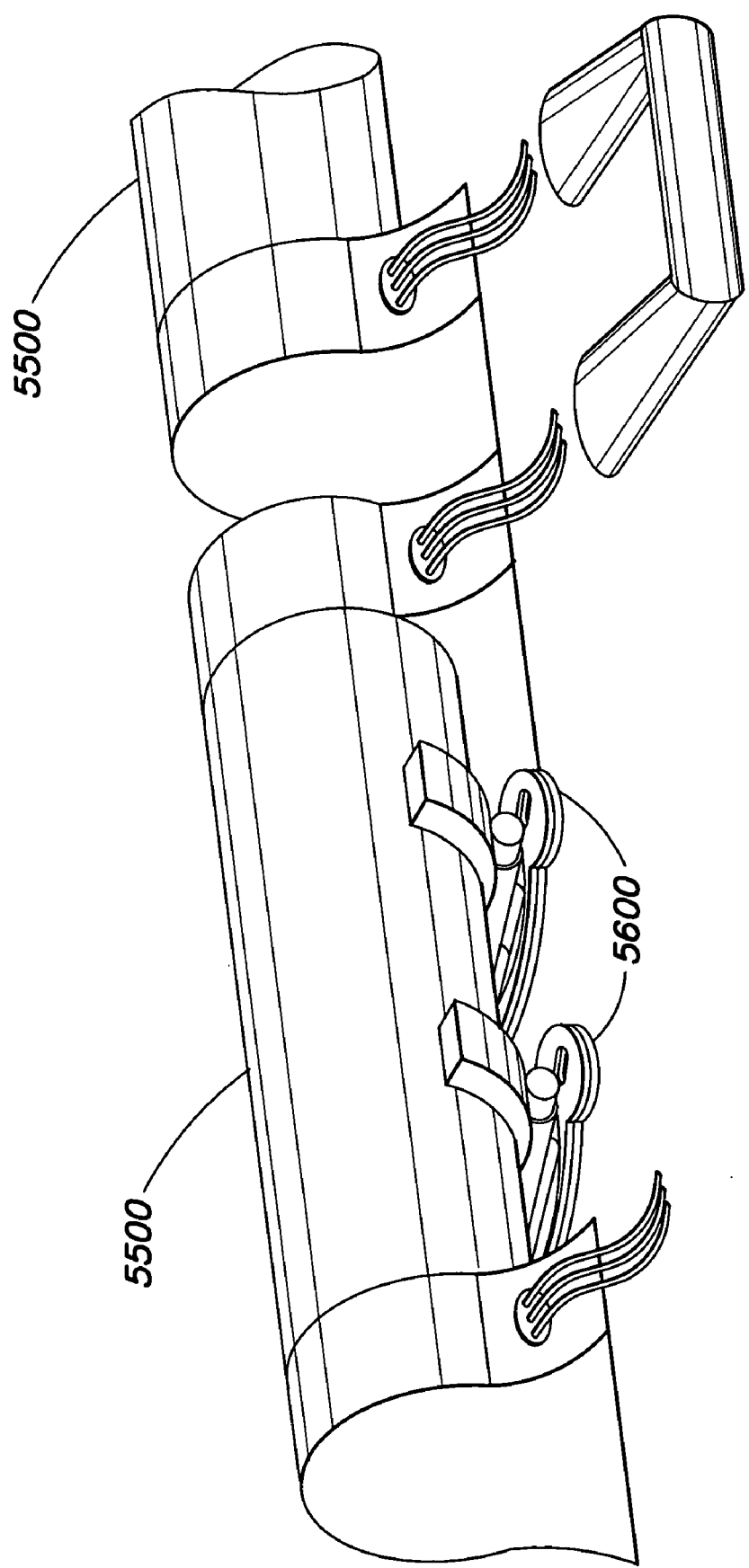
FIG. 58 illustrates a lighting system according to the principles of the present invention.

FIG. 58 provides a view of a lighting system 5500 disposed in a plurality of mounting systems 5600 on a planar surface. With the mounting systems 5600, a plurality of lighting systems 5500 can be disposed in any configuration on a surface, thus providing any geometric pattern of lighting systems 5500, such as any pattern one could produce with neon or similar lights. However, with the lighting units 100 and the processor 102, each lighting unit 100 can be controlled to produce specific illumination effects, with any color, intensity or temporal effect desired by the user. By controlling multiple such lighting systems 5500 together, an entire wall can be illuminated as desired by the user with whatever effects the user desires.

Figure 59:
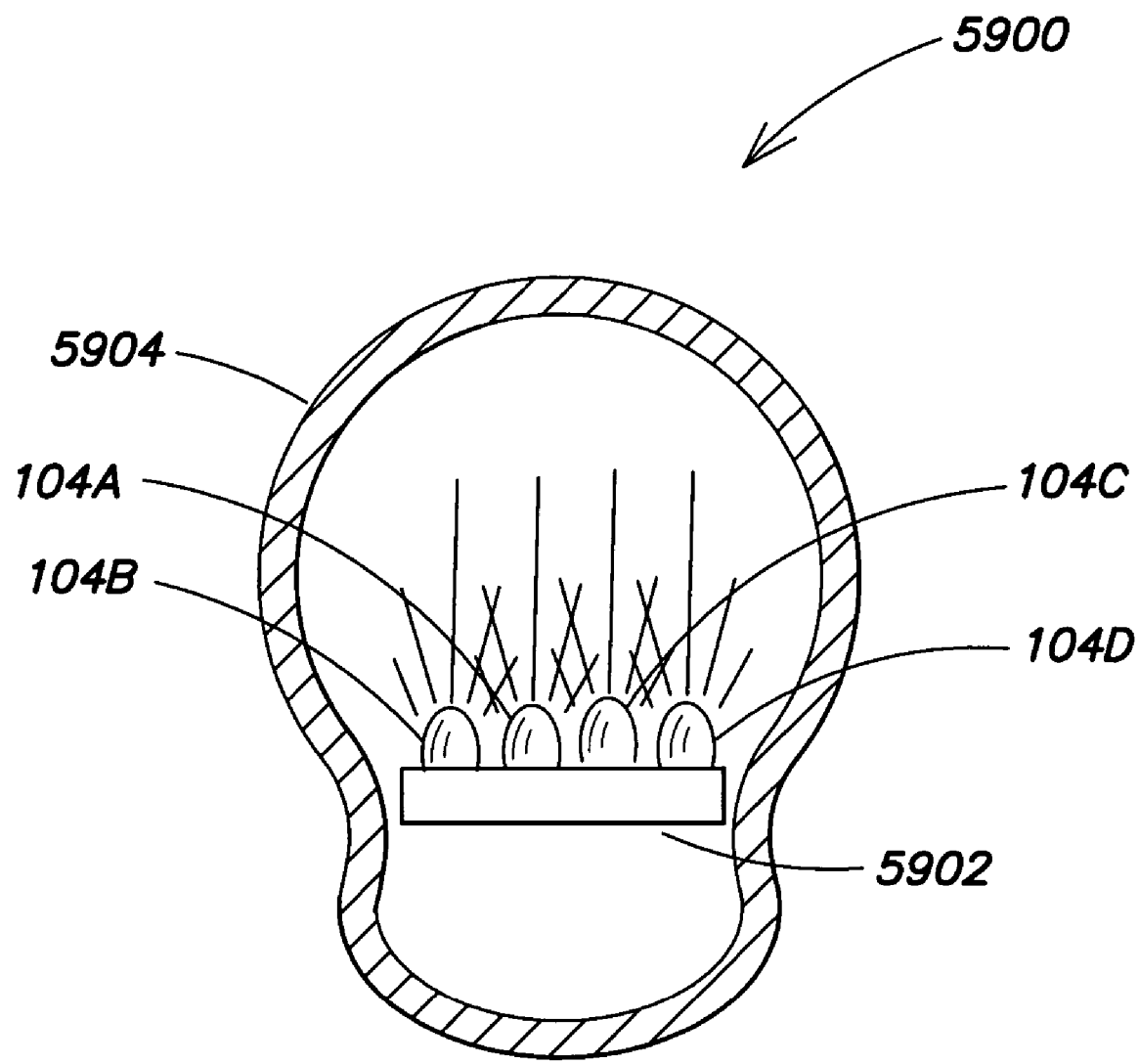
FIG. 59 illustrates a lighting system including an optic according to the principles of the present invention.

FIG. 59 illustrates a lighting system 5900 according to the principles of the present invention. The lighting system 5900 may include an optic 5904 along with an internally mounted circuit board 5902 and light sources 104A–104D, such as LED(s). In an embodiment, the optic 5904 may be an extruded polycarbonate optic that is formed to enclose the internal components. The extruded optic 5904 may have open ends that may be capped to form a fully encapsulating optic. In an embodiment, such a fully enclosed optic may house a lighting unit 100 or other illumination system such that the optic 5904 is lit by the illumination system. For example, LEDs 104A–104D may be mounted on circuit board 5902 and additionally the system may also include a microprocessor 102 for controlling the light sources 104A–104D.

Referring again to the embodiment in FIG. 59, the light sources 104A–104D may be arranged to optimize the light distribution on the optic 5904 to create the appearance of an evenly lit optic 5904. For example, a light sources 104A may be arranged such that a significant portion of the light emitted from the light source 104A hits a curved portion of the optic 5904. The beam angle from the light source 104A (i.e. projected angle of the light emitted from the light source 104A) may be adapted to project a significant portion of the light hits a curved surface to optimize the uniformity of the lighting of the optic 5904. In an embodiment, the light sources 104A–104D may be arranged in rows. The system may include, for example, a row of LEDs 104A–104D running through a length of the optic 5904 and another row of LEDs 104E–104F running the length of the optic 5904. The two rows of LEDs 104A–D and 104E–F may substantially parallel each other down an axis of the optic 5904. This arrangement may be useful in increasing the width of an evenly illuminated optic by effectively increasing the beam angle of the light projected by the LEDs. In another embodiment, there may be more than two rows of LEDs and in another embodiment, there may be only one row of LEDs, depending on the desired effect. In an embodiment, the light sources 104A–D may be mounted on a platform 5902 (e.g. a circuit board).

Figure 60:
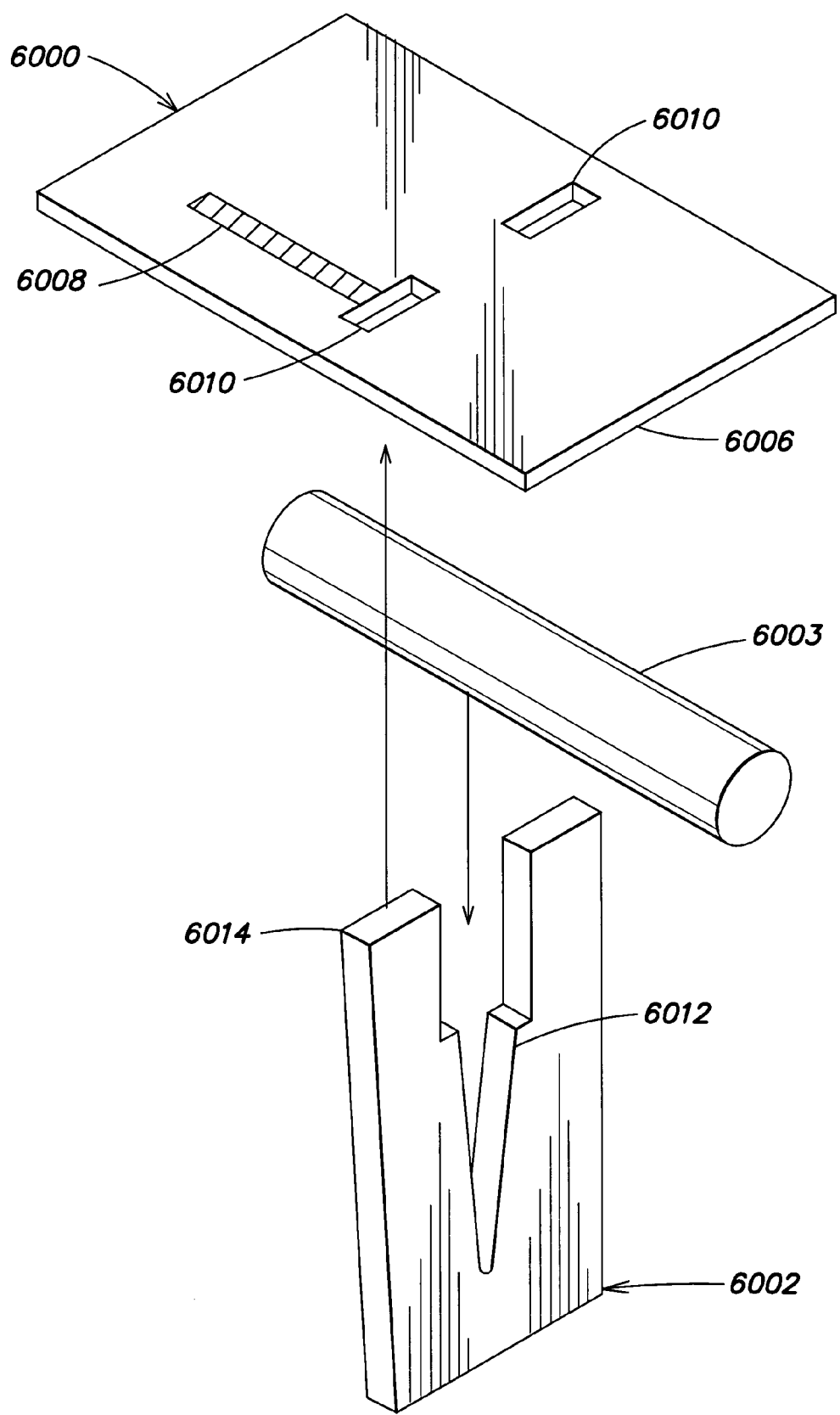
FIG. 60 illustrates a circuit assembly according to the principles of the present invention.

Another aspect of the present invention is a manufacturing method for assembling systems. FIG. 60 illustrates an embodiment of such a system. The assembly of a circuit board to power, data or other system tends to be a difficult task. In an embodiment, a lighting system may comprise a plurality of circuit boards that tap into power and or data lines. For example, a plurality of circuit boards 6000, populated with LEDs and a processor may be adapted to tap into a data line, for instructions, and power lines, to power each of the assemblies. The plurality of circuit boards may be arranged in an optic (not shown) (e.g. the optic may be eight feet long and it may include eight one foot addressable sections wherein each section includes LEDs and a processor). In an embodiment, the platform 6006 (e.g. circuit board) may have an attachment portion (e.g. holes 6010). The circuit board may also have conductive traces 6008 near the attachment portion. The assembly may also have an attachment device 6002. The attachment device 6002 may have an insulation displacement portion 6012 designed to pierce the insulation of a wire 6003 and provide electrical contact between the attachment device 6002 and a conductive layer of the wire 6003. The attachment device 6002 may also have an attachment end 6014 and this end 6014 may be passed through one of the holes 6010. Once passed through the hole 6014 an electrically conductive material may be used to mechanically and electrically associate the attachment device 6002 to the circuit board (e.g. solder may be used to connect an electrically conductive attachment device 6002 to the conductive trace 6008 and the solder may also be used to mechanically hold the device 6002 to the board 6006).

Figure 61:
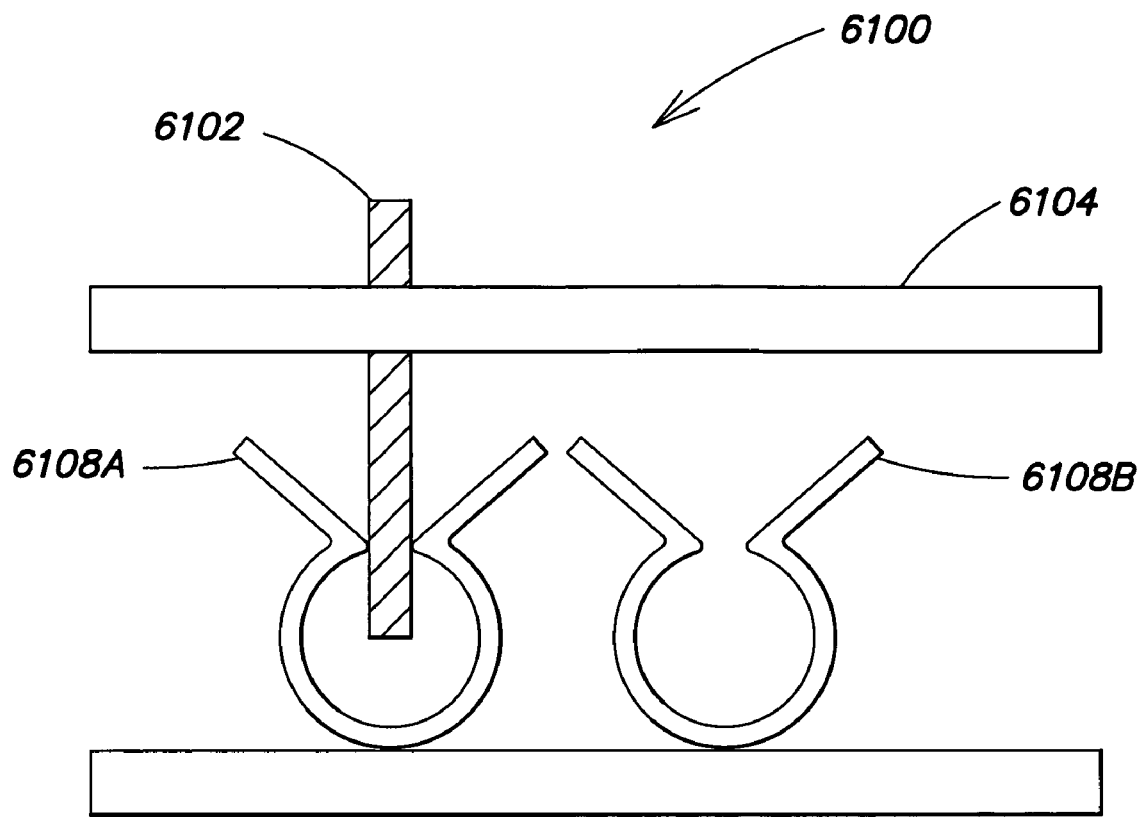
FIG. 61 illustrates an optic with end cap according to the principles of the present invention.

FIG. 61 illustrates another system 6100 according to the principles of the present invention. The illustrated system 6100 also relates to attaching a platform to data and or power. For example, a circuit board 6104 may be attached to an electrical conductor and or mechanical system 6108 through a connection device 6102. For example, an electrical conductor 6108 may be formed of an electrically conductive material (e.g. copper) and formed with spring tension such that it opens as the connection device 6102 is inserted and applies closing pressure on the device 6102 such that it provides both electrical contact and mechanical hold.

Figure 62:
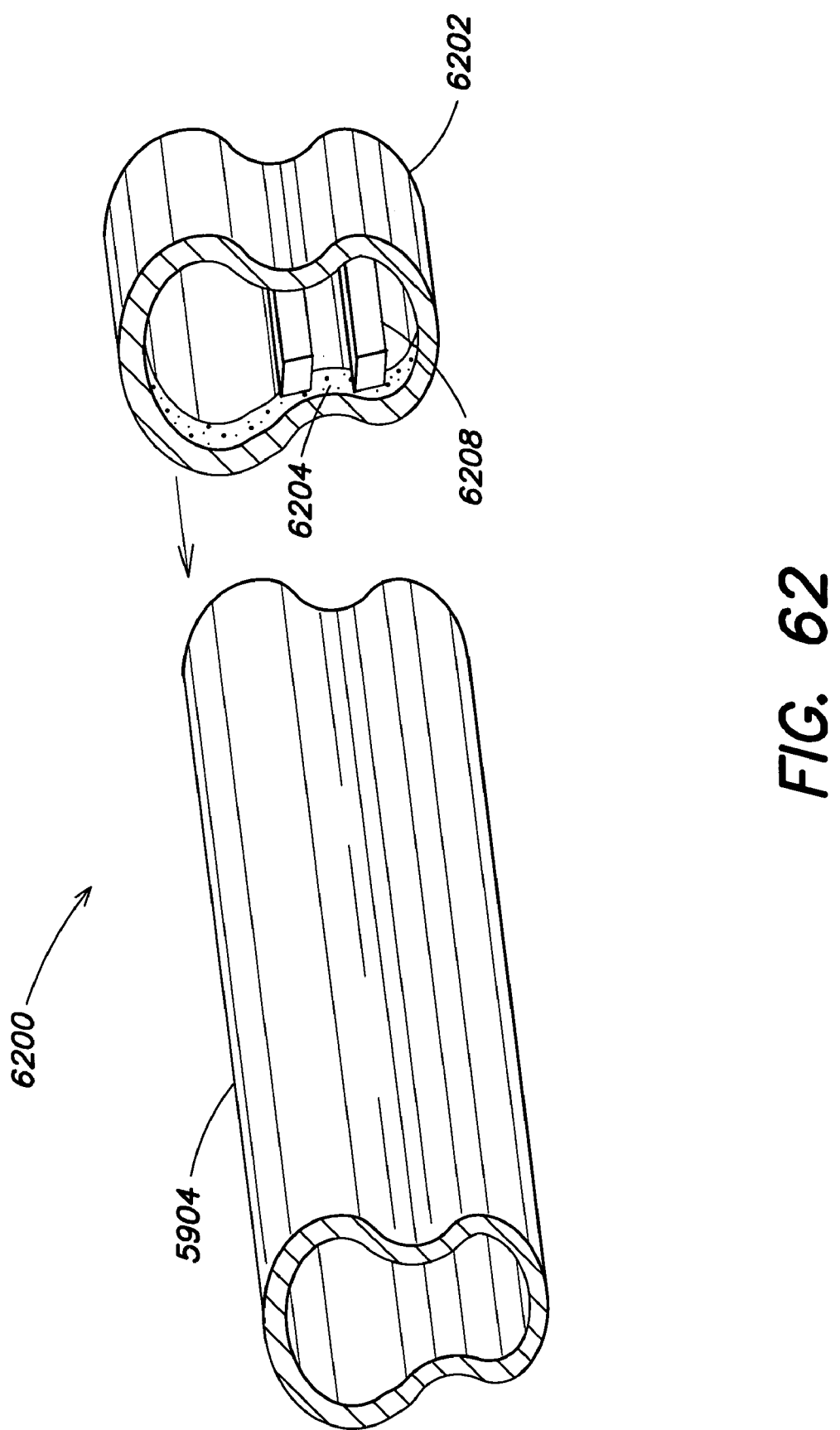
FIG. 62 illustrates an end cap with a purge vent according to the principles of the present invention.

Another aspect of the present invention relates to a lighting assembly technique. FIG. 62 illustrates a lighting assembly 6200 according to the principles of the present invention. The lighting assembly 6200 includes an optic 5904, similar to optics in the other described embodiments, along with an end cap 6202. The end cap 6202 may be adapted to slip over the optic 5904 in an overlap region

6204. The overlap area may seal the optic 5904 to the end cap 6202 with adhesive or other sealing technique or it may simply form a slip fit. The end cap 6202 may also be transparent or translucent to allow light to pass through the end cap 6202. This may be useful in providing an elongated optic that transmit light to and possibly from the end. The end cap 6202 may also include tabs 6208. The tabs 6208 may be arranged to capture an light source 104 (e.g. a circuit board populated with LEDs). This arrangement may be useful in capturing a circuit board (not shown in this illustration) at the ends while allowing the middle portion (i.e. a portion in the optic 5904) to remain relatively unconstrained.

Figure 63:
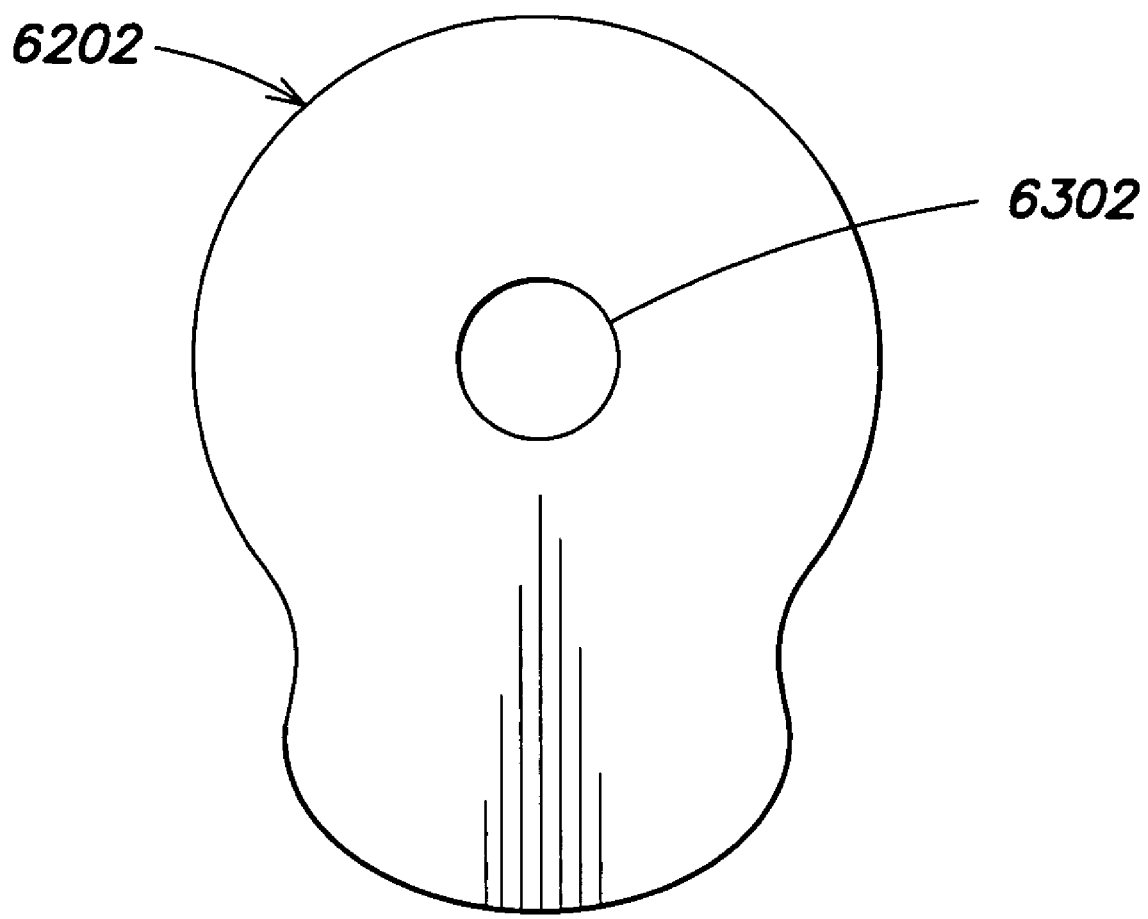
FIG. 63 illustrates a lighting system assembly according to the principles of the present invention.

FIG. 63 illustrates an end view of an end cap 6202 according to the principles of the present invention. The end of the end cap 6202 may include a gas exchange portion 6302. The gas exchange portion 6302 may be used to pass gas into or out of a sealed optic 5904 for example. In an embodiment, a method of cleaning or drying the atmosphere of a lighting assembly may include providing an optic 5904 with a sealed end cap 6202 on either end of the optic. Each end cap 6202 may include a gas exchange portion 6302 where one is used to pass a dry gas (e.g. nitrogen) into the system while the other is used to pull gas from the tube. After a period of purging the system, the vacuum end may be sealed followed by sealing the gas filling end. This may be useful in providing a lighting assembly with a dry internal atmosphere to prevent condensation or other ill effects caused by higher levels of water content.

Figure 64:
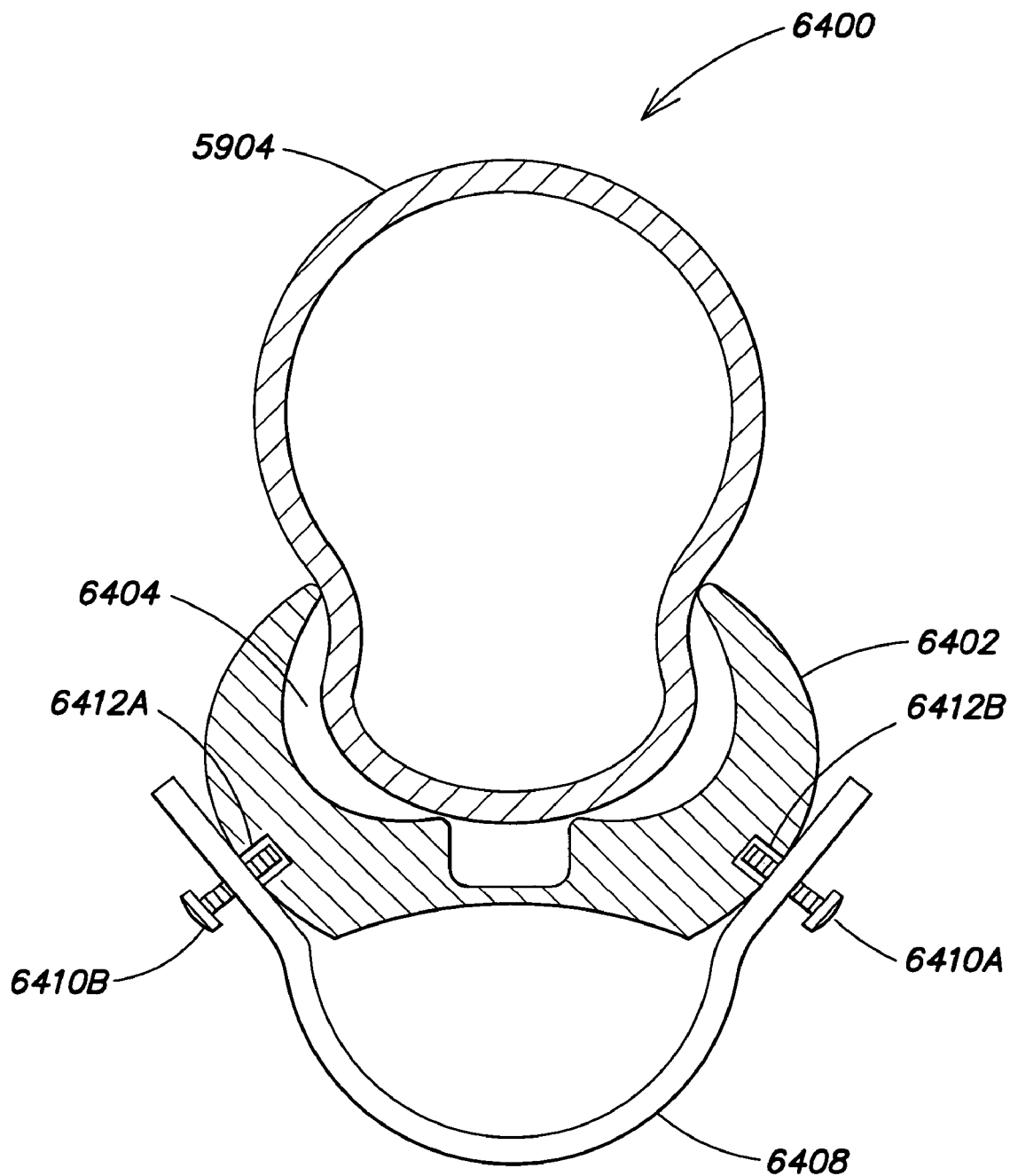
FIG. 64 illustrates an end cap and expansion system according to the principles of the present invention.

FIG. 64 illustrates a cross sectional view of a lighting assembly 6400. The lighting assembly 6400 may include an optic 5904 wherein the optic is made of a translucent material (e.g. polycarbonate). The lighting assembly 6400 may also include a ridged frame 6402 (e.g. aluminum). The ridged frame 6402 may be adapted to capture the lower lobe of the optic 5904 to provide overall system rigidity. In an embodiment, a clamping mechanism (e.g. a clamp as illustrated in FIG. 56) may be adapted to hold the ridged frame 6402. The ridged frame 6402 or the optic 5904 may be further adapted with a pass through section 6404. The pass through section 6404 may be adapted to pass liquid (e.g. water) or gas such that it does not get trapped between the ridged frame 6402 and the optic 5904. The ridged frame 6402 may also be adapted to allow for thermal expansion of the different materials. In an embodiment, the ridged frame 6402 may be adapted to include a securing fastener 6408. The securing fastener 6408 may be attached with other fasteners 6410 (e.g. screws) into holes or channels 6412. The securing fastener may be used to provide a safety feature such as an additional method of securing the lighting assembly to a surface (e.g. building). For example, the lighting assembly may be fastened to a building's exterior surface with a clamping mechanism (e.g. a clamp as illustrated in FIG. 56) and a safety cable may also be used to connect the lighting assembly to a wall in case the primary connection (e.g. the clamp) fails.

Figure 65:
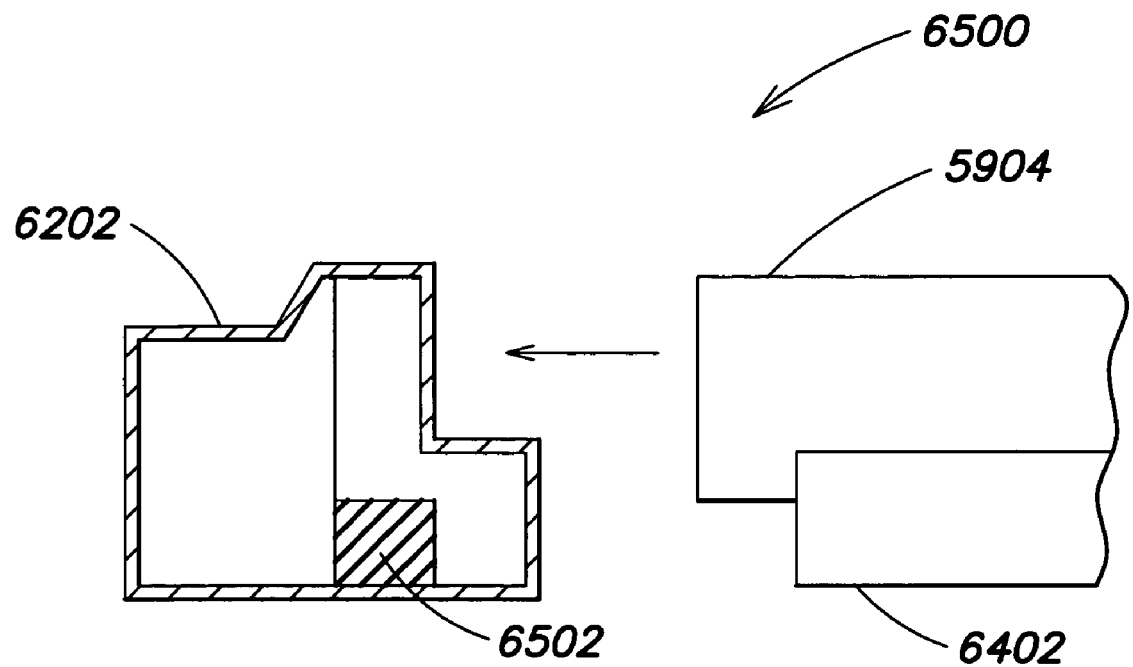
FIG. 65 illustrates a wiring system according to the principles of the present invention.

FIG. 65 illustrates a lighting assembly 6500 according to the principles of the present invention. The lighting assembly 6500 may include an optic 5904 along with a ridged frame 6402. As illustrated, the ridged frame 6402 may not extend to the end of the optic 5904. This construction may be adapted to allow the sealing of an end cap 6202 on the end of the optic 5904 while also allowing the inclusion of an expansion component 6502. The expansion component 6505 may be formed of rubber with a relatively soft material for example. In an embodiment, the expansion component 6502 may be used to constrain the movement of the ridged frame 6402 (i.e. from traveling on the optic 5904). While constraining the ridged frame, the expansion component 6502 may be soft enough to accommodate the thermal expansion mismatch between the ridged frame material and the optic material such that the end cap does not receive significant stress as the lighting assembly is exposed to thermal cycles.

Figure 66:
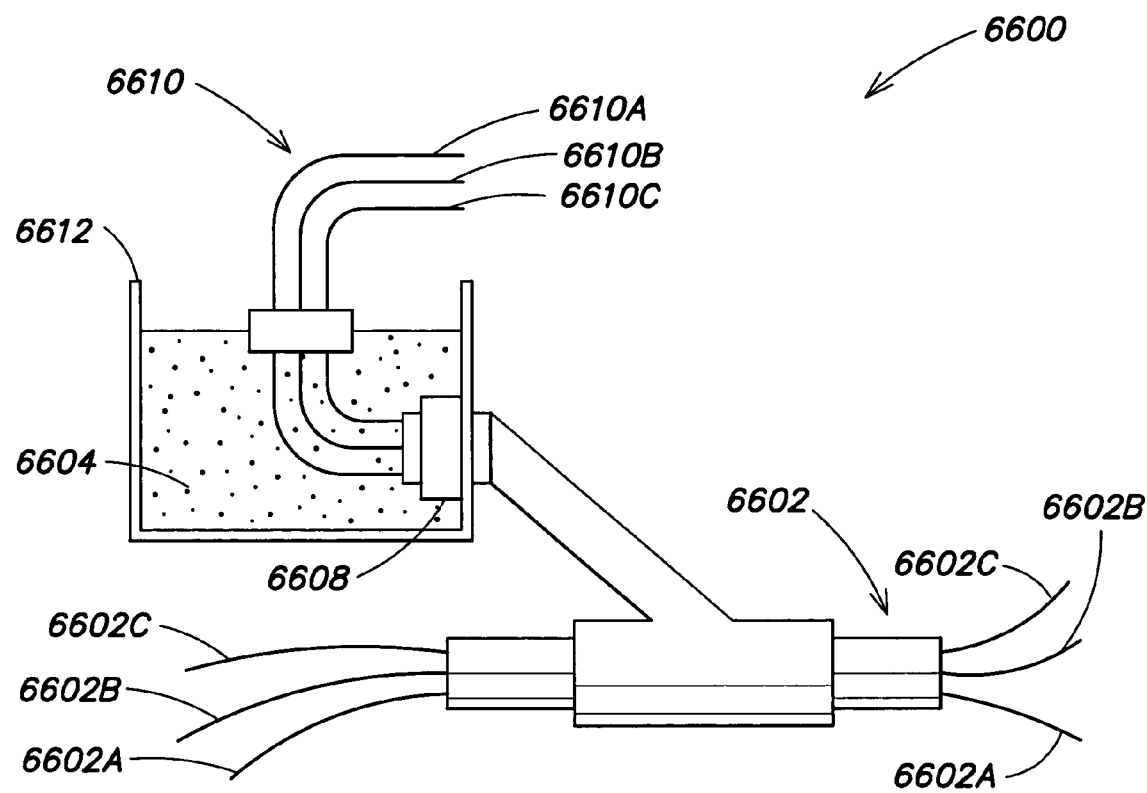
FIG. 66 illustrates a circuit assembly according to the principles of the present invention.

Another embodiment of the present invention relates to the electrical system 6600 of a lighting assembly. Many lighting assemblies may be associated through a common electrical system. The electrical system may include data and or power transmission systems. For example, the electrical system of FIG. 66 includes both power and data on a three-wire system. The electrical bus 6602 may include wires with greater current carrying capacity than the electrical bus 6610 because the bus 6610 needs carry current for a more limited number of lighting assemblies (e.g. one) while the bus 6602 supplies current to many more lighting assemblies. The buses may be broken up into three segments, 6610A, B, and C and 6602A, B, and C and the two busses may be electrically associated such that the electrical path of a respective lettered wire passes to the like identified wire of the other bus. The electrical system 6600 may be passed into a lighting assembly enclosure 6612. The wires may be passed into the enclosure 6612 and clamped using a clamp or other fastener 6608. This clamping device 6608 may be used to provide strain relief such that the outer assembly being pulled does not strain the wires. The enclosure 6612 may also be filled with a filling material 6604 (e.g. epoxy or resin) to waterproof the assembly.

Figure 67:
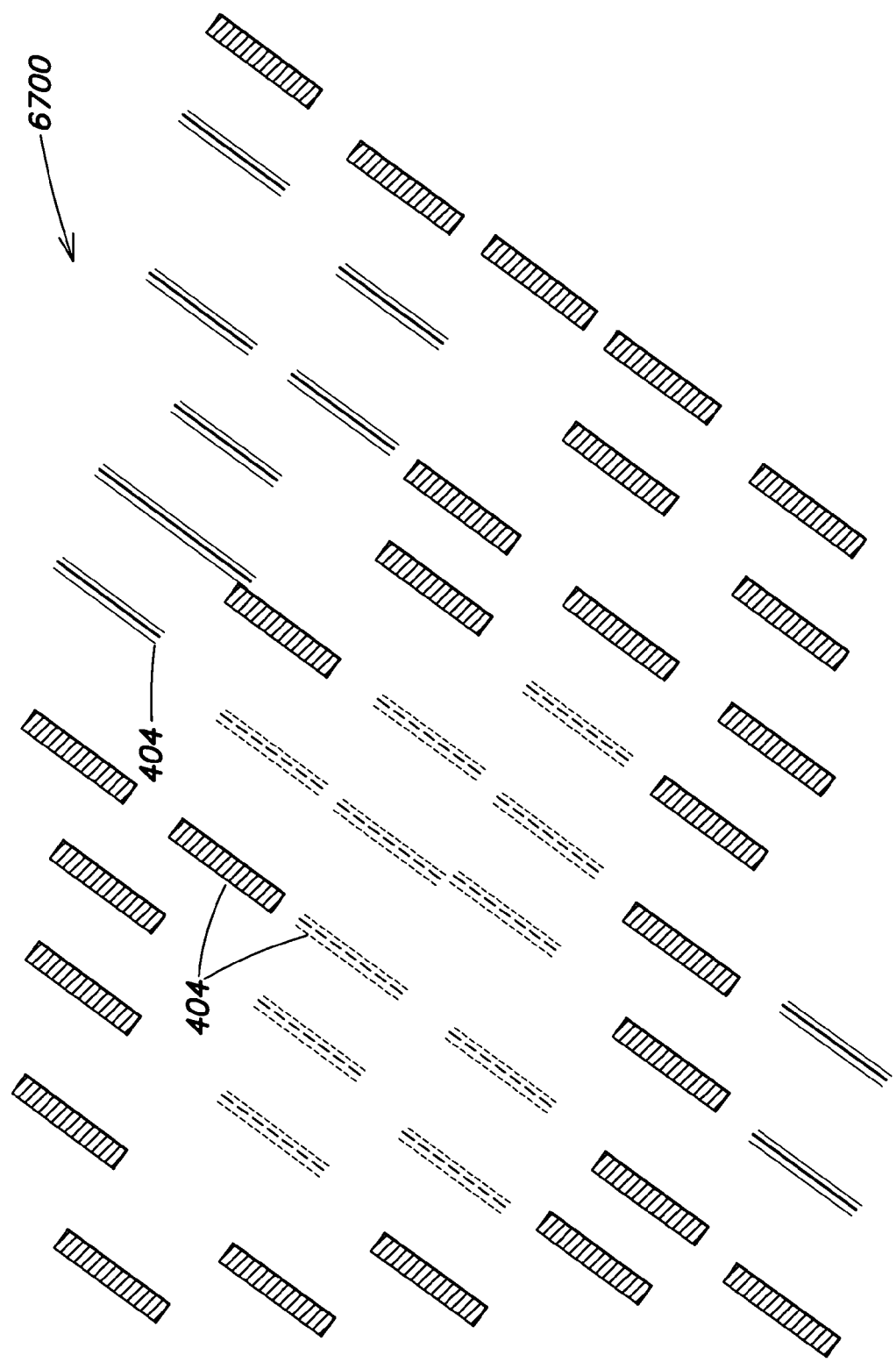
FIG. 67 depicts an array of linear lighting units that can display different effects.

FIG. 67 depicts an array 6700 of linear lighting units 404 that can be programmed to display different colors and intensities of light along varying timelines in accordance with the principles of the invention. The array 6700 consists of linear lighting units 404 disposed so that effects can travel through the array 6700 by propagating a given color and intensity along different elements, such as downward and to the right in FIG. 67. The individual control of various linear lighting units 404, using control, addressing and authoring techniques described above, allow creation of shows, such as color chasing shows, rainbows, solid color patterns, color fades, motion effects, explosion effects, graphics, logos, letters, numbers, symbols, and the like.

Figure 68:
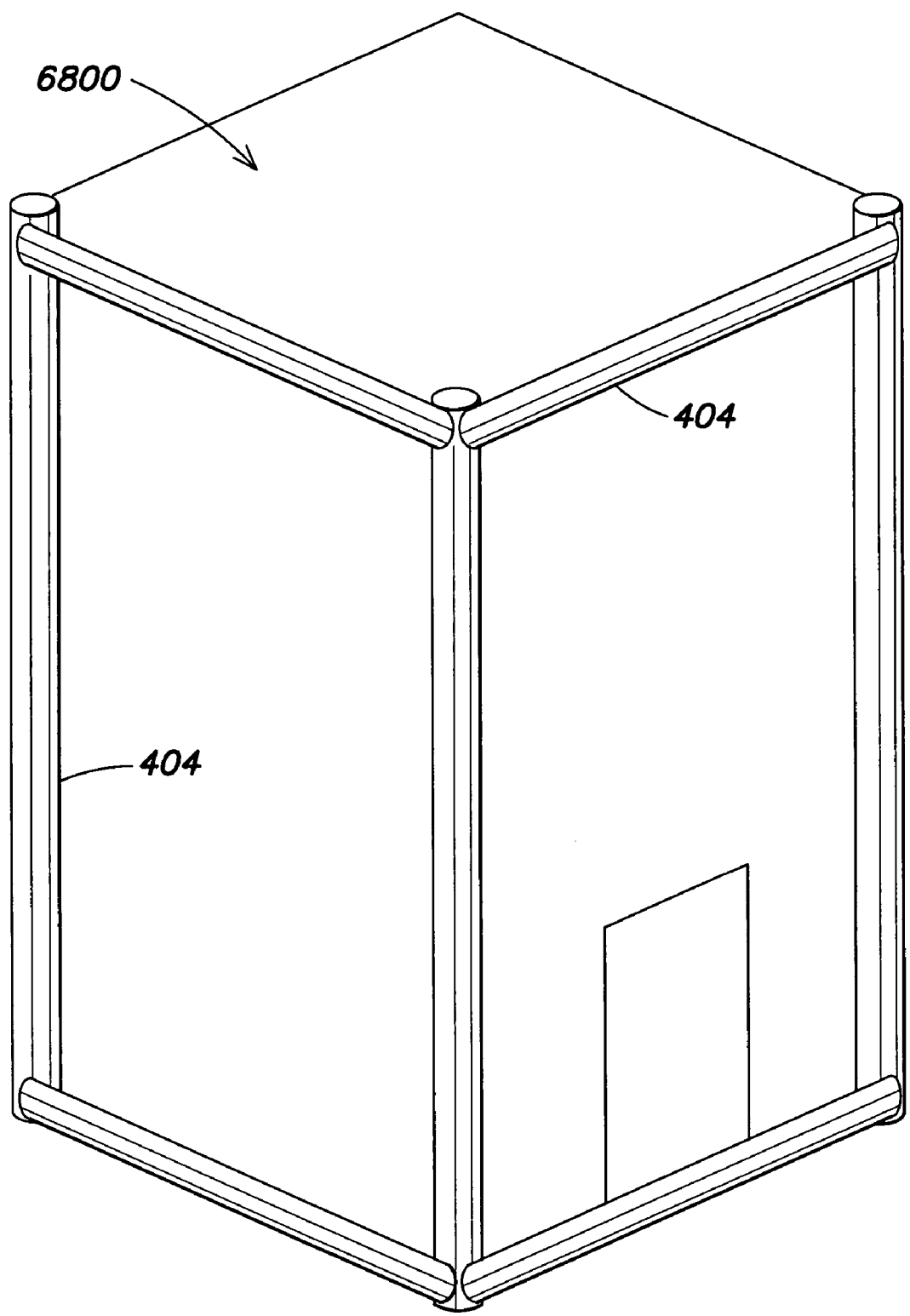
FIG. 68 depicts a building with a configuration of lights.

FIG. 68 shows a plurality of linear lighting units 404 disposed along the exterior of a building 6800. The linear lighting units 404 could outline the building, such as along all of the corners, around windows, around doors, along a roofline, or the like. Of course, the units need not be straight lines, but could include other shapes that highlight features of the architecture of the building. With power factor control, it is possible to provide very long lines of linear lighting units 404 with a small number of power supplies, making such arrangements practical. Effects can display on large portions of the exterior of any building 6800, such as an office building, bank, house, school, government building, bridge, or other structure. Many effects can be provided, including moving lights, symbols, and the like.

Figure 69:
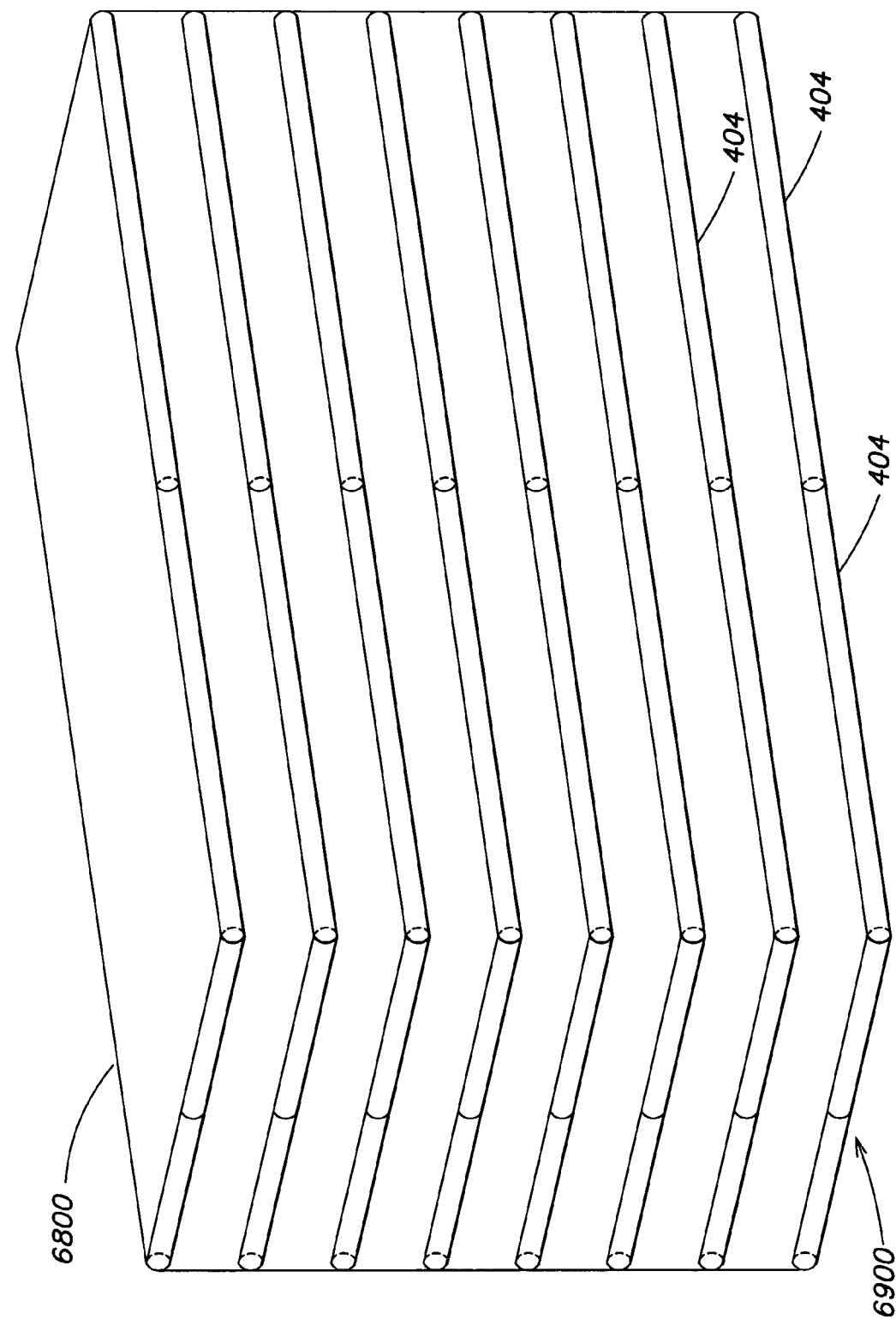
FIG. 69 depicts an array of linear lighting units substantially covering a building exterior.

FIG. 69 shows a building 6800 with an array 6900 of linear lighting units 404 covering most of the exterior of the building 6800. The linear lighting units 404 are sufficiently numerous to allow a wide range of displays and effects. For example, the lighting units 404 can be viewed, at a distance, as moving elements in a show, similar to pixels. However, in contrast to a video display, the elements can be distributed in any geometry, such as wrapping around the building 6800, and the pixels can be programmed by an authoring technique such as described above. In embodiments, a computer game, such as Pong, can be authored to be played on the array 6900, with the elements being controlled on a computer screen, and the lights of the array 6900 reflecting the objects in the game.

Figure 70:
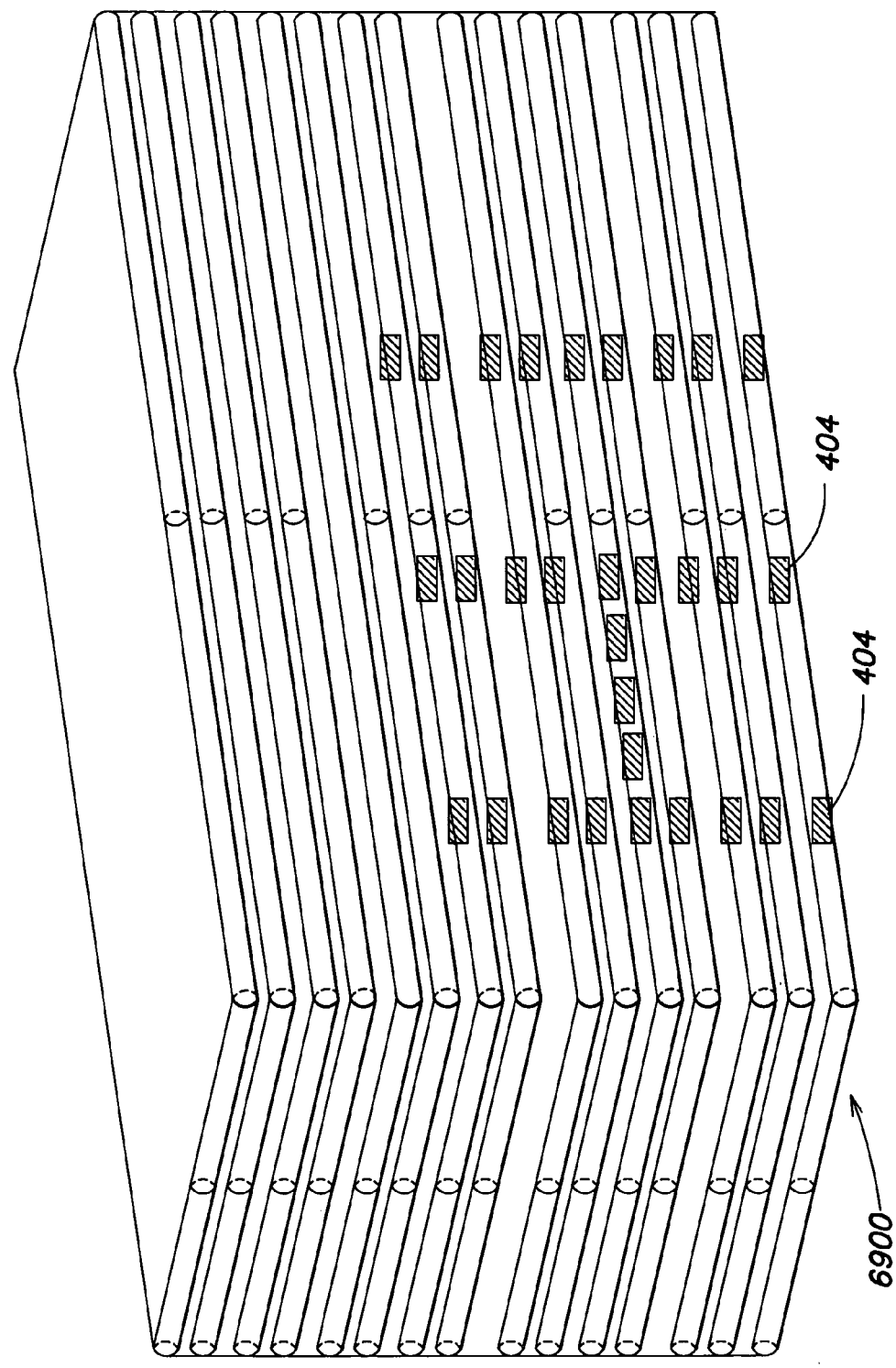
FIG. 70 depicts display of a word on an array of linear lighting units on the exterior of a building.

FIG. 70 shows the array 6900 with certain linear lighting elements 404 lit to show letters of a word. Any range of letters, numbers, symbols, logos, brands, pictures, or the like can be shown by lighting appropriate linear lighting units 404 in the array 6900. Thus, the array 6900 can form a sign to deliver information or show a brand for any signage purpose.

Figure 71:
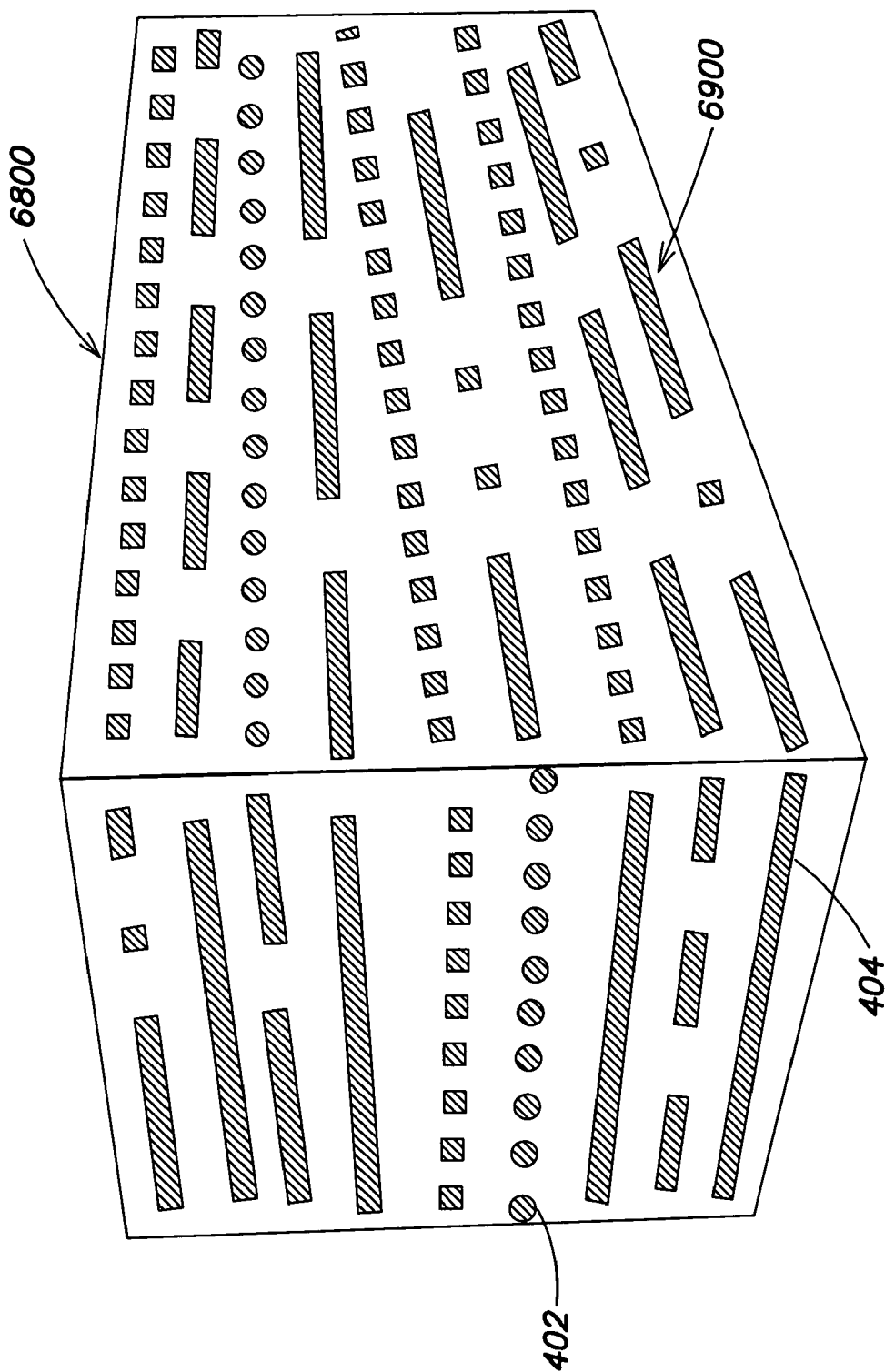
FIG. 71 depicts an array of lighting units of different configurations for producing a varied display on the exterior of a building.

FIG. 71 shows an array 6900 on a building 6800, where the array consists of a mixture of linear lighting units 404 and lighting units 100 of other configurations, such as circular lighting units 402. A mixture of lighting units 6900 can be lit with varying "on" and "off" states, colors, and intensities, to produce a wide range of different shows and effects.

Figure 72:
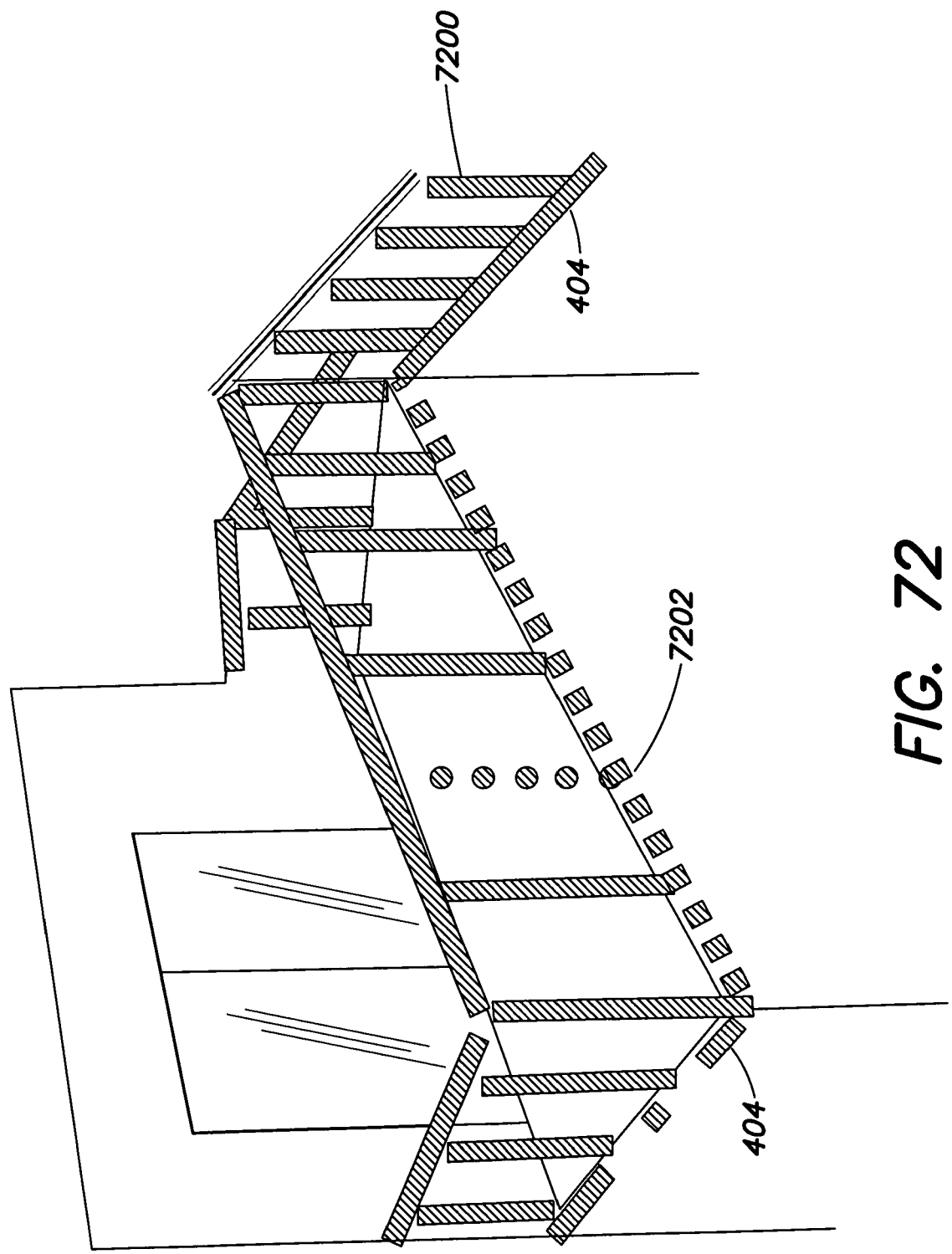
FIG. 72 depicts a stairway and deck lit by linear lighting units.

FIG. 72 shows a stairway 7200 leading up to a deck 7202. Linear lighting units 404 light the rails of the stairway 7200 and deck 7202. Different lighting units 404 can show different colors and intensities, producing unique deck lighting. Similar configurations can be provided to outline or display not only decks and stairways, but other architectural features, such as doors, windows, rooflines, gazebos, jungle gyms, swing sets, slides, tree houses, club houses, garages, sheds, pools, spas, furniture, umbrellas, counters, cabinets, ponds, walkways, trees, fences, light poles, statues, vehicles, automobiles, boats, masts, sails, airplanes, wings, fountains, waterfalls, and other objects and features.

Figure 73:
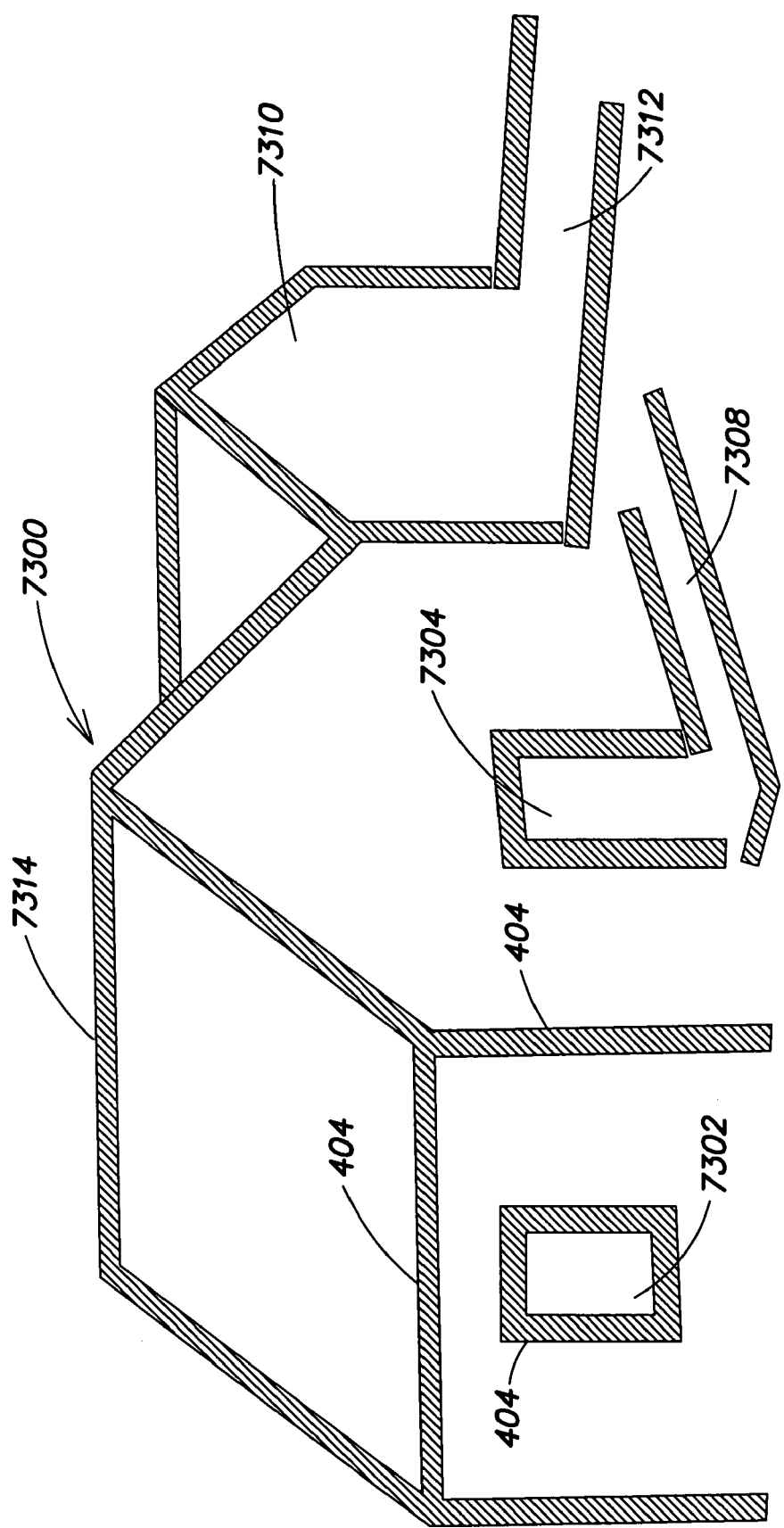
FIG. 73 depicts a house lit by a configuration of linear lighting units.

FIG. 73 shows a house 7300 with various features highlighted with linear lighting units 404, each of which can display different colors and intensities over any time line to produce striking effects. The linear lighting units 404 outline a window 7302, door 7304, walkway 7308, garage 7310, driveway 7312 and roofline 7314. Any other features of a building, whether a home, commercial building, or other structure, can be highlighted with a configuration of linear lighting units 404 or lighting units of other shapes, such as circular 402, curvilinear 408, branched 410 or bent 412 lighting units.

Figure 74:
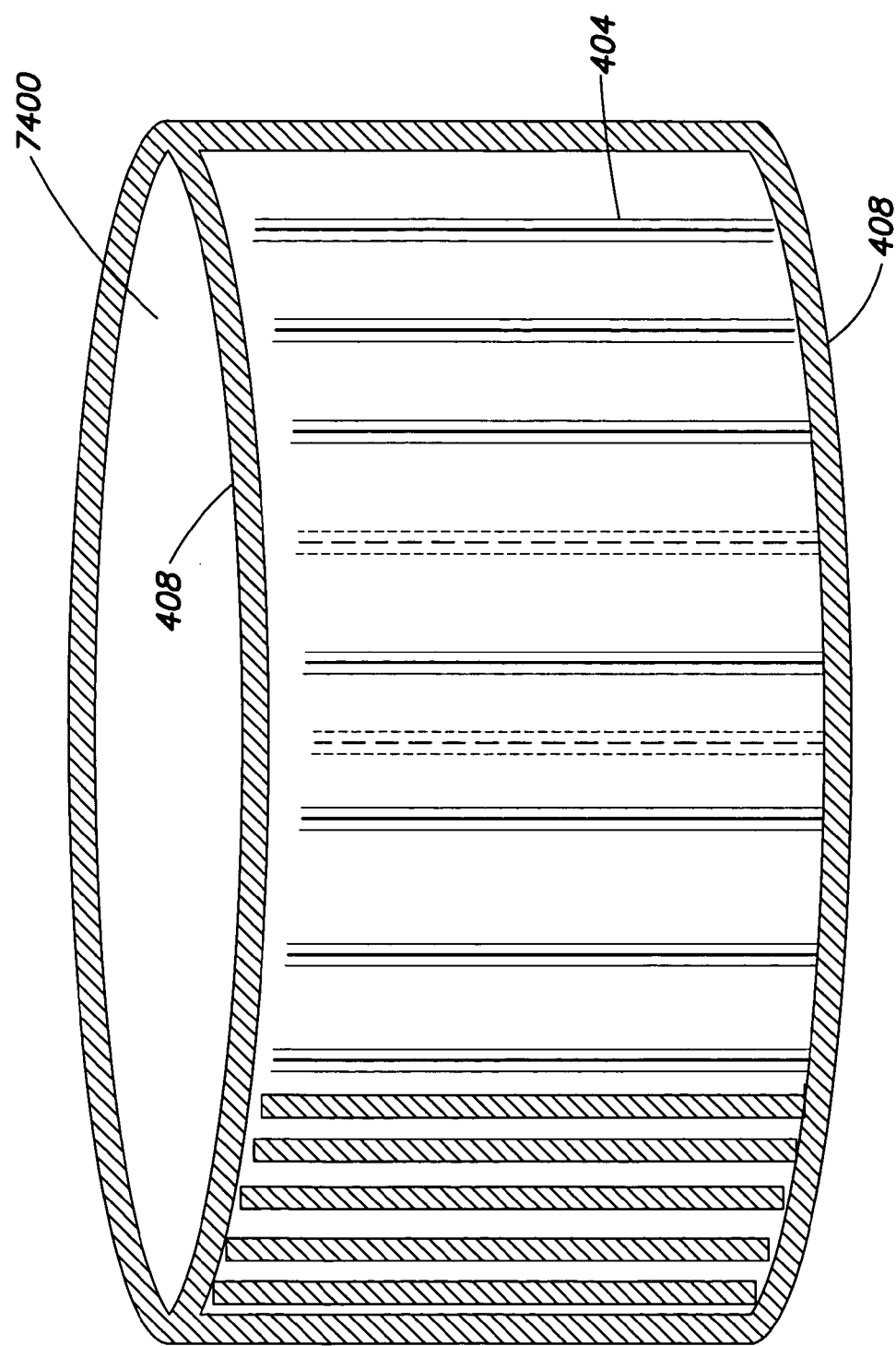
FIG. 74 depicts a substantially cylindrical configuration of lighting units for producing a display.

FIG. 74 shows a lighting configuration 7400 suitable for a substantially cylindrical object, such as an above ground pool, spa, tub, trampoline, or circular room or building. The configuration 7400 includes curved lighting units 408 and vertical linear lighting units 404, each of which can be addressed, controlled and authored to produce varying lighting effects as described herein.

Figure 75:
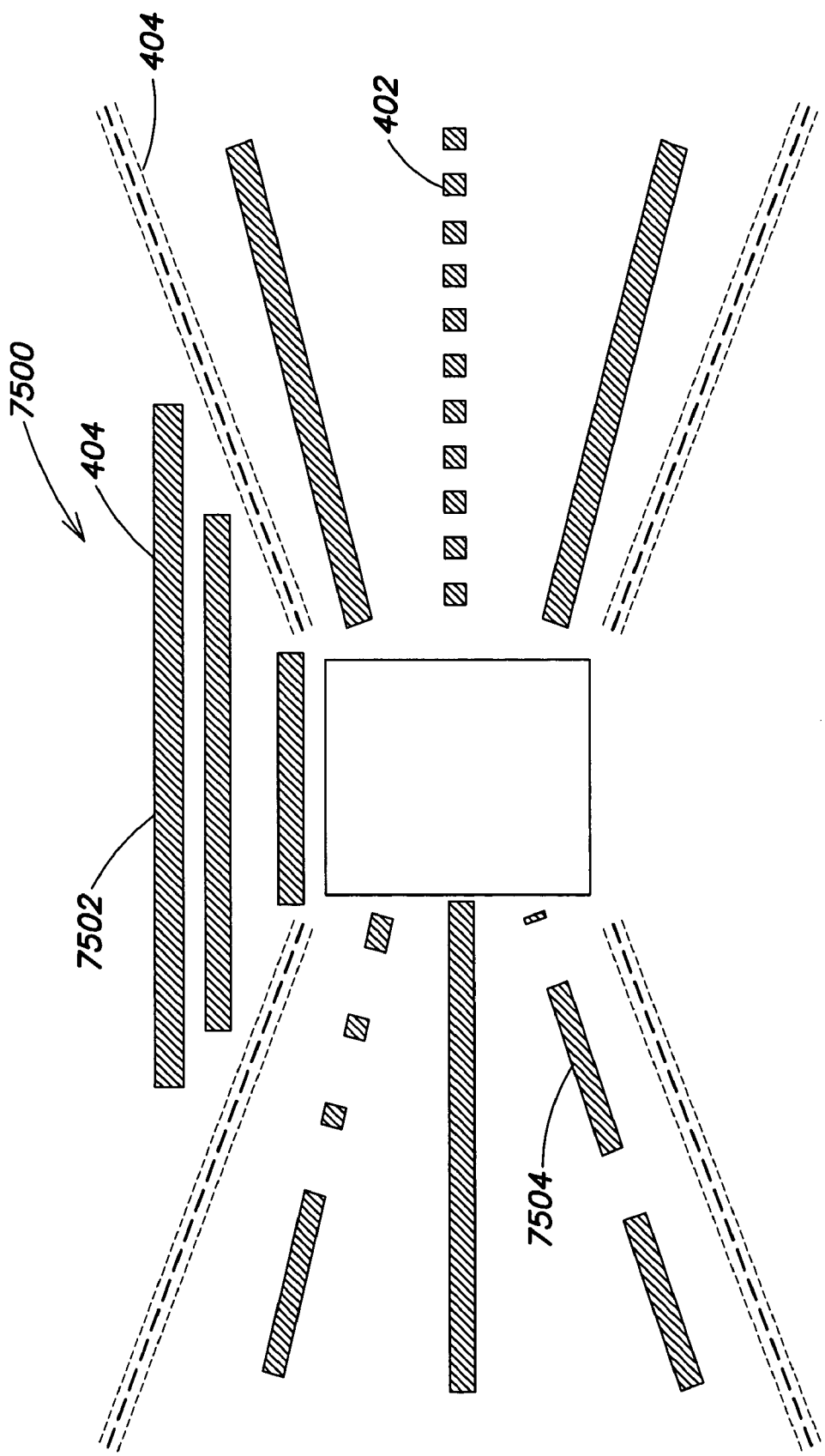
FIG. 75 depicts a corridor with lighting units in a configuration substantially covering the ceiling and walls of the corridor.

FIG. 75 shows a configuration 7500 with ceiling lights 7502 and wall lights 7504, including linear lighting units 404 and point source lighting units 402. Any mix of units could be supplied, to produce a wide range of effects in an architectural space, such as a hallway, corridor, airport terminal, tunnel, cylindrical tunnel, water slide tunnel, cave, entryway, vestibule, walkway, subway station, or similar environment.

Figure 76:
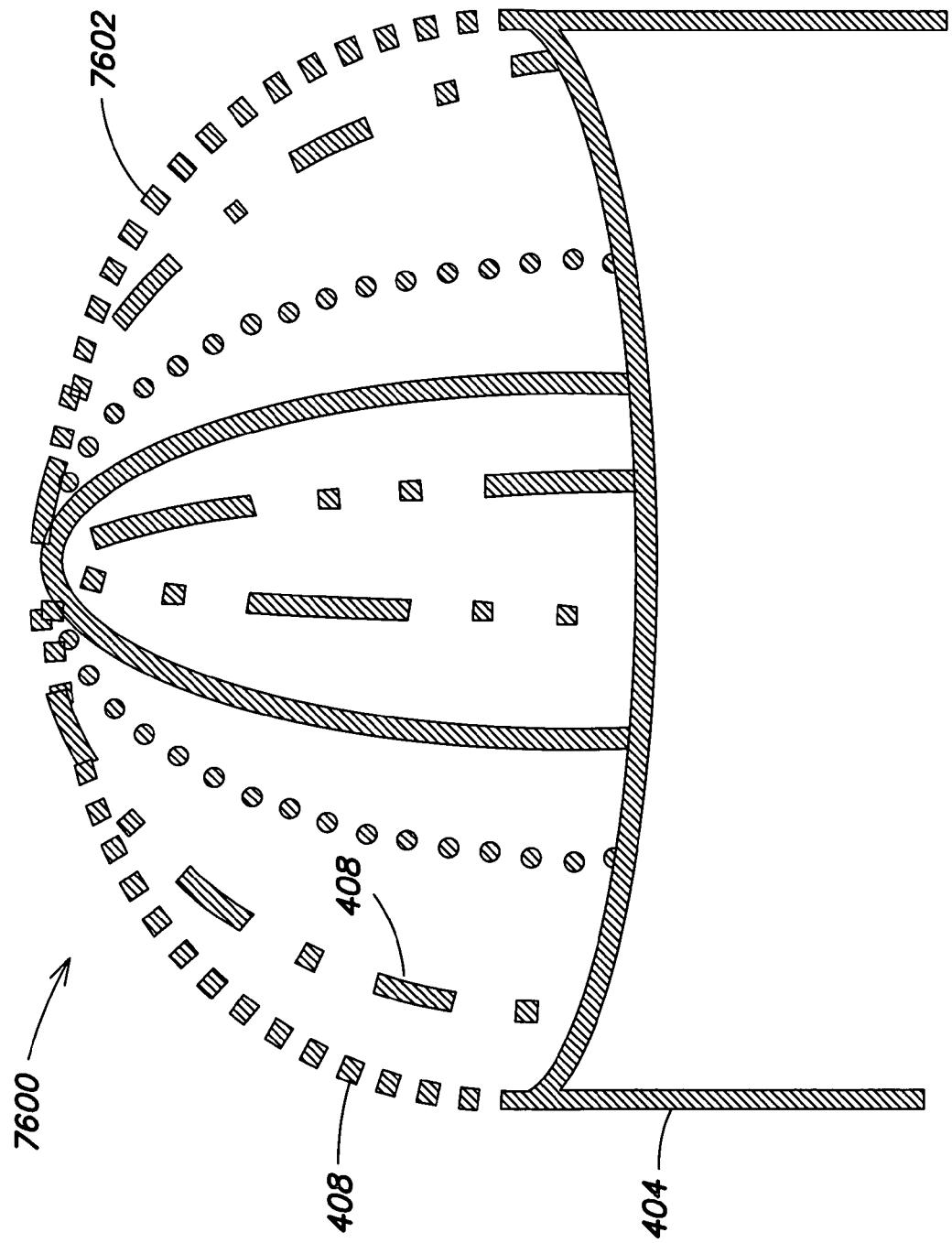
FIG. 76 depicts a configuration of lighting units in a dome shape.

FIG. 76 shows a configuration 7600 with a dome 7602 consisting of curved lighting units 408 and linear lighting units 404. The dome could be a dome for a building, gazebo, architectural feature or the like.

Figure 77:
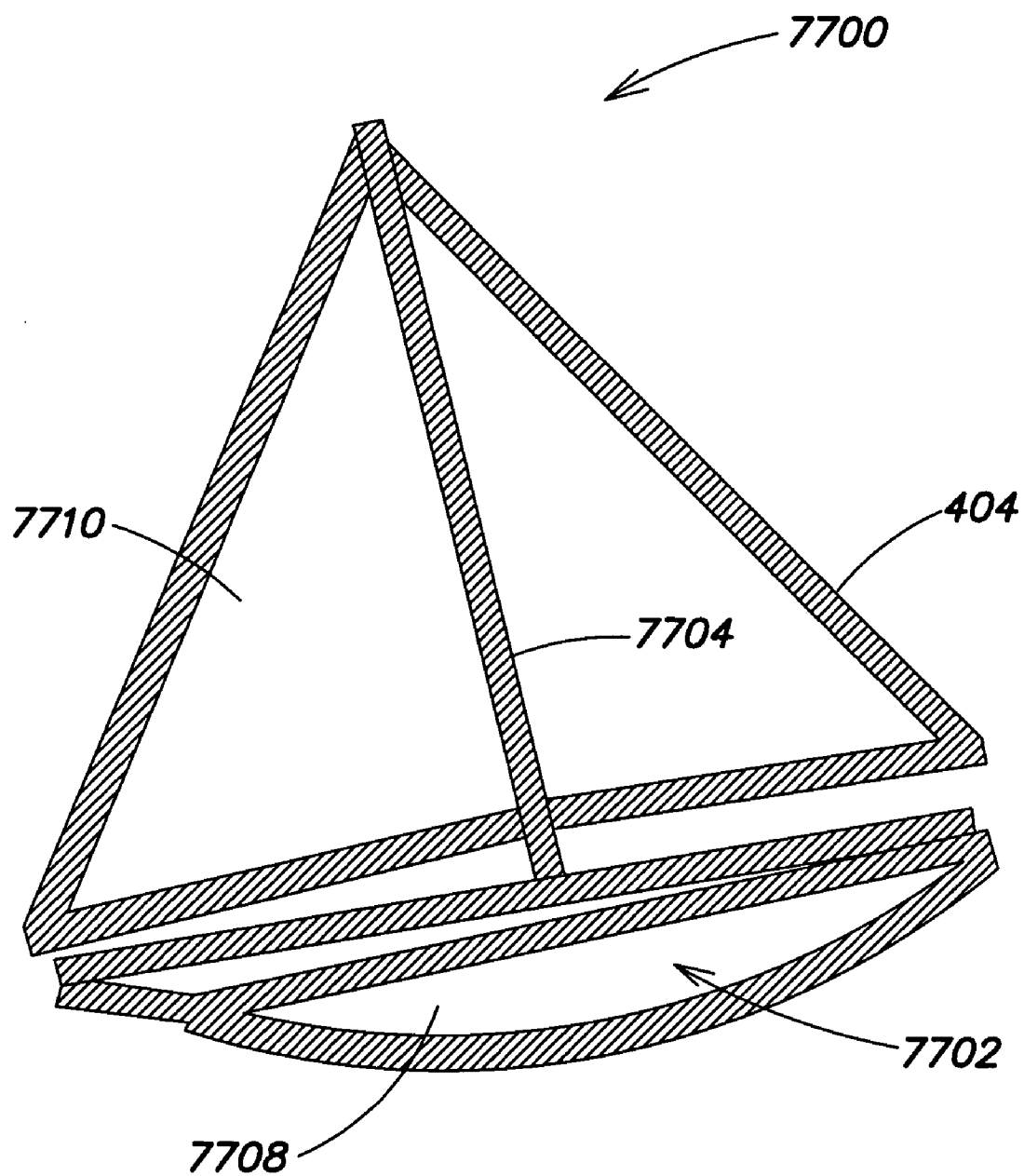
FIG. 77 depicts a configuration of lighting units disposed on a sail boat.

FIG. 77 shows a configuration 7700 of a boat 7702 with linear lighting units 404 highlighting the mast 7704, hull 7708 and sail 7710 of a sailboat. Similar configurations could be used for other forms of boats, such as motor boats, pontoon boats, and the like, as well as other vehicles, such as planes, automobiles, buses, ships and the like.

Again, in all of the embodiments above, individual lighting units 100 of all shapes and sizes can be addressed, authored and controlled in the ways described above, including playing scripted programs, responding to sensors, serving as objects in a game or other computer program, responding to music or video inputs, or responding to direct user input, such as a user interface. Linear lighting units 404 and curvilinear lighting units 408 allow the creation of large, elaborate arrays and configurations that allow for lighting displays that highlight architectural features, provide information, and produce entertaining effects.

While the invention has been disclosed in connection with the embodiments shown and described above, various equivalents, modifications and improvements will be apparent to one of ordinary skill in the art and are encompassed herein.

APPENDIX A

DirectLight API

A Programming Interface for Controlling Color Kinetics Full Spectrum Lighting

Important Stuff You Should Read First.
1) The sample program and Real Light Setup won't run until you register the DirectLight.dll COM object with Windows on your computer. Two small programs cleverly named "Register DirectLight.exe" and "Unregister DirectLight.exe" have been included with this install.
2) DirectLight assumes that you have a SmartJack hooked up to COM1. You can change this assumption by editing the DMX_INTERFACE_NUM value in the file "my_lights.h."

About DirectLight

Organization

An application (for example, a 3D rendered game) can create virtual lights within its 3D world. DirectLight can map these lights onto real-world Color Kinetics full spectrum digital lights with color and brightness settings corresponding to the location and color of the virtual lights within the game.

In DirectLights three general types of virtual lights exist:
Dynamic light. The most common form of virtual light has a position and a color value. This light can be moved and it's color changed as often as necessary. Dynamic lights could represent glowing space nebulae, rocket flares, a yellow spotlight flying past a corporate logo, or the bright red eyes of a ravenous mutant ice-weasel.
Ambient light is stationary and has only color value. The sun, an overhead room light, or a general color wash are examples of ambient. Although you can have as many dynamic and indicator lights as you want, you can only have one ambient light source (which amounts to an ambient color value).
Indicator lights can only be assigned to specific real-world lights. While dynamic lights can change position and henceforth will affect different real-world lights, and ambient lights are a constant color which can effect any or all real-world lights, indicator lights will always only effect a single real-world light. Indicators are intended to give feedback to the user separate from lighting, e.g. shield status, threat location, etc.
All these lights allow their color to be changed as often as necessary.

In general, the user will set up the real-world lights. The "my_lights.h" configuration file is created in, and can be edited by, the "DirectLight GUI Setup" program. The API loads the settings from the "my_lights.h" file, which contains all information on where the real-world lights are, what type they are, and which sort of virtual lights (dynamic, ambient, indicator, or some combination) are going to affect them.

Virtual lights can be created and static, or created at run time dynamically. DirectLights runs in it's own thread; constantly poking new values into the lights to make sure they don't fall asleep. After updating your virtual lights you send them to the real-world lights with a single function call. DirectLights handles all the mapping from virtual world to real world.

If your application already uses 3D light sources, implementing DirectLight can be very easy, as your light sources can be mapped 1:1 onto the Virtual_Light class.

A typical setup for action games has one overhead light set to primarily ambient, lights to the back, side and around the monitor set primarily to dynamic, and perhaps some small lights near the screen set to indicators.

The ambient light creates a mood and atmosphere. The dynamic lights around the player give feedback on things happening around him: weapons, environment objects, explosions, etc. The indicator lights give instant feedback on game parameters: shield level, danger, detection, etc.

Effects (LightingFX) can be attached to lights which override or enhance the dynamic lighting. In Star Trek: Armada, for example, hitting Red Alert causes every light in the room to pulse red, replacing temporarily any other color information the lights have.

Other effects can augment. Explosion effects, for example, can be attached to a single virtual light and will play out over time, so rather than have to continuously tweak values to make the fireball fade, virtual lights can be created, an effect attached and started, and the light can be left alone until the effect is done.

Real lights have a coordinate system based on the room they are installed in. Using a person sitting at a computer monitor as a reference, their head should be considered the origin. X increases to their right. Y increases towards the ceiling. Z increases towards the monitor.

Virtual lights are free to use any coordinate system at all. There are several different modes to map virtual lights onto real lights. Having the virtual light coordinate system axis-aligned with the real light coordinate system can make your life much easier.

Light positions can take on any real values. The DirectLight GUI setup program restricts the lights to within 1 meter of the center of the room, but you can change the values by hand to your heart's content if you like. Read about the Projection Types first, though. Some modes require that the real world and virtual world coordinate systems have the same scale.

Getting Started

Installing DirectLight SDK

Running the Setup.exe file will install:
In/Windows/System/three dll files, one for DirectLight, two for low-level communications with the real-world lights via DMX.
DirectLight.dll
DMXIO.dll
DLPORTIO.dll
In the folder you installed DirectLight in: Visual C++ project files, source code and header files:

```
DirectLight.dsp
DirectLight.dsw
etc.
DirectLight.h
DirectLight.cpp
Real_Light.h
Real_Light.cpp
Virtual_Light.h
Virtual_Light.cpp
etc.
``` compile time libraries:

```
FX_Library.lib
C01104.70118.US
679094.1
    DirectLight.lib
    DMXIO.lib
``` and configuration files:

```
my_lights.h
light_definitions.h
GUI_config_file.h
Dynamic_Localized_Strings.h
```

The "my_lights.h" file is referenced both by DirectLight and DirectLight GUI Setup.exe. "my_lights.h" in turn references "light_definitions.h" The other files are referenced only by DirectLight GUI Setup. Both the DLL and the Setup program use a registry entry to find these files:

```
HKEY_LOCAL_MACHINE\Software\ColorKinetics\
DirectLight\1.00.000\location
```

Also included in this directory is this documentation, and subfolders:

FX_Libraries contain lighting effects which can be accessed by DirectLights.
Real Light Setup contains a graphical editor for changing info about the real lights.
Sample Program contains a copiously commented program demonstrating how to use DirectLight.

DirectLight COM

The DirectLight DLL implements a COM object which encapsulates the DirectLight functionality. The DirectLight object possesses the DirectLight interface, which is used by the client program.

In order to use the DirectLight COM object, the machine on which you will use the object must have the DirectLight COM server registered (see above: Important Stuff You Should Read First). If you have not done this, the Microsoft COM runtime library will not know where to find your COM server (essentially, it needs the path of DirectLight.dll).

To access the DirectLight COM object from a program (we'll call it a client), you must first include "directlight.h", which contains the definition of the DirectLight COM interface (among other things) and "directlight_i.c", which contains the definitions of the various UIDs of the objects and interfaces (more on this later).

Before you can use any COM services, you must first initialize the COM runtime. To do this, call the CoInitialize function with a NULL parameter:

```
CoInitialize (NULL);
```

For our purposes, you don't need to concern yourself with the return value.

Next, you must instantiate a DirectLight object. To do this, you need to call the CoCreateInstance function. This will create an instance of a DirectLight object, and will provide a pointer to the DirectLight interface:

```
HRESULT hCOMError =
    CoCreateInstance( CLSID_CDirectLight,
        NULL,
        CLSCTX_ALL ,
        IID_IDirectLight,
        (void **) &pDirectLight);
```

CLSID_CDirectLight is the identifier (declared in directlight_i.c) of the DirectLight object, ID_IDirectLight is the identifier of the DirectLight interface, and pDirectLight is a pointer to the implementation of the DirectLight interface on the object we just instantiated. The pDirectLight pointer will be used by the rest of the client to access the DirectLights functionality.

Any error returned by CoCreateInstance will most likely be REGDB_E_CLASSNOTREG, which indicates that the class isn't registered on your machine. If that's the case, ensure that you ran the Register DirectLight program, and try again.

When you're cleaning up your app, you should include the following three lines:

```
// kill the COM object
    pDirectLight->Release( ) ;
// We ask COM to unload any unused COM Servers.
CoFreeUnusedLibraries ( ) ;
    // We're exiting this app so shut down the COM Library.
    CoUninitialize ( ) ;
```

You absolutely must release the COM interface when you are done using it. Failure to do so will result in the object remaining in memory after the termination of your app.

CoFreeUnusedLibraries( ) will ask COM to remove our DirectLight factory (a server that created the COM object when we called CoCreateInstance( )) from memory, and CoUninitialize( ) will shut down the COM library.

DirectLight Class

The DirectLight class contains the core functionality of the API. It contains functionality for setting ambient light values, global brightness of all the lights (gamma), and adding and removing virtual lights.

Types:

```
enum Projection_Type{
        SCALE_BY_VIRTUAL_DISTANCE_TO_CAMERA_
        ONLY = 0,
        SCALE_BY_DISTANCE_AND_ANGLE = 1,
        SCALE_BY_DISTANCE_VIRTUAL_TO_REAL = 2 };
```

For an explanation of these values, see "Projection Types" in Direct Light Class

```
enum Light_Type{
        C_75 = 0,
        COVE_6 = 1 };
```

For an explanation of these values, see "Light Types" in Direct Light Class, or look at the online help for "DirectLight GUI Setup."

```
enum Curve_Type{
        DIRECTLIGHT_LINEAR = 0,
        DIRECTLIGHT_EXPONENTIAL = 1,
        DIRECTLIGHT_LOGARITHMIC = 2 };
```

These values represent different curves for lighting effects when fading from one color to another.

Public Member Functions:

```
void Set_Ambient_Light(  int R,
                         int G,
                         int B );
```

The Set_Ambient_Light function sets the red, green and blue values of the ambient light to the values passed into the function. These values are in the range 0-MAX_LIGHT_BRIGHTNESS. The Ambient light is designed to represent constant or "Room Lights" in the application. Ambient Light can be sent to any or all real of the real-world lights. Each real world light can include any percentage of the ambient light.

```
void Stir_Lights(  void *user_data  );
```

Stir_Lights sends light information to the real world lights based on the light buffer created within DirectLights. The DirectLight DLL handles stirring the lights for you. This function is normally not called by the application

```
Virtual_Light * Submit_Virtual_Light(  float xpos,
                                       float ypos,
                                       float zpos,
                                       int red,
                                       int green,
                                       int blue  );
```

Submit_Virtual_Light creates a Virtual_Light instance. Its virtual position is specified by the first three values passed in, it's color by the second three. The position should use application space coordinates. The values for the color are in the range 0-MAX_LIGHT_BRIGHTNESS. This function returns a pointer to the light created.

```
void Remove_Virtual_Light( Virtual_Light * bad_light );
```

Given a pointer to a Virtual_Light instance, Remove_Virtual_Light will delete the virtual light.

```
void Set_Gamma( float gamma );
```

The Set_Gamma function sets the gamma value of the Direct Light data structure. This value can be used to control the overall value of all the lights, as every virtual light is multiplied by the gamma value before it is projected onto the real lights.

```
void Set_Cutoff_Range( float cutoff_range );
```

Set_Cutoff_Range sets the cutoff distance from the camera. Beyond this distance virtual lights will have no effect on real-world lights. Set the value high to allow virtual lights to affect real world lights from a long way away. If the value is small virtual lights must be close to the camera to have any effect. The value should be in application space coordinates.

```
void Clear_All_Real_Lights( void );
Clear_All_Lights destroys all real lights.
void Project_All_Lights( void );
```

Project_All_Lights calculates the effect of every virtual on every real-world light, taking into account gamma, ambient and dynamic contributions, position and projection mode, cutoff angle and cutoff range, and sends the values to every real-world light.

```
void Set Indicator Color( int which indicator,
                          int red,
                          int green,
                          int blue );
```

Indicators can be assigned to any of the real world lights via the configuration file( my_lights.h). Each indicator must have a unique non-negative integer ID. Set_Indicator_Color changes the color of the indicator designated by which_indicator to the red, green, and blue values specified. If Set_Indicator_Color is called with an indicator id which does not exist, nothing will happen. The user specifies which lights should be indicators, but note that lights that are indicators can still be effected by the ambient and dynamic lights.

```
Indicator Get Indicator( int which indicator );
```

Returns a pointer to the indicator with the specified value.

```
int Get_Real_Light_Count( void );
```

Returns the number of real lights.

```
void Get_My_Lights_Location( char buffer[MAX_PATH] );
```

Looks in the directory and finds the path to the "my_lights.h" file.

```
void Load_Real_Light_Configuration( char * fullpath = NULL );
```

Loads the "my_lights.h" file from the default location determined by the registry. DirectLight will create a list of real lights based on the information in the file.

```
void Submit_Real_Light( char * indentifier,
                        int DMX_port,
                        Projection_Type projection_type,
                        int indicator_number,
                        float add_ambient,
                        float add_dynamic,
                        float gamma,
                        float cutoff_angle,
                        float x,
                        float y,
                        float z );
```

Creates a new real light in the real world. Typically DirectLight will load the real light information from the "my_lights.h" file at startup.

```
void Remove_Real_Light( Real_Light * dead_light );
```

Safely deletes an instance of a real light.

```
Light GetAmbientLight ( void );
```

Returns a pointer to the ambient light.

```
bool RealLightListEmpty ( void );
```

Returns true if the list of real lights is empty, false otherwise.

Light Class

Ambient lights are defined as lights. Light class is the parent class for Virtual Lights and Real_Lights. Member variables:

---
static const int MAX_LIGHT_BRIGHTNESS. Defined as 255

---

LightingFX_List * m_FX_currently attached. A list of the effects currently attached to this light.

ColorRGB m_color. Every light must have a color! ColorRGB is defined in ColorRGB.h ---
SCALE_BY_VIRTUAL_DISTANCE_TO_CAMERA_ONLY this real light will receive contributions from virtual lights based soley on the distance from the origin of the virtual coordinate system to the position of the virtual light. The virtual light contribution fades linearly as the distance from the origin approaches the cutoff range.
SCALE_BY_DISTANCE_AND_ANGLE this real light will receive contributions from virtual lights based on the distance as computed above AND the difference in angle between the real light and the virtual light. The virtual light contribution fades linearly as the distance from the origin approaches the cutoff range and the angle approaches the cutoff angle.
SCALE_BY_DISTANCE_VIRTUAL_TO_REAL this real light will receive contributions from virtual lights based on the distance in 3-space from real light to virtual light. This mode assumes that the real and virtual coordinate systems are identical. The virtual light contribution fades linearly as the distance from real to virtual approaches the cutoff range.
float m_xpos x,y,z position in virtual space.
float m_ypos
float m_zpos

---

---
void Attach_FX( LightingFX * new_FX )

---

Attach a new lighting effect to this virtual light.

---
void Detach_FX( LightingFX * old_FX )

---

Detach an old lighting effect from this virtual light.

Real Lights

Real_Light inherits from the Light class. Real lights represent lights in the real world. Member variables:

---
static const int NOT_AN_INDICATOR_LIGHT defined as –1.

--- char m_identifier[100] is the name of the light (like "overhead" or "covelight1"). Unused by DirectLight except as a debugging tool.

int DMX_port is a unique non-negative integer representing the channel the given light will receive information on. DMX information is sent out in a buffer with 3 bytes (red, green and blue) for each light. (DMX_port * 3) is actually the index of the red value for the specified light. DirectLight DMX buffers are 512 bytes, so DirectLight can support approximately 170 lights. Large buffers can cause performance problems, so if possible avoid using large DMX_port numbers.

Light_Type m_type describes the different models of Color Kinetics lights. Currently unused except by DirectLight GUI Setup to display icons.

float m_add_ambient the amount of ambient light contribution to this lights color. Range 0–1 float m_add_dynamic the amount of dynamic light contribution to this lights color. Range 0–1 float m_gamma is the overall brightness of this light. Range 0–1.

float m_cutoff_angle determines how sensitive the light is to the contributions of the virtual lights around it. Large values cause it to receive information from most virtual lights. Smaller values cause it to receive contributions only from virtual lights in the same arc as the real light.

Projection_Type m_projection_type defines how the virtual lights map onto the real lights.

int m_indicator_number. if indicator is negative the light is not an indicator. If it is non-negative it will only receive colors sent to that indicator number.

Virtual Lights

Virtual Lights represent light sources within a game or other real time application that are mapped onto real-world Color Kinetics lights. Virtual Lights may be created, moved, destroyed, and have their color changed as often as is feasible within the application.

static const int MAX_LIGHT_BRIGHTNESS;

MAX_LIGHT_BRIGHTNESS is a constant representing the largest value a light can have. In the case of most Color Kinetics lights this value is 255. Lights are assumed to have a range that starts at 0

---
void Set_Color( int R,
                int G,
                int B );

---

The Set_Color function sets the red, green and blue color values of the virtual light to the values passed into the function.

---
void Set_Position( float x_pos,
                   float y_pos,
                   float z_pos  );

---

The Set_Position function sets the position values of the virtual light to the values passed into the function. The position should use application space coordinates.

```
void Get_Position(      float *x_pos,
                        float *y_pos,
                        float *z_pos  );
```

Gets the position of the light.

Lighting FX

Lighting FX are time-based effects which can be attached to real or virtual lights, or indicators, or even the ambient light. Lighting effects can have other effects as children, in which case the children are played sequentially.

```
static const int FX_OFF;       Defined as -1.
static const int START_TIME;   Times to start and stop the effect.
This is a virtual value. The
static const int STOP_TIME;    individual effects will scale their
time of play based on the total.
void Set_Real_Time(  bool Real_Time  );
```

If TRUE is passed in, this effect will use real world time and update itself as often as Stir_Lights is called. If FALSE is passed in the effect will use application time, and update every time Apply-FX is called.

```
void Set_Time_Extrapolation (  bool extrapolate );
```

If TRUE is passed in, this effect will extrapolate it's value when Stir_Lights is called.

```
void Attach_FX_To_Light (  Light * the_light );
```

Attach this effect to the light passed in.

```
void Detach_FX_From_Light ( Light * the_light,
                            bool remove_FX_from_light = true );
```

Remove this effect's contribution to the light. If remove_FX_from_light is true, the effect is also detached from the light.

The above functions also exist as versions to effect Virtual lights, Indicator lights (referenced either by a pointer to the indicator or it's number), Ambient light, and all Real_Lights.

```
void Start (     float FX_play_time,
                 bool looping = false );
```

Start the effect. If looping is true the effect will start again after it ends.

```
void Stop (      void );
```

Stop the effect without destroying it.

```
void Time_Is_Up (      void );
```

Either loop or stop playing the effect, since time it up for it.

```
void Update_Time (     float time_passed );
```

Change how much game time has gone by for this effect.

```
void Update_Real_Time (      void );
```

Find out how much real time has passed for this effect.

```
void Update_Extrapolated_Time (      void );
```

Change the FX time based on extrapolating how much application time per real time we have had so far.

```
virtual void Apply_FX (      ColorRGB &base_color  );
```

This is the principle lighting function. When Lighting_FX is inherited, this function does all the important work of actually changing the light's color values over time. Note that you can choose to add your value to the existing light value, replace the existing value with your value, or any combination of the two. This way Lighting effects can override the existing lights or simply supplant them.

```
static void Update_All_FX_Time (     float time_passed );
```

Update the time of all the effects.

```
void Apply_FX_To_All_Virtual_Lights (     void );
```

Apply this effect to all virtual, ambient and indicator lights that are appropriate.

```
void Apply_All_FX_To_All_Virtual_Lights (    void    );
```

Apply each effect to all virtual, ambient and indicator lights that are appropriate.

```
void Apply_All_FX_To _Real_Light (    Real_Light *
the_real_light );
```

Apply this effect to a single real light.

```
void Start_Next_ChildFX (    void    );
```

If this effect has child effect, start the next one.

```
void Add_ChildFX (    LightingFX * the_child,
                     float timeshare    );
```

Add a new child effect onto the end of the list of child effects that this effect has. Timeshare is this child's share of the total time the effect will play. The timeshares don't have to add up to one, as the total shares are scaled to match the total real play time of the effect

```
void Become_Child_Of (    Lighting_FX * the_parent    );
```

Become a parent of the specified effect.

```
void Inherit_Light_List (    Affected_Lights * our_lights    );
```

Have this effect and all it's children inherit the list of lights to affect.

Configuration File

The file "my_lights.h" contains information about real-world lights, and is loaded into the DirectLight system at startup. The files "my_lights.h" and "light_definitions.h" must be included in the same directory as the application using DirectLights.

"my_lights.h" is created and edited by the DirectLight GUI Setup program. For more information on how to use the program check the online help within the program.

Here is an example of a "my_lights.h" file:

```
//////////////////////////////////////////////
//
// my_lights.h
//
// Configuration file for Color Kinetics lights
//        used by DirectLights
//
// This file created with DirectLights GUI Setup v1.0
//
//////////////////////////////////////////////
// Load up the basic structures
#include "Light_Definitions.h"
// overall gamma
float OVERALL_GAMMA = 1.0;
// which DMX interface do we use?
int DMX_INTERFACE_NUM = 0;
//////////////////////////////////////////////
//
// This is a list of all the real lights in the world
//
Real_Light my_lights [MAX_LIGHTS] =
{
//NAME         PORT  TYPE  PRJ  IND  AMB    DYN    GAMMA  CUTOFF  X       Y       Z
"Overhead",    0,    1,    0,   -1,  1.000, 0.400, 1.000, 3.142,  0.000,  -1.000, 0.000,
"Left",        1,    0,    1,   -1,  0.000, 1.000, 1.000, 1.680,  -1.000, 0.000,  0.000,
"Right",       2,    0,    1,   -1,  0.000, 1.000, 0.800, 1.680,  1.000,  0.000,  0.000,
"Back",        3,    0,    1,   -1,  0.000, 1.000, 1.000, 1.680,  0.000,  0.000,  -1.000,
"LeftCove0",   4,    0,    1,   0,   0.000, 0.000, 1.000, 0.840,  -0.500, -0.300, 0.500,
"LeftCove1",   5,    0,    1,   1,   0.000, 0.000, 1.000, 0.840,  -0.500, 0.100,  0.500,
"LeftCove2",   6,    0,    1,   -1,  0.000, 0.000, 1.000, 0.840,  -0.500, 0.500,  0.500,
"CenterCove0", 7,    0,    1,   -1,  0.000, 0.000, 1.000, 0.840,  -0.400, 0.700,  0.500,
"CenterCove1", 8,    0,    1,   -1,  0.000, 0.000, 1.000, 0.840,  -0.200, 0.700,  0.500,
"CenterCove2", 9,    0,    1,   -1,  0.000, 0.000, 1.000, 0.840,  0.200,  0.700,  0.500,
"CenterCove3", 10,   0,    1,   -1,  0.000, 0.000, 1.000, 0.840,  0.400,  0.700,  0.500,
"RightCove0",  11,   0,    1,   2,   0.000, 0.000, 1.000, 0.840,  0.500,  0.500,  0.500,
"RightCove1",  12,   0,    1,   -1,  0.000, 0.000, 1.000, 0.840,  0.500,  0.100,  0.500,
"RightCove2",  13,   0,    1,   -1,  0.000, 0.000, 1.000, 0.840,  0.500,  -0.300, 0.500,
};
```

This example file is taken from our offices, where we had lights setup around a computer, with the following lights (referenced from someone sitting at the monitor): One overhead (mostly ambient); one on each side of our head (Left and Right); one behind our head; Three each along the top, left and right side of the monitor in front of us.

Each line in the "my_lights" file represents one Real_Light. Each Real_Light instance represents, surprise surprise, one real-world light.

The lower lights on the left and right side of the monitor are indicators 0 and 2, the middle light on the left side of the monitor is indicator 1.

The positional values are in meters. Z is into/out of the plane of the monitor. X is vertical in the plane of the monitor, Y is horizontal in the plane of the monitor.

MAX_LIGHTS can be as high as 170 for each DMX universe. Each DMX universe is usually a single physical connection to the computer (COM1, for example). The larger MAX_LIGHTS is, the slower the lights will respond, as MAX_LIGHTS determines the size of the buffer sent to DMX (MAX_LIGHTS * 3) Obviously, larger buffers will take longer to send.

OVERALL_GAMMA can have a value of 0–1. This value is read into DirectLights and can be changed during run-time.

The invention claimed is:

1. A method of providing a lighting system including at least first and second units, comprising:
   providing a substantially linear circuit board in each unit;
   disposing a plurality of light sources along the circuit board;
   disposing the circuit board and the light sources in a substantially linear housing of each unit;
   providing a light transmissive cover for the housing;
   providing a connection facility of the housing; and
   arranging the system such that the first unit of the lighting system is disposed end to end with the second unit of the lighting system without a gap in light emission between the housings;
   wherein the processor is an application specific integrated circuit (ASIC);
   wherein the ASIC is configured to receive and transmit a data stream; and
   wherein the ASIC responds to data addressed to it, modifies at least one bit of the data stream, and transmits the modified data stream.

2. A method of claim 1, wherein the light sources are LEDs.

3. A method of claim 1, wherein the processor and the LEDs are on the same circuit board.

4. A method of claim 1, wherein the connection facility is a hole that allows cables to exit the housing at a location other than the end of the housing.

5. A method of providing a lighting system including at least first and second units, comprising:
   providing a substantially linear circuit board in each unit;
   disposing a plurality of light sources along the circuit board;
   disposing the circuit board and the light sources in a substantially linear housing of each unit;
   providing a light-transmissive cover for the housing;
   providing a connection facility of the housing;
   arranging the system such that the first unit of the lighting system is disposed end to end with the second unit of the lighting system without a gap in light emission between the housings; and
   disposing a plurality of lighting systems in a serial configuration and controlling all of them by a stream of data to respective ASICs of each of them, wherein each lighting system responds to the first unmodified bit of data in the stream, modifies that bit of data, and transmits the stream to the next ASIC.

6. A method of claim 1, wherein the housing is configured to resemble at least one of a fluorescent light and a neon light.

7. A method of claim 1 wherein the housing is curved.

8. A method of claim 1, wherein the housing is configured in a bent configuration.

9. A method of claim 1, wherein the housing is configured in a branched configuration.

10. A method of claim 1, wherein the housing is configured in a T configuration.

11. A method of claim 1, further comprising providing a communication facility of the lighting system, wherein the lighting system responds to data from a source exterior to the lighting system.

12. A method of claim 11, wherein the data is from a signal source exterior to the lighting system.

13. A method of claim 12, wherein the signal source is a wireless signal source.

14. A method of claim 12, wherein the signal source includes a sensor for sensing an environmental condition, and the control of the lighting system is in response to the environmental condition.

15. A method of claim 12, wherein the signal source generates a signal based on a scripted lighting program for the lighting system.

16. A method of claim 1, wherein the control of the lighting system is based on assignment of lighting system units as objects in an object-oriented computer program.

17. A method of claim 16, wherein the computer is an authoring system.

18. A method of claim 17, wherein the authoring system relates attributes in a virtual system to real world attributes of lighting systems.

19. A method of claim 18, wherein the real world attributes include positions of lighting units of the lighting system.

20. A method of claim 17, wherein the computer program is a computer game.

21. A method of claim 17, wherein the computer program is a music program.

22. A method of claim 1, wherein the lighting system includes a power supply.

23. A method of claim 22, wherein the power supply is a power-factor-controlled power supply.

24. A method of claim 22, wherein the power supply is a two-stage power supply.

25. A method of claim 24, wherein power factor correction includes an energy storage capacitor and a DC—DC converter.

26. A method of claim 25, wherein power factor correction includes energy storage capacitor are separated from the DC—DC converter by a high voltage bus.

27. A method of claim 1, further comprising disposing at least one such lighting unit on a building.

28. A method of claim 27, wherein the lighting units are disposed in an array on a building.

29. A method of claim 28, wherein the array is configured to facilitate displaying at least one of a number, a word, a letter, a logo, a brand, and a symbol.

30. A method of claim 28, wherein the array is configured to display a light show with time-based effects.

31. A method of claim 1, further comprising disposing a lighting unit on at least one of a vehicle, an automobile, a boat, a mast, a sail, an airplane, a wing, a fountain, and a waterfall.

32. A method of claim 1, further comprising disposing a lighting unit on at least one of a deck, a stairway, a door, a window, a roofline, a gazebo, a jungle gym, a swing set, a slide, a tree house, a club house, a garage, a shed, a pool, a spa, furniture, an umbrella, a counter, a cabinet, a pond, a walkway, a tree, a fence, a light pole, and a statue.

33. A method of claim 1, wherein the lighting unit is configured to be recessed in an alcove.

34. A lighting system including at least first and second units, comprising:
a substantially linear circuit board in each unit;
a plurality of light sources along the circuit board, wherein the circuit board and the light sources are disposed in a substantially linear housing of each unit;
a light-transmissive cover for the housing;
a connection facility of the housing, wherein the lighting system is arranged such that the first unit of the lighting system is disposed end to end with the second unit of the lighting system without a gap in light emission between the housings; and
a processor, wherein the processor is an application specific integrated circuit (ASIC); and
wherein the ASIC responds to a data stream addressed to it, modifies at least one bit of the data stream, and transmits the modified data stream.

35. A system of claim 34, wherein the light sources are LEDs.

36. A system of claim 34, wherein the processor and the LEDs are on the same circuit board.

37. A system of claim 34, wherein the connection facility is a hole that allows cables to exit the housing at a location other than the end of the housing.

38. A lighting system including at least first and second units, comprising:
a substantially linear circuit board in each unit;
a plurality of light sources along the circuit board, wherein the circuit board and the light sources are disposed in a substantially linear housing of each unit;
a light-transmissive cover for the housing;
a connection facility of the housing, wherein the lighting system is arranged such that the first unit of the lighting system is disposed end to end with the second unit of the lighting system without a gap in light emission between the housings; and
a plurality of lighting systems in a serial configuration that are controlled by a stream of data to respective ASICs of each of them, wherein each lighting system responds to the first unmodified bit of data in the stream, modifies that bit of data, and transmits the stream to the next ASIC.

39. A system of claim 34, wherein the housing is configured to resemble a fluorescent light.

40. A system of claim 34, wherein the housing is curved.

41. A system of claim 34, wherein the housing is configured in a bent configuration.

42. A system of claim 34, wherein the housing is configured in a branched configuration.

43. A system of claim 34, wherein the housing is configured in a T configuration.

44. A system of claim 34, further comprising a communication facility of the lighting system, wherein the lighting system responds to data from a source exterior to the lighting system.

45. A system of claim 44, wherein the data is from a signal source exterior to the lighting system.

46. A system of claim 45, wherein the signal source is a wireless signal source.

47. A system of claim 45, wherein the signal source includes a sensor for sensing an environmental condition, and the control of the lighting system is in response to the environmental condition.

48. A system of claim 45, wherein the signal source generates a signal based on a scripted lighting program for the lighting system.

49. A system of claim 34, wherein the control of the lighting system is based on assignment of lighting system units as objects in an object-oriented computer program.

50. A system of claim 49, wherein the computer program is an authoring system.

51. A system of claim 50, wherein the authoring system relates attributes in a virtual system to real world attributes of lighting systems.

52. A system of claim 51, wherein the real world attributes include positions of lighting units of the lighting system.

53. A system of claim 49, wherein the computer program is a computer game.

54. A system of claim 49, wherein the computer program is a music program.

55. A system of claim 34, wherein the lighting system includes a power supply.

56. A system of claim 55, wherein the power supply is a power-factor-controlled power supply.

57. A system of claim 55, wherein the power supply is a two-stage power supply.

58. A system of claim 55, wherein power factor correction includes an energy storage capacitor and a DC—DC converter.

59. A system of claim 55, wherein the power factor correction and energy storage capacitor are separated from the DC—DC converter by a bus.

60. A system of claim 34, further comprising at least one such lighting unit on a building.

61. A system of claim 60, wherein the lighting units are disposed in an array on a building.

62. A system of claim 60, wherein the array is configured to facilitate displaying at least one of a number, a word, a letter, a logo, a brand, and a symbol.

63. A system of claim 61, wherein the array is configured to display a light show with time-based effects.

64. A system of claim 34, further comprising a lighting unit on at least one of a vehicle, an automobile, a boat, a mast, a sail, an airplane, a wing, a fountain, and a waterfall.

65. A system of claim 34, further comprising a lighting unit on at least one of a deck, a stairway, a door, a window, a roofline, a gazebo, a jungle gym, a swing set, a slide, a tree house, a club house, a garage, a shed, a pool, a spa, furniture, an umbrella, a counter, a cabinet, a pond, a walkway, a tree, a fence, a light pole, and a statue.

66. A system of claim 34, wherein the lighting unit is configured to be recessed in an alcove.

67. A method of claim 1, wherein the cover is optically operative to diffuse light from the plurality of light sources to produce a smooth color mixing of the light.

68. A method of claim 1, wherein the cover is optically operative to produce a substantially uniform light intensity of light from the plurality of light sources.

69. a system of claim 34, wherein the cover is optically operative to diffuse light from the plurality of light sources to produce a smooth color mixing of the light.

70. A system of claim 34, wherein the cover is optically operative to produce a substantially uniform light intensity of light from the plurality of light sources.

71. The method of claim 1, wherein the light-transmissive cover includes light-transmissive end caps.

72. The system of claim 34, wherein the light-transmissive cover includes light-transmissive end caps.

* * * * *

UNITED STATES PATENT AND TRADEMARK OFFICE
CERTIFICATE OF CORRECTION

| | | |
|---|---|---|
| PATENT NO. | : 7,202,613 B2 | Page 1 of 1 |
| APPLICATION NO. | : 10/360594 | |
| DATED | : April 10, 2007 | |
| INVENTOR(S) | : Frederick M. Morgan et al. | |

It is certified that error appears in the above-identified patent and that said Letters Patent is hereby corrected as shown below:

On the Title Page, Item -56- should read,

On page 4, FOREIGN PATENT DOCUMENTS, the following reference is included:

FR          264079          06/1990

Col. 26, lines 5-6, "color screen, is screen, or any type of display." should read -- color screen, screen, or any other type of display. --

Col. 74, line 34, "turning Is the lights off" should read -- turning the lights off --

Col. 76, line 59, "plugged into the lo wall" should read -- plugged into the wall --

Col. 79, line 21, "The is high voltage" should read -- The high voltage --

Col. 104, lines 30-31, "wherein the computer is an authoring system" should read -- wherein the computer program is an authoring system --

Col. 104, lines 50-51, "wherein power factor correction includes energy storage capacitor" should read -- wherein the power factor correction and energy storage capacitor --

Col. 106, claim 69, line 54, "a system" should read -- A system --

Signed and Sealed this

Eighth Day of July, 2008

JON W. DUDAS
*Director of the United States Patent and Trademark Office*